United States Patent [19]

Masunaga et al.

[11] 4,329,033
[45] May 11, 1982

[54] DISTANCE DETECTING DEVICE AND A FOCUS CONTROL SYSTEM UTILIZING THE SAME

[75] Inventors: Makoto Masunaga; Takao Kinoshita, both of Tokyo; Toshio Sakane; Tokuichi Tsunekawa, both of Yokohama; Kazuya Hosoe, Machida; Takashi Amikura, Tokyo; Isao Harigaya, Yokohama, all of Japan

[73] Assignee: Canon Kabushiki Kaisha, Tokyo, Japan

[21] Appl. No.: 121,690

[22] Filed: Feb. 15, 1980

[30] Foreign Application Priority Data

Feb. 28, 1979 [JP] Japan ............................. 54-22906

[51] Int. Cl.³ ........................... G03B 3/10; G01C 3/08
[52] U.S. Cl. ........................................ 354/25; 250/201
[58] Field of Search ................. 250/201, 204; 354/25, 354/53

[56] References Cited

U.S. PATENT DOCUMENTS

| | | | |
|---|---|---|---|
| 3,525,918 | 8/1970 | Parnell | 318/597 |
| 3,529,528 | 9/1970 | Leitz | 354/25 |
| 3,720,148 | 3/1973 | Harvey | 95/44 |
| 3,725,761 | 4/1973 | Webber | 318/577 |
| 3,777,133 | 12/1973 | Beck | 235/181 |
| 4,004,852 | 1/1977 | Pentecost | 250/201 X |
| 4,078,171 | 3/1978 | Stauffer | 259/201 |
| 4,091,275 | 5/1978 | Wilwerding | 250/201 |
| 4,173,402 | 11/1979 | Horike et al. | 250/204 X |
| 4,183,643 | 1/1980 | Imura | 354/25 |
| 4,189,232 | 2/1980 | Asano | 356/1 |
| 4,199,235 | 4/1980 | Matsuda | 354/25 |
| 4,238,153 | 12/1980 | Imura | 354/195 |
| 4,240,727 | 12/1980 | Lermann et al. | 250/201 X |
| 4,251,143 | 2/1981 | Stemme et al. | 250/201 X |

FOREIGN PATENT DOCUMENTS

42-7828 3/1967 Japan .
50-99729 8/1975 Japan .
2001223 1/1979 United Kingdom .................. 354/25

*Primary Examiner*—Donald A. Griffin
*Attorney, Agent, or Firm*—Fitzpatrick, Cella, Harper & Scinto

[57] ABSTRACT

A distance detecting device in which, with respect to an object whose distance is to be detected, the images of a first and a second field following different lines of sight and containing the object and different in range are scanned while, at the same time, continuous M quantized image element data regarding the first field image and continuous N (N>M) quantized image element data regarding the second field image are obtained and the M image element data regarding the first field image are stored in a first circulation type shift register while the first M image element data of the N image element data regarding the second field image are stored in a second circulation type shift register and the remaining N−M image element data are stored in a third shift register, and the comparison between the stored data of the first and second shift registers during one circulation of said stored data and the relative shift of n bits each of the stored data of the second and third shift registers with respect to the stored data of the first shift register are repeatedly effected to thereby detect the distance to the object, characterized in that in the circulation circuit of the first shift register, bypass means is provided for delaying one circulation of the stored data of the first shift register by n bits relative to one circulation of the stored data of the second shift register and the stored data of the first shift register are circulated through the bypass means, whereby for each one circulation of the stored data of the first shift register, the stored data of the second shift register are shifted by n bits each relative to the stored data of the first shift register.

57 Claims, 81 Drawing Figures

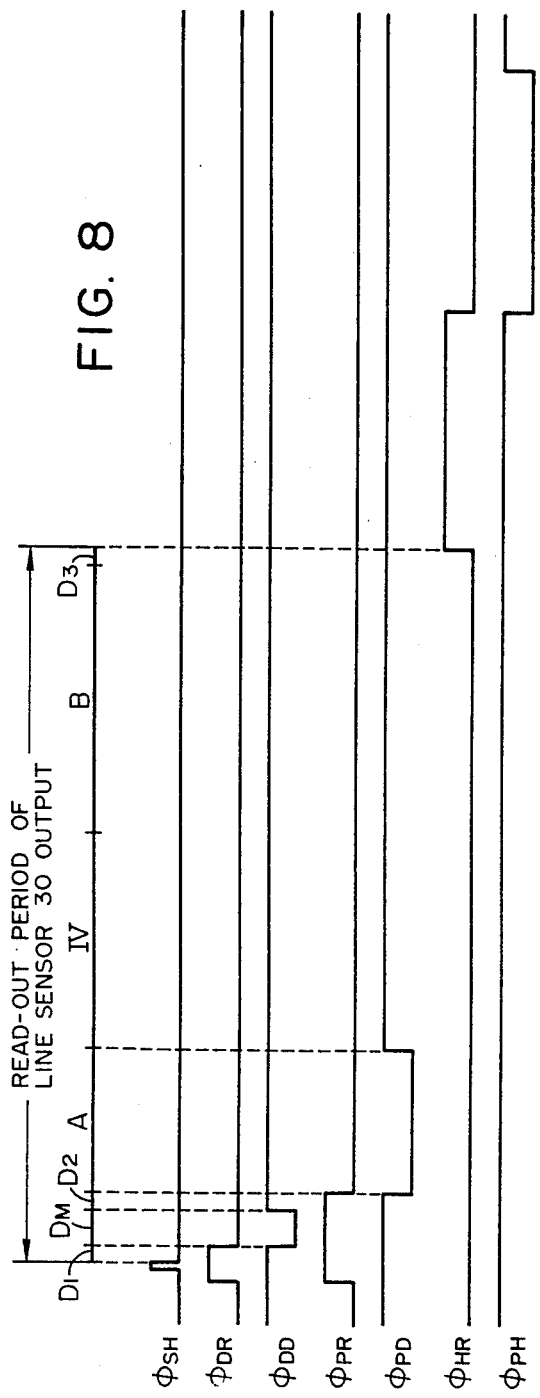
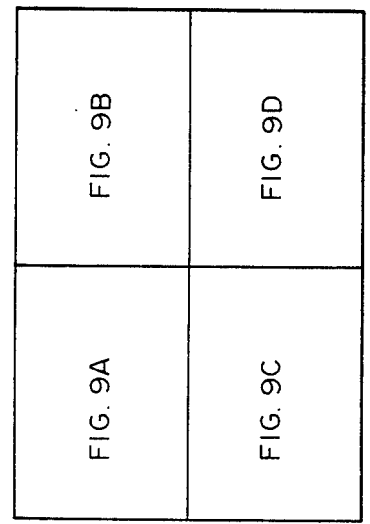

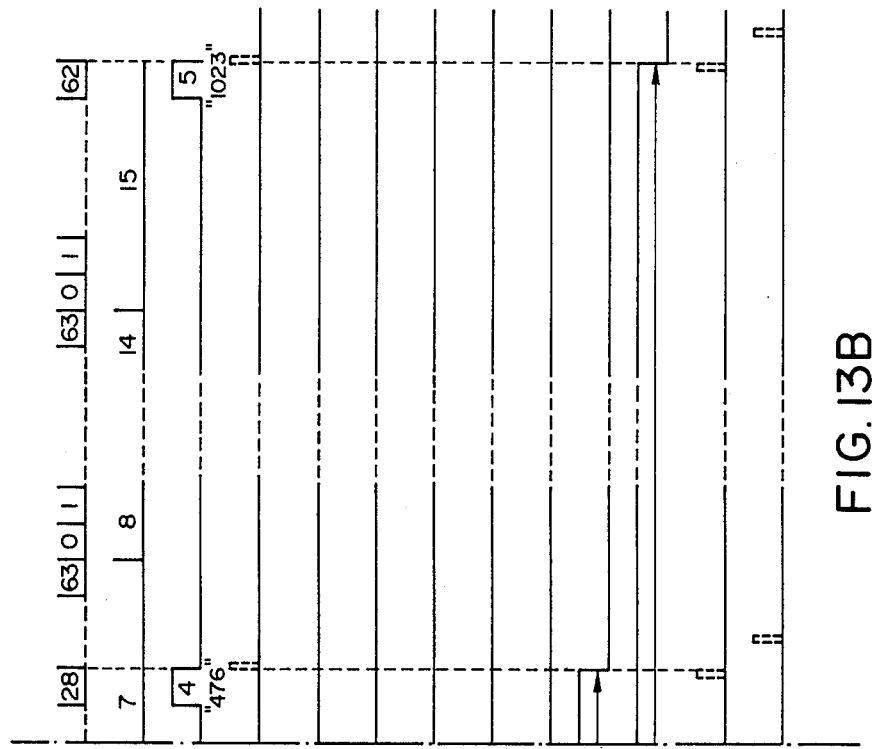

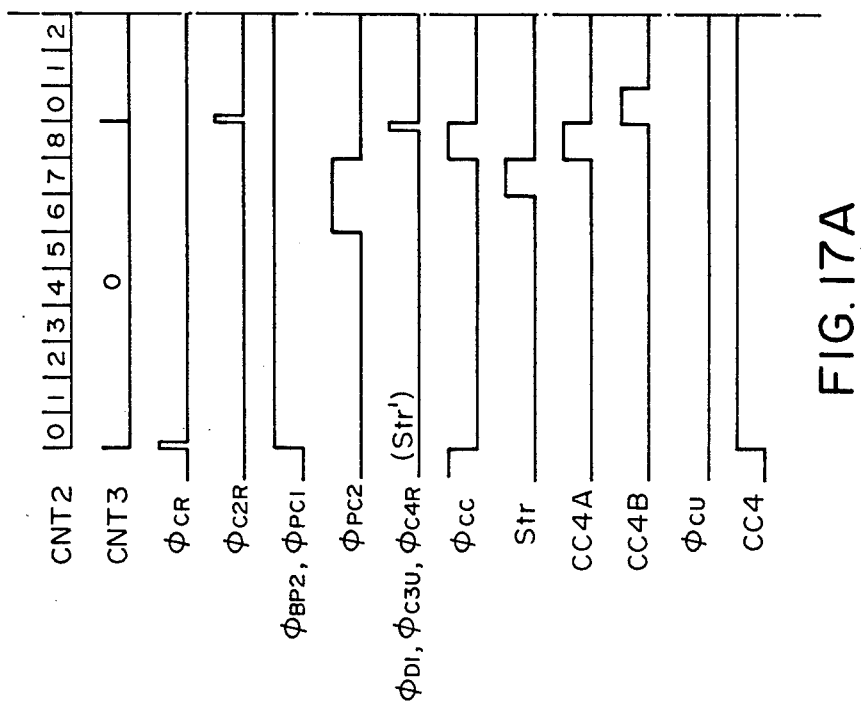

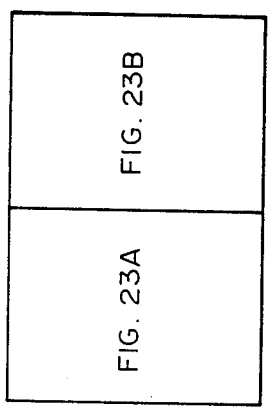
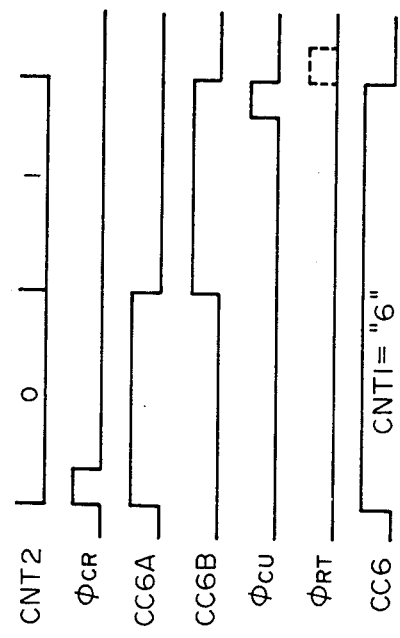
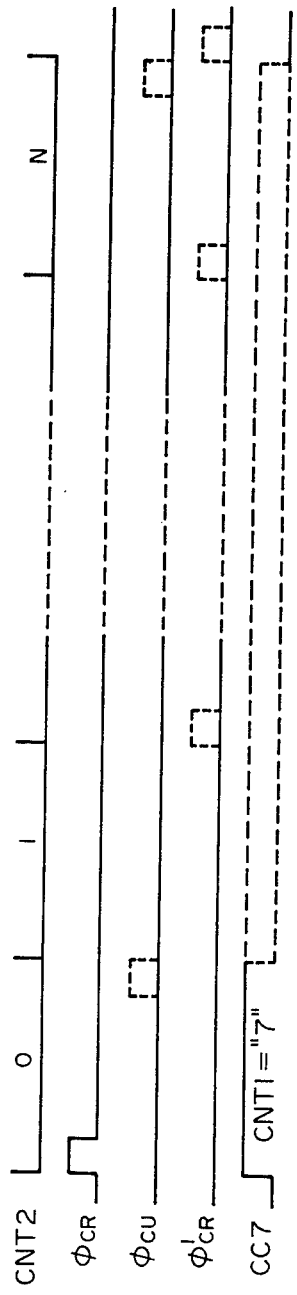

| FIG. 27A | FIG. 27B | FIG. 27C | FIG. 27D | FIG. 27E | FIG. 27F |
| --- | --- | --- | --- | --- | --- |
| FIG. 27G | FIG. 27H | FIG. 27J | FIG. 27K | FIG. 27L | FIG. 27M |
| FIG. 27N | FIG. 27P | FIG. 27Q | FIG. 27R | FIG. 27S | FIG. 27T |

| MODES | SERVO FOCUS OR AUTO. FOCUS | | | | PRESET FOCUS | | | | | |
|---|---|---|---|---|---|---|---|---|---|---|
| | FULL AUTO. | | SEMI-AUTO. | | F1.7 LENS | | F2.8 LENS | | | |
| TERMI-NALS | CONTINUOUS | FOCUS LOCK | STOP | ONE MORE FOCUS | NORMAL PHOTOGRAPHY | STROBOSCOPIC PHOTOGRAPHY | NORMAL PHOTOGRAPHY | STROBOSCOPIC PHOTOGRAPHY | | |
| 17 S | GND | GND | GND | GND | $V_{DD}$ | $V_{DD}$ | GND | GND | | |
| 28 S | GND | GND | GND | GND | GND | GND | $V_{DD}$ | $V_{DD}$ | | |
| POP | OPEN | OPEN | OPEN | OPEN | OPEN | GND | OPEN | GND | | |
| SF | OPEN | OPEN | GND | GND | GND | GND | GND | GND | | |
| OL | OPEN | GND *1 | OPEN *2 | GND *3 | OPEN | OPEN | OPEN | OPEN | | |

*1 : STOP AT CC7
*2 : STOP AT CC0
*3 : STOP AT CC7

FIG. 29

| GRAY CODE | | | | | | BINARY CODE | GRAY CODE | | | | | | BINARY CODE |
|---|---|---|---|---|---|---|---|---|---|---|---|---|---|
| TB0 | TB1 | TB2 | TB3 | TB4 | TB5 | | TB0 | TB1 | TB2 | TB3 | TB4 | TB5 | |
| MSB | | | | | LSB | | MSB | | | | | LSB | |
| 0 | 0 | 0 | 0 | 0 | 0 | 0 | 0 | 1 | 1 | 1 | 0 | 1 | 22 |
| 0 | 0 | 0 | 0 | 0 | 1 | 1 | 0 | 1 | 1 | 1 | 0 | 0 | 23 |
| 0 | 0 | 0 | 0 | 1 | 1 | 2 | 0 | 1 | 0 | 1 | 0 | 0 | 24 |
| 0 | 0 | 0 | 0 | 1 | 0 | 3 | 0 | 1 | 0 | 1 | 0 | 1 | 25 |
| 0 | 0 | 0 | 1 | 1 | 0 | 4 | 0 | 1 | 0 | 1 | 1 | 1 | 26 |
| 0 | 0 | 0 | 1 | 1 | 1 | 5 | 0 | 1 | 0 | 1 | 1 | 0 | 27 |
| 0 | 0 | 0 | 1 | 0 | 1 | 6 | 0 | 1 | 0 | 0 | 1 | 0 | 28 |
| 0 | 0 | 0 | 1 | 0 | 0 | 7 | 0 | 1 | 0 | 0 | 1 | 1 | 29 |
| 0 | 0 | 1 | 1 | 0 | 0 | 8 | 0 | 1 | 0 | 0 | 0 | 1 | 30 |
| 0 | 0 | 1 | 1 | 0 | 1 | 9 | 0 | 1 | 0 | 0 | 0 | 0 | 31 |
| 0 | 0 | 1 | 1 | 0 | 1 | 10 | 1 | 1 | 0 | 0 | 0 | 0 | 32 |
| 0 | 0 | 1 | 1 | 1 | 0 | 11 | 1 | 1 | 0 | 0 | 0 | 1 | 33 |
| 0 | 0 | 1 | 0 | 1 | 0 | 12 | 1 | 1 | 0 | 0 | 1 | 1 | 34 |
| 0 | 0 | 1 | 0 | 1 | 1 | 13 | 1 | 1 | 0 | 0 | 1 | 0 | 35 |
| 0 | 0 | 1 | 0 | 0 | 1 | 14 | 1 | 1 | 0 | 1 | 1 | 0 | 36 |
| 0 | 0 | 1 | 0 | 0 | 0 | 15 | 1 | 1 | 0 | 1 | 1 | 1 | 37 |
| 0 | 1 | 1 | 0 | 0 | 0 | 16 | 1 | 1 | 0 | 1 | 0 | 1 | 38 |
| 0 | 1 | 1 | 0 | 0 | 1 | 17 | 1 | 1 | 0 | 1 | 0 | 0 | 39 |
| 0 | 1 | 1 | 0 | 1 | 1 | 18 | 1 | 1 | 1 | 1 | 0 | 0 | 40 |
| 0 | 1 | 1 | 0 | 1 | 0 | 19 | 1 | 1 | 1 | 1 | 0 | 1 | 41 |
| 0 | 1 | 1 | 1 | 1 | 0 | 20 | 1 | 1 | 1 | 1 | 1 | 1 | 42 |
| 0 | 1 | 1 | 1 | 1 | 1 | 21 | | | | | | | |

| STATES / TERMINALS | FORWARD FOCUS | IN FORCUS | BACKWARD FOCUS |
|---|---|---|---|
| MU1 | L | L | H |
| MU2 | H | L | L |
| ML1 | L | H | H |
| ML2 | H | H | L |
FIG. 36
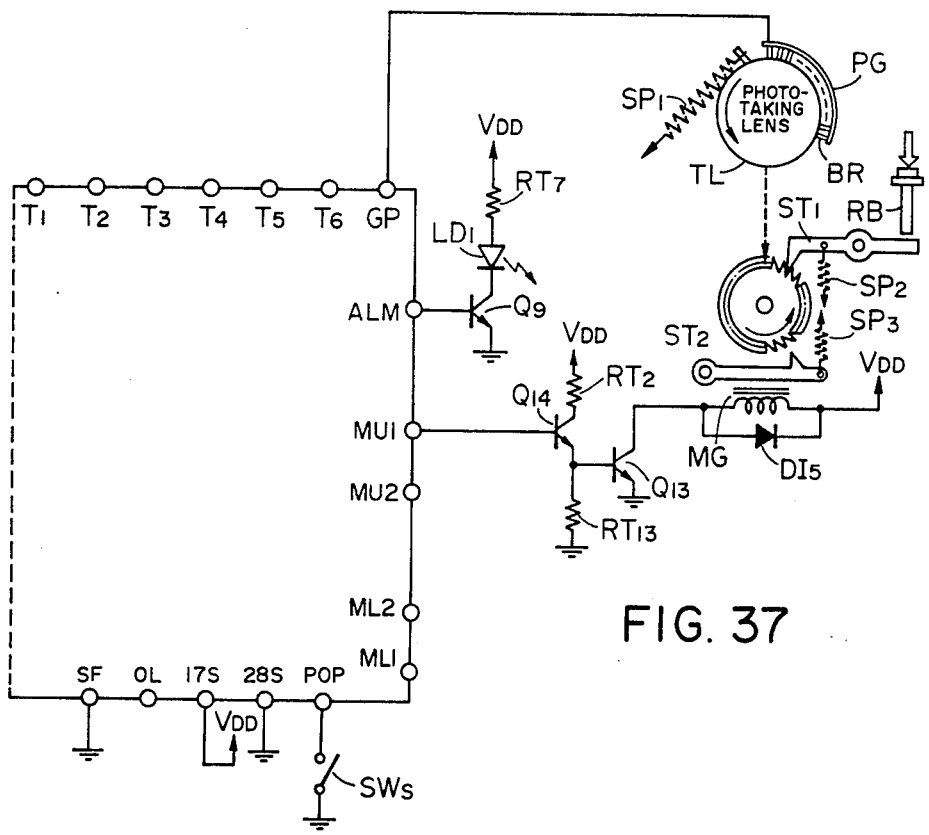
FIG. 37
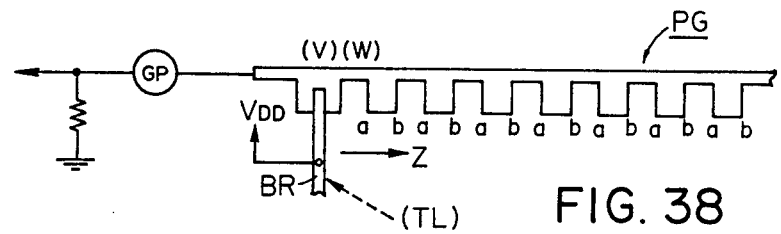
FIG. 38

DISTANCE DETECTING DEVICE AND A FOCUS CONTROL SYSTEM UTILIZING THE SAME

BACKGROUND OF THE INVENTION

1. Field of the Invention

This invention relates to a distance detecting device and a focus control system utilizing the same.

2. Description of the Prior Art

Various distance detecting devices for automatically detecting the distance to an object and various focus control systems for optical instruments such as cameras or the like for effecting the detection of the in-focus and/or the automatic focus adjustment of the optical system with respect to the object on the basis of the distance signal obtained by said devices have heretofore been proposed, and particularly nowadays, there have been proposed such devices which greatly adopt the recent electronic technique to digitalize the system and thereby digitally carry out the detection of the distance to the object. For example, U.S. Pat. No. 4,004,852 patented Jan. 25, 1977, filed June 30, 1975, title "INTEGRATED AUTOMATIC RANGING DEVICE FOR OPTICAL INSTRUMENTS", granted to Pentecost, proposes a distance detecting device in which, with respect to an object whose distance is to be detected, the images of a first and a second field following different lines of sight and containing said object and different in range are scanned by the use of a line type image sensor while, at the same time, the scanning image element signals obtained at this time are transformed into binary form (quantized) on the basis of a predetermined slice level to obtain continuous M binary image element data regarding the first field image and continuous N (N>M) binary image element data regarding the second field image, and the M image element data regarding the first field image are stored in a first circulation type shift register of M-bit construction while the N image element data regarding the second field image are stored in a second circulation type shift register of N-bit construction, whereafter the detection of bit-by-bit coincidence of the first M bits of stored data of the second shift register with the stored data of the first shift register during one circulation of the stored data of the first and second shift registers and the relative shift of one bit each of the stored data of the second shift register with respect to the stored data of the first shift register are repetitively effected to thereby detect the image portion of the second field image which is most similar to the first field image and know the object distance from the location of this most similar image portion in the second field image.

Also, the assignee of this invention has proposed, in Japanese Patent Application No. 504/1977 (Japanese Laid-open Patent Application Publication No. 85452/1978), a distance detecting device in which when, with respect to an object whose distance is to be detected, the images of a first and a second field following different lines of sight and containing said object and different in range are scanned by a combination of a rockable prism and a pair of light-receiving elements having slits, scanning image element signals obtained by sampling the outputs the light-receiving elements at a predetermined timing are transformed into binary form to obtain M and N continuous binary image element data regarding the first and second field images, respectively, and the M image element data regarding the first field image are stored in a first circulation type shift register of M-bit construction while the first M image element data of the N image element data regarding the second field image are stored in a second circulation type shift register of M-bit construction and the remaining N-M image element data are stored in a third shaft register of N-M-bit construction, whereafter the detection of bit-by-bit coincidence between the stored data of the first and second shift registers during one circulation of each of such stored data and the transfer of the stored data of the last bit of the third shift register to the leading bit of the second shift register, namely, the relative shift of one bit each of the stored data of the second and third shift registers with respect to the stored data of the first shift register, are repetitively effected to thereby detect the image portion of the second field image which is most similar to the first field image and know the object distance from the location of this most similar image portion in the second field image.

These proposed distance detecting devices are entirely different from conventional ones and particularly, according to these devices, the scanning image element data obtained by scanning the images are once quantized and then processed, thereby digitally accomplishing the detection of the distance to the object through a digital system and thus, these devices are very excellent in that they can accomplish the detection of the object distance with a high accuracy beyond comparison with conventional devices.

In these distance detecting devices, the relatively complicated processing of quantized image element data as described above is effected for the detection of the object distance and what must be particularly considered in the digital system performing such a complicated operation is making the data processing operation efficient as far as possible and making the system construction efficient. For example, as regards the comparison and processing of the M and N continuous quantized image element data regarding the first and second field images, respectively, according to the device proposed in the aforementioned U.S. Pat. No. 4,004,852, the M image element data regarding the first field image are stored in the first circulation type shift register of M-bit construction while the N image element data regarding the second field image are stored in the second circulation type shift register of N-bit construction, whereafter during circulation of the stored data of these first and second shift registers, until the M stored data of the first shift register make just one circulation, the coincidence or incoincidence between the M stored data of the first shift register and the first M bits of the stored data of the second shift register is detected for each bit and the coincidence number if counted by a counter and, at the point of time whereat the stored data of the first shift register has made just one circulation and returned to their initial state, the driving of the first shift register is stopped and the then count of the counter is compared with the maximum count of the counter hitherto (the count is "0" at the first point of time) (if this count is greater, it is stored as the maximum count), while only the second shift register is further driven by N+M+1 bits to thereby cause the stored data of the second shift register to be shifted by one bit relative to the stored data of the first shift register, whereafter when the stored data of the first and second shift registers are again circulated, during the time until the stored data of the first shift register make just one circulation, the coincidence or incoincidence between the stored data of the first shift register and the first M bits of the stored data of the second shift register is detected for each bit and the coincidence number is again counted by the counter, and such operation is repeated. However, such method of comparison and processing is apparently inefficient in that during the time from after the termination of one circulation and comparison until the next circulation and comparison is effected, the first shift register must remain stopped while only the second shift register must be driven excessively by $N-M+1$ bits and therefore, before the comparison and processing of all the N data stored in the second shift register is terminated, an excess time represented by at least $(M-N+1)\times(M-N)\times$(period of clock pulses) is required as compared with the time spent for the actual comparison and processing and accordingly, the time required for the comparison and processing of the data is prolonged and after all, this results in an inconvenience that a long time is required before the object distance is detected. Also, to execute such comparison and processing, it is necessary to repeat such operation in the comparison-processing sequence that, for example, clock pulses are always imparted to the second shift register while M clock pulses are first imparted to the first shift register in synchronism with the start of the circulation of the stored data of the second shift register to thereby cause the stored data of the first shift register to effect one circulation and the ensuing $N-M+1$ clock pulses are caused to be neglected, whereafter M clock pulses are again imparted to the first shift register to cause the stored data thereof to effect one circulation again, and this leads to a complicated style of drive control for the first shift register in particular, for example, the necessity of providing an exclusive counter for controlling the supply of clock pulses to the first shift register and a logic circuit attendant thereon, which also means complicated construction of the control system for the shift registers.

On the other hand, in the device proposed by the assignee of the present invention (applicant) in Japanese Patent Application No. 504/1977, as far as the comparison and processing of the quantized image element data is concerned, M image element data regarding the first field image are first stored in the first circulation type shift register of M-bit construction while the first M data of the N image element data regarding the second field image are stored in the second circulation type shift register of M-bit construction and the remaining $N-M$ data are stored in the third shift register of $N-M$-bit construction, whereafter when the stored data of the first and second shift registers are caused to effect one circulation simultaneously, the coincidence or incoincidence between these stored data is detected for each bit and the coincidence number is counted by a counter and, at the point of time whereat the stored data of these first and second shift registers have made just one circulation and returned to their initial state, the driving of the first shift register is temporally interrupted and the then count of the counter is compared with the maximum count of the counter hitherto (the count is "0" at the first point of time) (if this count is greater, it is stored as the maximum count) while, in the meantime, the second and third shift registers are driven by one bit and the data of the leading bit of the third shift register is transferred to the last bit of the second shift register, whreby the stored data of the second and third shift registers are shifted by one bit relative to the stored data of the first shift register, whereafter when the stored data of the first and second shift registers are again caused to effect one circulation simultaneously, the coincidence or incoincidence between the stored data is detected for each bit and the coincidence number is again counted by the counter, and such operation is repeated. According to such method of comparison and processing, during the time from after the termination of one circulation and comparison until the next circulation and comparison is effected, it is only necessary to secure the time required for the comparison of the count of the counter obtained during one circulation and comparison with the maximum count obtained so far, the storage of the count of the counter based on the result of said comparison, and the resetting of the counter thereafter, and moreover, this can be further shortened by parallel-processing the output data of the counter and therefore, as compared with the device of the aforementioned U.S. Pat. No. 4,004,852, there is obtained an advantage that the image element data processing efficiency is much improved and the total time required for the comparison and processing of the image element data is very much shortened. On the other hand, however, in order that such comparison and processing may be executed and that said time may be secured, it is necessary to repeat the operation of temporally cutting off the supply of clock pulses to the first shift register after the termination of one circulation of the stored data of the first and second shift registers to interrupt the driving of the first shift register while imparting one excess clock pulse to the second shift register and also imparting one clock pulse to the third shift register to thereby effect relative one-bit shift of the stored data of the second and third shift registers with respect to the stored data of the first shift register and resuming the supply of clock pulses to the first and second shift registers after said necessary time has elapsed after the driving of the first shift register has been stopped, thereby causing the stored data thereof to be circulated and accordingly, there is still left much room for improvement in that the style of drive and control for each shift register is complicated and particularly, the selected supply of clock pulses to each shift register complicates the construction of the control system.

On the other hand, aside from what has been described above, in such a distance detecting device, particularly the digital circuit system thereof is complicated and considerably bulky and therefore, in order to enable such device to be utilized for the focus control system for automatic in-focus detection or automatic focus adjustment in optical instruments such as cameras, it is naturally necessary to make the device into an integrated circuit and thereby make the device compact so that it can easily be incorporated into small instruments, and a particular problem encountered in making the device into an integrated circuit is the number of IC (integrated circuit) elements required. As is well-known, as the number of elements used is smaller, the IC can be made more inexpensive, but on the other hand, if the number of elements used amounts to the order of 10,000, the device must unavoidably be made into an LSI (large scaled integrated circuit) which means a rise in cost. Now, as is generally well-known, even in a digital circuit system of entirely the same function and specification, there is a great difference in number of elements used between the case where it is made into a static type system and the case where it is made into a dynamic type system and by making the digital circuit system into a dynamic type system, the number of elements used can be much reduced as compared with the case where the digital circuit system is made into a static type system. Accordingly, it is much more advantageous to form the digital circuit system as a dynamic type system than to form the digital circuit system as a static type system. On the other hand, however, the dynamic type system encounters its own inconvenience. For example, when the data storing registers are considered, the stored data thereof will be extinguished unless these are always circulated and driven as the data circulation type shift registers by clock pulses, and the clock pulses in this case must have a clock frequency of the order of at least 50 KHz.

Considering the digital circuits in the aforementioned proposed devices from such a point of view, the device of U.S. Pat. No. 4,004,852, as noted above, makes it necessary that during the comparison and processing of the image element data, the first shift register be stopped for a relatively long time after the termination of one circulation and comparison and also, the device proposed by the assignee of the present invention (applicant) in Japanese Patent Application No. 504/1977 makes it necessary that the first and second shift registers be stopped though for a slight time after the termination of one circulation and comparison and accordingly, the construction of the digital circuit systems in these proposed devices are apparently unsuitable to be made into a dynamic type system and thus, in this point as well, there is still left much room for improvement.

SUMMARY OF THE INVENTION

It is a primary object of the present invention to provide, as the distance detecting device of the above-described type, namely, the digitalized distance detecting device in which, with respect to an object whose distance is to be detected, quantized image element data regarding the images of two fields following different lines of sight and containing said object and different in range are obtained and the correlation therebetween is taken to thereby effect the detection of the object distance, a more rational form of system which eliminates all the above-noted inconveniences peculiar to the prior art and which can more efficiently carry out the comparison and processing of image element data as the construction of the digital system adopted and also can reduce the time required for the comparison and processing of image element data and which can simplify the style of drive and control for the image element data storing shift registers and is particularly suited to be formed as a dynamic type system.

For such an object, according to the present invention, there is proposed a more advantageous form of distance detecting device in which, with respect to an object whose distance is to be detected, the images of a first and a second field following different lines of sight and containing said object and different in range are scanned while, at the same time, continuous M quantized image element data regarding the first field image and continuous N (N>M) quantized image element data regarding the second field image are obtained and the M image element data regarding the first field image are stored in a first circulation type shift register while the first M image element data of the N image element data regarding the second field image are stored in a second circulation type shift register and the remaining N−M image element data are stored in a third shift register, and the comparison between the stored data of the first and second shift registers during one circulation of said stored data and the relative shift of n bits each of the stored data of the second and third shift registers with respect to the stored data of the first shift register are repeatedly effected to thereby detect the distance to said object, and wherein in the circulation circuit of the first shift register, bypass means is provided for delaying one circulation of the stored data of the first shift register by n bits relative to one circulation of the stored data of the second shift register and the stored data of the first shift register are circulated through said bypass means, whereby for each one circulation of the stored data of the first shift register, the stored data of the second shift register are shifted by n bits relative to the stored data of the first shift register.

It is another object of the present invention to provide a more advantageous form of focus control system adapted to the actual use in constructing a focus control system for in-focus detection and/or automatic focus adjustment of the optical system in an optical instrument such as a camera or the like by utilizing the above-described distance detecting device.

For such an object, in the embodiments described hereinafter, there are proposed the distance detecting device endowed with the above-described features and very useful various forms as mentioned hereinafter as the focus control system for in-focus detection and/or automatic focus adjustment of the optical system which utilizes such distance detecting device.

For example, a focus control system in which data regarding the distance to an object is obtained in the form of digital data and data regarding the adjusted distance of the optical system to be focused with respect to said object is obtained in the form of digital data and by the comparison between these digital data, a signal representing the focus adjusted condition of the optical system with respect to said object is obtained, there is proposed a form of focus control system characterized in that the system is selectively operable in a first operation mode in which the data representing the adjusted distance of the optical system is obtained in the form of gray code signal and this is compared with the object distance data to thereby obtain a signal representing the focus adjusted condition and in a second operation mode in which pulses created during the movement of said optical system from a predetermined position are counted to thereby obtain data representing the adjusted distance of the optical system and this is compared with the object distance data to thereby obtain a signal representing the focus adjusted condition. This is excellent particularly in the versatility of the focus control system and is very advantageous in that it is widely applicable not only to motion picture cameras, TV cameras and photographic cameras but also to other various optical instruments.

In addition, for example, as a focus control system in which the distance data put out from the distance detecting device for detecting the distance to an object is compared with the data regarding the adjusted distance of the optical system to be focused with respect to said object to thereby obtain a signal representing the focus adjusted condition of the optical system with respect to said object, there is propsed a form of focus control system characterized in that is is selectively operable between a first operation mode in which the distance detecting device is continuously operated to thereby render possible the response to a variation in the distance to said object and a second operation mode in which the distance detecting device is only once operated in accordance with an operation instruction from outside to thereby render impossible the response to a variation in the distance to said object after the detection of the distance. This further expands the function as the focus control system and is highly useful in that when it is utilized particularly in such instruments as motion picture cameras, TV cameras, etc. directed to the photographing of moving objects, the photographing technique thereof is expanded.

In addition, for example, as a control system in which the ouptut data from the distance detecting device for detecting the distance to an object and the adjusted distance data of the optical system to be focused with respect to said object are applied to comparing means and the output of the comparing means is utilized to control drive means for adjusting and driving the optical system to thereby effect the automatic focus adjustment of the optical system, there is proposed a form of focus control system in which, during the time from after the start of the object distance detecting operation by the distance detecting device until the object distance data is put out for the first time from said device, the infinity distance data instead of the output of said device is applied to said comparing means to thereby maintain the optical system is infinity in-focus position. This is very useful as a counter-measure for the control of the optical system in a case where the object distance data has not been obtained. For example, in a case where the contrast of the image of an object becomes concerned as an important factor in the distance detecting device, it is usually at the infinity side that the contrast of the image is reduced to make the distance detection difficult to do and accordingly, if design is made such that the optical system is automatically adjusted to the infinity in-focus position in a condition in which the object distance data is not put out from the distance detecting device, as described above, then there can be obtained practically allowable focusing even in such condition and in this point, this form of focus control system is very useful.

Further, for example, as a focus control system in which data regarding the distance to an object is obtained in the form of digital data of a predetermined number of bits while data regarding the adjusted distance of the optical system to be focused with respect to said object is obtained in the form of digital data of the same number of bits and by comparing these digital data, a signal representing the focus adjusted condition of said optical system with respect to said object is obtained, there is proposed a form of focus control system characterized in that when said optical system is adjusted to the in-focus position with said object, the object distance data and the adjusted distance data of the optical system are compared with each other with at least the least significant bit data thereof neglected, and as a focus control system in which the output data from the distance detecting device for detecting the distance to an object is compared with the data regarding the adjusted distance of the optical system to be focused with respect to said object to thereby obtain a signal representing the focus adjusted condition of the optical system with respect to said object and the comparison result signal is imparted to a switching circuit to thereby control focus adjusted condition display means and/or optical system automatic adjusting drive means connected to said switching circuit, there is proposed a form of focus system characterized in that said comparison result signal is imparted to said switching circuit through a delay circuit. These are very useful in preventing fine movement of the optical system which would otherwise result from a very slight fluctuation of the object distance data in a condition in which the optical system is at in-focus position. That is, when the object distance data repetitively fluctuates in a very slight range with the optical system adjusted to in-focus position, the optical system is also caused to follow it and is finely moved repetitively and, particularly in an instrument such as motion picture camera, TV camera or the like which is directed to the continuous photographing of moving objects, this adversely affects the photographed images thereof, but on the other hand, if the fluctuation of the distance data is in a very slight range, substantially acceptable in-focus condition is usually obtained without causing the optical system to follow it and re-adjusting the optical system and accordingly, if the above-described construction is adopted so that the optical system is not caused to follow a very slight fluctuation of the distance data in the condition in which the optical system is at in-focus position, the problem of the aforementioned adverse effect imparted to the photographed images by the fine movement of the optical system in its in-focus condition can be avoided.

In addition, there is proposed, for example, a form of focus control system characterized in that the output data from the distance detecting device for detecting the distance to an object and the adjusted distance data of the optical system obtained on the basis of an electrical signal created with the movement, from a predetermined position, of the optical system to be focused with respect to said object are applied to comparing means and the output of said comparing means is utilized to control stop means for stopping said optical system to thereby accomplish the automatic focus adjustment of said optical system and distance data output means for putting out fixed distance data representing a specific distance is provided so that, during the time from after the start of the object distance detecting operation by said distance detecting device until the object distance data is put out for the first time from said device, the output data of said distance data output means instead of the output data of said device is applied to said comparing means, whereby when the movement of said optical system has been started during the time until the object distance data is put out for the first time from said distance detecting device, the optical system is adjusted to the in-focus position for said specific distance indicated by the output data of said distance data output means. This is very useful as a counter-measure for a case where it is desired to effect photography under a situation in which the conditions for the distance detection are extremely bad and accordingly, the distance data is not readily put out from the distance detecting device, or a case where the movement of the optical system has been started by mistake before the distance data is put out. Incidentally, in a camera, this is more advantageous in that if said specific distance is rendered into a distance corresponding to the hyper focal position of the phototaking optical system for the most frequently used aperture value, photography can be effected in practically acceptable focusing condition in most cases.

Further, there is proposed, for example, a form of focus control system characterized in that the output data from the distance detecting device for detecting the distance to an object and the adjusted distance data of the phototaking optical system obtained on the basis of an electrical signal created with the movement, from a predetermined position, of the phototaking optical system to be focused with respect to said object are applied to comparing means and the output of said comparing means is utilized to control stop means for stopping said phototaking optical system to thereby accomplish the automatic focus adjustment of the phototaking optical system and distance data output means for putting out fixed distance data representing a specific distance suited for flash photography using a flash unit is provided so that, during the flash photography using the flash unit, the output data of said distance data output means instead of the output data of said distance detecting device is applied to said comparing means, whereby said phototaking optical system is adjusted to the in-focus position for said specific distance indicated by the output data of said distance data output means. This is very useful particularly as a camera using a flash unit.

Other objects and features of the present invention will become apparent from the following detailed description taken in conjunction with the accompanying drawings showing some embodiments of the invention.

BRIEF DESCRIPTION OF THE DRAWINGS

Preferred embodiments of the present invention will hereinafter be described with reference to the accompanying drawings, in which:

FIG. 8 is a timing chart showing various control signals imparted to the analog circuit system shown in FIGS. 7A and 7B;

FIG. 9 shows the relative positions between FIGS. 9A–9D;

FIGS. 13A and 13B are a timing chart showing the operation of said digital circuit system in the sequence mode CC1;

FIG. 14 shows the manner of control of the charge accumulation time for said image sensor in the sequence mode CC1;

FIG. 17 shows the relative positions between FIGS. 17A and 17B;

FIGS. 17A and 17B are a timing chart showing the operation of said digital circuit system in the sequence mode CC4;

FIG. 21 is a timing chart showing the operation of said digital circuit system in the sequence mode CC6;

FIG. 22 is a timing chart showing the operation of said digital circuit system in the sequence mode CC7;

FIG. 23 shows the relative positions between FIGS. 23A and 23B;

FIG. 29 shows the setting conditions of various focus control modes for said digital circuit system;

FIG. 36 shows the relation of the output from said digital circuit system with the adjusted condition of the phototaking lens;

FIG. 37 is a circuit diagram showing an example of the construction for the automatic focus control of the phototaking lens by the preset focus mode;

FIG. 38 is a schematic diagram showing the construction and connection relation of the pulse generating mechanism in the construction of FIG. 37;

DESCRIPTION OF THE PREFERRED EMBODIMENTS

Figure 1:
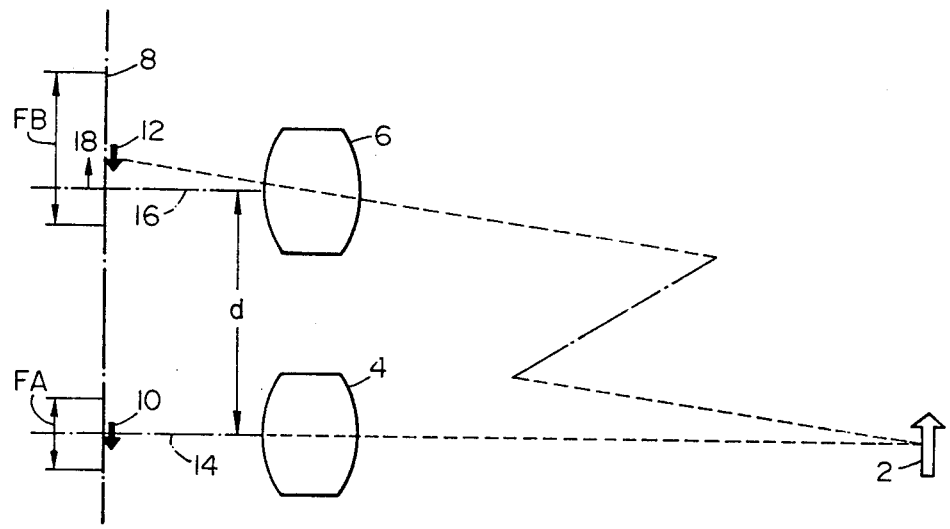
FIG. 1 is a schematic view for illustrating the principle of the distance detection in the device of the present invention.

Reference is first had to FIG. 1 to describe the principle of the distance detection in the device of the present invention. Needless to say, the principle of the distance detection herein described is entirely similar to that of the device proposed in the aforementioned U.S. Pat. No. 4,004,852.

In FIG. 1, reference character 2 designates an object whose distance is to be detected, reference numerals 4 and 6 denote a pair of image forming lenses disposed with a base line spacing d interposed therebetween, and reference numeral 8 designates an image formation plane on which the images 10 and 12 of the object 2 are formed by these lenses 4 and 6.

In such an arrangement, assuming that the object 2 lies on the optica axis 14 of the lens 4, the image 10 of the object 2 at this time by the lens 4 is formed with the center thereof coincident with the intersection between the image formation plane 8 and the optic axis 14 of the lens 4, independently of the distance thereof.

On the other hand, assuming that the object 2 lies at infinity with respect to the lens 4, the image 12 by the lens 6 is formed with the center thereof coincident with the intersection between the image formation plane 8 and the optic axis 16 of the lens 6 because the object 2 can be regarded as lying on the optic axis 16 of the lens 6 with respect also to the lens 6. Accordingly, at this time, the positional relations of these two images 10 and 12 with the optic axes 14 and 16 of the lenses 4 and 6 can be regarded as the same and for example, if consideration is taken with the optic axes 14 and 16 of the lenses 4 and 6 superposed upon each other, the images 10 and 12 can be regarded as being positionally coincident.

Next, assuming that the object 2 has come close toward the lens 4 on the optic axis 14 thereof, the image 10 of the object 2 by the lens 4 does not move from the intersection between the image formation plane 8 and the optic axis 14 of the lens 4, while the image 12 of the object 2 by the lens 6 moves on the image formation plane 8 in the direction of arrow 18 from the intersection between the plane 8 and the optic axis 16 of the lens 6. This amount of movement becomes greater as the object 2 comes closer to the lens 4 and theoretically, it has such a character that it reaches infinity when the distance between the object 2 and the lens 4 has become zero. Accordingly, the positional relations of the two images 10 and 12 on the image formation plane 8 with the optic axes 14 and 16 of the lenses are of such a property that they become more deviated from each other as the object 2 comes closer and for example, if consideration is taken with the optic axes of the lenses 4 and 6 superposed upon each other, the two images 10 and 12 at this time are not positionally coincident and the amount of deviation therebetween can be regarded as the information regarding the distance.

Accordingly, if the positional relations of the two images 10 and 12 on the image formation plane 8 with the optic axes 14 and 16 of the lenses could be detected in some form or other, the distance to the object 2 can be known and the device of the present invention, like the device of the aforementioned U.S. Pat. No. 4,004,852, intends to find the distance to the object 2 by digitally effecting the detection of the amount of relative deviation between the two images 10 and 12 through an electronic system.

More specifically, it intends to know the object distance by scanning the image of a predetermined first image formation are a FA on the image formation plane 8 with the axis 14 of the lens 4 as the center (namely, a predetermined range of first field image with the optic axis 14 of the lens 4 as the line of sight) and the image of a second image formation area FB including a wider range than the first image formation area FA on the close-up side with the infinity side set by the optic axis 16 of the lens 16 as the standard (namely, a wider range of second field image with the optic axis 16 of the lens 16 as the line of sight) and quantizing the scanning image element signals obtained at this time to thereby obtain continuous M and N (N>M) quantized image element data with regard to the images of the first and second image formation areas FA and FB, successively comparing a set of different continuous M image element data of the N image element data regarding the image of the second image formation area FB with the M image element data regarding the image of the first image formation ara FA to thereby detect, on the basis of the quantized image element data, an image portion of the image of the second image formation area FB which is most similar to the image of the first image formation area FA and know the object distance from the location of this most similar image portion in the second image formation area FB.

Now, description will be made of embodiments of the device of the present invention for detecting the distance to an object whose distance is to be detected, in accordance with the above-described principle. Attention is first drawn to that in the embodiments described hereinafter, the device of the present invention is shown with an embodiment of the focus control system for the automatic in-focus detection and automatic focus adjustment of an optical system which utilizes the same.

Figure 2:
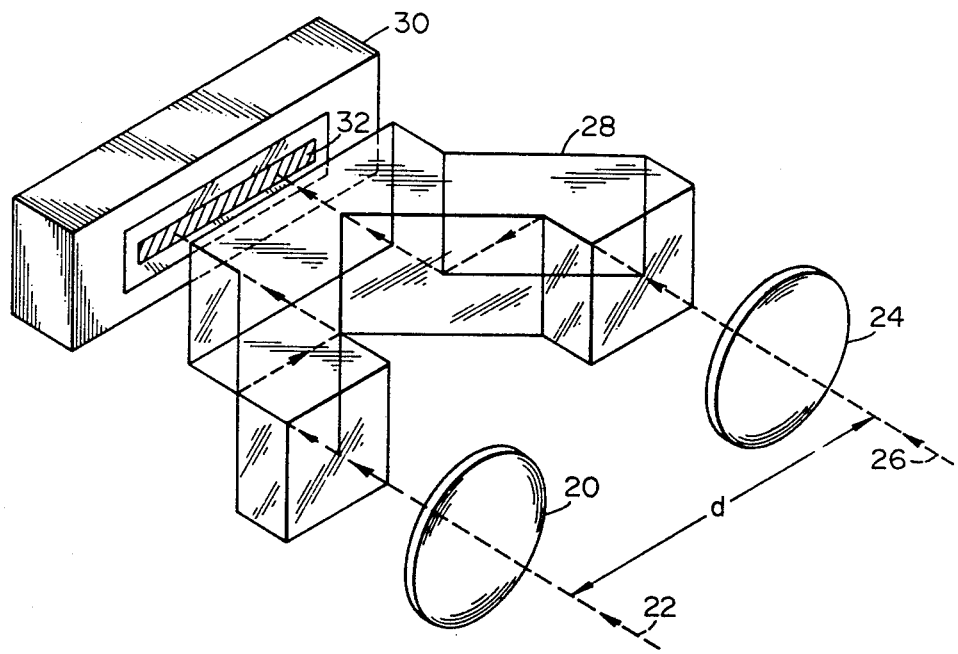
FIG. 2 is a perspective view showing the optical arrangement and construction in an embodiment of the present invention.
Figure 3:
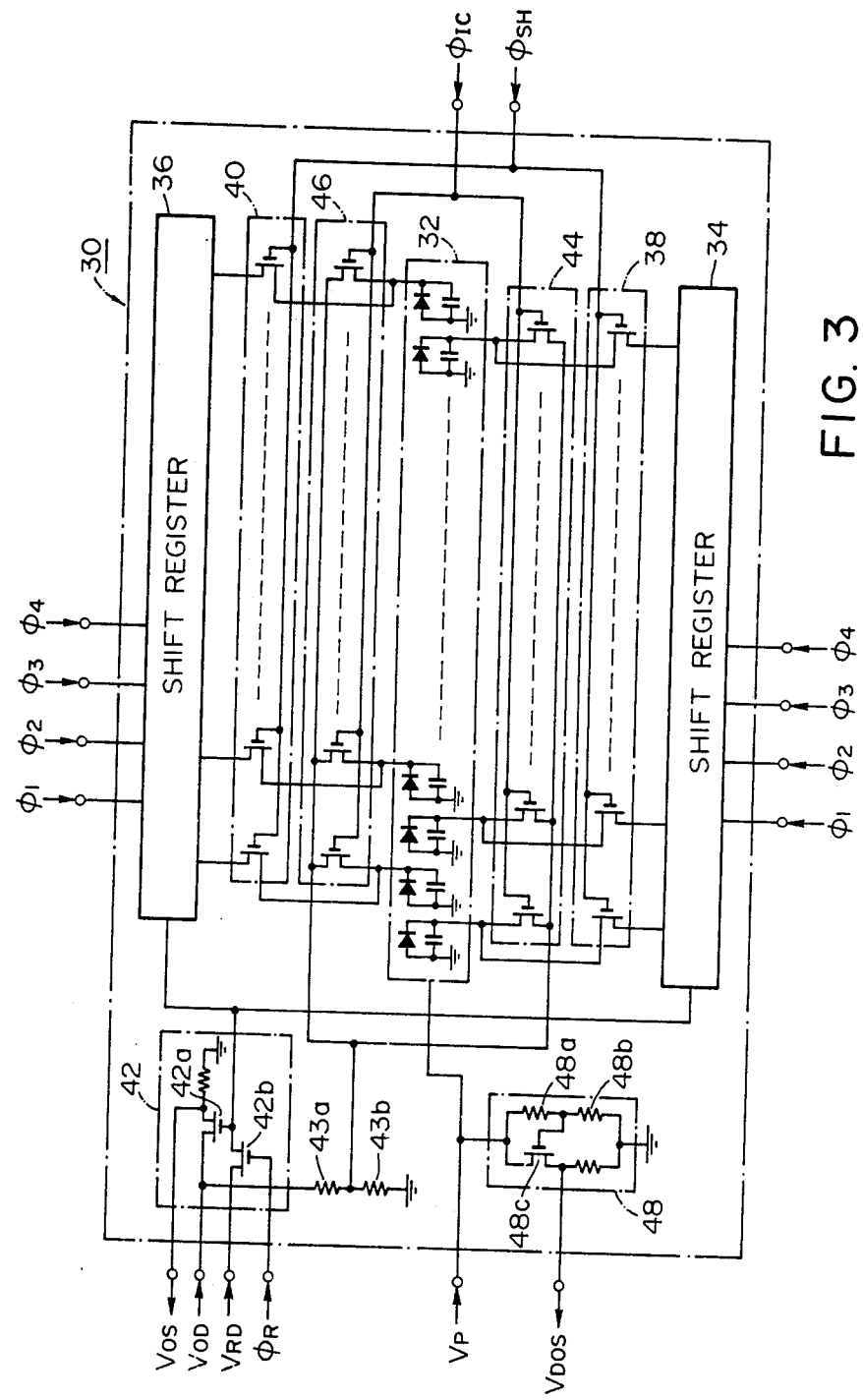
FIG. 3 is an equivalent circuit diagram showing the construction of a line type image sensor adopted in said embodiment.

Referring to FIG. 2 which shows an example of the arrangement of a range finding optical system which is applied to the device according to an embodiment of the present invention, there is seen a first image forming optical system 20 for sighting through which an object whose distance is to be detected is aimed at on the optical axis 22 thereof, a second image forming optical system 24 for eferencing disposed with a predetermined base line length interposed between it and said first optical system 20 and having an optic axis 26 parallel to the optic axis 22 of said first optical system 20, and a line sensor 30 positioned and disposed so as to receive, through a prism 28, the images formed by said first and second optical systems 20 and 24, the line sensor 30 having a light-receiving portion 32 including a linearly arranged sensor array. This line sensor 30 is a selfscanning type linear image sensor such as photodiode array (MOS image sensor), CCD photosensor, or CCD photodiode array (comprising a combination of CCD and photodiode array) and is a semiconductor device which can put out, continuously in time, electrical signals corresponding to the illumination distributions of the images formed on the light-receiving portion 32. In the present embodiment, a CCD photodiode array of the construction as shown in FIG. 3 is used as the line sensor 30. In FIG. 3, the light-receiving portion 32 comprises, for example, a photodiode array of 240 elements linearly arranged as shown, and the generated charge in each photodiode corresponding to the quantity of light received thereby is accumulated in the p-n junction capacitor thereof as is well-known. A photogate bias voltage Vp is imparted to the light-receiving portion 32. Designated by 34 and 36 are CCD analog shift registers for successively transferring to a voltage converting portion the charges accumulated in the odd-numbered groups and the even-numbered groups of said photodiode array. Herein, these shift registers are of the four-phase transfer type driven by four-phase transfer pulses $\phi_1-100_4$. Designated by 38 is a shift gate for transferring the charges accumulated in odd-numberd group photodiodes of said photodiode array to said shift register 34, and designated by 40 is a shift gate for transferring the charges accumulated in the even-numbered group photodiodes of said photodiode array to said shift register 36. A shift gate pulse $\phi SH$ is imparted to these shift gates 38 and 40. Denoted by 42 is a voltage converting portion for converting into voltages the charges successively transferred by the shift registers 34 and 36. The voltage converting portion 42 comprises a voltage converting MOS-FET 42$a$ and a charge resetting MOS-FET 42$b$. Said transferred charges are imparted to the gate of the voltage converting FET 42$a$ and the voltage corresponding to the charge at this time is obtained as an output $V_{OS}$ from the source thereof. An output drain bias voltage $V_{OD}$ is imparted to the drain of the voltage converting FET 42$a$, a reset drain bias voltage $V_{RD}$ is imparted to the drain of the charge resetting FET 42$b$, and a reset pulse $\phi_R$ is imparted to the gate thereof. Designated by 44 and 46 are anti-blooming gates additionally provided corresponding to the odd-numbered group photodiodes and the even-numbered group photodiodes, respectively, in order to prevent the excess charge from being diffused to cause the so-called blooming when the charge generated by each photodiode exceeds the storage capacity thereof. Generally, to discharge the excess charge exceeding the storage capacity of each photodiode, a predetermined bias voltage corresponding to this storage capacity is imparted to the anti-blooming gates, but herein, for the setting of the charge accumulation time in each photodiode, a pulse signal $\phi_{1C}$ (hereinafter referred to as the integration clear pulse) is imparted to thereby completely clear the charge in the light-receiving portion 32. A predetermined bias voltage obtained by dividing said output drain bias voltage $V_{OD}$ by resistors 43$a$ and 43$b$ is imparted to the drains of the anti-blooming gates 44 and 46. Designated by 48 is a voltage fluctuation detecting portion additionally provided to detect any fluctuation of a photogate bias voltage $V_P$ imparted to the light-receiving portion 32. The voltage fluctuation detecting portion 48 has a voltage fluctuation detecting MOS-FET 48$c$ adapted to receive the photo-gate bias voltage $V_P$ at the drain thereof and to receive a voltage obtained by dividing the photo-gate bias voltage $V_P$ by resistors 48$a$ and 48$b$ at the gate thereof, and the voltage output representing the fluctuation of the photogate bias voltage $V_P$ is obtained as output $V_{DOS}$ from the source thereof.

Figure 4:
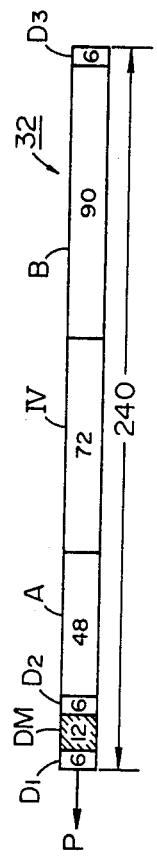
FIG. 4 is a schematic diagram showing the area setting for the light-receiving portion of said image sensor in said embodiment.

The items of the photodiode array comprising 240 elements included in the light-receiving portion 32 are, for example, as shown in FIG. 4. In FIG. 4, $D_1$ is the leading dummy bit to which are allotted six bits. The next DM is a dark current detecting area for detecting the dark current component in the output of the line sensor 30 and twelve bits are allotted to this, and these twelve bits are shielded from light by a technique such as Al vacuum evaporation or the like as is conceptionally shown by hatching (actually, the leading dummy bit $D_1$ is also shielded from light). The next $D_2$ is a separating space for separating the dark current detecting area DM from the next effective area, and six bits are allotted to this. The next area indicated by A is a standard field area for obtaining the image data of the standard field with regard to the object whose distance is to be detected, and forty-eight bits are allotted to this area, and this standard field area A has the center thereof substantially coincident with the extension optic axis of the first optical system 20 by the prism 28 in order to receive the image formed by the first optical system 20 shown in FIG. 22, for example. The next IV is a separating space for separating the standard field area A from the next effective area, and seventy-two bits are allotted to this. The next area indicated by B is a reference field area for obtaining the image data of the reference field with regard to the object whose distance is to be detected, and ninety bits are allotted to this area, and this reference field are a B has the center of the fortyeight bit area thereof adjacent to the separating space IV substantially coincident with the extension optic axis of the second optical system 24 by the prism 28 in order to receive the image formed by the second optical system 24 shown in FIG. 2, for example. The six bits of the last $D_3$ are dummy bits. Accordingly, here, the output from the twelve bits of the dark current detecting area DM, the output from the forty-eight bits of the standard field are a and the output from the ninety bits of the reference field area B are handled as effective outputs, and the outputs from $D_1$, $D_2$IV and $D_3$ are handled as unnecessary outputs. The output of the photodiode array in the light-receiving portion 32 in this case is read out in the direction of arrow P in FIG. 4 through the CCD analog shift registers 34 and 36.

Incidentally, the construction of the above-described line sensor 30 is substantially similar to that of the CCD photodiode array sold under the tradename of "CCPD" by Reticon Corp. of United States America except that the number of elements of the photodioide array in the light-rceiving portion 32 is 240, that part of the photodiode array is shielded from light and the dark current detecting area DM is provided and the voltage fluctuation detecting portion 48 is provided.

Figure 5:
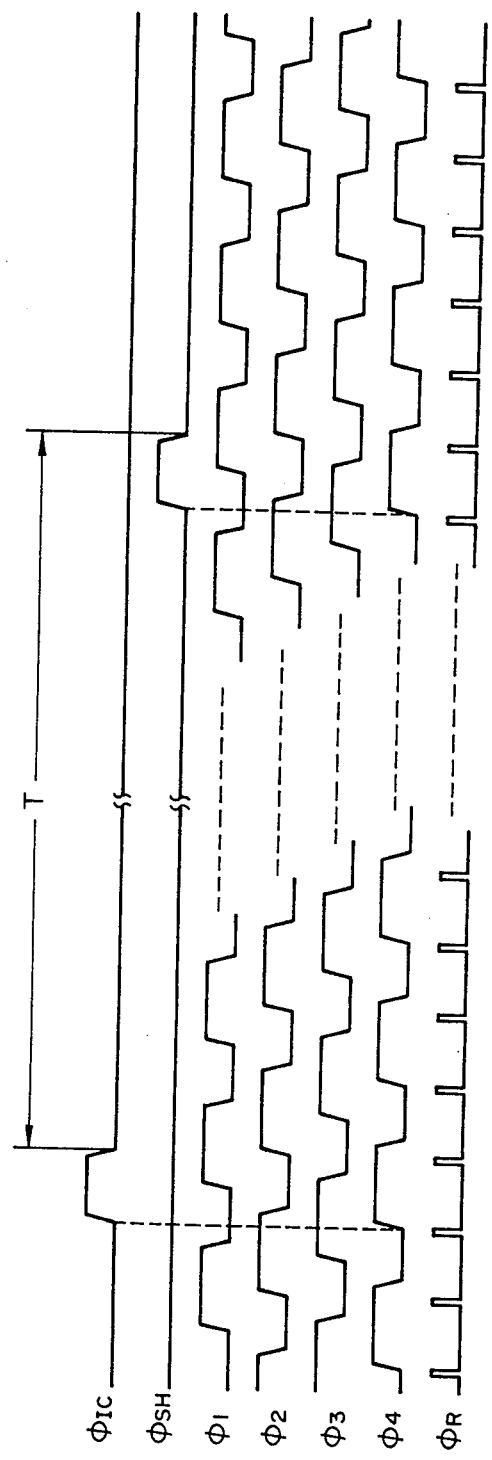
FIG. 5 shows the waveforms of various pulse signals to be imparted to said image sensor.

In the present embodiment, the line sensor 30 of the above-described construction is driven by pulses obtained in the timing relationship as shown in FIG. 5 by a sequence control circuit and a timing control circuit in a digital circuit system, to be described, as said pulse signals $\phi_{IC}$, $\phi_{SH}$, $\phi_1$-$\phi_4$ and $\phi_R$.

Figure 6:
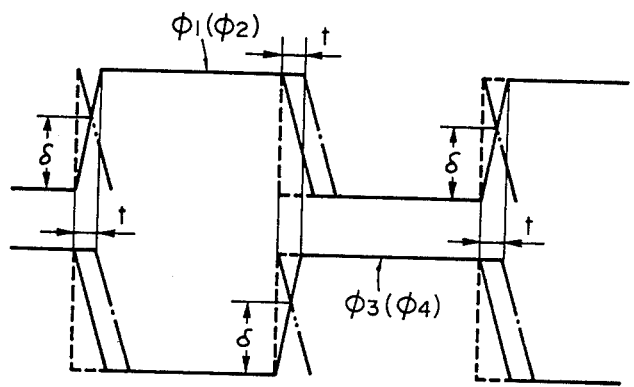
FIG. 6 shows the detailed waveforms of transfer pulses imparted to said image sensor.

The transfer pulses $\phi_1$-$\phi_4$ are successively put out with a phase difference of $\pi/4$ and in this case, the relations between the pulses $\phi_1$ and $\phi_3$ and between the pulses $\phi_2$ and $\phi_4$ should theoretically be such as indicated by broken lines in FIG. 6, but actually, as is well-known, become such as indicated by solid lines in FIG. 6 because the rising and falling of these pulses require a certain degree of time. On the other hand, to effect smooth transfer of charges in the shift registers 34 and 36, the overlap S between the transfer pulses $\phi_1$ and $\phi_3$ and between $\phi_2$ and $\phi_4$ during the falling and rinsing thereof must be guaranteed at 70% or more as is well-known, but it is very difficult with an ordinary IC to set the time of the rising and falling of the clocks so as to satisfy this. Accordingly, here, when these transfer pulses $\phi_1$-$\phi_4$ are put out from a timing control circuit to be described, the timing of the start of the falling of each pulse is delayed by a time t as indicated by dot-and-dash lines in FIG. 6 and the rising time of each pulse is minimized within this delay time t to thereby theoretically quarantee an overlap of 100%. Incidentally, in the present embodiment, as said transfer pulses $\phi_1$-$\phi_4$, the frequency is set to 31, 25 KC, the delay time t is set to 500 nsec., the rising time is set to 500 nsec., and the falling time is set to 0.2-3.0 $\mu$sec.

Also, herein, the integration clear pulse $\phi_{IC}$ for the anti-blooming gates 44 and 46 and the shift gate pulse $\phi_{SH}$ for the shift gates 38 and 40 are put out from a sequence control circuit, to be described, in synchronism with said transfer clock $\phi_4$ and accordingly, as indicated by T in FIG. 5, the time from the falling of the integration clear pulse $\phi_{IC}$ till the falling of the shift gate pulse $\phi_{SH}$ becomes the charge accumulation time of each photodiode in the light-receiving portion 32. Incidentally, in the present embodiment, this accumulation time T is controlled between the six stages of 96 $\mu$sec., 384 $\mu$sec., 1.824 msec., 9120 msec., 45.792 msec. and 98.304 msec. Also, the low level potential of the integration clear pulse $\phi_{IC}$ imparted from the aforementioned sequence control circuit to the line sensor 30 is 0 volt, but within the line sensor 30, to prevent the blooming in each photodiode, a voltage of several volts (for example, 2-3 volts) is imparted to the anti-blooming gates 44 and 46 even if the integration clear pulse $\phi_{IC}$ is at low level. The high level of the integration clear pulse $\phi_{IC}$, like the other pulses, is about 7 volts.

The reset pulse $\phi_R$ for the charge resetting FET 42b in the voltage converting portion 42 is put out from the aforementioned timing control circuit immediately before the rising of said transfer pulses $\phi_2$ and $\phi_4$, and the pulse width thereof is of the order of 1 $\mu$sec.

In the present embodiment, the signals by the charges accumulated in the odd-numbered group photodiodes of the photodiode array are obtained at the timing of the transfer pulse $\phi_2$ and the signals by the charges accumulated in the even-numbered group photodiodes of the photodiode array are obtained at the timing of the transfer pulse $\phi_4$.

Figure 7:
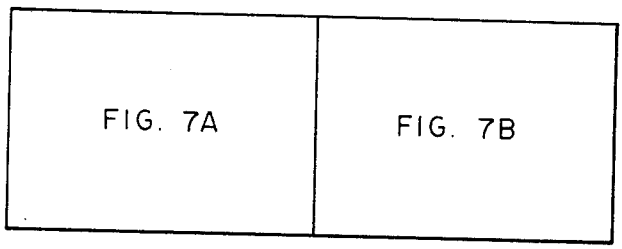
FIG. 7 shows the relative positions between FIG. 7A and FIG. 7B.
Figure 7A:
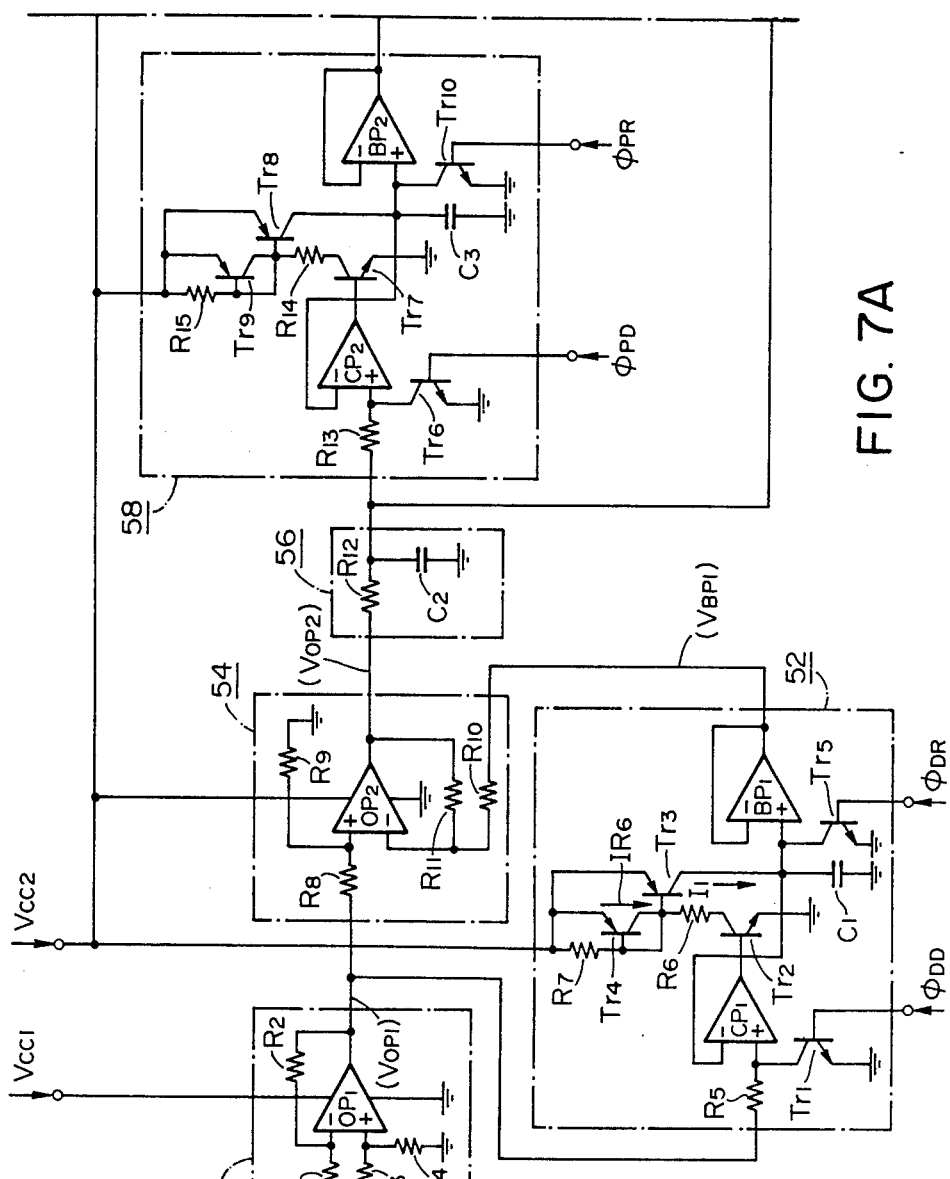
FIGS. 7A and 7B are circuit diagrams showing the construction of the analog circuit system in an embodiment of the present invention for processing the image scanning output from said image sensor.
Figure 7B:
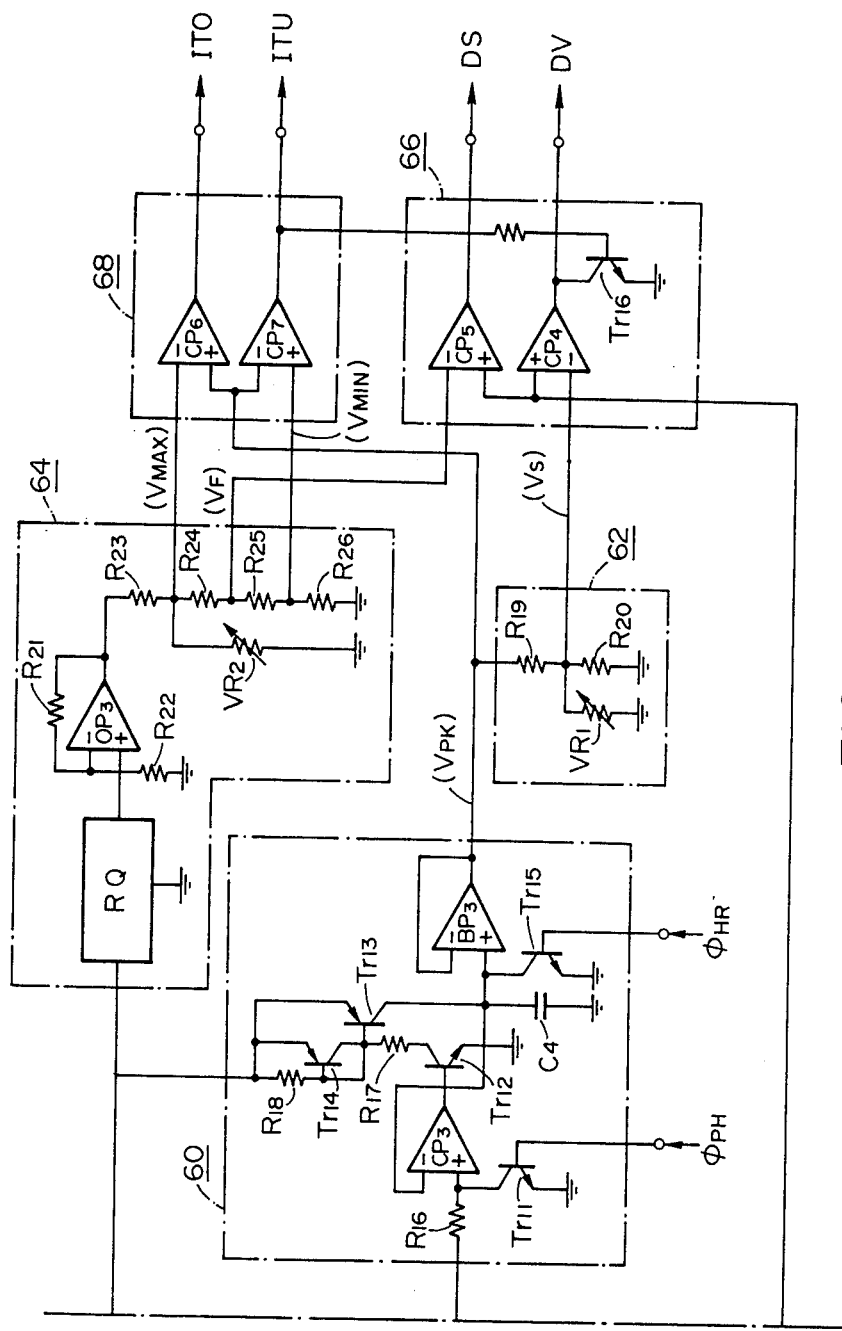
Figure 9A:
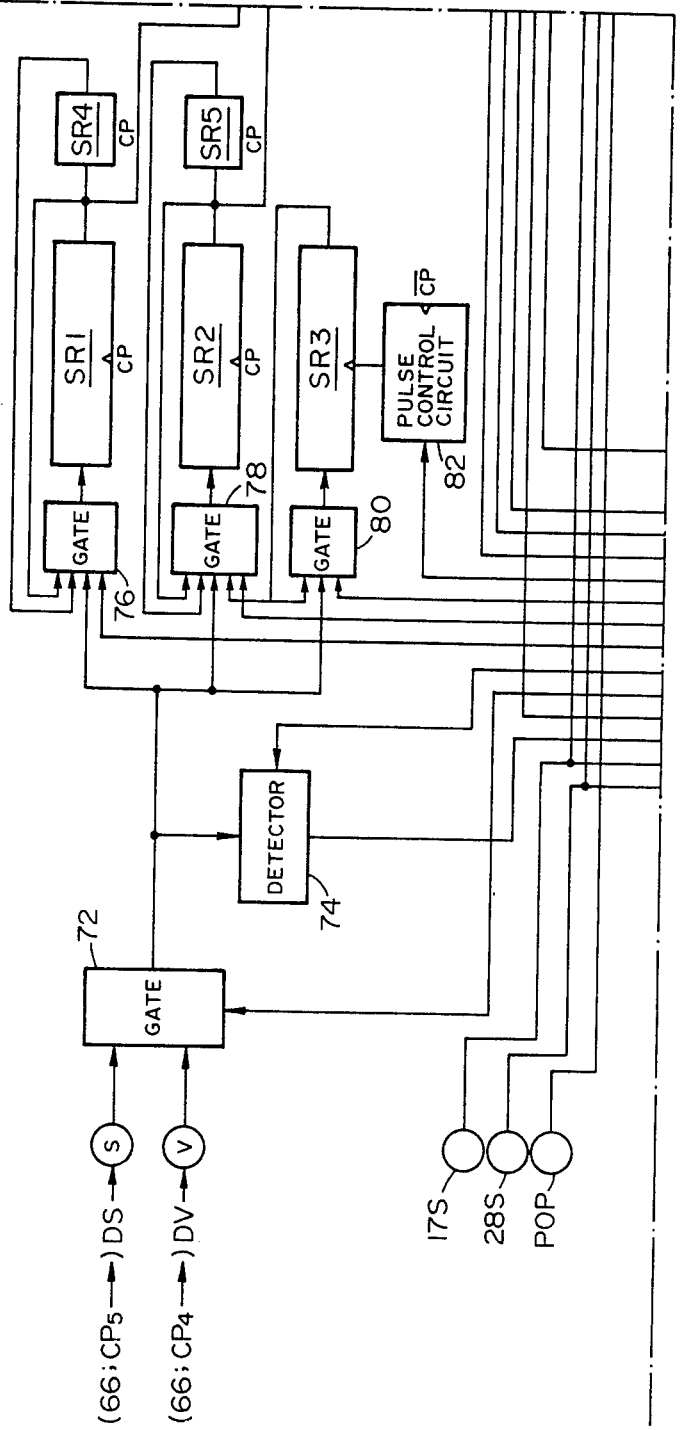
FIGS. 9A–9D are a block diagram showing the construction of the digital circuit system in an embodiment of the present invention for effecting the distance detection and the infocus detection or the automatic focus adjustment control of the phototaking lens on the basis of the output of said analog circuit system.
Figure 9B:
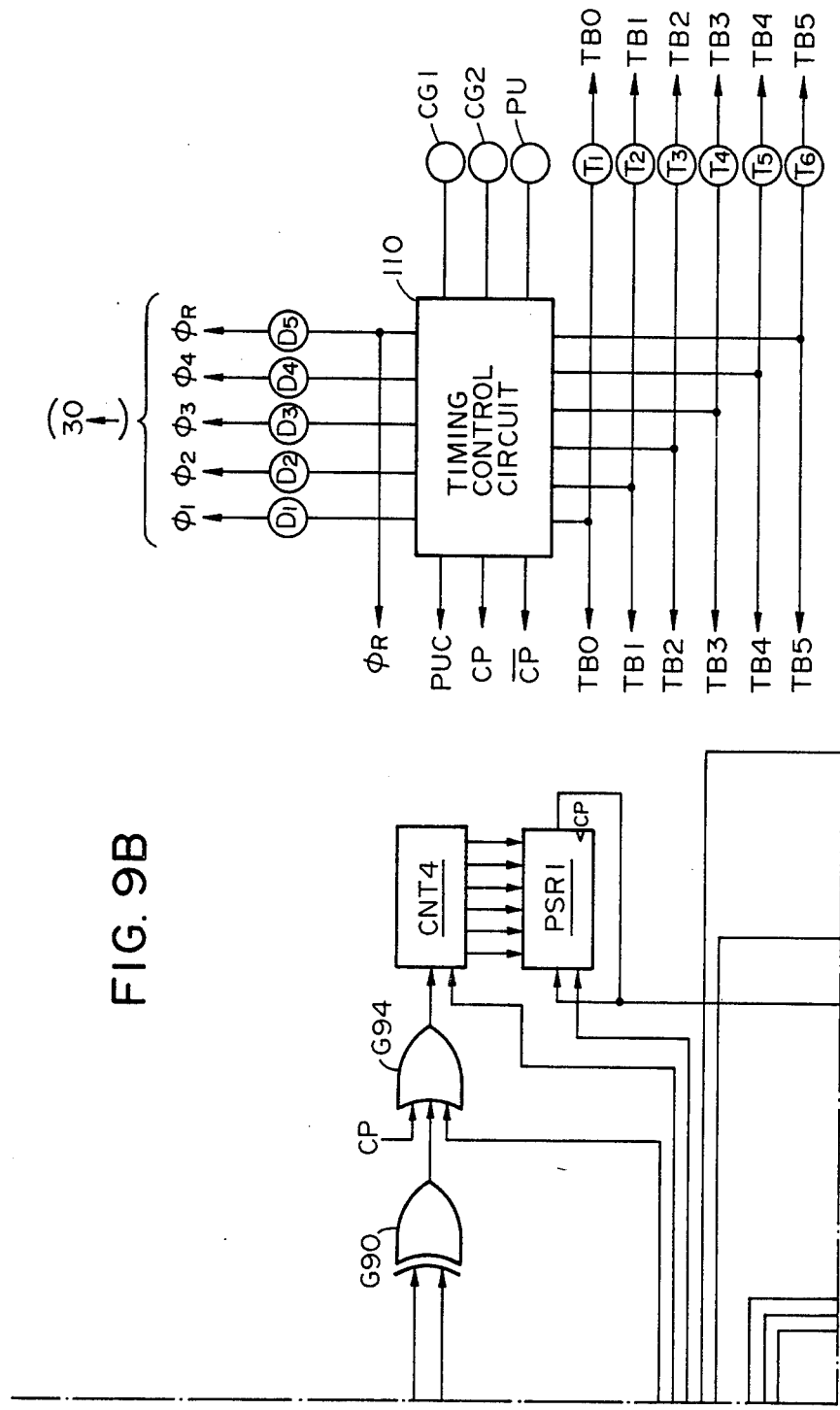
Figure 9C:
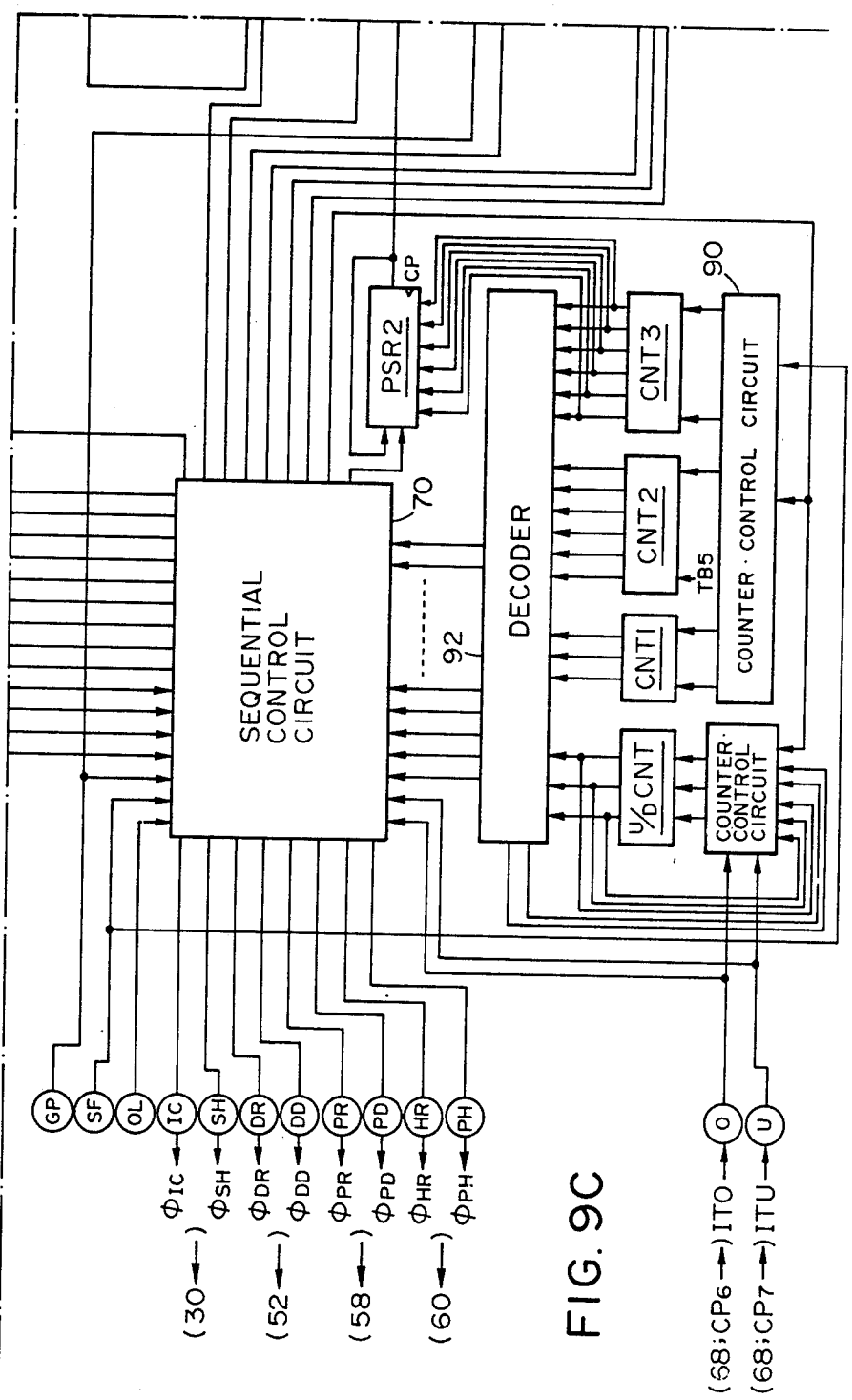
Figure 9D:
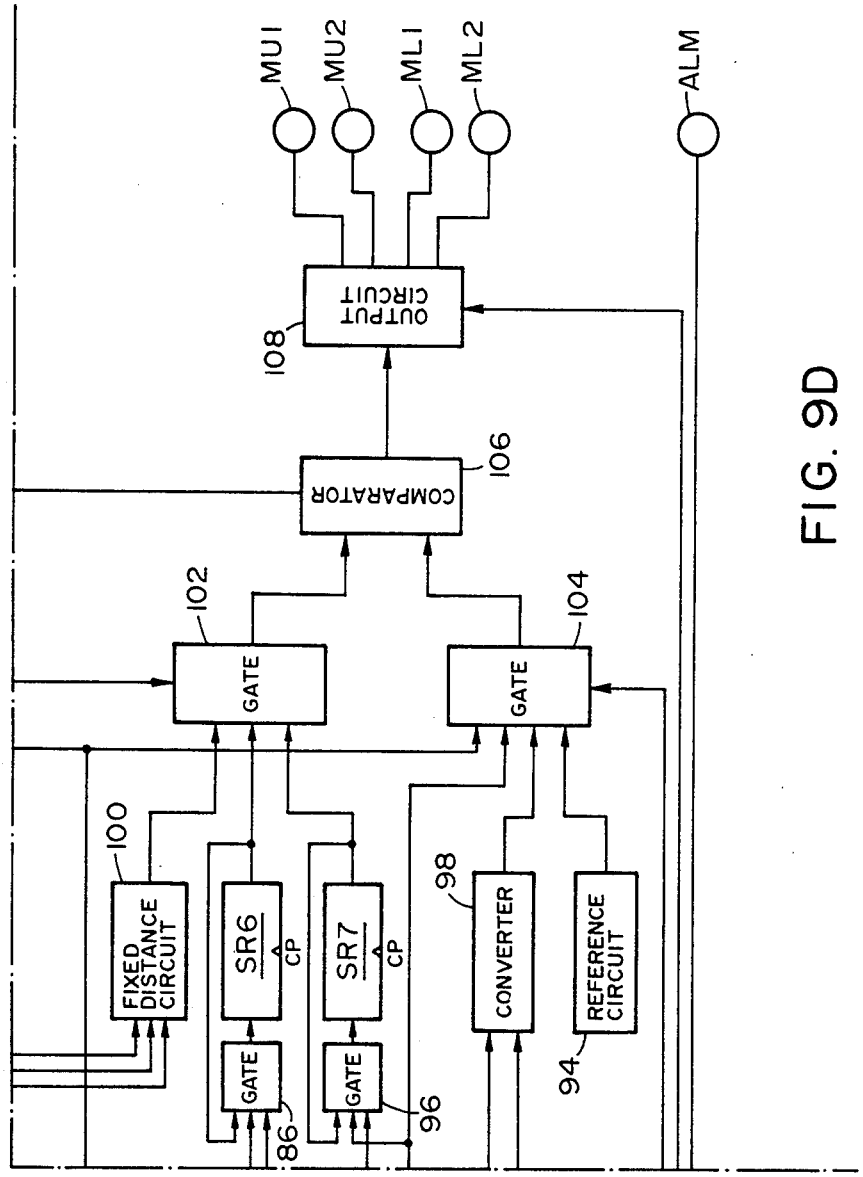

Reference is now had to FIGS. 7A and 7B to describe an analog circuit system for transforming into binary form (quantizing) the output of the line sensor for the purpose of the later digital treatment. This analog circuit system is adapted to remove noise components such as voltage fluctuation component and dark current component in the image scanning output $V_{OS}$, to transform into two binary forms the scanning output from which the noise components have been removed, by a slice level determined by the peak value of such scanning output and a fixed slice level, and to discriminate the magnitude of the charge accumulation time T of each photodiode in the light-receiving portion 32. FIGS. 7A and 7B are to be combined in the manner as shown in FIG. 7.

In these Figures, reference numeral 50 designates a differential amplifier circuit as a voltage fluctuation component removing circuit for receiving as inputs both the image scanning output $V_{OS}$ from the voltage converting portion 42 of the line sensor 30 and the voltage fluctuation information output $V_{DOS}$ from the voltage fluctuation detecting portion 48 and removing the voltage fluctuation component in the scanning output $V_{OS}$, and this differential amplifier circuit 50 comprises an operational amplifier $OP_1$ and resistors $R_1$-$R_4$, and the above-mentioned scanning output $V_{OS}$ is imparted to the inverting input terminal of the operational amplifier $OP_1$ through the resistor $R_1$ and the voltage fluctuation information output $V_{DOS}$ is imparted to the non-inverting input terminal of the operational amplifier $OP_1$ through the resistor $R_3$.

Designated by 52 is a dark current signal detecting and holding circuit for receiving as input the output signal from the above-described differential amplifier circuit 50, namely, the scanning output from which the voltage fluctuation component has been removed, and detecting and holding as the dark current signal a signal corresponding to the output from the twelve bits of the dark current detecting area DM (FIG. 4) shielded from light in the light-receiving portion 32 of the line sensor 30. The circuit 52 comprises a comparator CP, resistors $R_5$-$R_7$, transistors $T_{r1}$-$T_{r5}$, a capacitor $C_1$ and a buffer amplifier $BP_1$, and the output signal from the differential amplifier circuit 50 is imparted to the non-inverting input terminal of the comparator $CP_1$ through the resistor $R_5$ only when the input controlling transistor $T_{r1}$ is non-conductive state. Also, at that time, the hold voltage of the capacitor $C_1$ is imparted to the inverting input terminal of the comparator $CP_1$, and the output of the comparator $CP_1$ is imparted to the base of the transistor $T_{r2}$ to regulate the charging amount of the capacitor $C_1$ in accordance with the level of the input signal to said non-inverting input terminal and accordingly, the capacitor $C_1$ is charged with a constant current for a time determined by the output of the comparator $CP_1$, or in other words, a time corresponding to the level of the input signal imparted to the non-inverting input terminal of the comparator $CP_1$ and after all, this circuit becomes operated by a constant current. The input to the non-inverting input terminal of the comparator $CP_1$ is controlled so that by a dark detect signal $\phi_{DD}$ being imparted to the base of the input controlling transistor $T_{r1}$, of the output signal from the differential amplifier circuit 50, only a signal corresponding to the output from the twelve bits of the dark current detecting area DM shielded from light appears as described above. Also, the stored value of the capacitor $C_1$ is cleared before the output from the differential amplifier circuit 50 begins to be imparted to the non-inverting input terminal of the comparator $CP_1$ by a dark reset signal $\phi_{DR}$ being imparted to the base of the stored value clearing transistor $T_{r5}$.

Designated by 54 is a differential amplifier circuit as a dark current component removing circuit for receiving as input both the output signal from the differential amplifier circuit 50, namely, the scanning output from which the voltage fluctuation component has been removed, and the output signal from the dark current signal detecting and holding circuit 52, namely, the dark current information signal held by the capacitor $C_1$, and removing the dark current component from the scanning output from which the voltage fluctuation component has been removed. The differential amplifier circuit 54 comprises an operational amplifier $OP_2$ and resistors $R_8$–$R_{11}$, and the output signal from the differential amplifier circuit 50 is imparted to the non-inverting input terminal of the operational amplifier $OP_2$ through the resistor $R_8$ and the output signal from the dark current signal detecting and holding circuit 52 is imparted to the inverting input terminal of the operational amplifier $OP_2$ through the resistor $R_{10}$.

Designated by 56 is a filter circuit provided to remove a high frequency noise component from the output signal from the differential amplifier circuit 54, namely, the scanning output from which the voltage fluctuation component and the dark current component have been removed. The filter circuit 56 comprises a resistor $R_{12}$ and a capacitor $C_2$.

Denoted by 58 is a peak value detecting circuit for detecting the peak value of the output signal from the filter circuit 56, namely, the scanning output from which the voltage fluctuation component, the dark current component and the high frequency noise component have been removed. The peak value detecting circuit 58 has a comparator $CP_2$, resistors $R_{13}$–$R_{15}$, transistors $T_{r6}$–$T_{r10}$, a capacitor $C_3$ and a buffer amplifier $BP_2$ and is a constant current operated circuit similar in connection and construction to the dark current signal detecting and holding circuit 52, and the output signal from the filter circuit 56 is imparted to the non-inverting input terminal of the comparator $CP_2$ through the resistor $R_{13}$. The input to the non-inverting input terminal of the comparator $CP_2$ is controlled so that by a peak detect signal $\phi_{PD}$ being imparted to the base of the input controlling transistor $T_{r6}$, of the output signal from the filter circuit 56, only a signal corresponding to the output from the above-described standard field area A appears. The stored value of the capacitor $C_3$ is cleared before the output from the filter circuit begins to be imparted to the comparator $CP_2$ by a peak reset signal $\phi_{PR}$ being imparted to the base of the stored value clearing transistor $T_{r10}$.

Reference numeral 60 designates a peak value holding circuit for holding the peak value of the scanning output detected by the peak value detecting circuit 58 for one scanning period. The peak value holding circuit 60 has a comparator $CP_3$, resistors $R_{16}$–$R_{18}$, transistors $T_{r11}$–$T_{r15}$, a peak value holding capacitor $C_4$ and a buffer amplifier $BP_3$, and is a constant current operated circuit similar in connection and construction to the dark current signal detecting and holding circuit 52 and the peak value detecting circuit 58, and the output signal from the peak value detecting circuit 58, namely, the peak value information signal held by the capacitor $C_3$, is imparted to the non-inverting input terminal of the comparator $CP_3$ through the resistor $R_{16}$. The imparting of the peak value information signal held by the capacitor $C_3$ to the non-inverting input terminal of the comparator $CP_3$ is controlled so as to take place after the completion of the read-out of the line sensor output by a peak hold signal $\phi_{PH}$ being imparted to the base of the input controlling transistor $T_{r11}$. Also, the stored value of the peak value holding capacitor $C_4$ is cleared before the peak value information signal held by the capacitor $C_3$ is imparted to the non-inverting input terminal of the capacitor $CP_3$ by a hold reset signal $\phi_{HR}$ being imparted to the base of the stored value clearing transistor $T_{r15}$.

Designated by 62 is a voltage dividing circuit as a slice level setting circuit provided to set a slice level which provides the standard in transforming the image scanning output into a binary form on the basis of the output signal from the peak value holding circuit 60, namely, the peak value voltage ($V_{PK}$) held by the capacitor $C_4$. The voltage dividing circuit 62 comprises voltage dividing resistors $R_{19}$ and $R_{20}$ and a regulating variable resistor $VR_1$, and the voltage obtained at the voltage dividing point of the resistors $R_{19}$ and $R_{20}$ (this voltage is called $V_S$) is utilized as the slice level for transformation of the signal into a binary form. It has been confirmed that if the voltage $V_S$ as the slice level obtained by the voltage dividing circuit 62 is made to be $V_S = 0.6$–$0.8\ V_{PK}$ for the above-mentioned peak value storage $V_{PK}$, the influence of the noise signal in the circuit is eliminated to provide good binary data.

Designated by 64 is a standard voltage setting circuit which comprises a constant voltage circuit RQ, an operational amplifier $OP_3$, resistors $R_{21}$ and $R_{22}$, voltage dividing resistors $R_{23}$–$R_{26}$ and a regulating variable resistor $VR_2$, and the voltage obtained at the voltage dividing point of the resistor $R_{23}$ and the resistors $R_{24}$–$R_{26}$ (this voltage is called $V_{MAX}$) and the voltage obtained at the voltage dividing point of the resistors $R_{23}$–$R_{25}$ and the resistor $R_{26}$ (this voltage is called $V_{MIN}$) and utilized as the standard voltages for knowing whether or not the peak value voltage $V_{PK}$ held by the peak value holding circuit 60 is within a proper level range, and the voltage obtained at the voltage dividing point of the resistors $R_{23}$, $R_{24}$ and the resistors $R_{25}$, $R_{26}$ (this voltage is called $V_F$) is utilized as the fixed slice level for transformation of the signal into a binary form. In the present embodiment, the upper limit voltage $V_{MAX}$ is set to a level slightly lower than the voltage level corresponding to the saturation level of each photodiode in the line sensor 30, and the lower limit voltage $V_{MIN}$ is set to a level more or less higher than the level of the total noise component in the scanning output $V_{SO}$ which includes the noise component in the treatment circuit. The voltage $V_F$ as the aforementioned fixed slice level may be determined in various manners, but for example, the voltage level obtained from the level intermediate the voltages $V_{MAX}$ and $V_{MIN}$, namely, $$VF = (V_{MAX} + V_{MIN})/2$$

or the voltage level obtained from the intermediate level as the stage number, namely, $$VF = \sqrt{V_{MAX} \times V_{MIN}}$$

is relatively satisfactory.

Designated by 66 is a binary circuit for transforming the output signal from the filter circuit 56 into two binary forms with the voltage $V_S$ obtained at the voltage dividing point of the resistors $R_{19}$ and $R_{20}$ of the voltage dividing circuit 62, namely, the divided voltage of the peak value voltage $V_{PK}$ held by the peak value holding circuit 60, and the voltage $V_F$ obtained at the voltage dividing point between the resistors $R_{23}$, $R_{24}$ and the resistors $R_{25}$, $R_{26}$ of the standard voltage setting circuit 64 as the slice levels. The binary circuit 66 comprises a first binary comparator CP$_4$ using the voltage $V_S$ as the slice level and a second binary comparator CP$_5$ using the voltage $V_F$ as the slice level, and the output from the filter circuit 56 is imparted to the non-inverting input terminals of the comparators CP$_4$ and CP$_5$. Accordingly, these comparators CP$_4$ and CP$_5$ put out a logic value "0" (low signal) when their non-inverting input potentials are lower than their inverting input potentials (i.e., $V_S$ and $V_F$), and put out a logic value "1" (high signal) when their non-inverting input potentials are higher than their inverting input potentials and after all, in this manner, the analog output from the filter circuit 56 is transformed into two binary forms on the basis of the voltages $V_S$ and $V_F$, respectively.

Designated by 68 is a discrimination circuit for discriminating whether the peak value voltage $V_{PK}$ held by the peak value holding circuit 60 is within or over or under the voltage range determined by the upper limit voltage $V_{MAX}$ and the lower limit voltage $V_{MIN}$ set by the standard voltage setting circuit 64. The discrimination circuit 68 is a wind comparator comprising an over-detecting comparator CP$_6$ and an under-detecting comparator CP$_7$, and the peak value voltage $V_{PK}$ held by the peak value holding circuit 60 is imparted to the non-inverting input terminal of the comparator CP$_6$ and the inverting input terminal of the comparator CP$_7$, and the upper limit voltage $V_{MAX}$ is imparted to the inverting input terminal of the comparator CP$_6$ and the lower limit voltage $V_{MIN}$ is imparted to the non-inverting input terminal of the comparator CP$_7$. The discrimination output from the discrimination circuit 68, namely, the outputs of the comparators CP$_6$ and CP$_7$ (these outputs are called ITO and ITU, respectively) are utilized to determine whether or not the charge accumulation time T in the line sensor 30 should be altered and if altered, to which side it should be altered, longer or shorter, and as will be described later, the accumulation time T is altered to the shorter time side when the output ITO of the comparator CP$_6$ is high, and is altered to the longer time side when the output ITU of the comparator CP$_7$ is high. Also, which of the two binary data from the binary circuit 66, namely, the data from the first comparator CP$_4$ (this data is called DV) and the data from the second comparator CP$_5$ (this data is called DS), should be utilized as the binary data for taking the image correlation is determined by a subsequent digital circuit system. The output ITU of the comparator CP$_7$ is imparted to the base of the output controlling transistor $T_{r16}$ connected to the output terminal of the first binary comparator CP$_4$ and, when the output ITU of the comparator CP$_7$ is high, the binary data output from the binary comparator CP$_4$ is cut off and this is for interrupting the image correlation treatment in the subsequent digital circuit when the peak value voltage held by the peak value holding circuit 60 has become lower than the lower limit voltage $V_{MIN}$ set by the standard voltage setting circuit 64, with the charge accumulation time T in the line sensor 30 being set to the longest time of the aforementioned six stages of time, namely, 98.304 msec. (this will further be described).

In the present embodiment, the control of the analog circuit of the above-described construction is accomplished by obtaining, as the control signals $\phi_{DR}$, $\phi_{DD}$, $\phi_{PR}$, $\phi_{PD}$, $\phi_{HR}$ and $\phi_{PH}$, signals having the timing relations as shown in FIG. 8 for the read-out of the line sensor output by a sequence control circuit in a digital circuit system to be described, and by using such signals. That is, first, the dark reset signal $\phi_{DR}$ for the stored value clearing transistor $T_{r5}$ in the dark current signal detecting and holding circuit 52 is a signal which changes from low to high slightly before the shift gate pulse $\phi_{SH}$ is put out and then returns from high to low at the timing when the read-out of the six bits of the leading dummy bit D$_1$ in the light-receiving portion 32 of the line sensor 30 has been terminated, and the dark detect signal $\phi_{DD}$ for the input controlling transistor $T_{r1}$ in the circuit 52 is a signal which maintains high until the read-out of the six bits of the said dummy bit D$_1$ is terminated and changes from high to low at the timing when the read-out of the six bits of the dummy bit D$_1$ has been terminated and which returns from low to high at the timing when the read-out of the twelve bits of the dark current detecting area DM shielded from light has been terminated. By this, the stored value of the capacitor C$_1$ in the dark current signal detecting and holding circuit 52 is cleared before the read-out of the twelve bits of the dark current detecting area DM shielded from light is started, and the imparting of the input to the comparator CP$_1$ is limited to a signal corresponding to the output from the twelve bits of this dark current detecting area DM. Next, the peak reset signal $\phi_{PR}$ for the stored value clearing transistor $T_{r10}$ in the peak value detecting circuit 58 is a signal which changes from low to high in synchronism with the dark reset signal $\phi_{DR}$ for the dark current signal detecting and holding circuit 52 and then returns from high to low at the timing when the read-out of the six bits of the next separating space D$_2$ of the dark current detecting area DM has been terminated, and the peak detect signal $\phi_{PD}$ for the input controlling transistor $T_{r6}$ in the circuit 58 is a signal which maintains high until the read-out of the six bits of the separating space D$_2$ is terminated and changes from high to low at the timing when the read-out of the six bits of the separating space D$_2$ has been terminated, and then returns from low to high at the timing when the read-out of the forty-eight bits of the next standard field area A has been terminated. By this, the stored value of the capacitor C₃ in the peak value detecting circuit 58 is cleared before the read-out of the forty-eight bits of the standard field area A is started, and the imparting of the input to the comparator CP₂ is limited to a signal corresponding to the output from the forty-eight bits of this standard field area A. Finally, the hold reset signal $\phi_{HR}$ for the stored value clearing transistor $T_{r15}$ in the peak value holding circuit 60 is a signal which maintains low during the read-out period of the line sensor output and changes from low to high at the timing when the read-out of the line sensor output is terminated and the next mode (this will later be described) is entered, and then returns from high to low after a predetermined time (2.304 msec. in the present embodiment) has elapsed, and the peak hold signal $\phi_{PH}$ for the input controlling transistor $T_{r11}$ in the circuit 60 is a signal which changes from high to low in synchronism with the change of the hold reset signal $\phi_{HR}$ from high to low and then returns from low to high after a predetermined time (2.304 msec. in the present embodiment, similarly to the hold reset signal $\phi_{HR}$) has elapsed. By this, the stored value of the capacitor C₄ in the peak value holding circuit 60 is cleared during 2.304 msec. after the read-out of the line sensor output has been terminated, and the imparting of the input to the comparator CP₃ takes place during 2.304 msec. after the stored value of the capacitor C₄ has been cleared. In the circuit system shown in FIGS. 7A and 7B, a voltage $V_{CC1}$ (for example, 13±1 volts) is imparted to the differential amplifier circuit 50 and a voltage $V_{CC2}$ (for example, 7±1 volts) is imparted to the remaining circuits. This circuit system shown in FIGS. 7A and 7B is all made into IC, except the capacitors C₁-C₄.

Description will now be made of the operation whereby the binary data of the two detection images formed by the range finding optical system shown in FIG. 2 may be obtained by a combination of the analog circuit system shown in FIGS. 7A and 7B and the line sensor 30 shown in FIG. 3.

First, in a condition in which two detection images of an object whose distance is to be detected are formed on the light-receiving portion 32 of the line sensor 30 by the optical system shown in FIG. 2 and the photo-gate bias voltage $V_P$, the output drain bias voltage $V_{DD}$, the reset drain bias voltage $V_{RD}$, the transfer pulses $\phi_1$-$\phi_4$ and the reset pulse $\phi_R$ are imparted to the line sensor 30 while, at the same time, the voltages $V_{CC1}$ and $V_{CC2}$ are imparted to the analog circuit system shown in FIGS. 7A and 7B, when an integration clear pulse $\phi_{IC}$ is put out from the sequence control circuit, the anti-blooming gates 44 and 46 in the line sensor 30 are completely opened thereby and accordingly, the accumulated charges in the odd-numbered group photodiodes of the light-receiving portion 32 flow into the drain of the anti-blooming gate 44 and the accumulated charges in the even-numbered group photodiodes flow into the drain of the anti-blooming gate 46 and these charges are completely cleared. When this integration clear pulse $\phi_{IC}$ returns from high to low, each of the photodiodes in the light-receiving portion 32 newly starts to accumulate a generated charge corresponding to the quantity of light received thereby (of course, in this case, the dark current detecting area DM is shielded from light and therefore, storage of a charge corresponding to the dark current component is effected in the twelve bits of the dark current detecting area DM). When the predetermined accumulation time T (this is initially the shortest time, 96 μsec., of the aforementioned six stages of time) has elapsed from the point of time whereat the integration clear pulse $\phi_{IC}$ has returned to low, the shift gate pulse $\phi_{SH}$ is put out from the sequence control circuit and by this, the shift gates 38 and 40 in the line sensor 30 are opened so that the accumulated charges in the odd-numbered group photodiodes of the light-receiving portion 32 are introduced into the corresponding bits of the CCD analog shift register 34 through the shift gate 38 and the accumulated charges in the even-numbered group photodiodes are introduced into the corresponding bits of the CCD analog shift register 36 through the shift gate 40, and these charges are successively transfered through the shift registers 34 and 36 to the voltage converting portion 42, where they are converted into voltage values and successively put out. In this case, as described above, the voltage outputs resulting from the accumulated charges in the odd-numbered group photodiodes are obtained at the timing of the transfer pulse $\phi_2$, and the voltage outputs resulting from the accumulated charges in the even-numbered group photodiodes are obtained at the timing of the transfer pulse $\phi_4$. During the above-described charge accumulation period, if the generated charge in any photodiode of the photodiode array in the light-receiving portion 32 exceeds the storage capacity, the excess charge is cleared through the anti-blooming gate 44 or 46.

Now, the scanning output $V_{OS}$ from the line sensor 30 read out in the described manner is imparted to the inverting input terminal of the operational amplifier OP₁ of the differential amplifier circuit 50 in the analog circuit system shown in FIG. 7A. On the other hand, at this time, in the voltage fluctuation detecting portion 48 of the line sensor 30, the fluctuation of the photo-gate bias voltage $V_P$ being imparted to the light-receiving portion 32 is detected and an output $V_{DOS}$ representing that fluctuation is being imparted to the non-inverting input terminal of the operational amplifier OP₁ and accordingly, the output $V_{OP1}$ of this operational amplifier P₁ is expressed as $$V_{OP1} = \frac{r_4}{r_3 + r_4} \cdot \frac{r_1 + r_2}{r_1} \cdot V_{DOS} - \frac{r_2}{r_1} \cdot V_{OS}$$

(where r₁-r₄ are the resistance values of resistors R₁-R₄) and if, here, $r_1 = r_2 = r_3 = r_4$, $$V_{OP1} = V_{DOS} - V_{OS}$$

and thus, an output from which the noise component resulting from the fluctuation of the photo-gate bias voltage $V_P$ comes to appear at the output end of the differential amplifier circuit 50 and after all, the voltage fluctuation in the scanning output $V_{OS}$ is removed by this. On the other hand, in the initial stage of the read-out of the line sensor output at this time, a signal corresponding to the dark current component which results from the accumulated charge in the twelve bits of the dark current detecting area DM shielded from light in the light-receiving portion 32 is obtained, and in the dark current signal detecting and holding circuit 52 in the analog circuit system shown in FIG. 7A, the dark reset signal $\phi_{DR}$ for the stored value clearing transistor $T_{r5}$ changes from low to high slightly before the point of time whereat the shift gate pulse $\phi_{SH}$ is put out, as already described, whereby the transistor $T_{r5}$ conducts at this point of time to clear the capacitor C₁ and thereafter, the dark detect signal $\phi_{DD}$ for the input controlling transistor $T_{r1}$ becomes low for a period corresponding to the read-out of the twelve bits of the dark current detecting area DM, as described above, whereby the transistor $T_{r1}$ is non-conductive during this period and accordingly, of the output $V_{OP}$ from the differential amplifier circuit 50, the signal corresponding to the output of the twelve bits of the dark current detecting area DM is imparted to the non-inverting input terminal of the comparator $CP_1$. At this time, the inverting input terminal of this comparator $CP_1$ is connected to the capacitor $C_1$, so that the transistor $T_{r1}$ becomes non-conductive and at the point of time whereat the output of the differential amplifier circuit 50 is imparted, the non-inverting input potential becomes higher than the inverting input potential and therefore, the output of the comparator $CP_1$ is inverted from low to high and accordingly, the transistor $T_{r2}$ conducts, whereby a constant current $IR_6$ determined by resistor $R_6$ flows through the transistor $T_{r4}$ whose base-collector is short-circuited so as to operate as a diode while, at the same time, the transistor $T_{r3}$ conducts and the charging of the capacitor $C_1$ is started by a current $I_1$ flowing through the transistor $T_{r3}$. Assuming that the resistance value of the resistor $R_7$ is sufficiently higher than that of the resistor $R_6$ and if the base current of the transistor $T_{r3}$ is neglected, the base-emitter voltages $V_{BE4}$ and $V_{BE3}$ of the transistors $T_{r4}$ and $T_{r3}$ become $$V_{BE4} = \frac{KT}{g} \ln\left(\frac{IR_6}{i_0} + 1\right)$$

$$V_{BE3} = \frac{KT}{g} \ln\left(\frac{I_1}{i_0} + 1\right)$$

where K is Boltzmann constant, T is the absolute temperature, g is the primary amount of charge, $i_0$ is the reverse saturation current, $IR_6$ is the current flowing through the resistor $R_6$, and $I_1$ is the charging current of the capacitor $C_1$.

In the present circuit, $V_{BE3}=V_{BE4}$, hence, $I_1=IR_6$ and the capacitor $C_1$ is charged with a constant current equivalent to the current flowing through the resistor $R_6$. When the potential of the capacitor $C_1$ rises and the inverting input potential of the comparator $CP_1$ exceeds the non-inverting input potential thereof, the output of the comparator $CP_1$ is inverted from high to low, whereby the transistor $T_{r2}$ becomes non-conductive and therefore, the transistor $T_{r3}$ becomes non-conductive, so that the charging of the signal detecting and holding circuit 52, the detection and holding of the dark current signal is effected on the basis of the signal corresponding to the output from the twelve bits of the dark current detecting area DM shielded from light, of the output $V_{OP1}$ from the differential amplifier circuit 50, and the dark current information signal held by the capacitor $C_1$ is put out through the buffer amplifier $BP_1$.

The resistor $R_7$ is for eliminating the delay of the switching of the transistor $T_{r3}$ caused by the junction capacity of the diode-connected transistor $T_{r4}$ when the transistor $T_{r2}$ has become non-conductive. Incidentally, the delay of the inverting operation of the comparator $CP_1$ and the transistors $T_{r2}$, $T_{r3}$ is constant and therefore, if it is assumed that independently of the fluctuation of the output voltage of the differential amplifier circuit 50, the charging of the capacitor $C_1$ is cut off in a predetermined time $t_D$ after the point of time whereat the inverting input potential of the comparator $CP_1$ has exceeded the non-inverting input potential thereof, then the detection error voltage $\Delta V$ based on the overcharging of the capacitor $C_1$ resulting from the response delay of the circuit system becomes $$\Delta V = (t_D \cdot I_1)/C_q$$

(where $C_q$ is the capacity of the capacitor $C_1$). Accordingly, a voltage highly accurately corresponding to the dark current signal voltage can be obtained by shifting the offset voltage of the comparator $CP_1$ or the buffer amplifier $BP_1$ by a voltage component corresponding to this error voltage $\Delta V$, or by connecting a differential amplifier circuit to the output end of the buffer amplifier $BP_1$ and subtracting this error voltage $\Delta V$.

Now, when the read-out period of the twelve bits of the dark current detecting area DM has passed, the outputs of the various areas indicated by $D_2$, A, IV, B and $D_3$ in the light-receiving portion 32 are successively read out to obtain an output including the scanning signals regarding the standard field detection image and the reference field detection image formed on the light-receiving portion 32 by the optical system of FIG. 2, and this output, after the voltage fluctuation component thereof has been removed by the differential amplifier circuit 50, is imparted to the non-inverting input terminal of the operational amplifier $OP_2$ in the next differential amplifier circuit 54. On the other hand, at this point of time, the dark current information signal detected and held by the dark current signal detecting and holding circuit 52 is being imparted to the inverting input terminal of the operational amplifier $OP_2$ and accordingly, assuming that the output of the dark current detecting and holding circuit 52 is $V_{BP1}$, the output $V_{OP2}$ of the operational amplifier $OP_2$, like the output $V_{OP1}$ of the operational amplifier $OP_1$ in the differential amplifier circuit 50, is expressed as $$V_{OP2} = \frac{r_9}{r_8 + r_9} \cdot \frac{r_{10} + r_{11}}{r_{10}} \cdot V_{OP1} - \frac{r_{11}}{r_{10}} \cdot V_{BP1}$$

(where $r_8$-$r_{11}$ are the resistance values of the resistors $r_8$-$R_{11}$) and here, if $r_8=r_9=r_{10}=r_{11}$, $$V_{OP2} = V_{OP1} - V_{BP1}$$

and thus, a signal from which the dark current component has been removed appears at the output end of the differential amplifier circuit 554 and after all, by this, the dark current component is further removed from the scanning output $V_{OS}$. The output from the differential amplifier circuit 54 is then imparted to the filter circuit 56, where a high frequency noise component is further removed from said output, whereafter it is imparted to the binary circuit 66 and the peak value detecting circuit 58. In the peak value detecting circuit 58, as described above, the peak reset signal $\phi_{PR}$ for the stored value clearing transistor $T_{r10}$ changes from low to high slightly before the point of time whereat the shift gate pulse $\phi_{SH}$ is put out, whereby the transistor $T_{r10}$ conducts at this point of time and the capacitor $C_3$ is cleared and thereafter, as already noted, the peak detect signal $\phi_{PD}$ for the input controlling transistor $T_{r6}$ becomes low for a period corresponding to the read-out of the forty-eight bits of the standard field area A, whereby the transistor $T_{r6}$ becomes non-conductive for this period and accordingly, of the output from the filter circuit 56, the signal corresponding to the output of the forty-eight bits of the standard field area A is imparted to the non-inverting input terminal of the comparator CP$_2$. At this time, the comparator CP$_2$, like the comparator CP$_1$ in the dark current signal detecting and holding circuit 52, has its inverting input terminal connected to the capacitor C$_3$ and therefore, at the point of time whereat the output from the filter circuit 56 has been imparted to the non-inverting input terminal of the comparator CP$_2$, the output thereof is inverted from low to high, whereby the transistors T$_{r7}$ and T$_{r8}$ conduct and, as in the case of the dark current signal detecting and holding circuit 52, the capacitor C$_3$ starts to be charged with a constant current equivalent to the current flowing through the resistor R$_{14}$ and, when the charging voltage of the capacitor C$_3$ exceeds the output potential from the filter circuit 56, the output of the comparator CP$_2$ is inverted from high to low and the charging of the capacitor C$_3$ is cut off. Thereafter, in this peak value detecting circuit 58, if the non-inverting input potential of the comparator CP$_2$ exceeds the inverting input potential thereof in accordance with the variation in the output from the filter circuit 56, the charging of the capacitor C$_3$ is resumed and, if the inverting input potential exceeds the non-inverting input potential, the charging of the capacitor C$_3$ is cut off, and such operation is repeated until the read-out of the forty-eight bits of the standard field area DM is terminated and, at the timing when the read-out of the forty-eight bits of the standard field area A has been terminated, the peak detect signal $\phi_{PD}$ returns from low to high and the transistor T$_{r6}$ conducts, whereby at the point of time whereat the imparting of the output from the filter circuit 56 to the non-inverting input terminal of the comparator CP$_2$ has been cut off, a voltage corresponding to the maximum value of the output from the filter circuit 56 corresponding to the output of the forty-eight bits of the standard field area A, or in other words, the peak value of the scanning output regarding the standard field area A, is held by the capacitor C$_3$.

When the read-out of the line sensor output is terminated, as already noted, the hold reset signal $\phi_{HR}$ for the stored value clearing transistor T$_{r15}$ in the peak value holding circuit 60 becomes high for 2.304 msec. after the termination of the read-out of the line sensor output, so that during this period the transistor T$_{r15}$ conducts to clear the capacitor C$_4$ and for the next 2,304 msec., the peak hold signal $\phi_{PH}$ for the input controlling transistor T$_{r11}$ becomes low, so that during this period the transistor T$_{r11}$ becomes non-conductive and the output from the peak value detecting circuit 58 is imparted to the non-inverting input terminal of the comparator CP$_3$ and as in the dark current signal detecting and holding circuit 52 and the peak value detecting circuit 58, the capacitor C$_4$ is charged up to a level corresponding to the non-inverting input potential of the comparator CP$_3$ and after all, a voltage corresponding to the peak value of the scanning output regarding the standard field area A detected by the peak value detecting circuit 58 is held by the capacitor C$_4$. The hold voltage of this capacitor C$_4$ is imparted as the peak value voltage V$_{PK}$ to the discrimination circuit 68 and the voltage dividing circuit 62 through the buffer amplifier BP$_3$. In the discrimination circuit 68, whether or not the peak value voltage V$_{PK}$ exceeds the upper limit standard voltage VMAX set by the standard voltage setting circuit 64 is detected by the over-detecting comparator CP$_6$ and whether or not the peak value voltage V$_{PK}$ is under the lower limit standard voltage V$_{MIN}$ is detected by the under-detecting comparator CP$_7$ and after all, assuming that the outputs of the comparators CP$_6$ and CP$_7$ are ITO and ITU, respectively, the discrimination result corresponding to the level of the peak value voltage V$_{PK}$ is obtained by a combination of the outputs ITO and ITU of the comparators CP$_6$ and CP$_7$ in such a manner that when V$_{MAX} \geq V_{PK} \geq V_{MIN}$, both of ITO and ITU are low, that when V$_{PK} > V_{MAX}$, ITO is high and ITU is low, and that when V$_{PK} < V_{MIN}$, ITO is low and ITU is high.

Also, in the voltage dividing circuit 62, a voltage V$_S$ expressed as $$V_S = \frac{\frac{V_{PK}}{r_{19}}}{\frac{1}{r_{19}} + \frac{1}{r_{20}} + \frac{1}{vr_1}} (= 0.6 - 0.8\ V_{PK})$$

(where $r_{19}$, $r_{20}$ and $vr_1$ are the resistance values of resistors R$_{19}$, R$_{20}$ and variable resistor VR$_1$) appears at the output end thereof and this is imparted to the inverting input terminal of the first binary comparator CP$_4$ in the binary circuit 66 as the slice level for transforming the signal into a binary form, and accordingly, the scanning output obtained during the next read-out of the line sensor output is transformed into a binary form by the comparator CP$_4$ on the basis of the voltage V$_S$ obtained at this time.

Assuming that this read-out of the line sensor output is the first read-out, the voltage held by the peak value holding circuit 60 during this read-out does not correspond to the peak value of the scanning output regarding the standard field area A (that is, the potential of the capacitor C$_4$ at this time is zero or, if it is more or less charged, it is caused by the leak current of the circuit) and accordingly, the output voltage V$_S$ from the voltage dividing circuit at this time is disqualified as the slice level for transforming the signal into a binary form and therefore, during this first read-out, it is advisable to utilize a binary data DS having as the slice level a fixed voltage V$_F$ set by the standard voltage setting circuit 64 which is obtained from the second binary comparator CP$_5$ in the binary circuit 66 to take the image correlation. This also holds true with the case of the first read-out taking place immediately after the charge accumulation time T of the line sensor 30 has been altered. That is, when the accumulation time T has been altered, the voltage V$_S$ for the scanning output obtained during the first read-out immediately thereafter is determined on the basis of the peak value of the scanning output regarding the standard field area A which has been obtained during the read-out taking place immediately before the alteration of the accumulation time T and accordingly, the voltage V$_S$ at this time is clearly disqualified as the slice level for the scanning output obtained during the first read-out taking place immediately after the alteration of the accumulation time T and therefore, again in this case, it is advisable to utilize the binary data DS obtained from the second binary comparator CP$_5$.

In the analog circuit system shown in FIGS. 7A and 7B, as described above, each time the scanning output regarding the two detection images of the object formed by the range finding optical system of FIG. 2 is obtained from the line sensor 30, two binary data regarding this scanning output, namely, the binary data DV having as the slice level the voltage $V_S$ determined on the basis of the peak value $V_{PK}$ of the scanning output regarding the standard field area A and the binary data DS having the fixed voltage $V_F$ as the slice level, are obtained and there are also obtained the discrimination signals ITO and ITU representing whether the peak value $V_{PK}$ at this time is within or over or under the predetermined voltage range determined by the voltages $V_{MAX}$ and $V_{MIN}$. As will later be described in detail, in the present embodiment, whether or not the accumulation time T for the line sensor 30 should be altered is determined on the basis of the discrimination outputs ITO and ITU from the discrimination circuit 68.

Description will now be made of a digital circuit system for effecting the detection of the distance to the object on the basis of the binary image data obtained in the described manner through the analog circuit system shown in FIGS. 7A and 7B and for further effecting the detection of the focusing and non-focusing of the phototaking lens or the automatic focus adjustment and control of the phototaking lens.

Referring to FIG. 9, it shows the construction of such digital circuit system by functional blocks to facilitate the understanding. In FIG. 9, reference numeral 70 designates a sequence control circuit for controlling the operation of the entire system, and reference numeral 72 designates a select gate circuit for receiving the outputs from the binary circuit 66 in the analog circuit system of FIGS. 7A and 7B, namely, the binary data outputs DV and DS from the comparators $CP_4$ and $CP_5$ at the input ends V and S thereof and selecting one of them. The selecting operation of the select gate circuit 72 is controlled by the control signal from the sequence control circuit 70. Incidentally, the sequence control circuit 70 controls the select gate circuit 72 so as to select the binary data output DS from the comparator $CP_5$ (a) during the first data introduction after the closing of the main switch,
(b) during the first data introduction after one-more operation in the case of the semi-auto focus mode in the servo focus mode (this will later be described), and
(c) during the first data introduction immediately after the charge accumulation time T for the line sensor 30 has been altered and to select the binary data output DV from the comparator $CP_4$ during the other time. That is, any of the cases (a), (b) and (c) above is a case where the data Ds transformed into binary form by the fixed voltage $V_F$ is considered to be a binary data higher in likelihood by the reason that the newest image scanning output data on which the slice level should be based does not exist or that even if it exists, it is not an effective data. Designated by 74 is a slice failure detecting circuit for detecting whether or not, of the binary data introduced through the select gate circuit 72, at least one of the 48-bit binary data regarding the standard field area A in the line sensor 30 (hereinafter referred to as the standard field data) and the 90-bit binary data regarding the reference field B (hereinafter referred to as the reference field data) is all "1" or all "0" (both of these mean slice-transformation into binary form-failure and in this case, the distance detection becomes impossible). The slice failure detecting 74 is controlled by the control signal from the sequence control circuit 70 so as to detect the slice failure only of the 48-bit standard field data and the 90-bit reference field data, and the result is stored in this slice failure detecting circuit 74. The sequence control circuit 70 introduces the detection result of the slice failure detecting circuit 74 at a specific timing and on the basis thereof, it determines whether to advance the sequence to the next step or to return the sequence to the initial step, and this will later be described in detail.

SR1 designates a series input-series output type shift register of 48-bit construction applied for storing the above-described 48-bit standard field data, SR4 designates a circulation delaying series input-series output type shift register of 6-bit construction as bypass means provided in one of the two circulation paths of the shift register SR1, SR2 denotes a series input-series output type shift register of 48-bit construction applied for storing the first 48-bit data of the 90-bit reference field data, SR5 denotes a circulation delaying series input-series output type shift register of 5-bit construction as bypass means provided in one of the two circulation paths of the shift register SR2, SR3 designates a series input-series output type shift register of 42-bit construction applied for storing the remaining 42-bit data of the 90-bit reference field data, 76 denotes a select gate circuit on the input side of the shift register SR1, 78 designates a select gate circuit on the input side of the shift register SR2, and 80 designates a select gate circuit on the input side of the shift register SR3 and the operation thereof is controlled by the control signal from the sequence control circuit 70. Incidentally, the sequence control circuit 70 controls the above-described select gate circuits 76, 78 and 80 so as to successively perform the following operations:

(1) the operation of first causing the 48-bit data regarding the standard field area A, of the binary data selected by the select gate circuit 72, to be introduced into the shift register SR1 during the read-out of the line sensor output, thereafter causing the stored data of the shift register SR1 to be circulated through a circulation path which does pass through the circulation delaying shift register SR4, then causing the first 48-bit data of the 90-bit data regarding the reference field area B to be introduced into the shift register SR2, thereafter causing the stored data of the shift register SR2 to be circulated through a circulation path which does not pass through the circulation delaying shift register SR5, and causing the remaining 42-bit data of the reference field data to be introduced into the shift register SR3, thereafter causing the stored data of the shift register SR3 to be circulated;

(2) next, the operation of maintaining the circulation of the stored data of the shift registers SR2 and SR3 in the condition of (1) above while changing over the circulation path of the stored data of the shift register SR1 to a circulation path which passes through the circulation delaying shift register SR4, at a predetermined timing, for the purpose of uniformizing the heads of the data in the shift registers SR1, SR2 and SR3, and causing the stored data of the shift register SR1 to be circulated through the circulation delaying shift register SR4;

(3) and the operation of changing over the circulation path of the stored data of the shift register SR2 to a circulation path which passes through the circulation delaying shift register SR5 after the heads of the data in the shift registers SR1, SR2 and SR3 have been uniformized by the operation (2) above, causing the stored data of the shift register SR2 to be circulated through the circulation delaying shift register SR5 and causing the 1-bit data in the leading bit of the shift register SR3 to be introduced into the shift register SR2 each time one circulation of the stored data of the shift register SR2 is terminated.

Each of the shift registers SR1–SR5 is of the dynamic type and driven by the clock pulses CP (pulses of 62.5KC in the present embodiment shown in FIG. 12) from a timing control circuit to be described. To the shift registers SR1, SR2, SR4 and SR5, the clock pulses CP are directly imparted from the timing control circuit, whereas to the shift register SR3, the clock pulses CP are imparted through a pulse control circuit controlled by the control signal from the sequence control circuit 70 and in this case, the sequence control circuit 70 controls the pulse control circuit 82 so that, in the operation modes (1) and (2) of the select gate circuits 76, 78 and 80, all of the clock pulses CP from the timing control circuit are imparted to the shift register SR3, but in the operation mode (3), while 54 pulses of the clock pulses CP are being imparted to the shift registers SR1, SR2, SR4 and SR5, 43 pulses thereof are imparted to the shift register SR3 (that is, of the 54 pulses, 11 pulses are picked out, but in this case, the last one pulse of the 43 pulses is always coincident with the last one pulse of the 54 pulses). That is, in the operation mode (3) of the select gate circuits 76, 78 and 80, when 54 (=48+6) pulses of the clock pulses CP are imparted to the shift registers SR1 and SR4, the stored data of the shift register SR1 makes just one circulation to return to its initial state while, on the other hand, at this time, the stored data of the shift register SR2 makes one circulation to return to its initial state for 53 (=48+5) pulses because the circulation delaying shift register SR5 is of 5-bit construction and accordingly, when one more pulse, namely, the 54th pulse, is imparted, the stored data of the shift register SR2 is subjected to 1-bit right shift relative to the stored data of the shift register SR1. On the other hand, the shift register SR3 is of 42-bit construction and therefore, the stored data thereof makes one circulation for 42 pulses and accordingly, if design is made such that the 43rd pulse is imparted to the shift register SR3 in synchronism with the last one pulse of the aforementioned 54 pulses and if, during this one pulse, the select gate circuit 78 is set to a mode for causing one bit of the stored data of the shift register SR3 to be introduced into the shift register SR2, then the data in the leading bit of the shift register SR3 at this time point is shifted to the last bit of the shift register SR2 and after all, through this operation, relative shift of each one bit of the 90-bit reference field data to the 48-bit standard field data stored in the shift register SR1 occurs. Incidentally, in the condition in which the above-described operation has been repeated 42 times, the last 48 bits of the 90-bit reference field data, namely, 48 bits of data from the 43rd bit to the 90th bit, are stored in the shift register SR2. In the present embodiment, as will be appreciated from the ensuing description, one word time for the data processing is of 6 bits and therefore, the circulation delaying shift register SR4 for the shift register SR1 is made into 6-bit construction and as described above, to provide relative shift of each one bit of the reference field data to the standard field data for each one circulation of the stored data of the shift registers SR1 and SR2, the circulation delaying shift register SR5 for the shift register SR2 is made into 5 bit construction.

G90 designates an exclusive OR gate as a coincidence detecting circuit for discriminating the coincidence or incoincidence between the output data of the shift registers SR1 and SR2 for each bit, and it puts out "0" in the case of coincidence, namely, when both the two inputs are "1" or "0", and puts out "1" in the case of incoincidence.

G94 designates an OR gate for replacing the period during which the output of the exclusive OR gate G90 is "0" by the number of the clock pulses CP and it is controlled by the control signal from the sequence control circuit 70 and puts out the clock pulses CP only during the period during which the output of the exclusive OR gate G90 is "0", within the period until the data which have been in the last bits of the shift registers SR1 and SR2 are shifted to the last bits of the circulation delaying shift registers SR4 and SR5, respectively, of the period until the stored data of shift register SR1 makes one circulation to return to its initial state in each circulation of the stored data of the shift registers SR1 and SR2 through the respective circulation delaying shift registers SR4 and SR5, namely, within the period of each first 48 pulses, of the period of each 54 pulses of the clock pulses CP imparted to the shift registers SR1, SR2, SR4 and SR5. Accordingly, when the output data of the shift registers SR1 and SR2 are all coincident, the exclusive OR gate G90 puts out "0" throughout the whole period of the foregoing 48 pulses and therefore, in this case, 48 pulses of the clock pulses CP are put out from the OR gate G94 within said period. During the period of each of the last 6 pulses of the period of each said 54 pulses, the output of the OR gate G94 is maintained high. CNT4 designates a match counter for counting the output pulse number from the OR gate G94, namely, the number of coincident bits between the output data of the shift registers SR1 and SR2. The match counter CNT4 counts up by the falling of the output pulse from the OR gate G94 and is reset by the reset signal from the sequence control circuit 70 each time one circulation of the stored data of the shift register SR1 is terminated. Here, a falling synchronization type binary counter of 6-bit construction is used as the counter CNT4.

PSR1 designates a parallel input-series output circulation type (dynamic type) shift register of 6-bit construction for temporally latching the count output of the counter CNT4 for the data comparison, and it introduces and stores therein the count output of the counter CNT4 in response to the falling of the strobe signal from the sequence control circuit 70. Incidentally, the sequence control circuit 70 puts out to the shift register PSR1 a strobe signal which changes from low to high in synchronism with the rising of the 43rd pulse of each 54 pulses imparted to the shift registers SR1, SR2, SR4 and SR5 and thereafter returns from high to low in synchronism with the rising of the 49th pulse and thus, the shift register PSR1 introduces and stores therein the count output of the counter CNT4 before reset during each circulation of the stored data of the shift registers SR1 and SR2, and the counter CNT4 is reset after the count output thereof has been introduced into the shift register PSR1. By this, in the shift register PSR1, the number of coincident bits between the output data of the shift registers SR1 and SR2 in each circulation of the stored data of the shift registers SR1 and SR2 through the respective circulation delaying shift registers SR4 and SR5 is latched for each circulation. The shift register PSR1 is normally driven by the clock pulses CP.

SR6 designates a series input-series output circulation type (dynamic type) shift register of 6-bit construction provided to store the content of the shift register PSR1 under specific conditions, and 86 denotes a select gate circuit for changing over the input data to the shift register SR6 between the output data of the shift register SR6 and the output data of the shift register PSR1, and the select operation thereof is controlled by the control signal from the sequence control circuit 70. Incidentally, the sequence control circuit 70 controls the select gate circuit 86 so that the output data of the shift register PSR1 is introduced into the shift register SR6 only when "content of PSR1 ≧ content of SR6" has been found as the result of the comparison between the magnitude of the content of the shift register PSR1 and the magnitude of the content of the shift register SR6 effected by a magnitude comparing circuit 106 to be described and that the content of the shift register SR6 is intactly circulated under the other conditions. More specifically, the sequence control circuit 70 controls so that, during each circulation of the stored data of the shift registers SR1 and SR2 through the respective circulation delaying shift registers SR4 and SR5, the count output of the counter CNT4 is latched by the shift register PSR1 in synchronism with the rising of the 49th pulse of each 54 pulses imparted to the shift registers SR1, SR2, SR4 and SR5, whereafter within the period of each 6 pulses from the 49th pulse to the 54th pulse, comparison between the magnitudes of the contents of the shift registers PSR1 and SR6 is effected by the magnitude comparing circuit 106 and, when "content of PSR1 ≧ content of SR6" has been found, the select gate circuit 86 is set to a mode for causing the output data of the shift register PSR1 to be introduced into the shift register SR6 for the period of the first 6 pulses of the next 54 pulses imparted to the shift registers SR1, SR2, SR4 and SR5 (by this, during these 6 pulses, the output data of the shift register PSR1 is introduced and stored in the shift register SR6) and that under the other conditions, the select gate circuit 86 is set to a mode for causing the content of the shift register SR6 to be intactly circulated. Accordingly, each time the number of coincident bits during the detection of the coincidence between the output data by the exclusive OR gate G90 during each circulation of the stored data of the shift registers SR1 and SR2, the content of the shift register SR6 is rewritten into the increased number of coincident bits and, in the present system, the detection of the coincidence between the output data by the exclusive OR gate G90 during the circulation of the stored data of the shift registers SR1 and SR2 through the respective circulation delaying shift registers SR4 and SR5 is repeated 43 times with the circulation and coincidence immediately after the termination of the uniformization of the heads of the data in the shift registers SR1–SR3 as the first time and with the circulation and coincidence detection immediately after the data which has initially been in the last bit of the shift register SR3 has been transferred to the last bit of the shift register SR2 as the last time, or in other words, 43 times from the detection of the coincidence between the data of the first 48 bits (namely, from the 1st bit to the 48th bit) of the 90-bit reference field data for the 48-bit standard field data stored in the shift register SR1 to the detection of the coincidence between the data of the last 48 bits (namely, from the 43rd bit to the 90th bit), and accordingly, the data left in the shift register SR6 at the point of time whereat the 43 times of coincidence detection has been terminated represents the maximum coincidence number during the detection of the coincidence between the data of each continuous 48 bits of the 90-bit reference field data for the 48-bit standard field data. The shift register SR6, like the shift register PSR1, is normally driven by the clock pulses CP.

U/D CNT designates a binary up-down counter of 3-bit construction provided to change over and store the charge accumulation time T in the line sensor 30, and 88 designates a counter control circuit for controlling the up-down counter U/D CNT on the basis of the control signal from the sequence control circuit 70, the count output of the up-down counter U/D CNT, the decoded output of the up-down counter U/D CNT by a decoder circuit 92, and the discrimination outputs ITO and ITU from the discrimination circuit 68 in the analog circuit system of FIG. 7 imparted through input terminals O and U. The counter control circuit 88 causes the up-down counter U/D CNT to effect one count down only when the content of the up-down counter U/D CNT is other than "0" and the discrimination output ITO from the discrimination circuit 68 becomes high, causes the up-down counter U/D CNT to effect one count up only when the content of the up-down counter U/D CNT is other than "5" and the discrimination output ITU from the discrimination circuit 68 becomes high, and holds the up-down counter U/D CNT as it is, namely, in the condition of content "0" or "5", when the content of the up-down counter U/D CNT is "0" and the discrimination output ITO from the discrimination circuit 68 becomes high or when the content of the up-down counter U/D CNT is "5" and the discrimination output ITU from the discrimination circuit 68 becomes high. Accordingly, the count content of the up-down counter U/D CNT is changed over in six stages from "0" to "5", and the count contents "0", "1", "2", "3", "4" and "5" of the up-down counter U/D CNT are decoded by the decoder circuit 92 and made to correspond to the six stages of charge accumulation time which should be set to the line sensor 30 as mentioned in the description of the line sensor 30 of FIG. 3, namely, 96 μsec., 384 μsec., 1.824 msec., 9.120 msec., 45.792 msec. and 98.304 msec. and after all, one of the six stages of accumulation time is selected in accordance with the count content of the up-down counter U/D CNT. Incidentally, the accumulation time is changed over to the shorter time side by the high of the discrimination output ITO from the discrimination circuit 68 and is changed over to the longer time side by the high of the discrimination output ITU. When the content of the up-down counter U/D CNT is altered and the set accumulation time is altered, the sequence control circuit 70, as already described, sets the select gate circuit 72 to the mode for selecting the binary data DS by the fixed slice level $V_F$ from among the output data DV and DS from the binary circuit 66.

CNT1 designates a sequence counter applied to control the sequence of the entire system, and a falling synchronization type binary counter of 3-bit construction is used as this sequence counter.

Although this will later be described in detail, the operation sequence of the system is divided into eight sequence modes called CC0–CC7, and the count output of the sequence counter CNT1 is utilized to control these sequence modes CC0–CC7.

CNT2 designates a sequence sub-counter applied to control finer sub-sequences of the sequence modes CC0–CC7, and a falling synchronization type binary counter of 6-bit construction is used as such sub-counter.

CNT3 denotes a counter applied to count the frequency with which the data stored in the shift register SR3 is introduced into the shift register SR2 (this represents the amount of relative shift of the 90-bit reference field data stored in the shift registers SR2 and SR3 with respect to the 48-bit standard field data stored in the shift register SR1), and a falling synchronization type binary counter of 6-bit construction is used as such counter. Reference numeral 90 denotes a counter control circuit for controlling the counters CNT1-CNT3 by the control signal from the sequence control circuit 70, and it controls the resetting of the counters CNT1-CNT3 and the imparting of count clock.

The counters CNT2 and CNT3 are also applied to count the charge accumulation time T of the line sensor 30 selected in accordance with the count content of the up-down counter U/D CNT and in that case, they are handled as a series counter by the sequence control circuit 70, namely, as a 12-bit counter by causing the counter CNT3 to count the carry signal from the counter CNT2. Particularly, in a preset focus mode to be described, the counter CNT3 is also applied to count the pulse number representing the position of the phototaking lens during movement of the phototaking lens (this is started after termination of the sequence mode CC7). Incidentally, the counter control circuit 90 causes the counter CNT3 to count up each time the data in the leading bit of the shift register SR3 is transferred to the last bit of the shift register SR2 during the relative shift of the 90-bit reference field data stored in the shift registers SR2 and SR3 with respect to the 48-bit standard field data stored in the shift register SR1, and causes the counter CNT3 to count up by a pulse generated with the movement of the phototaking lens during the movement of the phototaking lens in the preset focus mode.

Timing pulse TB5 put out at the rate of once per 6 pulses of the clock pulses CP (shown in FIG. 12—this is a timing pulse which becomes high in synchronism with the rising of the 6th pulse of each 6 pulses of the clock pulses CP and then changes to low in synchronism with the rising of the 1st pulse) is normally imparted from a timing control circuit, to be described, to the counter CNT2, and this counter CNT2 counts up upon falling of the timing pulse TB5 (accordingly, in synchronism with the rising of the 1st pulse of each 6 pulses of the clock pulses CP). Also, the timing pulse TB5 is imparted to the sequence counter CNT1 through the counter control circuit 90 and this counter CNT1 count up upon falling of the timing pulse TB5 only when such timing pulse TB5 is imparted thereto.

The count outputs of the counters U/D CNT, CNT1, CNT2 and CNT3 are decoded by the decoder circuit 92 and then imparted to the sequence control circuit 70, which effects the sequence control of the system on the basis of the decode-out output of the decoder circuit 92.

PSR2 designates a parallel input-series output circulation type (dynamic type) shift register of 6-bit construction provided to latch the output of the counter CNT3 under specific conditions and at a specific timing during the relative shift of the 90-bit reference field data stored in the shift registers SR2 and SR3 with respect to the 48-bit standard field data stored in the shift register SR1 and during the movement of the phototaking lens in the preset focus mode, and the data latching operation thereof is controlled by the control signal from the sequence control circuit 70. Incidentally, the sequence control circuit 70 controls so that, during the relative shift of the 90-bit reference field data stored in the shift registers SR2 and SR3 with respect to the 48-bit standard field data stored in the shift register SR1, a strobe signal synchronized with the timing pulse TB5 put out from the timing control circuit only when "content of PSR1 ≧ content of SR6" has been found as the result of the comparison between the magnitudes of the contents of the shift registers PSR1 and SR6 effected by the magnitude comparing circuit 106 is imparted to the shift register PSR2 to thereby cause the count of the counter CNT3 at that point of time to be introduced into the shift register PSR2 (in this case, the counter CNT3 is imparted a count-up pulse synchronized with the timing pulse TB5 from the counter control circuit 90 to thereby count up in synchronism with the falling of the timing pulse TB5 and accordingly, the shift register PSR2 latches the count output of the counter CNT3 immediately before it counts up), and during the movement of the phototaking lens in the preset focus mode, a strobe signal also synchronized with the timing pulse TB5 is imparted to the shift register PSR2 to thereby cause the count output of the counter CNT3 to be introduced each time the timing pulse TB5 is provided.

As is apparent from the foregoing, at the point of time whereat the total 43 times of circulation and comparison of the data of each continuous 48 bits of the 90-bit reference field data stored in the shift registers SR2 and SR3 with respect to the 48-bit standard field data stored in the shift register SR1 has been terminated, the maximum count of the counter CNT4, namely, the maximum coincidence number of the 48-bit data stored in the shift register SR2 with respect to the 48-bit standard field data stored in the shift register SR1, is left in the shift register SR6 while, on the other hand, the count of the counter CNT3 at the point of time whereat this maximum coincidence has occurred, namely, the amount of shift of the 90-bit reference field data stored in the shift registers SR2 and SR3 with respect to the 48-bit standard field data stored in the shift register SR1 until the maximum coincidence occurs, is left in the shift register PSR2 and here, the latter represents the location, in the 90-bit reference field image elements, of the continuous 48-bit image elements regarded as most similar to the 48-bit standard field image elements, of the 90-bit reference field image elements, and in the present system, this is the distance data with the infinity as the standard, as is apparent from the principle of the optical arrangement described in connection with FIGS. 1 and 2.

Reference numeral 94 designates a constant setting circuit for putting out a standard data for discriminating whether or not the maximum coincidence number left in the shift register SR6 at the point of time whereat the comparison of the data of each continuous 48 bits of the 90-bit reference field data stored in the shift registers SR2 and SR3 with the 48-bit standard field data stored in the shift register SR1 has been terminated, namely, the degree of "similarity" of the continuous 48-bit image elements of the 90-bit reference field image elements which have been regarded as most similar to the 48-bit standard field image elements to said 48-bit standard field image elements, is sufficient to regard the 48-bit reference field image elements as identical to the 48-bit standard field image elements, namely, an allowable minimum coincidence number, and in the present system, for the ideal maximum coincidence number "48", a value, for example, of about 90% thereof, "44", is set. Of course, this value is empirically determined for the number of image elements set in the standard field area A. Also, this value is set by 6-bit binary code. The sequence control circuit 70 causes the magnitude comparing circuit 106 to effect the magnitude discrimination between the maximum coincidence number left in the shift register PSR2 and the allowable minimum coincidence number set in the constant setting circuit 94 and on the basis of the result of this discrimination, determines whether the sequence should be advanced to the next stage or returned to the initial stage, but this will later be described in detail.

SR7 designates a series input-series output circulation type (dynamic type) shift register provided to introduce and store therein the content of the shift register PSR2, and 96 designates a select gate circuit for changing over the input data to the shift register SR7 between the output data of the shift register SR7 and the output data of the shift register PSR2 and the select operation thereof is controlled by the control signal from the sequence control circuit 70. Incidentally, the sequence control circuit 70 controls the select gate circuit 96 so that at the point of time whereat the comparison of the 90-bit reference field data stored in the shift registers SR2 and SR3 with the 48-bit standard field data stored in the shift register SR1 has been terminated, the magnitude comparing circuit 106 is caused to compare the magnitude of the maximum coincidence number left in the shift register SR6 and the magnitude of the allowable minimum coincidence number ("44") set in the constant setting circuit 94 and only when "content of shift register SR6 ≧ allowable minimum coincidence number" has been found as the result of said comparison, the select gate circuit 96 is set to a mode for causing the content of the shift register PSR2 to be introduced into the shift register SR7 and under the other conditions, the select gate circuit 96 is set to a mode for causing the content of the shift register SR7 to be intactly circulated.

Reference numeral 98 designates a gray-binary converting circuit for converting a gray code signal representing the adjusted position of the phototaking lens during the focus control of the phototaking lens in the servo focus or the focusmatic mode to be described (this gray code signal, as will later be described, is put out at 6 bits gross from a gray code plate operatively associated with the phototaking lens, by the timing pulses TB0, TB1, TB2, TB3, TB4 and TB5—shown in FIG. 12—from a timing control circuit to be described) into a binary code, and the operation thereof is controlled by the control signal from the sequence control circuit 70. Reference numeral 100 designates a fixed distance data output circuit for putting out a fixed distance data for setting the adjusted position of the phototaking lens to a specific distance position, for example, a pan-focus distance position for the most frequently used aperture value and a strobe-interlocking distance position, when the movement of the phototaking lens has been started before the effective distance data is obtained in the preset focus mode or when a strobe is used to effect photography, and in the present system, the following setting is made for two types of camera, for example, a camera equipped with a phototaking lens of 40 mm-f1.7 and a camera equipped with a phototaking lens of 40 mm-f2.8:

(1) for the phototaking lens of 40 mm-f1.7,
 (a) the adjusted distance when the movement of the phototaking lens has been started before the effective distance data is obtained ... about 6 m
 (b) the adjusted distance during strobo-scopic photography ... about 2.5 m
(2) for the phototaking lens of 40 mm - f2.8,
 (a) the adjusted distance when the movement of the phototaking lens has been started before the effective distance data is obtained ... about 6.5 m
 (b) the adjusted distance during strobo-scopic photography ... about 2 m Of course, such numerical data are merely an example and for example, the numerical data in (a) above is empirically determined by taking into account the numerical data of the phototaking lens in a camera, the most frequently used aperture value, and the number of steps of the set adjusted position in the adjustment range between the infinity focused position and the shortest distance focused position of the phototaking lens (for example, a hyper focal position data for the most frequently used aperture value), and the numerical data in (b) above is determined by taking into account the light-emission distance of the strobe used and the above-mentioned number of steps of the set adjusted position of the phototaking lens. All these numerical data are set at 6 bits and the fixed distance data output circuit 100 is adapted to select and put out a corresponding data out of the four fixed distance data in the preset focus mode in accordance with the setting conditions, namely, which of the phototaking lens of 40 mm-f1.7 or the phototaking lens of 40 mm-f2.8 is being used and whether or not the strobe is in its preparatory condition. Reference numeral 102 designates a select gate circuit provided to select any one of the output data of the fixed distance data output circuit 100, the output data of the shift register SR6 and the output data of the shift register SR7 and impart the same to one input of the magnitude comparing circuit 106, and reference numeral 104 denotes a select gate circuit provided to select any one of the output data of the shift register PSR1, the output data of the shift register PSR2, the output data of the gray-binary converting circuit 98 and the output data of the constant setting circuit 94 and impart the same to the other input of the magnitude comparing circuit 106, and the data selecting operations of these select gate circuits 102 and 104 are controlled by the control signal from the sequence control circuit 70. Incidentally, the sequence control circuit 70 controls the select gate circuits 102 and 104 so that (1) during the comparison of the data of each continuous 48 bits of the 90-bit reference field data stored in the shift registers SR2 and SR3 with the 48-bit standard field data stored in the shift register SR1, the output data of the shift register SR6 is selected by the select gate circuit 102 while the output data of the shift register PSR1 is selected by the select gate circuit 104 for the period of each 6 pulses from the 49th pulse to the 54th pulse of the 54 pulses of the clock pulses CP imparted to the shift registers SR1, SR2, SR4 and SR5 and during this period, the comparison between the magnitude of the content of the shift register PSR1 and the magnitude of the content of the shift register SR6 is effected by the magnitude comparing circuit 106 (as described above, when "content of shift register PSR1 ≧ content of shift register SR6" has been found as the result of said comparison, the sequence control circuit 70 sets the select gate circuit 86 to the mode for causing the output data of the shift register PSR1 to be introduced into the shift register SR6 for the period of the first 6 pulses of the next 54 pulses imparted to the shift registers SR1, SR2, SR4 and SR5, thereby causing the content of the shift register PSR1 to be introduced into the shift register SR6); (2) next, at the point of time whereat the total 43 times of comparison of the data of each 48 bits of the reference field data with the standard field data have all been terminated, the output data of the shift register SR6 is selected by the select gate circuit 102 while the output data of the constant setting circuit 94 is selected by the select gate circuit 104 and as described above, whether or not the maximum coincidence number finally left in the shift register SR6 is greater than the predetermined allowable minimum coincidence number is discriminated by the magnitude comparing circuit 106; (3) in the servo focus or the focusmatic mode, at the point of time whereat the sequence mode has come to CC7, the output data of the shift register SR7 is selected by the select gate circuit 102 while the output data of the gray-binary converting circuit 98 is selected by the select gate circuit 104 and in which condition the phototaking lens is, in-focus, forward focus or backward focus, discriminated by the magnitude comparing circuit 106; and (4) in the preset focus mode, during the period until the sequence mode comes to CC7, except the period for the comparison of the reference field data with the standard field data and the period for the comparison of the resultant maximum coincidence number with the allowable minimum coincidence number, the output data of the fixed distance data output circuit 100 is selected by the select gate circuit 102 while the output data of the shift register PSR2 is selected by the select gate circuit 104 and when the movement of the phototaking lens has been started before the effective distance data is obtained, discrimination as to whether or not the phototaking lens has arrived at the photographing distance position specifically determined by the output data of the fixed distance data output circuit 100 is effected by the magnitude comparing circuit 106 and on the other hand, after the sequence mode has come to CC7, the output data of the shift register SR7 is selected by the select gate circuit 102 while the output data of the shift register PSR2 is selected by the select gate circuit 104 and when the movement of the phototaking lens has been started after this sequence mode has come to CC7, discrimination as to whether or not the phototaking lens has arrived at a proper in-focus position is effected by the magnitude comparing circuit 106. Reference numeral 108 designates an output circuit for putting out signals representing the adjusted conditions of the phototaking lens, namely, in-focus, forward focus and backward focus, on the basis of the output of the magnitude comparing circuit 106, through the output terminals MU1, MU2, ML1 and ML2 thereof, and the operation thereof is controlled by the control signal from the sequence control circuit 70, and each of the adjusted conditions of the phototaking lens is indicated by a logic combination of the outputs from the output terminals MU1, MU2, ML1 and ML2 (the output form thereof will later be described in detail). As will hereinafter be described, in the present embodiment, all the outputs from the output terminals MU1, MU2, ML1 and ML2 are utilized in the servo focus or the focusmatic mode, and only the output from the output terminal MU1 is utilized in the preset focus mode.

ALM designates an alarm signal output terminal for putting out an alarm signal when the distance data is not yet calculated in a series of range finding sequences. In the present system, the alarm signal is put out from the sequence control circuit 70 through the output terminal ALM during the time from after the range finding sequence has been started by closing of the main switch until the sequence comes to the final sequence mode CC7 for the first time and during the time from after the one more focus requirement has been given out in the semi-auto mode until the distance data is calculated.

IC designates an output terminal for putting out the integration clear pulse $\phi_{IC}$ to the line sensor 30, SH denotes an output terminal for putting out the shift gate pulse $\phi_{SH}$ to the line sensor 30, DR designates an output terminal for putting out the dark reset signal $\phi_{DR}$ to the dark current signal detecting and holding circuit 52 shown in FIG. 7A, DD denotes an output terminal for putting out the dark detect signal $\phi_{DD}$ to the dark current signal detecting and holding circuit 52, PR designates an output terminal for putting out the peak reset signal $\phi_{PR}$ to the peak value detecting circuit 58 shown in FIG. 7A, PD denotes an output terminal for putting out the peak detect signal $\phi_{PD}$ to the peak value detecting circuit 58, HR designates an output terminal for putting out the hold reset signal $\phi_{HR}$ to the peak value holding circuit 60 shown in FIG. 7B, and PH denotes an output terminal for putting out the peak hold signal $\phi_{PH}$ to the peak value holding circuit 60. The above-mentioned pulse signals are put out from the sequence control circuit 70 through the respective output terminals. In this case, the integration clear pulse $\phi_{IC}$ and the shift gate pulse $\phi_{SH}$ are put out in synchronism with the timing pulse TB5 from the timing control circuit.

Reference character 17S designates a mode setting terminal used to control the phototaking lens of 40 mm-f1.7, for example, in the preset focus mode, and 28S designates a mode setting terminal used to control the phototaking lens of 40 mm-f2.8, for example, in the preset focus mode. The input signals to these setting terminals are imparted to the sequence control circuit 70, and this sequence control circuit 70 determines which control of servo focus or focusmatic mode or preset focus mode should be effected, in accordance with the states of the input signals to these setting terminals 17S and 28S. Incidentally, here, design is made such that when both of these terminals 17S and 28S are GND-short-circuited, the servo focus or the focusmatic mode is brought about and that when the terminal 17S is pulled up by the source voltage $V_{DD}$, the preset focus mode for the f1.7 lens is brought about and when the terminal 28S is pulled up by the source voltage $V_{DD}$, the preset focus mode for the f2.8 lens is brought about. The preset focus mode for the f1.7 lens and the preset focus mode for the f2.8 lens only differ in the fixed distance data put out from the fixed distance data output circuit 100 and controls thereof are entirely the same.

Description will now be made of the servo focus mode, the focusmatic mode and the preset focus mode. (1) The servo focus mode is a focus control mode in which the positional information of the phototaking lens is introduced in the form of 6 bits gross of gray code from the gray code plate connected to the phototaking lens and this is converted into a binary code by the aforementioned gray-binary converting circuit 98, whereafter this is compared with the distance data stored in the shift register SR7 and on the basis of the comparison result (this is put out from the output terminals MU1, MU2, ML1 and ML2), a phototaking lens automatic adjusting motor is controlled to thereby effect the automatic focus adjustment of the phototaking lens; (2) the focusmatic mode is a focus control mode in which the positional information of the phototaking lens is introduced in the form of gray code from the gray code plate connected to the phototaking lens and this is converted into a binary code by the gray-binary converting circuit 98, whereafter this is compared with the distance data stored in the shift register SR7 and on the basis of the comparison result, display of the focus adjusted conditions of the phototaking lens such as forward focus, backward focus and in-focus is effected (the display in this case is effected by a suitable combination of the outputs from the output terminals MU1, MU2, ML1, ML2 and the adjustment of the phototaking lens is effected manually); and (3) the preset focus mode is a focus control mode in which when the phototaking lens is moved, for example, from its infinity focused position toward the shortest distance focused position by a spring or the like, the number of pulse signals from a pulse generating plate connected to the phototaking lens (this represents the amount of movement of the phototaking lens) is counted by the aforementioned counter CNT3 while, at the same time, the count output thereof is introduced into the shift register PSR2 at a suitable timing and this is compared with the distance data stored in the shift register SR7 and at the point of time whereat the two have become coincident, the phototaking lens is stopped to thereby effect the automatic focus adjustment of the phototaking lens (in this case, only the output signal from the output terminal MU1 is utilized to control an electromagnet for stopping the phototaking lens).

POP designates a setting terminal used when stroboscopic photography is effected in the preset focus mode, and by connecting to this terminal POP a normally open switch connected to the earth and adapted to be closed manually, or by the mounting of the strobe device to the camera, or in the case of a camera of the type containing a strobo therein, by the setting to the stroboscopic photography mode (for example, in the pop-up type one, by the pop-up of the strobe unit), the GND-short-circuiting of the terminal POP represents the stroboscopic photography mode. The input signal to the terminal POP, with the input signals to the mode setting terminals 17S and 28S, is imparted to the fixed distance data output circuit 100, which puts out a corresponding fixed distance data out of the above-described four fixed distance data, on the basis of the input signals to those terminals 17S, 28S and POP, in accordance with for which of the f1.7 lens or the f2.8 lens the camera is in the preset focus mode and with whether or not the camera is in the stroboscopic photography mode. GP designates an input terminal for receiving as inputs a gray code signal representing the position of the phototaking lens in the servo focus or the focusmatic mode (this signal is imparted in 6 bits gross to the bit series by the timing signals TB0, TB1, TB2, TB3, TB4 and TB5 from the timing control circuit to be described) and a pulse generated with the movement of the phototaking lens in the preset focus mode. The input signal to the input terminal GP is imparted to the sequence control circuit 70 and the gray-binary converting circuit 98. When the servo focus or the focusmatic mode is designated in accordance with the state of the input signal to the setting terminals 17S and 28S, the sequence control circuit 70 sets the gray-binary converting circuit 98 to its operative condition to effect the conversion of the gray code signal imparted to the input terminal GP into a binary code signal and, when the preset focus mode is designated, the sequence control circuit 70 effects the detection of whether or not the movement of the phototaking lens has been started, on the basis of the input to the input terminal GP and when a pulse signal is imparted by the movement of the phototaking lens, it absorbs the chattring thereof while converting it into a pulse signal of a predetermined number, for example, the double number (this will later be described in detail) and causes the pulse signal to be imparted to the counter CNT3 through the counter control circuit 90, thereby causing the counter CNT3 to count the amount of movement of the phototaking lens. SF designates a full auto-semi auto setting terminal for imparting the full auto mode and the semi auto mode setting signal in the servo focus or the focusmatic mode, and the input signal to this setting terminal SF is imparted to the sequence control circuit 70, and this sequence control circuit 70 determines which control of the full auto mode or the semi auto mode should be effected, on the basis of the state of the input signal to the setting terminal SF. Incidentally, here, design is made such that the semi auto mode is brought about by the GND-short-circuiting of the setting terminal SF and the full auto mode is brought about by the opening of the setting terminal SF, and such change-over setting becomes possible by connecting a manually changeable over, earth-connected switch to the setting terminal SF. The full auto mode is a mode for causing the operation sequnce of the system to be repetitively executed from the sequence mode CCO to the sequence mode CC7 as long as there is not a special requirement as described later, and the semi auto mode is a mode for causing the operation sequence of the system to be once executed from the sequence mode CC0 to the sequence mode CC7 only when the main switch is closed or when there is the requirement as described later. The setting terminal SF is maintained open (full auto setting) in the case of the focusmatic mode except for special cases, and is GND-short-circuited in the case of the preset focus mode.

01 designates a setting terminal for effecting focus lock during the full auto mode and one more focus during the semi auto mode, in the servo focus or the focusmatic mode. The input signal of this terminal OL is imparted to the sequence control circuit 70, which effects the focus lock during the fall auto mode and the one more focus during the semi auto mode in accordance with the combination condition of the state of the input signal to the full auto-semi auto setting terminal SF and the state of the input signal to the setting terminal OL. Incidentally, where the full auto-semi auto setting terminal SF is open to bring about the full auto mode, when the terminal OL is GND-short-circuited, the operation sequence of the system is stopped at the sequence mode CC7 to bring about the focus lock and on the other hand, where the full auto-semi auto setting terminal SF is GND-short-circuited to bring about the semi auto mode, when the terminal OL is GND-short-circuited, the operation sequence of the system which has been stopped at the sequence mode CC0 advances to the sequence mode CC1 and so on to bring about the one more focus. That is, in the case of the full auto mode, as long as the terminal OL is open, the operation sequence of the system is repetitively executed from the sequence mode CC0 to the sequence mode CC7, but when the terminal OL is GND-short-circuited, the operation sequence is stopped to assume the waiting condition at the point of time whereat it has come to the sequence mode CC7 (that is, focus lock is brought about) and on the other hand, in the case of the semi auto mode, as long as the terminal OL is open, the operation sequence of the system is in waiting condition at the sequence mode CC0, but when the terminal OL is GND-short-circuited, the operation sequence advances from the sequence mode CC0 to the sequence modes CC1, CC2, ..., CC7 and stops at the sequence mode CC7 (that is, the one more focus is brought about, and in this case, if the terminal OL has become open at the point of time whereat the sequence has advanced to the sequence mode CC7, the operation sequence returns to the sequence mode CC0 to assume waiting condition, but if the terminal OL has been GND-short-circuited, the operation sequence waits at the sequence mode CC7 until the terminal OL becomes open). In the case of the semi auto mode, even if the terminal OL is open when the main switch is closed, the operation sequence is executed from the sequence mode CC0 to the sequence mode CC7 and returns to the sequence mode CC0, thus assuming waiting condition. Incidentally, such full auto-semi auto change-over becomes possible, for example, by connecting a manually changeable over, earth-connected switch to the terminal OL. The terminal OL is maintained open in the case of the preset focus mode, and also maintained open in the case of the focusmatic mode except for special cases.

The above-described set conditions are as shown in FIG. 29.

Figure 12:
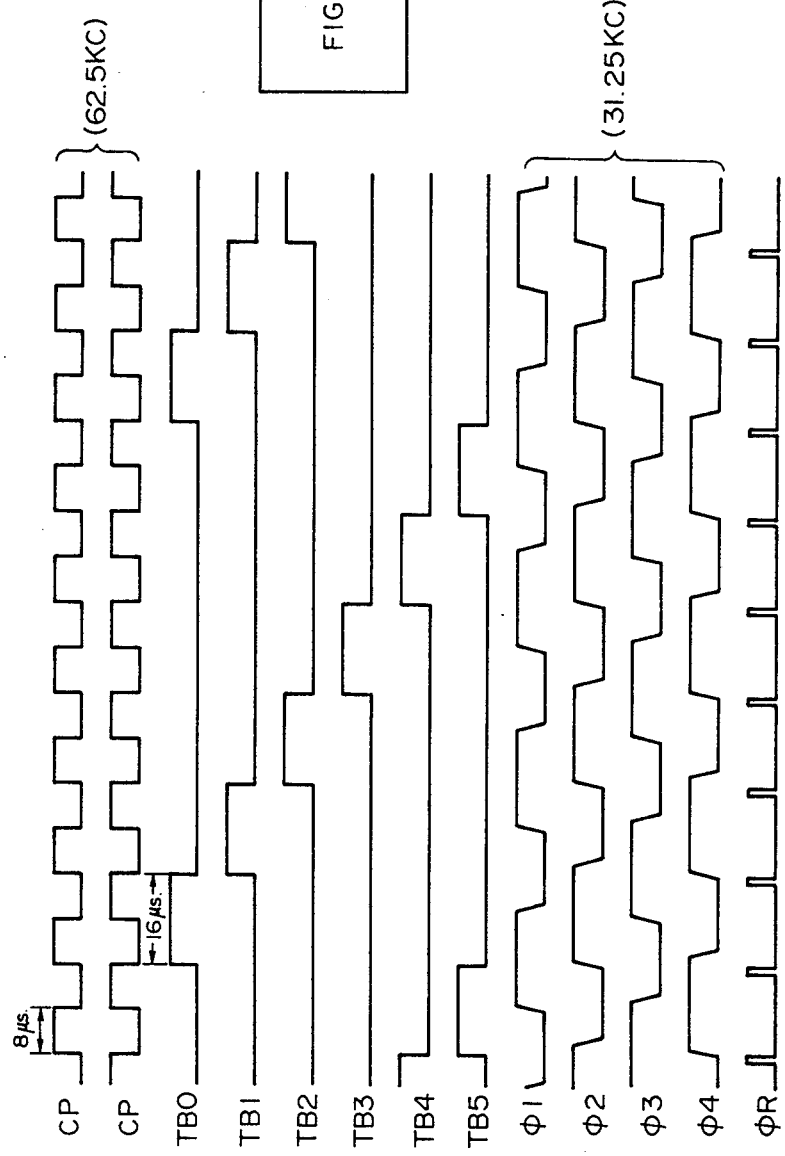
FIG. 12 shows the waveforms of various pulse signal outputs from the timing control circuit in the digital circuit system of FIG. 9.
Figure 13A:
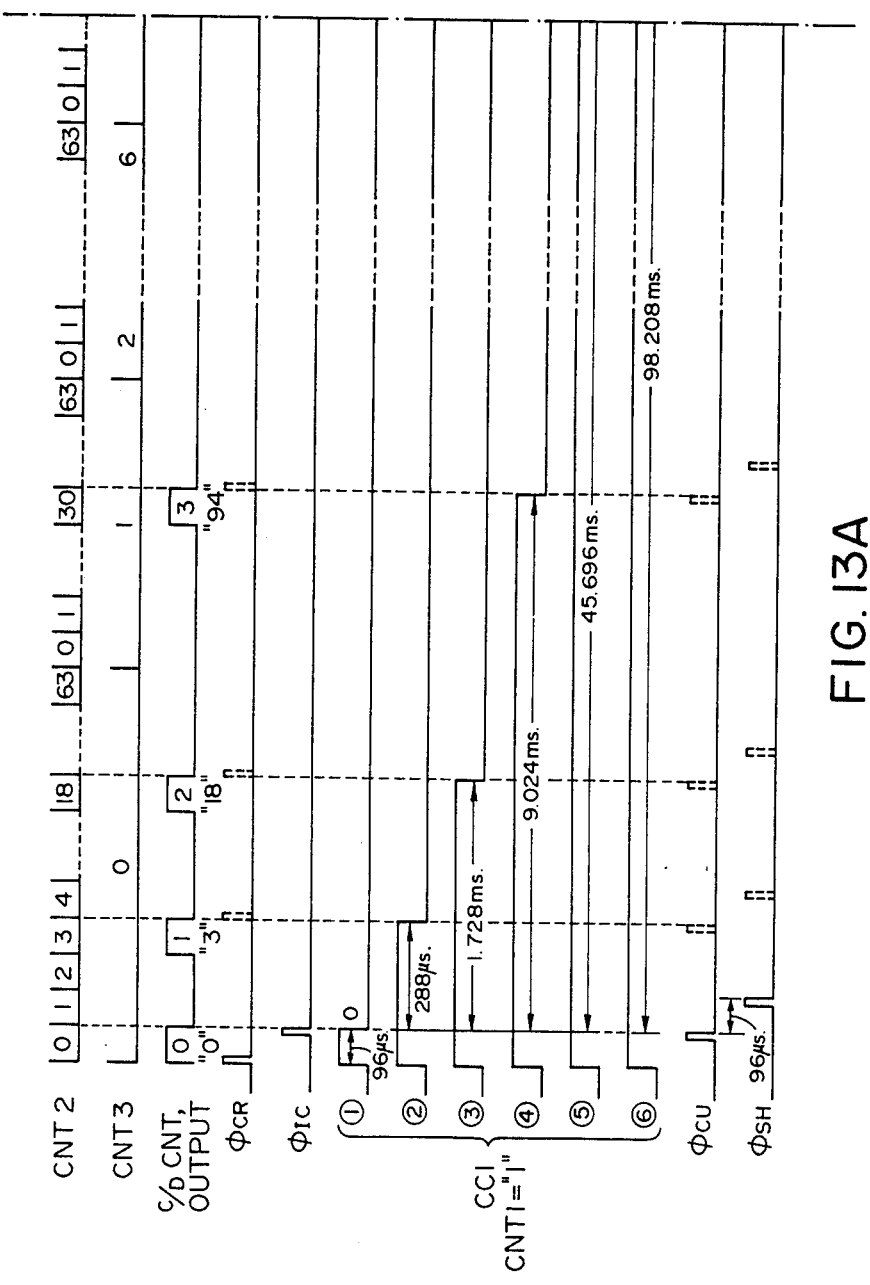

Lastly, a circuit block 110 shown at the right-hand corner of the Figure is a timing control circuit for effecting the outputting of power up clear signal PUC, clock pulses CP and $\overline{CP}$ (the clock pulses $\overline{CP}$ are the inverted clock pulses CP and in the present embodiment, the frequency of these clock pulses CP and $\overline{CP}$ is 62.5 KC—shown in FIG. 12) and timing pulses TB0–TB5 (the timing pulses TB0–TB5 each have a pulse width double that of the clock pulses CP and are successively put out in the order of TB0 to TB5 at the rate of once per 6 pulses of the clock pulses CP—shown in FIG. 12—and this will later be described in detail) to the above-described digital circuit system, the outputting of transfer pulses $\phi_1$–$\phi_4$ and reset pulse $\phi_R$ (shown in FIG. 12) to the line sensor 30, and the outputting of the timing pulses TB0–TB5 to the outside. $D_1$–$D_5$ designate terminals for putting out the transfer pulses $\phi_1$–$\phi_4$ and reset pulse $\phi_R$ to the line sensor 30, and $T_1$–$T_6$ designate terminals for putting out the timing pulses TB0–TB5 to the outside. These timing pulses TB0–TB5 are utilized to obtain the positional information of the photo-taking lens at 6 bits gross in a bit series from the gray code plate connected to the photo-taking lens. CG1 and CG2 designate terminals for setting the oscillation frequency of a clock generator in the timing control circuit 110, and a resistor having a resistance value corresponding to the required oscillation frequency is connected to these terminals. PU designates a terminal for imparting a power up signal during the closing of the main switch, and a power up circuit to be described is connected to this terminal, and the timing control circuit 110 puts out a power up clear signal PUC in response to the power up signal imparted to the terminal PU.

Description will now be made of the operation of the digital circuit system having the above-described construction.

As already noted, the operation sequence of the system is controlled by dividing it into eight sequence modes called CC0–CC7 and here, the contents of these sequence modes CC0–CC7 will be briefly described. First, the sequence mode CC0 is the waiting mode and the system is once set to this mode by the power up clear signal PUC put out from the timing control circuit 110 during the closing of the main switch. After the closing of the main switch, the sequence unconditionally, shifts from this mode to the next mode, but during the other time, whether or not to shift to the next mode is determined in accordance with each mode of the focus control. The sequence is fixed to this mode during the semi auto mode of the servo focus mode (of course, in this case again, the sequence is unconditionally shifted to the next mode immediately after the closing of the main switch) and during the lens position count of the preset focus mode. The sequence mode CC1 is a mode for causing the line sensor 30 to effect the accumulation of image signal and in this sequence mode, the integration clear pulse $\phi_{IC}$ is imparted to the line sensor 30 while, at the same time, the subsequent optical image accumulation time, namely, the charge accumulation time, is controlled. The accumulation time in this case, as already described, is controlled between the six stages of 96 $\mu$sec., 384 $\mu$sec., 1.824 msec., 9.120 msec., 45.792 msec. and 98.304 msec. and in this sequence mode CC1, the integration clear pulse $\phi_{IC}$ is put out for 16 $\mu$sec. in 80 $\mu$sec. after this mode has been started and thereafter, 0–98.208 msec. are controlled and the sequence shifts to the next mode. The sequence mode CC2 is a mode for effecting the read-out of the image signal from the line sensor 30, the transformation of such signal into binary form and the storage of the standard field data and reference field data of the binary image data and in 80 $\mu$sec. after this mode has been started, the shift gate pulse $\phi_{SH}$ is imparted to the line sensor 30 for 16 $\mu$sec. (thus, the accumulation time is controlled between 96 $\mu$sec.–98.304 msec.), whereby the read-out of the image signal from the line sensor 30 is started and the image signal so read out is subjected to the above-described treatment in the analog circuit system shown in FIGS. 7A and 7B and is converted into binary image data, whereafter it is introduced into the digital circuit system of FIG. 9, where the binary image data regarding the standard field area A and the reference field area B are stored in the shift registers SR1, SR2 and SR3, respectively. In this mode, the detection and holding of the dark current signal based on the signal from the dark current detecting area DM in the light-receiving portion 32 of the line sensor 30 by the dark current signal detecting and holding circuit 52 of FIG. 7A and the detection of the peak value of the image signal output corresponding to the standard field area A by the peak value detecting circuit 58 are effected while, at the same time, the detection of the presence of the slice failure of the standard field data and the reference field data by the slice failure detecting circuit 74 is effected. Next, the sequence mode CC3 is a mode for uniformizing the heads of the binary image data stored in the shift registers SR1, SR2 and SR3 in the previous sequence mode CC2. As already described, registers of the dynamic type normally driven by clock pulses CP are used as the shift registers SR1, SR2 and SR3 and the stored data thereof are normally circulated through the circulation path thereof and therefore, the heads of the binary image data stored in the previous sequence mode CC2 are non-uniform. Accordingly, in this sequence mode CC3, the operation of uniformizing the heads of the binary image data in these shift registers SR1, SR2 and SR3 is carried out. This mode consumes a time of 4.608 msec. and of this time, during the latter half 2.304 msec., the storage and holding of the peak value of the output of the peak value detecting circuit 58, namely, the image signal output corresponding to the standard field area A, by the peak value holding circuit 60 of FIG. 7B, is effected. Also, at the final time point of this mode, the evaluation of the outputs ITO and ITU of the discrimination circuit 68 shown in FIG. 7B is effected and on the basis of the result thereof, the control of the up-down counter U/D CNT and the select gate circuit 72 is effected while, at the same time, the evaluation of the detection result of the slice failure detecting circuit 74 is effected and, when a slice failure has occurred, the distance detection becomes impossible and therefore, the operation sequence of the system is returned to the first sequence mode CC0 and, when a slice failure has not occurred, the operation sequence shifts to the next mode. The sequence mode CC4 is a mode for calculating the distance to the object 2 by the comparison of the 48-bit standard field data stored in the shift register SR1 with the 90-bit reference field data stored in the shift registers SR2 and SR3. As already described, at the point of time whereat this mode is terminated, the number of coincident bits of the continuous 48-bit image elements of the 90-bit reference field image elements which have been regarded as most similar to the 48-bit standard field image elements, to said 48-bit standard field image elements, namely, the data regarding the degree of "similarity" thereof, is left in the shift register SR6, and the data regarding the location of the continuous 48-bit image elements which have been regarded as most similar in the 90-bit reference field image elements, namely, the distance data with infinity as the standard, is left in the shift register PSR2. Next, the sequence mode CC5 is a mode for setting an excess time for synchronizing the repetition period of the accumulation of the image signal for the line sensor 30 with the flicker or turn-on-and-off period of an artificial light source such as a fluorescent lamp in repetitively executing the series of operation sequence from the sequence mode CC0 to the sequence mode CC7. That is, when the object 2 is under the illumination of the artificial light source and the operation sequence from the sequence mode CC0 to the sequence mode CC7 is to be repetitively executed (for example, during the full auto mode of the servo focus mode), and where the accumulation time for the like sensor 30 is much shorter than the turn-on-and-off period 10 msec.—about 8.3 msec. of the artificial light source, for example, where the accumulation time is the aforementioned 96 μsec., 384 μsec. or 1.824 msec., the level of the image signal obtained may be greatly fluctuated even under the same accumulation time by the incoincidence of the timing of the sampling of the image signal with respect to the turn-on-and-off period of the artificial light source and therefore, in this case, in order to prevent the level of the image signal obtained under the same accumulation time from being affected by the turn-on-and-off of the artificial light source, the time required for the sequence loop of the sequence modes CC0–CC7 must be as great as integer times the turn-on-and-off period of the artificial light source and in this sequence mode CC5, the excess time therefor is provided. In the present embodiment, a time of 1.920 msec. is allotted to this sequence mode CC5. Next, the sequence mode CC6 is a mode of effecting the evaluation of the maximum coincidence number left in the shift register SR6 during the previous sequence mode CC4 and, in this sequence mode, the comparison of the maximum coincidence number left in the shift register SR6 with the output data of the constant setting circuit 94, namely, the allowable minimum coincidence number (44 in the present embodiment) is carried out. When the maximum coincidence number left in the shift register SR6 is smaller than the allowable minimum coincidence number set in the constant setting circuit 94, the reliability of the distance data left in the shift register PSR2 during the previous sequence mode CC4 is regarded as low and the operation sequence is returned to the first sequence mode CC0 and on the other hand, when the maximum coincidence number left in the shift register SR6 is greater than said allowable minimum coincidence number, the content of the shift register SR6 is stored in the storage shift register SR7 and the operation sequence is caused to shift to the next mode. Lastly, the sequence mode CC7 is a distance data output mode and in this mode, the distance data stored in the shift register SR7 is imparted to the comparison circuit 106 and in the case of the servo focus or the focusmatic mode, signals representing the focus adjusted conditions of the phototaking lens with respect to the object 2, such as forward focus, backward focus and in-focus, are put out from the output terminals MU1, MU2, ML1 and ML2 and in the case of the preset focus mode, a signal for controlling the stoppage of the phototaking lens at its in-focus position after the start of the phototaking lens is put out from the output terminal MU1. This distance data output, once this sequence mode CC7 has been entered for the first time after the closing of the main switch, is continued until the power source is disconnected.

Figure 10:
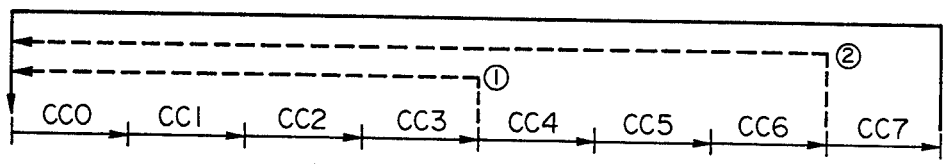
FIG. 10 is a schematic diagram showing the flow of the operation sequence of the digital circuit system shown in FIG. 9.

The flow of the above-described sequence modes is as shown in FIG. 10.

Now, the operation of the present system will be described in detail on the basis of the foregoing brief description. First, when the main switch is closed, the power up clear signal PUC is put out from the timing control circuit 110, whereby the digital circuit system shown in FIG. 9 is cleared and the content of the sequence counter CNT1 becomes "0", so that the system is set to the sequence mode CC0 (shown in FIG. 11). Also, simultaneously therewith, the clock pulses CP and $\overline{CP}$, timing pulses TB0–TB5, and transfer pulses $\phi_1$–$\phi_4$ and reset pulse $\phi_R$ to the line sensor 30 (all being shown in FIG. 12) begin to be put out from the timing control circuit 110, whereby the CCD analog shift registers 34 and 36 in the line sensor 30 and the shift registers SR1–SR5, PSR1 and PSR2 in the digital circuit system of FIG. 9 begin to be driven. At this time, the up-down counter U/D CNT is cleared by said power up clear signal PUC and the content thereof becomes "0", whereby the set accumulation time for the line sensor 30 becomes 96 μsec. which is shortest. On the other hand, at this time, the sequence control circuit 70 begins to put out an alarm signal from the output terminal ALM thereof in response to said power up clear signal PUC (that is, renders the output of the terminal ALM high) and at the same time, controls the output circuit 108 to render low all the output signals from the output terminals MU1, MU2, ML1 and ML2 (as already noted, this state is continued until the final sequence mode CC7 is reached). Also, this time corresponds to the first operation sequence immediately after the closing of the main switch and therefore, as previously described, the sequence control circuit 70 comes to set the select gate circuit 72 so as to select the output data of the comparator CP5, namely, the binary data DS by the fixed slice level $V_F$, from among the output data DV and DS from the binary circuit 66 shown in FIG. 7B. Also, in this state, the sequence control circuit 70 renders high the output signals from its output terminals DD, PD and PH, namely, the dark detect signal $\phi_{DD}$ to the dark current signal detecting and holding circuit 52 shown in FIG. 7A, the peak detect signal $\phi_{PD}$ to the peak value detecting circuit 58 and the peak hold signal $\phi_{PH}$ to the peak value holding circuit 60 shown in FIG. 7B (all these signals being shown in FIG. 8) and therefore, in these circuits 52, 58 and 60, the respective input controlling transistors $T_{r1}$, $T_{r6}$ and $T_{r11}$ conduct to inhibit the dark current signal detecting operation, the peak value detecting operation and the peak value holding operation until the time described later. When the sequence mode CC0 starts, the sequence control circuit 70, as shown in FIG. 11, causes a reset pulse $\phi_{CR}$ synchronized with the first timing pulse TB0 from the timing control circuit 110 to the imparted to be reset terminals of the counters CNT2 and CNT3 by the counter control circuit 90, and resets these counters CNT2 and CNT3 by the rising thereof.

Figure 11:
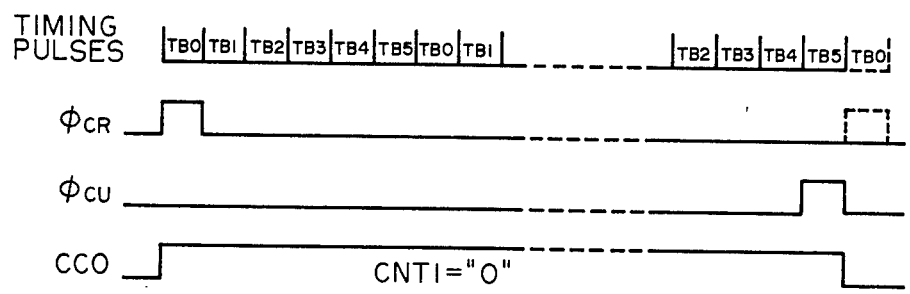
FIG. 11 is a timing chart showing the operation of said digital circuit in the sequence mode CC0.

Now, when the sequence is set to the sequence mode CC0, the sequence control circuit 70 discriminates whether or not to shift to the next mode and this time corresponds to the first operation sequence immediately after the closing of the main switch and therefore, the sequence control circuit 70 immediately causes a count up pulse $\phi_{CU}$ synchronized with the timing pulse TB5 from the timing control circuit 110 to be imparted to the clock terminal of the sequence counter CNT1 by the counter control circuit 90 to thereby cause the counter CNT1 to effect one count up and, when the content of the counter CNT1 becomes count "1", the sequence shifts to the sequence mode CC1 on the basis of the output of the decoder circuit 92 at this time (shown in FIG. 11).

As already noted, the operation sequence of the system is fixed to the sequence mode CC0 during the semi auto mode of the servo focus mode (except the first operation sequence immediately after the closing of the main switch and the case where one more focus requirement has occurred due to the GND-short-circuiting of the setting terminal OL) and during the lens position counting in the preset focus mode.

Figure 13:
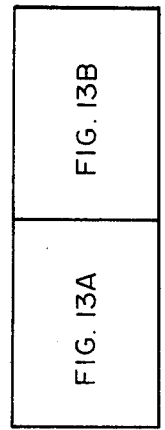
FIG. 13 shows the relative positions between FIGS. 13A and 13B.

Now, when the operation sequence shifts to the sequence mode CC1, the sequence control circuit 70, as shown in FIG. 13, causes the reset pulse $\phi_{CR}$ synchronized with the first timing pulse TB0 to be imparted to the counters CNT2 and CNT3 by the counter control circuit 90 simultaneously with the start of this sequence mode CC1 and resets these counters CNT2 and CNT3 by the rising thereof, and then, in the condition in which the contents of these counters CNT2 and CNT3 are both "0" (as already described, the counter CNT2 is caused to count up by the falling of the timing pulse TB5), the integration clear pulse $\phi_{IC}$ is put out from the output terminal IC thereof for 16 μsec. in synchronism with the timing pulse TB5 from the timing control circuit 110, namely, in 80 μsec. after the sequence mode CC1 has been started, whereby in the line sensor 30, the anti-blooming gates 44 and 46 are completely opened, so that the charge so far accumulated in the light-receiving portion 32 is completely cleared through the anti-blooming gates 44 and 46. On the other hand, when the sequence shifts to this sequence mode CC1, the sequence control circuit 70 causes the counter CNT3 to count the carry signal from the counter CNT2 (that is, these counters CNT2 and CNT3 are handled as a series counter) and on the basis of the timing pulse TB5 from the timing control circuit 110, causes the counter CNT3 to count the accumulation time set by the output of the up-down counter U/D CNT. The relation of the count value and count time of the series counter CNT2–CNT3 and the accumulation time obtained thereby with the content of the up-down counter U/D CNT in this case, namely, the relation of the output timing of the shift gate pulse $\phi_{SH}$ with the line sensor 30, is as shown in FIGS. 13 and 14, but this case is the first operation sequence immediately after the closing of the main switch and accordingly, the content of the up-down counter U/D CNT has become "0" and therefore, as shown in FIG. 13, the sequence control circuit 70 causes a count up pulse $\phi_{CU}$ synchronized with said integration clear pulse $\phi_{IC}$, namely, synchronized with the timing pulse TB5 in the "0" count condition of both of the counters CNT2 and CNT3, to be imparted to the sequence counter CNT1 by the counter control circuit 90 to cause this counter CNT1 to effect one count up and when the content of the counter CNT1 becomes count "2", the sequence shifts to the next sequence mode CC2. Accordingly, in this case, the mode indicated by ① in FIG. 13 is brought about and the time of the sequence mode CC1 becomes 96 μsec. which is shortest. Of course, when the content of the up-down counter U/D CNT is other than "0", as shown in FIGS. 13 and 14, the series counter CNT2–CNT3 is caused to count the timing pulse TB5 up to a value designated by the output of the decoder circuit 92 for the then content of the up-down counter U/D CNT, and when the count of the series counter CNT2–CNT3 reaches the value designated by the output of the decoder circuit 92, the sequence control circuit 70 causes the count up pulse $\phi_{CU}$ synchronized with the next timing pulse TB5 in the condition in which the series counter CNT2–CNT3 has reached the designated count to be imparted to the sequence counter CNT1 by the counter control circuit 90 and causes the counter CNT1 to effect one count up, thereby shifting to the next sequence mode CC2.

Figure 15:
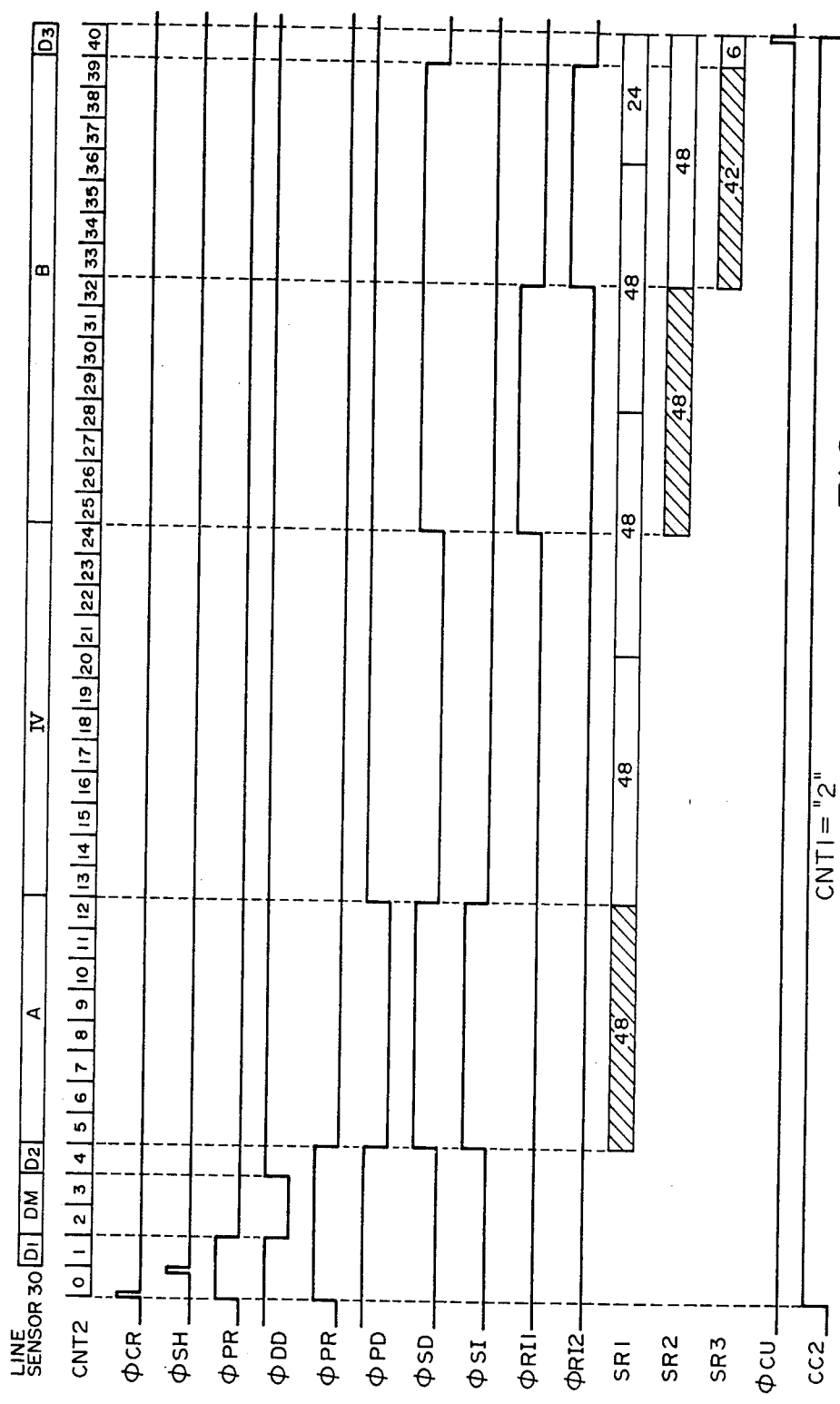
FIG. 15 is a timing chart showing the operation of said digital circuit system in the sequence mode CC2.

Now, when the sequence shifts to the sequence mode CC2, the sequence control circuit 70, as shown in FIG. 15, causes the reset pulse $\phi_{CR}$ synchronized with the first timing pulse TB0 to be imparted to the counters CNT2 and CNT3 by the counter control circuit 90 simultaneously with the start of this sequence mode CC2 and resets these counters CNT2 and CNT3 (at this point of time, the sequence control circuit 70 stops handling the counters CNT2 and CNT3 as a series counter and from this, the counter CNT3 becomes unused until the sequence mode CC4 is reached) and at the same time, in synchronism with the rising of this timing signal TB0, renders high the output signals from its terminals DR and PR, namely, the dark reset signal $\phi_{DR}$ to the dark current signal detecting and holding circuit 52 shown in FIG. 7 and the peak reset signal $\phi_{PR}$ to the peak value detecting circuit 58, whereby in the dark current signal detecting and holding circuit 52, the stored value clearing transistor $T_{r5}$ conducts, so that the dark current signal storing capacitor $C_1$ is cleared and in the peak value detecting circuit 58, the stored value clearing transistor $T_{r10}$ conducts, so that the peak value storing capacitor $C_2$ is cleared. Then, in the "0" count condition of the counter CNT2, when the timing pulse TB5 is put out from the timing control circuit 110, the sequence control circuit 70, as shown in FIG. 15, puts out the shift gate pulse $\phi_{SH}$ from its output terminal SH in synchronism with the timing pulse TB5 (the output timing of the shift gate pulse $\phi_{SH}$ with respect to the sequence mode CC1 in this case is as shown in FIG. 13), whereby in the line sensor 30, the shift gates 38 and 40 are opened, so that the charges accumulated in the odd-numbered group photodiodes in the light-receiving portion 32 are introduced into the CCD analog shift register 34 and the charges accumulated in the even-numbered group photodiodes are introduced into the CCD analog shift register 36 and, in this state, these CCD analog shift registers 34 and 36 are being driven by the transfer pulses $\phi_1$-$\phi_4$ from the timing control circuit 110 and therefore, read-out of the image signal is started in the manner already described. In this state, the sequence control circuit 70 inhibits the introduction of the output data from the select gate circuit 72 into the slice failure detecting circuit 74 and the application of the output data from the select gate circuit 72 to the shift registers SR1, SR2 and SR3 by the select gate circuits 76, 78 and 80. Although not mentioned in the description of FIGS. 3-5, during the read-out of the line sensor output, the outputting of a signal corresponding to the charge accumulated in the first photodiode in the light-receiving portion 32 of the line sensor 30, namely, the leading photodiode in the leading dummy bit $D_1$ (shown in FIG. 4) is started at the output time point of the transfer pulse $\phi_2$ immediately after the shift gate pulse $\phi_{SH}$, namely, the output time point of the timing pulse TB0 immediately after the counter CNT2 has been caused to effect one count up by the timing pulse TB5 synchronized with the shift gate pulse $\phi_{SH}$ to become count "1". Accordingly, when the counter CNT2 is caused to effect further one count up by the next timing pulse TB5 to become count "2", the read-out of the charge accumulated in the photodiode in the aforementioned leading dummy bit $D_1$ (6 bits) is terminated at this point of time and then, the read-out of the charge accumulated in the photodiode in the dark current detecting area (light-shielded area) DM (12 bits) is started and therefore, the sequence control circuit 70, as shown in FIG. 15, renders low both of the dark reset signal $\phi_{DR}$ and the dark detect signal $\phi_{DD}$ to the dark current signal detecting and holding circuit 52 as soon as the content of the counter CNT2 becomes count "2", thus releasing the dark current signal detecting and holding circuit 52 from its detecting operation inhibited condition. In the count "2" condition of the counter CNT2, when the timing pulse from the timing control circuit 110 advances in the order of TB0, TB1, TB2, . . . and the read-out of the signal from the dark current detecting area DM, namely, the signal corresponding to the dark current component, is started, the dark current signal detecting and holding circuit 52 comes to effect the detection and holding of the dark current signal in the described manner and, when the count of the counter CNT2 advances to count "4", the signal from the dark current detecting area DM is terminated just at this point of time and therefore, the sequence control circuit 70, as shown in FIG. 15, renders the dark detect signal $\phi_{DD}$ high as soon as the content of the counter CNT2 becomes count "4", and renders conductive the input controlling transistor $T_{r1}$ in the dark current signal detecting and holding circuit 52, thereby again inhibiting the detecting operation of the dark current signal detecting and holding circuit 52. Thus, in the dark current signal detecting and holding circuit 52, the dark current signal is stored in the storing capacitor $C_1$ thereof and as already described, the stored value of the capacitor $C_1$ is imparted to the differential amplifier circuit 54 shown in FIG. 7A, and the line sensor output continuedly read out thereafter has the dark current component thereof removed by the differential amplifier circuit 54.

Now, when the content of the counter CNT2 becomes count "4", the read-out of the signal from the separating space $D_2$ (6 bits) in the light-receiving portion 32 is started and, when the content of the counter CNT2 becomes count "5", the read-out of the signal from the separating space $D_2$ is terminated, and then the read-out of the standard field signal from the standard field area A (48 bits) is started. At this time, the sequence control circuit 70, as shown in FIG. 15, renders low the peak reset signal $\phi_{PR}$ and peak detect signal $\phi_{PD}$ to the peak value detecting circuit 58 as soon as the content of the counter CNT2 becomes count "5", thus releasing the peak value detecting circuit 58 from its detecting operation inhibited condition while, at the same time, it puts out a data introduction instruction signal $\phi_{SD}$ to the slice failure detecting circuit 74 and also puts out to the select gate circuit 76 on the input side of the shift register SR1 a standard field data input signal $\phi_{S1}$ for applying to the shift register SR1 the output data from the select gate circuit 72 (as already described, this case corresponds to the first operation sequence immediately after the closing of the main switch and therefore, in the select gate circuit 72, the output data of the comparator $CP_5$ in the binary circuit 66 of FIG. 7B, namely, the binary data DS by the fixed voltage $V_F$, has been selected). Accordingly, in the count "5" condition of the counter CNT2, when the timing pulse from the timing control circuit 110 advances in the order of TB0, TB1, TB2, . . . and the read-out of the image signal corresponding to the standard field area A is effected, the peak value detecting circuit 58 comes to effect the detection of the peak value of the image signal output corresponding to the standard field area A in the described manner because the input controlling transistor $T_{r6}$ and the stored value clearing transistor $T_{r10}$ thereof have both become non-conductive, while, on the other hand, the slice failure detecting circuit 74 introduces thereinto the 48-bit binary standard field data DS from the select gate circuit 72 and detects whether or not this is all "1" or all "0" and, as shown in FIG. 15, the select gate circuit 76 causes this 48-bit binary standard field data DS to be introduced into the shift register SR1. In this condition, when the count of the counter CNT2 advances to count "13", the outputting of the image signal corresponding to the standard field A is terminated at this point of time and therefore, the sequence control circuit 70, as shown in FIG. 15, renders high the peak detect signal $\phi_{PD}$ to the peak value detecting circuit 58 as soon as the content of the counter CNT2 becomes count "13", thus again inhibiting the detecting operation of the peak value detecting circuit 58, and also cuts off the data introduction instruction signal $\phi_{SD}$ to the slice failure detecting circuit 74 to interrupt the data introduction while, at the same time, it cuts off the outputting of the standard field data input signal $\phi_{SI}$ to the select gate circuit 76 and sets the select gate circuit 76 to the mode for causing the data of the shift register SR1 to be circulated through the circulation path which does not pass through the circulation delaying shift register SR4, as already noted. Thus, in the peak value detecting circuit 58, the peak value of the image signal output corresponding to the standard field area A is stored in the capacitor C3 and, in the slice failure detecting circuit 74, the result of the detection of whether or not the 48-bit binary standard field data have become all "1" or all "0" is stored.

Now, in this condition, when the count of the counter CNT2 advances, the read-out of the signal from the separating space IV (72 bits) succeeding to the standard field area A is effected and, when the content of the counter CNT2 becomes count "25", the read-out of the signal from the separating space IV is terminated, and then the read-out of the image signal corresponding to the reference field area B (90 bits) is started and therefore, the sequence control circuit 70, as shown in FIG. 15, again puts out the data introduction instruction signal $\phi_{SD}$ to the slice failure detecting circuit 74 as soon as the content of the counter CNT2 becomes count "25", while, at the same time, it comes to put out to the select gate circuit 78 on the input side of the shift register SR2 a reference field data input signal $\phi_{RI1}$ for applying 48 bits of the output data of the select gate circuit 72 to the shift register SR2. Accordingly, in the count "25" condition of the counter CNT2, when the timing pulse from the timing control circuit 110 advances in the order of TB0, TB1, TB2, ... and the binary reference field data comes to be put out from the select gate circuit 72, the slice failure detecting circuit 74 again introduces this thereinto and effects the detection of whether or not this is all "1" or all "0", and the select gate circuit 78, as shown in FIG. 15, causes the data of the first 48 bits of this 90-bit reference field data to be introduced into the shift register SR2. When the content of the counter CNT2 becomes count "33", the outputting of the data of the first 48 bits of the 90-bit reference field data is terminated and the outputting of the data of the next 42 bits is started and therefore, the sequence control circuit 70, as shown in FIG. 15, cuts off the outputting of the reference field data input signal $\phi_{RI1}$ to the select gate circuit 78 as soon as the content of the counter CNT2 becomes count "32", and sets the select gate circuit 78 to the mode for causing the data of the shift register SR2 to be circulated through the circulation path which does not pass through the circulation delaying shift register SR5, as already described, while it comes to put out to the select gate circuit 80 a reference field data input signal $\phi_{RI2}$ for applying 42 bits of the output data of the select gate circuit 72 to the shift register SR3 and accordingly, in the count "33" condition of the counter CNT2, when the timing pulse from the timing control circuit 110 advances in the order of TB0, TB1, TB2, ... the select gate circuit 80 causes the data of the last 42 bits of the 90-bit reference field data to be introduced into the shift register SR3. In this case, the sequence control circuit 70 sets the pulse control circuit 82 to the mode for imparting all of the clock pulses CP put out from the timing control circuit 110 to the shift register SR3, and this condition is continued until the sequence mode CC4 is reached.

Now, in this condition, when the count of the counter CNT2 advances to count "40", the read-out of the image signal corresponding to the reference field area B is terminated and therefore, the sequence control circuit 70, as shown in FIG. 15, cuts off the outputting of the data introduction instruction signal $\phi_{SD}$ to the slice failure detecting circuit 74 as soon as the content of the counter CNT2 becomes count "40", thus stopping the introduction of the data, while, on the other hand, it cuts off the outputting of the reference field data input signal $\phi_{RI2}$ to the select gate circuit 80 and sets this select gate circuit 80 to the mode for causing the data of the shift register SR3 to be circulated, as already described.

Thus, in the slice failure detecting circuit 74, the result of the detection of whether or not at least one of the 48-bit standard field data and the 90-bit reference field data has become all "1" or all "0" is stored, and the standard field data, the first 48 bits of the reference field data and the last 42 bits of the reference field data are stored in the shift register SR1, the shift register SR2 and the shift register SR3, respectively.

In the count "40" condition of the counter CNT2, when the timing pulses TB0-TB5 have all been put out from the timing control circuit 110, the read-out of the signal from the last dummy bit D3(6 bits) succeeding to the reference field area B is effected and thus, the read-out of all of the signals from the line sensor 30 is terminated and accordingly, the sequence control circuit 70, as shown in FIG. 15, causes a count up pulse $\phi_{CU}$ synchronized with the last timing pulse TB5 in the count "40" condition of the counter CNT2 to be imparted to the sequence counter CNT1 by the counter control circuit 90 to thereby cause the counter CNT1 to effect one count up and, when the content of the counter CNT1 becomes count "3", the sequence shifts to the next sequence mode CC3. During the time until the sequence mode CC2 is terminated, the stored data of the shift register SR1 is caused to effect 3.5 circulations and the stored data of the shift register SR2 is caused to effect just 1 circulation and the stored data of the shift register SR3 is caused to effect 1/7 circulation and accordingly, at the point of time whereat this sequence mode CC2 has been terminated, as shown in FIG. 15, the stored data of the shift registers SR1, SR2 and SR3 are in the conditions in which they have been subjected to 24bit, 0-bit and 6-bit circulation shifts, respectively, and in such conditions, the sequence shifts to the next sequence mode CC3.

Also, as can be seen from the signal chart of FIG. 15, the peak detect signal $\phi_{PD}$ to the peak value detecting circuit 58 is obtained by imparting the standard field data input signal $\phi_{SI}$ to the select gate circuit 76, and the data introduction instruction signal $\phi_{SD}$ to the slice failure detecting circuit 74 is obtained by taking the logic sum of the data input signals $\phi_{SI}$, $\phi_{RI1}$ and $\phi_{RI2}$ to the select gate circuits 76, 78 and 80.

Figure 16A:
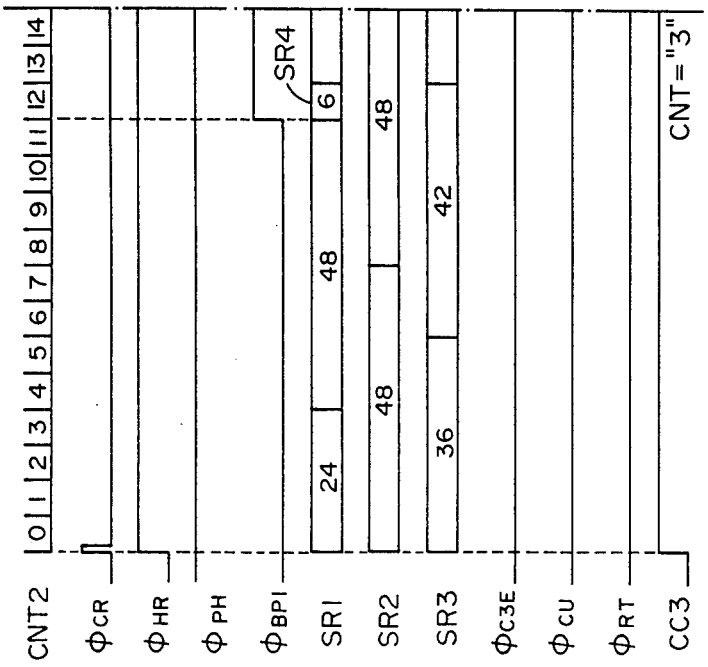
FIGS. 16A and 16B are a timing chart showing the operation of said digital circuit system in the sequence mode CC3.
Figure 16:
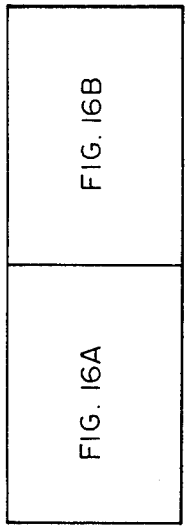
FIG. 16 shows the relative positions between FIGS. 16A and 16B.
Figure 16B:
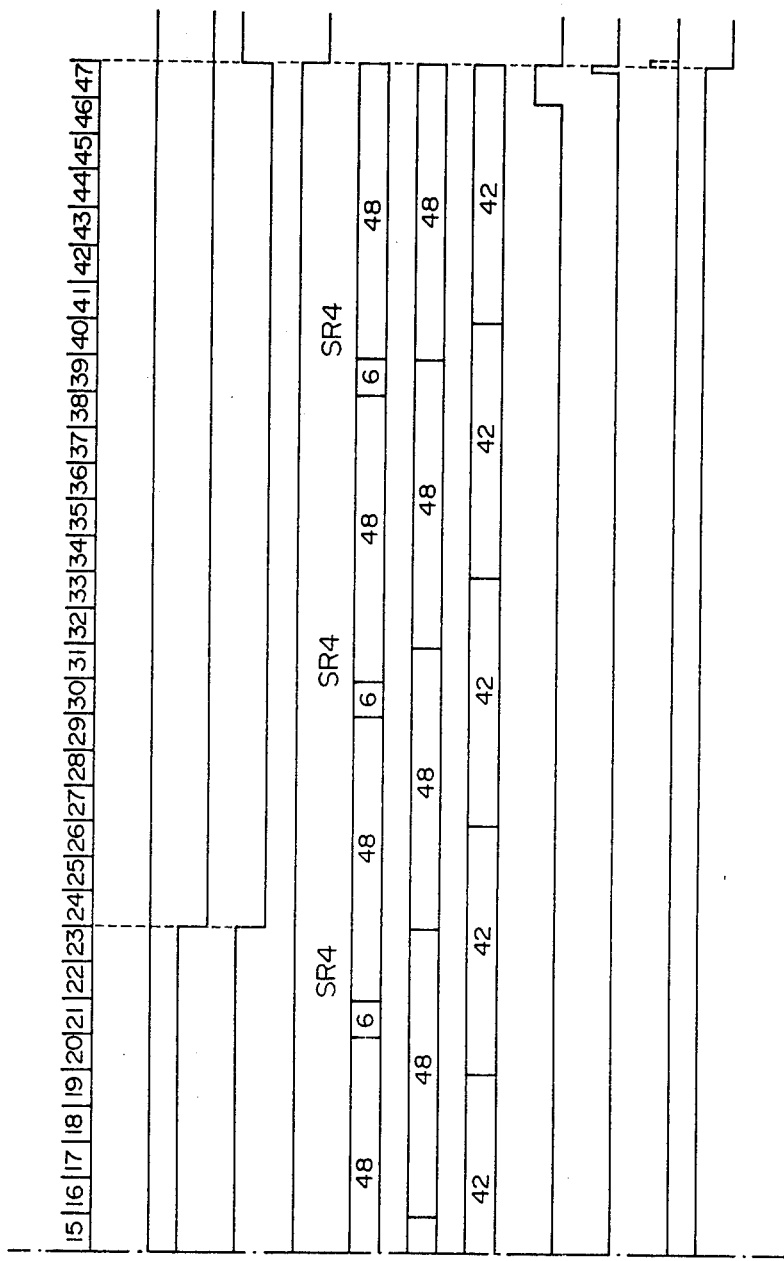

Now, when the sequence shifts to the sequence mode CC3, the sequence control circuit 70, as shown in FIG. 16, causes a reset pulse $\phi_{CR}$ synchronized with the first timing pulse TB0 to be imparted to the counters CNT2 and CNT3 by the counter control circuit 90 simultaneously with the start of this sequence mode CC3 while, at the same time, it renders high the signal from its output terminal HR, namely the hold reset signal $\phi_{HR}$ to the peak value holding circuit 60 shown in FIG. 7B, simultaneously with the rising of the timing pulse TB0, whereby in the peak value holding circuit 60, the stored value clearing transistor $T_{r15}$ conducts, so that the peak value storing capacitor $C_4$ is cleared. Next, when the content of the counter CNT2 becomes count "12", as seen from FIG. 16, the stored data of the shift register SR1 is caused to effect 1.5 circulation during time from the point of time whereat this sequence mode CC3 has been started until the content of the counter CNT2 becomes count "12" and thus, considering from the point of time whereat the previous sequence mode CC2 was terminated (that is, at that point of time, said stored data was in 24-bit shift condition), said stored data comes into just 0-bit shift condition and at this point of time, namely, as soon as the content of the counter CNT2 becomes count "12" the sequence control circuit 70, as shown in FIG. 16, puts out to the select gate circuit 76 on the input side of the shift register SR1 a bypass circulation instruction signal $\phi_{BP1}$ for causing the stored data of the shift register SR1 to be circulated through the circulation delaying shift register SR4, whereby the stored data of the shift register SR1 is circulated through the circulation delaying shift register SR4 and accordingly, as seen from FIG. 16, thereafter, the stored data of the shift register SR1 is caused to effect just one circulation for 54 pulses of the clock pulses CP, to thereby return to its original state. During this time, the stored data of the shift register SR2 is continuedly circulated through the circulation path which does not pass through the circulation delaying shift register SR5 and accordingly, effects just one circulation for 48 pulses of the clock pulses CP, to thereby return to its original state, and the stored data of the shift register SR3 effects just one circulation for 42 pulses of the clock pulses CP, to thereby return to its original state. Then, when the content of the counter CNT2 becomes count "24" (this point of time means that, after this sequence mode CC3 has started, just one half of the time required therefor, namely, 2.304 msec. has elapsed) the sequence control circuit 70, as shown in FIG. 16, renders low both of the hold reset signal $\phi_{HR}$ and the peak hold signal $\phi_{PH}$ to the peak value holding circuit 60, whereby in this peak value holding circuit 60, both the stored value clearing transistor $T_{r15}$ and the input controlling transistor $T_{r11}$ become non-conductive and are released from their peak value holding operation inhibited condition and accordingly, the peak value signal stored in the storing capacitor $C_3$ of the peak value detecting circuit 58 is introduced and stored in the storing capacitor $C_4$ in the manner already described. When the content of the counter CNT2 becomes count "47", the sequence control circuit 70, as shown in FIG. 16, renders high the peak hold signal $\phi_{PH}$ to the peak value holding circuit 60 simultaneously with the falling of the timing pulse TB5 from the timing control circuit 110 in the count "47" condition of the counter CNT2 and again inhibits the peak value holding operation while, on the other hand, it cuts off the outputting of the bypass circulation instruction signal $\phi_{BP1}$ to the select gate circuit 76, thus terminating the sequence mode CC3.

Accordingly, during the time from the start of the sequence mode CC3 till the termination thereof, 6×48 (=count number of the counter CNT2), namely, 288 pulses of the clock pulses CP are imparted to the shift registers SR1, SR2 and SR3, whereby the stored data of these registers are subjected to 288-bit circulation shift and here, as seen from FIG. 16, at the point of time whereat this sequence mode CC3 has started, the shift register SR1 is in a condition in which the stored data thereof has been circulation-shifted by 24 bits and moreover, once the content of the counter CNT2 has become count "12" after the sequence has shifted to this sequence mode CC3, namely, once the stored data thereof has been caused to effect 1.5 circulation and returned to its original state, the stored data thereof is circulated through the 6-bit circulation delaying shift register SR4 and thus, $(288-48\times 1.5)\div(6+48)=4$, and said stored data is caused to effect 5.5 circulations during the sequence mode CC3 and at the point of time whereat the sequence mode CC3 has been terminated, said stored data makes just one round to return to its original state while, on the other hand, at the point of time whereat the sequence mode CC3 has started, the shift register SR2 is in a condition in which the stored data thereof has been subjected to 0-bit shift and moreover, in this sequence mode CC3, said stored data is directly circulated without passing through the circulation delaying shift register SR5 and thus, $288\div 48=6$, and said stored data is caused to effect 6 circulations during this sequence mode CC3 and at the point of time whereat the sequence mode CC3 has been terminated, said stored data makes just one round to return to its original state, and at the point of time whereat this sequence mode CC3 has started, the shift register SR3 is in a condition in which the stored data thereof has been caused to effect circulation shift by 6 bits and moreover, during this sequence mode CC3, said stored data is directly circulated and thus, $(288-36)\div 42=6$, and said stored data is caused to effect 6 6/7 circulations during the sequence mode CC3 and at the point of time whereat the sequence mode CC3 has been terminated, said stored data makes just one round to return to its original state and thus, at the point of time whereat this sequence mode CC3 has been terminated, the head uniformization of the stored data of the shift registers SR1, SR2 and SR3 is completed as shown in FIG. 16.

Also, through the above-described operation, the peak value of the image signal output corresponding to the standard field area A which was detected by the peak value detecting circuit 58 in the previous sequence mode CC2 is stored and held by the capacitor $C_4$ in the peak value holding circuit 60, and as already described, the peak value voltage output $V_{PK}$ from the peak value holding circuit 60 at this time is imparted, on the one hand, to the discrimination circuit 68 of FIG. 7B, where it is compared with the upper limit and lower limit standard voltages $V_{MAX}$ and $V_{MIN}$ set in the standard voltage setting circuit 64, and the result of such comparison is displayed by a logic combination of the high and low of the outputs ITO and ITU of the comparators $CP_6$ and $CP_7$ and on the other hand, said peak value voltage output is imparted to the voltage dividing circuit 62, where the slice level $V_S$ is determined on the basis of said peak value voltage $V_{PK}$ and this is imparted to the comparators $CP_4$ and $CP_5$ in the binary circuit 66.

When the comparison of the peak value voltage $V_{PK}$ held in the peak value holding circuit 60 with the standard voltages $V_{MAX}$ and $V_{MIN}$ is effected by the discrimination circuit 68 and the comparison results ITO and ITU are put out, the counter control circuit 88 causes the up-down counter U/D CNT to effect one count down to shorten the accumulation time when the output ITO is high (that is, when $V_{PK}>V_{MAX}$) (however, in the first operation sequence immediately after the closing of the main switch, the content of the up-down counter U/D CNT is "0" and in this case, therefore, the counter control circuit 88 holds the up-down counter U/D CNT in count "0" condition), and causes the up-down counter U/D CNT to effect one count up to increase the accumulation time when the output ITU is high (that is, when $V_{PK}<V_{MIN}$) (however, as already described, when the content of the up-down counter U/D CNT has become "5", the counter control circuit 88 holds the up-down counter U/D CNT in count "5" condition), and when the content of the up-down counter U/D CNT is altered to after the setting of the accumulation time, the sequence control circuit 70, as previously described, sets the select gate circuit 72 to the mode for selecting the output data DS from among the output data DV and DS from the binary circuit 66 (accordingly, in the next operation sequence, the binary data DS by the fixed slice level $V_F$ is adopted) and on the other hand, unless the content of the up-down counter U/D CNT is altered, it sets the select gate circuit 72 to the mode for selecting the output data DV from among the output data DV and DS from the binary circuit 66 (accordingly, in the next operation sequence, the binary data DV by the slice level $V_S$ set by the voltage dividing circuit 62 in the described manner is adopted).

Also, the sequence control circuit 70 effects the evaluation of the detection result stored in the slice failure detecting circuit 74 in the count "47" condition of the counter CNT2 and, when it has been found that a slice failure has occurred (that is, one of the standard field data and the reference field data has become all "1" or all "0"), the distance detection becomes impossible and therefore, as shown in FIG. 16, the sequence control circuit causes a return pulse $\phi_{RT}$ synchronized with the timing pulse TB0 immediately after the termination of this sequence mode CC3 to be imparted to the reset terminals of the counters CNT1, CNT2 and CNT3 by the counter control circuit 90 to reset all these counters CNT1–CNT3, thereby returning the operation sequence to the first sequence mode CC0 as indicated by broken line ① in FIG. 10. On the other hand, when it has been found that no slice failure has occurred (that is, neither of the standard field data and the reference field data has become all "1" or all "0"), the sequence control circuit causes a count up pulse $\phi_{CU}$ synchronized with the timing pulse TB5 put out in the count "47" condition of the counter CNT2 to be imparted to the sequence counter CNT1 by the counter control circuit 90 to cause this counter CNT1 to effect one count up and, when the content of the counter CNT1 becomes count "4", the sequence shifts to the next sequence mode CC4.

When the content of the counter CNT2 becomes count "47", the sequence control circuit 70, as shown in FIG. 16, puts out a signal $\phi_{C3E}$ which is high for the "47" count of the counter CNT2 to the reset terminal of the match counter CNT4 and the select gate circuit 86 on the input side of the shift register SR6 to cause the match counter CNT4 to be reset by the rising of the signal $\phi_{C3E}$ and hold the select gate circuit 86 in closed gate condition, thereby clearing the shift register SR6.

Although the description goes more or less out of sequence, the up count or the down count of the up-down counter U/D CNT based on the discrimination outputs ITO and ITU from the discrimination circuit 68 is effected in synchronism with the rising of said signal $\phi_{C3E}$.

Figure 17B:
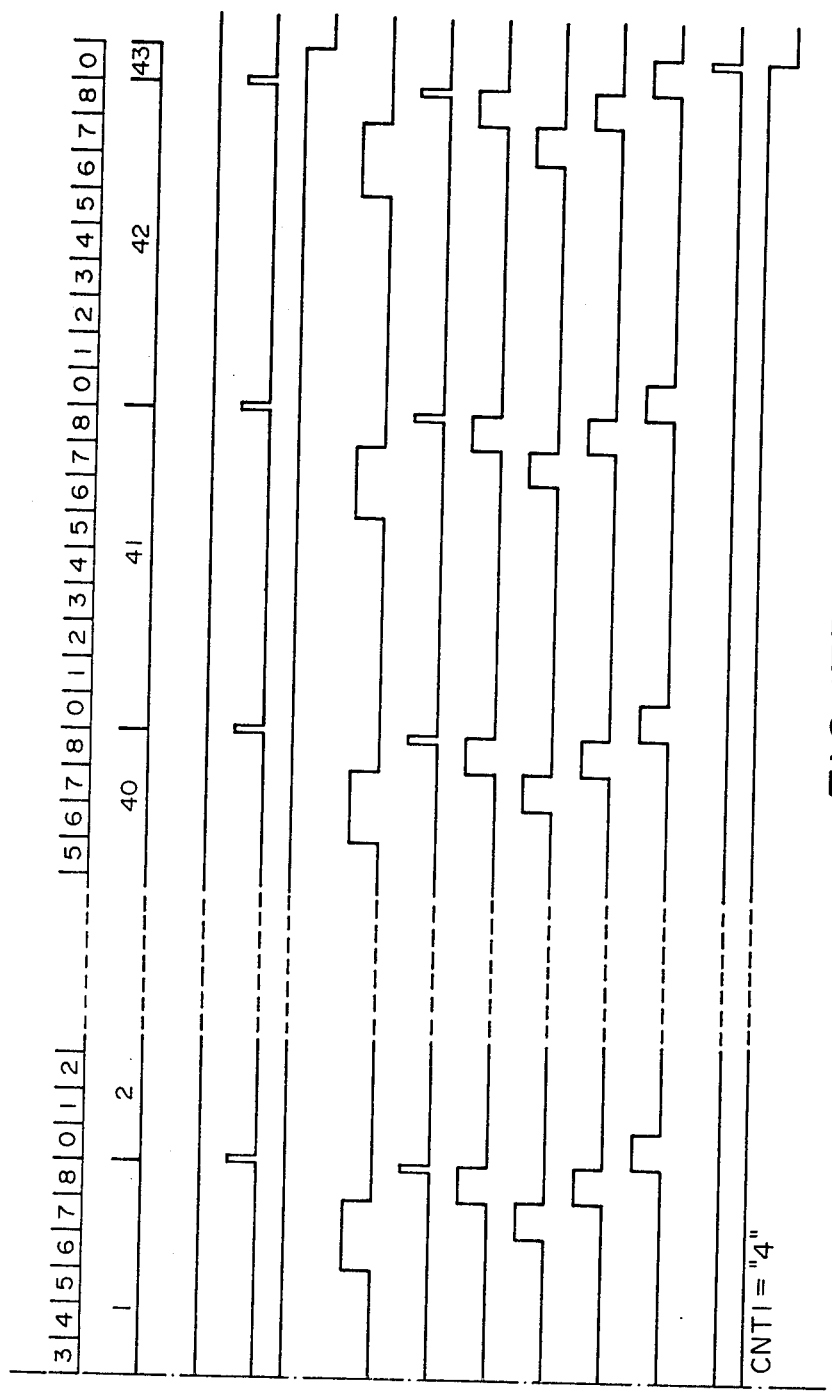

Now, when the sequence shifts to the sequence mode CC4, the sequence control circuit 70, as shown in FIG. 17, causes the reset pulse $\phi_{CR}$ synchronized with the first timing pulse TB0 to be imparted to the counters CNT2 and CNT3 by the counter control circuit 90 simultaneously with the start of this sequence mode CC4 to reset these counters CNT2 and CNT3 while, on the other hand, it puts out to the select gate circuits 76 and 78 a bypass circulation instruction signal $\phi_{BP2}$ for causing the stored data of the shift registers SR1 and SR2 to be circulated through the circulation delaying shift registers SR4 and SR5, respectively, simultaneously with the rising of the timing pulse TB0 until this sequence mode CC4 is terminated and also puts to the pulse control circuit 82 a control signal $\phi_{PC1}$ for drawing out those of the clock pulses CP to be imparted to the shift register SR3 which are synchronized with the rising of the timing pulse TB4, until this sequence mode CC4 is terminated.

Figure 18:
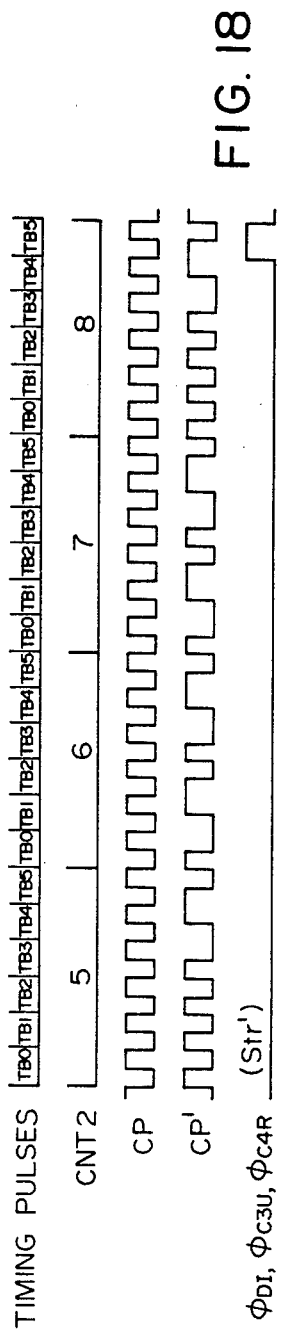
FIG. 18 is a timing chart showing driving clock pulses to a shift register SR3 in said sequence mode CC4.
Figure 19:
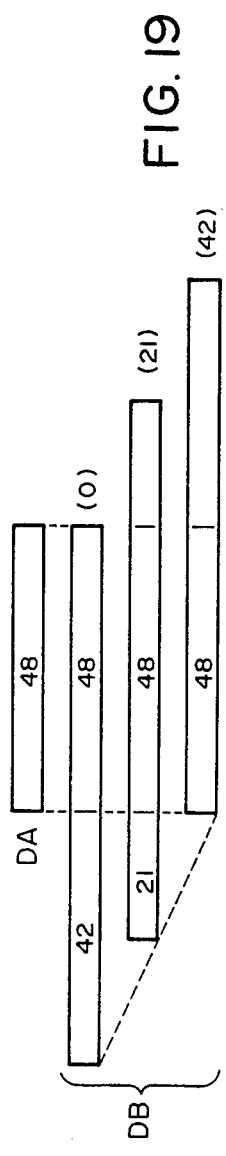
FIG. 19 is a schematic diagram showing the manner of relative shift of the reference field data with respect to the standard field data in the sequence mode CC4.

In this sequence mode CC4, the sequence control circuit 70, as shown in FIG. 17, causes a reset pulse $\phi_{C2R}$ synchronized with the ninth timing pulse TB0 to be imparted to the counter CNT2 by the counter control circuit 90 each time nine timing pulses TB0 are put out from the timing control circuit 110, to thereby reset the counter CNT2 always at count "8" and at the same time, puts out to the pulse control circuit 82 a control signal $\phi_{PC2}$ for drawing out those of the clock pulses CP to be imparted to the shift register SR3 which are synchronized with the timing pulse TB1, during the count "6" and "7" of the counter CNT2. Accordingly, during the time until the counter CNT2 is reset, $6\times 9$ (=count step number of counter CNT2), namely, 54 pulses, of the clock pulses CP are imparted to the shift registers SR1, SR4, SR2 and SR5, whereby the stored data of the shift register SR1 is caused to effect one circulation during this time because the circulation delaying shift register SR4 is of 6 bits, while on the other hand the stored data of the shift register SR2 is caused to effect one circulation during this time because the circulation delaying shift register SR5 is of 5 bits, whereafter said stored data is circulation-shifted excessively by one bit and during this time, 54 pulses minus 9+2, i.e. 11, pulses, namely, 43 pulses are imparted to the shift register SR3 and therefore, the stored data thereof effects one circulation, whereafter said stored data is circulation-shifted excessively by one bit. As will later be described, the pulse control circuit 82 comprises a NAND gate for taking the invert of the logic product of the control signal $\phi_{PC1}$ from the sequence control circuit 70 and the timing pulse TB4, a NAND gate for taking the invert of the logic sum of the control signal $\phi_{PC2}$ and the timing pulse TB1, and a NAND gate for taking the invert of the logic sum of the outputs of said two NAND gates and the clock pulses $\overline{CP}$ and imparting this to the shift register SR3 as a driving clock pulse CP′, and accordingly, the clock pulse CP′ imparted from the pulse control circuit 82 to the shift register SR3 at this time is as shown in FIG. 18. On the other hand, at this time, the sequence control circuit 70, as shown in FIGS. 17 and 18, puts out to the select gate circuit 78 a data introduction instruction signal $\phi_{DI}$ for causing the output data of the shift register SR3 to be introduced into the shift register SR2, in synchronism with the timing pulse TB5 in the count "8" condition of the counter CNT2, and at the same time, puts out a count up pulse $\phi_{C3U}$ to the counter CNT3 and accordingly, each time the stored data of the shift register SR1 is caused to effect one circulation through the shift register SR4, the data of the leading bit of the shift register SR3 is introduced into the last bit of the shift register SR2 and the number of times of such data introduction is counted by the counter CNT3 and thus, relative shift of each one bit of the 90-bit reference field data DB stored in the shift registers SR2 and SR3 to the 48-bit standard field data DA stored in the shift register SR1 takes place and the number of shift bits at this time is counted by the counter CNT3. FIG. 19 shows the condition in which the reference field data DB has been subjected to relative shifts of 0 bit, 21 bits and 42 bits with respect to the standard field data DA. Now, in this sequence mode CC4, the relative shift of the reference field data DB to the standard field data DA is effected in the described manner and, as already noted, during the circulation of the stored data of the shift registers SR1 and SR2, a low or a high signal is put out from the exclusive OR gate G90 in accordance with the coincidence or incoincidence between the bits for each one bit of each circulation output data and at this time, the sequence control circuit 70, as shown in FIG. 17, puts out to the OR gate G94 a control signal $\phi_{CC}$ which maintains low during the time from count "0" to count "7" of the counter CNT2, namely, during the time from after the outputting of the stored data of the leading bits of the shift registers SR1 and SR2 has been started until the outputting of the stored data of the last bits of these shift registers is terminated and which is high only during count "8" of the counter CNT2, namely, only during the time until the stored data of the last bit of the shift register SR1 is again returned to the last bit of the shift register SR1 through the shift register SR4 and accordingly, only for the period during which the output of the exclusive OR gate G90 is low, within the period during which the control signal $\phi_{CC}$ is low, the clock pulses CP are put out from the OR gate G94 and thus, the number of the clock pulses CP put out from the OR gate G94 during the time from count "0" to count "7" of the counter CNT2 represents the number of coincident bits between the stored data of the shift registers SR1 and SR2 during one circulation of such data. The clock pulses CP put out from the OR gate G94 at this time are counted by the counter CNT4 and at this time, the sequence control circuit 70, as shown in FIG. 17, puts out to the shift register PSR1 a strobe signal Str which rises simultaneously with count "7" of the counter CNT2 and falls simultaneously with count "8" of the counter CNT2 and causes the count of the counter CNT4 to be introduced into the shift register PSR1 upon the falling of such signal and thus, the number of coincident bits between the stored data of the shift registers SR1 and SR2 during one circulation of these stored data is latched by the shift register PSR1. When the content of the counter CNT2 becomes count "8", the sequence control circuit 70 sets the select gate circuit 104 to a mode for selecting the output data of the shift register PSR1, for the period CC4A indicated in FIG. 17, namely, for the period during which the content of the counter CNT2 is count "8", and on the other hand, sets the select gate circuit 102 to a mode for selecting the output data of the shift register SR6 (which initially is "0") and accordingly, by 6 pulses of the clock pulses CP within this period CC4A, the contents of the shift registers PSR1 and SR6 (both of which are 6-bit data) are put out in bit series to the comparison circuit 106. Thereby, within this period CC4A, the comparison circuit 106 effects the comparison between the magnitude of the content of the shift register PSR1 and the magnitude of the content of the shift register SR6 and, when "content of PSR1 ≧ content of SR6" is found, the sequence control circuit 70 puts out to the shift register PSR2 a strobe signal Str' synchronized with the count up pulse $\phi_{C3U}$ to the counter CNT3 to cause the count of the counter CNT3 before it is caused to count up to be latched by the shift register PSR2, and then, for the period CC4B indicated in FIG. 17, namely, for the period during which the content of the counter CNT2 is count "2", the sequence control circuit sets the select gate circuit 86 on the input side of the shift register SR6 to a mode for causing the output data of the shift register PSR1 to be introduced into the shift register SR6, whereby within this period CC4B, the content of the shift register PSR1 is shifted to the shift register SR6 by 6 pulses of the clock pulses CP within this period. In this case, the sequence control circuit 70, as shown in FIG. 17, puts out to the counter CNT4 a reset pulse $\phi_{C4R}$ synchronized with the timing pulse TB5 in the count "8" condition of the counter CNT2, namely, synchronized with the count up pulse $\phi_{C3U}$ to the counter CNT3, and resets the counter CNT4 by the rising of such reset pulse.

As shown in FIG. 19, the above-described operation is repeated until the comparison of the data of the last 48 bits of the reference field data DB with the standard field data DA is terminated, namely 43 times from count "0" to count "42" of the counter CNT3 and, when the content of the counter CNT3 becomes count "43", the sequence control circuit 70, as shown in FIG. 17, causes a count up pulse $\phi_{CU}$ synchronized with the timing pulse TB5 immediately after the content of the counter CNT3 has become count "43" (namely, in the count "0" condition of the counter CNT2) to be imparted to the sequence counter CNT1 by the counter control circuit 90 to cause the counter CNT1 to effect one count up and, when the content of the counter CNT1 becomes count "5", the sequence shifts to the next sequence mode CC5.

Thus, at the point of time whereat this sequence mode CC4 has been terminated, the maximum count of the counter CNT4, namely, the maximum coincidence number of the 48-bit data stored in the shift register SR2 with respect to the 48-bit standard field data DA stored in the shift register SR1 is left in the shift register SR6 while, on the other hand, the count of the counter CNT3 at the point of time whereat this maximum coincidence has occurred, namely, the amount of shift of the reference field data DB relative to the standard field data DA until the maximum coincidence occurs, or in other words, the data (=distance data) representing the location, in the 90-bit reference field image elements, of the continuous 48-bit image elements of the 90-bit reference field image elements which have been regarded as most similar to the 48-bit standard field image elements, is left in the shift register PSR2.

Figure 20:
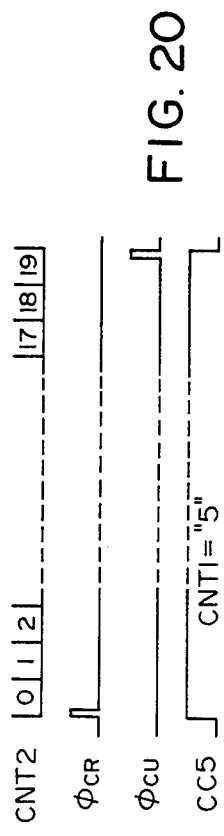
FIG. 20 is a timing chart showing the operation of said digital circuit system in the sequence mode CC5.

Now, when the sequence shifts to the sequence mode CC5, the sequence control circuit 70, as shown in FIG. 20, causes a reset pulse $\phi_{CR}$ synchronized with the timing pulse TB0 to be imparted to the counters CNT2 and CNT3 by the counter control circuit 90 simultaneously with the start of this sequence mode CC5 to thereby reset these counters CNT2 and CNT3. Thereafter, the counter CNT2 counts the timing pulse TB5 and when the content thereof becomes count "19", the sequence control circuit 70, as shown in FIG. 20, causes a count up pulse $\phi_{CU}$ synchronized with the timing pulse TB5 in the count "19" condition of the counter CNT2 to be imparted to the sequence counter CNT1 by the counter control circuit 90 to thereby cause this counter CNT1 to effect one count up and, when the content of the counter CNT1 becomes count "6", the sequence shifts to the next sequence mode CC6. Accordingly, the required time of this sequence mode CC5 becomes one count time of counter CNT2×count step number of counter CNT2=96 $\mu$sec.×20, namely, 1,920 $\mu$sec. and thus, as previously described, the excess time 1,920 $\mu$sec. for synchronizing the repetition period of accumulation of the image signal for the line sensor 30 with the turn-on-and-off period of the artificial light source such as fluorescent lamp is controlled.

Now, when the sequence shifts to the sequence mode CC6, the sequence control circuit 70, as shown in FIG.

20, causes the reset pulse $\phi_{CR}$ synchronized with the timing pulse TB0 to be imparted to the counters CNT2 and CNT3 by the counter control circiot 90 simultaneously with the start of this sequence mode CC6 to thereby reset these counters CNT2 and CNT3 while, at the same time, it sets the select gate circuit 102 to a mode for selecting the content of the shift register SR6, namely, the maximum coincidence number, for the period indicated by CC6A, namely, for the period during the content of the counter CNT2 is count "2" and on the other hand, sets the select gate circuit 104 to a mode for selecting the set content of the constant setting circuit 94, namely, the allowable minimum coincidence number (=44) and accordingly, the maximum coincidence number from the shift register SR6 and the allowable minimum coincidence number from the constant setting circuit 94 (both being 6 bits) are put out in bit series to the comparison circuit 106 by 6 pulses of the clock pulses CP during the period of this CC6A. By this, within the period of this CC6A, the comparison circuit 106 compares the maximum coincidence number from the shift register SR6 with the allowable minimum coincidence number from the constant setting circuit 94 and, when "content of SR6≧set content of setting circuit 94", namely, "the maximum coincidence number being equal to or greater than the allowable minimum coincidence number" has been found, the sequence control circuit 70 sets the select gate circuit 96 on the input side of the shift register SR7 to a mode for causing the output data of the shift register PSR2 to be introduced into the shift register SR7, for the period indicated by the next CC6, namely, for the period during which the content of the counter CNT2 is count "1", and accordingly, the content of the shift register PSR2, namely, the distance data with infinity as the standard, is shifted to and stored in the shift register SR7 by 6 pulses of the clock pulses CP within the period of this CC6B. In the count "1" condition of the counter CNT2, when the timing pulse TB5 is put out from the timing control circuit 110, the sequence control circuit 70, as shown in FIG. 21, causes the count up pulse $\phi_{CU}$ synchronized with this timing pulse TB5 to be imparted to the sequence counter CNT1 by the counter control circuit 90 to thereby cause the counter CNT1 to effect one count up and, when the content of the counter CNT1 becomes count "7", the sequence shifts to the last sequence mode CC7. On the other hand, when "content of SR6<set content of setting circuit 94", that is, the maximum coincidence number being smaller than the allowable minimum coincidence number, has been found as the result of the magnitude discrimination by the comparison circuit 106 during the period of CC6A, the sequence control circuit 70, regarding as low the reliability of the distance data left in the shift register PSR2 during the previous sequence mode CC4, does not cause the shift register SR7 to store the content of the shift register PSR2 during the period of the next CC6B, but as shown in FIG. 21, causes a return pulse $\phi_{RT}$ synchronized with the timing pulse TB0 immediately after the termination of this sequence mode CC6 to be imparted to the reset terminals of the counters CNT1, CNT2 and CNT3 by the counter control circuit 90 to thereby reset all these counters CNT1-CNT3, thereby returning the operation sequence to the first sequence mode CC0 as indicated by broken line ② in FIG. 10.

Now, when the sequence shifts to the sequence mode CC7, the sequence control circuit 70, as shown in FIG. 22, causes the reset pulse $\phi_{CR}$ synchronized with the first timing pulse TB0 to be imparted to the counters CNT2 and CNT3 by the counter control circuit 90 simultaneously with the start of this sequence mode CC7 to thereby reset these counters CNT2 and CNT3.

Here, where the servo focus or the focusmatic mode is designated, the sequence control circuit 70 sets the select gate circuit 102 to a mode for selecting the output data of the shift register SR7 except the period of CC4A in the sequence mode CC4 (shown in FIG. 17) and the period of CC6A in the squence mode CC6 (shown in FIG. 21) and on the other hand, sets the select gate circuit 104 to a mode for selecting the output from the gray-binary converting circuit 98, namely, the binary code signal representing the adjusted position of the phototaking lens and accordingly, in the case of the servo focus or the focusmatic mode, when this sequence mode CC7 is started, the distance data stored in the shift register SR7 during the period of CC6B in the previous sequence mode CC6 is imparted to the comparison circuit 106 with the binary code signal from the gray-binary converting circuit 98, by 6 pulses of the clock pulses CP within the period during which the content of the counter CNT2 is count "0", whereby the result of the discrimination of the adjusted position of the phototaking lens with respect to the object distance is put out from the comparison circuit 106 simultaneously with the termination of the "0" count of the counter CNT2. On the other hand, at this time, the sequence control circuit 70 releases its control for the output circuit 108 simultaneously with the termination of the "0" count of the counter CNT2, whereby the output circuit 108 comes to put out, from its output terminals MU1, MU2, ML1 and ML2, a signal representing the focus adjusted condition of the phototaking lens with respect to the object, on the basis of the output from the comparison circuit 106 at this time and thus, in the case of the servo focus mode, automatic adjustment of the phototaking lens to the in-focus position with respect to the object is effected and in the case of the focusmatic mode, discrimination between in-focus, forward focus and backward focus is indicated by a combination of the outputs from the terminals MU1 and MU2 or ML1 and ML2 (examples of these forms will later be described more specifically). Where the full auto mode is designated, the sequence control circuit 70 causes the count up pulse $\phi_{CU}$ synchronized with the timing pulse TB5 in the count "0" condition of the counter CNT2 to be imparted to the sequence counter CNT1 by the counter control circuit 90 to thereby cause the counter CNT1 to effect one count up and, when the content of the counter CNT1 again becomes count "0" (namely, the counter CNT1 is a 3-bit binary counter and accordingly, the content thereof is reset to "0" when the count up pulse is imparted thereto in the count "7" condition thereof), the sequence again returns to the sequence mode CC0. Once the distance data is stored in the shift register SR7, the result of the discrimination of the adjusted position of the phototaking lens with respect to the object is put out thereafter from the comparison circuit 106 except the period of CC4A in the sequence mode CC4 and the period of CC6A in the sequence mode CC6 and accordingly, during this time, the outputting of a signal representing the adjdusted condition of the phototaking lens from the output circuit 108 is continued. Of course, if the output from the gray-binary converting circuit 98 is varied by the adjustment of the phototaking lens during this time, the output from the comparison circuit 106 is varied and therefore, the output from the output circuit 108 is also varied and, if the distance data stored in the shift register SR7 is varied during the repetition of the operation sequence, the output from the comparison circuit 106 is varied also by this and therefore, the output from the output circuit 108 is also varied. Incidentally, the sequence control circuit 70 controls the output circuit 108 during the period of CC4A in the sequence mode CC4 and during the period of CC6A in the sequence mode CC6 so as to maintain the output condition immediately before each of these periods.

In the full auto mode, where the focus lock requirement is given out by GND-short-circuiting of the terminal OL, the sequence control circuit 70 stops the system at this sequence mode CC7 and, when the terminal OL becomes open, the sequence control circuit causes the count up pulse $\phi_{CU}$ synchronized with the timing pulse TB5 immediately thereafter to be imparted to the sequence counter CNT1 by the counter control circuit 90 to thereby cause this counter CNT1 to effect count up, whereby the sequence returns to the sequence mode CC0 to start a new operation sequence. Also, where the semi auto mode is designated, if the terminal OL has become open at the point of time where this sequence mode CC7 has been reached, the sequence control circuit 70 causes the count up pulse $\phi_{CU}$ synchronized with the timing pulse TB5 in the count "0" condition of the counter CNT2 to be imparted to the sequence counter CNT1 by the counter control circuit 90 to thereby return the sequence to the sequence mode CC0 and the sequence is stopped at this sequence mode CC0, but if the terminal OL remains GND-short-circuited at the point of time whereat the sequence has shifted to the sequence mode CC7, the sequence control circuit stops the system at the sequence mode CC7 and, when the terminal OL becomes open, it causes the count up pulse $\phi_{CU}$ synchronized with the timing pulse TB5 immediately thereafter to be imparted to the counter CNT1 by the counter control circuit 90 to thereby cause the counter CNT1 to effect count up, whereby the sequence returns to and stops at the sequence mode CC0.

In contrast, where the preset focus mode is designated, the sequence control circuit 70 sets the select gate circuit 102 to a mode for selecting the fixed distance data put out from the fixed distance data output circuit 100 in accordance with the set conditions of the terminals 17S, 28S and POP, except the period of CC4A in the sequence mode CC4 and the period of CC6A in the sequence mode CC6 and on the other hand, sets the select gate circuit 104 to a mode for selecting the output data of the shift register PSR2 and, when this sequence mode CC7 is reached, the sequence control circuit sets the select gate circuit 102 to a mode for selecting the distance data output from the shift register SR7 while, at the same time, it stops the system at this sequence mode CC7. On the other hand, in this preset focus mode, the output circuit 108 renders high the output from the output terminal MU1 simultaneously with the closing of the main switch, on the basis of the control signal from the sequence control circuit 70. When the movement of the phototaking lens from the infinity in-focus position is started after the sequence mode CC7 has been reached, the sequence control circuit 70 detects the pulse input from the input terminal GP at this time and as shown in FIG. 22, causes a reset pulse $\phi'_{CR}$ to be imparted to the reset terminals of the counters CNT1-CNT3 by the counter control circuit 90 in synchronism with the timing pulse TB0 immediately after the lens start to reset these counters CNT1-CNT3, thereby returning the system to the sequence mode CC0, and at the same time, causes the counter CNT3 to count a pulse representing the position of the phototaking lens which is imparted to the input terminal GP, or a pulse corresponding thereto, through the counter control circuit 90 and, each time the timing pulse TB5 is put out, the sequence control circuit imparts a strobe signal to the shift register PSR2 to thereby cause the count of the counter CNT3 to be sampled by the shift register PSR2 each time the timing pulse TB5 is put out. Thus, the distance data from the shift register SR7 is imparted to the comparison circuit 106 through the select gate 102 while the data from the shift register PSR2 representing the position of the phototaking lens is imparted to the comparison circuit 106 through the select gate circuit 104, and the comparison circuit 106 compares these data and puts out a coincidence signal at a point of time whereat the output data of the shift regiater PSR2 becomes coincident with the output data of the shift register SR7. By this, the output circuit 108 immediately renders low the output from its output terminal MU1 and by the change from high to low of the output from this output terminal MU1, the phototaking lens is stopped. Although examples of such form will later be described more specifically, a form of construction is here adopted in which the phototaking lens is locked in its infinity in-focus position against the lens moving spring by a first stop released, for example, by depression of a release button while a second stop for the lens is held at its released position by the attraction of an electromagnet and the electromagnet is connected through a switching circuit so that it is energized by the high output of the output terminal MU1 of the output circuit 108 and deenergized by the low output of the output terminal MU1, whereby by depressing the release button in the condition in which the second stop is released by the energization of the electromagnet, the first stop is released to start the movement of the phototaking lens and in the course of movement of the phototaking lens, when the output from the output terminal MU1 of the output circuit 108 is rendered low by the coincidence detection of the comparison circuit 106, the electromagnet is deenergized thereby and the second stop is released to lock the phototaking lens in its in-focus position.

Incidentally, in this preset focus mode, when the movement of the phototaking lens has been started earlier than the operation sequence of the system reaches the sequence mode CC7, the fixed distance data output from the fixed data distance data output circuit 100 is selected by the select gate circuit 102 before this sequence mode CC7 is reached, as already noted, and therefore, the phototaking lens is automatically adjusted to the predetermined distance position determined in accordance with the set conditions of the setting terminals 17S, 28S and POP, namely, the distance position of about 6 m during normal photography and of about 2.5 m during stroboscopic photography in the case of f1.7 lens, and the distance position of about 6.5 m during normal photography and of about 2 m during stroboscopic photography in the case of f2.8 lens, as already described.

Although the description has been delayed, where this sequence mode CC7 is the first one after the closing of the main switch or the one after the one more focus requirement has occurred in the semi auto mode in the servo focus or the focusmatic mode, the sequence control circuit 70 changes the output from the output terminal ALM from high to low as soon as the content of the counter CNT2 becomes count "1" (that is, in 96 μsec. after the start of the sequence mode CC7), thereby releasing the alarming condition.

In an embodiment of the present invention, detection of the distance to the object and discrimination of the in-focus of the phototaking lens on the basis of the result of such detection or automatic adjustment of the lens to its in-focus position are effected in the manner described hitherto.

Details of the construction of the digital circuit system shown in FIG. 9 will now be described.

Figure 23A:
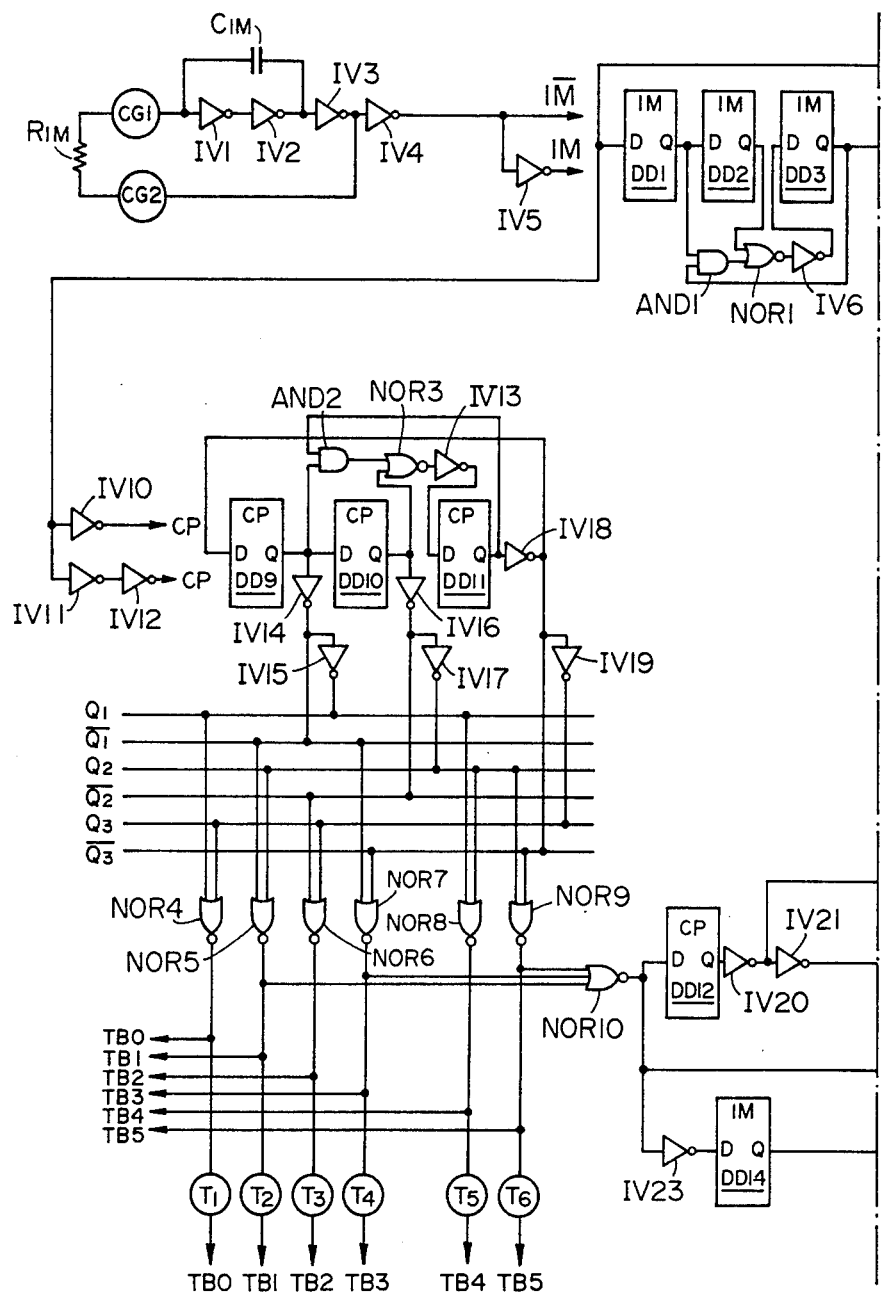
FIGS. 23A and 23B are a circuit diagram showing the details of the timing control circuit in the digital circuit system of FIG. 9.
Figure 23B:
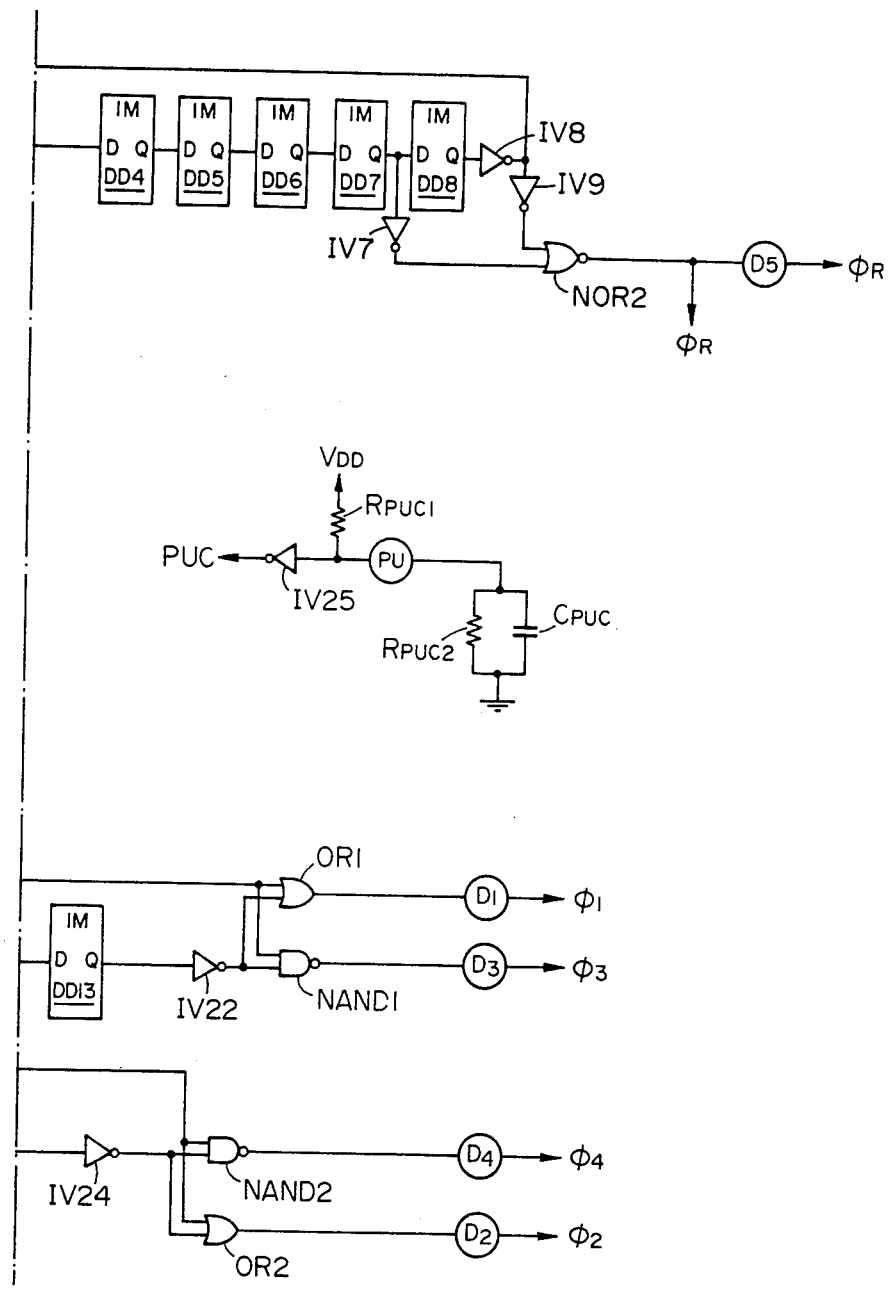

Referring to FIG. 23 which shows the details of the timing control circuit 110 shown in FIG. 9, IV1–IV25 designate inverters, DD1–DD14 designate D-type flip-flops operable in synchronism with the rising of the clock input, AND1 and AND2 designate AND gates, OR1 and OR2 designate OR gates, NAND1 and NAND2 designate NAND gates, NOR1–NOR10 designate NOR gates, $C_{1M}$ and $C_{PUC}$ designate capacitors, and $R_{1M}$, $R_{PUC1}$ and $R_{PUC2}$ designate resistors. Of these, the resistors $R_{1M}$, $R_{PUC2}$ and the capacitor $C_{PUC}$ are externally connected.

Figure 24:
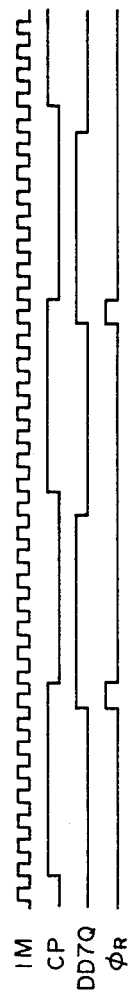
FIGS. 24, 25 and 26 show the waveforms of the outputs of various portions of the circuit shown in FIG. 23.

The inverters IV1–IV3 and capacitor $C_{1M}$, with the resistor $R_{1M}$ connected between connecting terminals CG1 and CG2, constitute an oscillator, which, in the present embodiment, is adapted to generate a rectangular wave pulse of IMC by the selection of the resistance value of the resistor $R_{1M}$. The clock pulses of IMC obtained through such construction are put out as clock pulses $\overline{IM}$ through the inverter IV4 for a buffer and further put out as clock pulses IM (shown in FIG. 24) through the inverter IV5 for a buffer.

Next, the D-type flip-flops DD1–DD8, AND gate AND1, NOR gate NOR1 and inverters IV6 and IV8 together constitute a ring counter operable in synchronism with the rising of the clock pulses 1M from said inverter IV5, and the output of the inverter IV8 is put out as clock pulses CP (shown in FIG. 25) through the inverter IV10 for a buffer on the one hand and is put out as clock pulses $\overline{CP}$ (shown in FIG. 24) through the inverters IV11 and IV12 for buffers on the other hand. The clock pulses IM put out from said inverter IV5 are frequency-divided into 1/16 by the aforementioned ring counter and accordingly, in the present embodiment, as already described, the frequency of these clock pulses CP and $\overline{CP}$ is 62.5 KC. The AND gate AND1, NOR gate NOR1 and inverter IV6 are inserted so that a desired divided frequency waveform is obtained irrespective of the initial condition of the flip-flops DD1–DD8.

The inverters IV7, IV9 and NOR gate NOR2 together constitute a circuit for producing a reset pulse $\phi_R$ (shown in FIG. 24) for the line sensor 30 depending on the AND condition of the Q output (shown in FIG. 24) of the flip-flop DD7 and the output of the inverter IV8, namely, the clock pulses $\overline{CP}$.

The D-type flip-flops DD9–DD11, AND gate AND2, NOR gate NOR 3 and inverters IV13, IV18 together constitute a ring counter operable in synchronism with the rising of the clock pulses CP from the inverter IV10, and the Q outputs of the flip-flops DD9–DD11 are respectively put out as pulses $\overline{Q_1}$, $\overline{Q_2}$ and $\overline{Q_3}$ through the inverters IV14, IV16 and IV18 and also are put out as pulses $Q_1$, $Q_2$ and $Q_3$ (shown in FIG. 25) through the inverters IV15, IV17 and IV19, respectively. The AND gate AND2, NOR gate NOR3 and inverter IV13 are inserted so that a desired divided frequency waveform is obtained irrespective of the initial condition of the flip-flops DD9–DD11. The NOR gate NOR4 receives the pulses $Q_1$, and $Q_3$ to put out the timing pulse TB0, the NOR gate NOR5 receives the pulses $\overline{Q_1}$ and $Q_2$ to put out the timing pulse TB1, the NOR gate NOR6 receives the pulses $\overline{Q_2}$ and $Q_3$ to put out the timing pulse TB2, the NOR gate NOR7 receives the pulses $\overline{Q_1}$ and $\overline{Q_3}$ to put out the timing pulse TB3, the NOR gate NOR8 receives the pulses $Q_1$ and $\overline{Q_2}$ to put out the timing pulse TB4, and the NOR gate NOR9 receives the pulses $Q_2$ and $\overline{Q_3}$ to put out the timing pulse TB5 (see FIG. 25).

Figure 25:
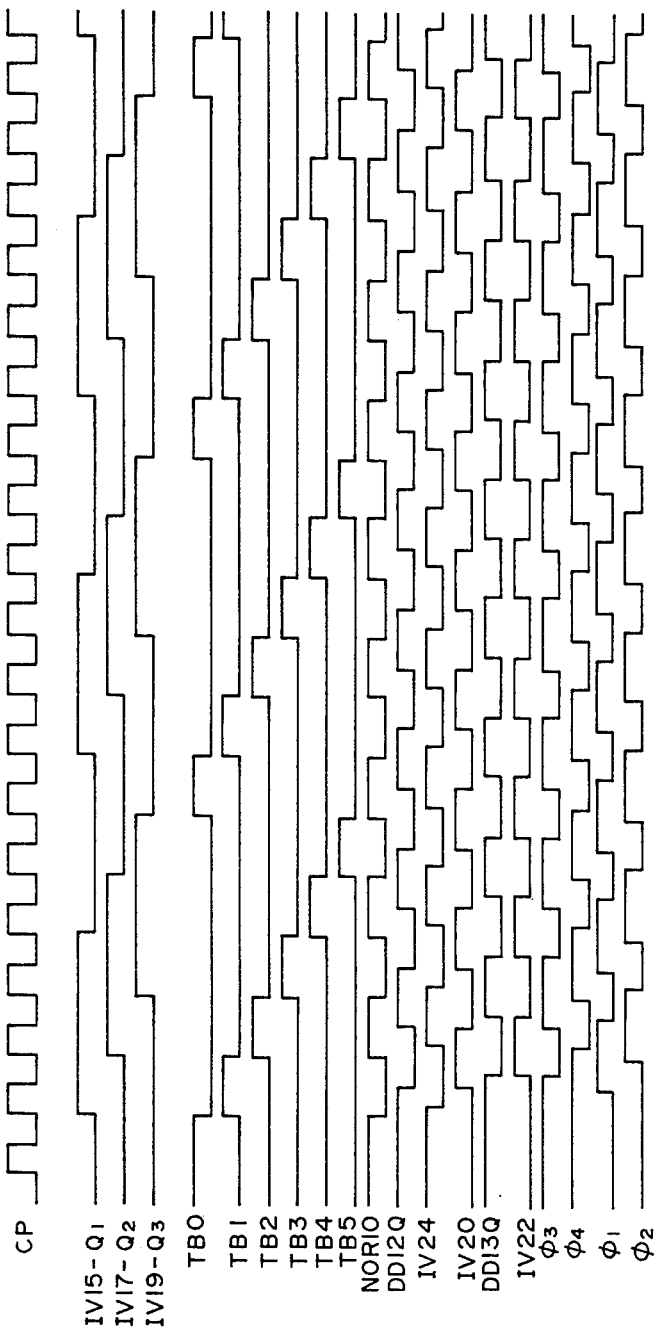

On the other hand, the NOR gate NOR10 receives the timing pulses TB1, TB3 and TB5 from the NOR gates NOR5, NOR7 and NOR9 to put out a pulse which provides the standard of the transfer pulse $\phi_2$ for the line sensor 30, and the output pulse thereof (shown in FIG. 25) is delayed by a predetermined time (500 nsec.) through the inverter IV23, the D-type flip-flop DD14 operable in synchronism with the rising of clock pulses $\overline{IM}$ and the inverter IV24, whereafter it is put out as transfer pulse $\phi_2$ (shown in FIG. 25) with the OR condition thereof with the output of the NOR gate NOR2 taken by the OR gate OR2 and also is put out as transfer pulse $\phi_4$ (shown in FIG. 25) with the NAND condition thereof with the output of the NOR gate NOR10 taken by the NAND gate NAND2. On the other hand, the output of the NOR gate NOR10 is delayed by a predetermined time (8 μsec.) through the D-type flip-flop DD12 operable in synchronism with the rising of the clock pulses $\overline{CP}$, and then put out as a pulse which provides the standard of transfer pulse $\phi_3$ for the line sensor 30. The output pulse of the flip-flop DD12 (shown in FIG. 25) is delayed by a predetermined time (500 nsec.) through the inverters IV20, IV21, the D-type flip-flop DD13 operable in synchronism with the rising of the clock pulses $\overline{IM}$ and the inverter IV22, and then is put out as transfer pulse $\phi_1$ (shown in FIG. 25) with the OR condition thereof with the output of the inverter IV20 (shown in FIG. 25) taken by the OR gate OR1, and also is put out as transfer pusle $\phi_3$ (shown in FIG. 25) with the NAND condition thereof with the output of the inverter IV20 taken by the NAND gate NAND1. The Q output of the flip-flop DD13 and the output of the inverter IV22 at this time are as shown in FIG. 25.

Figures 26, 27:
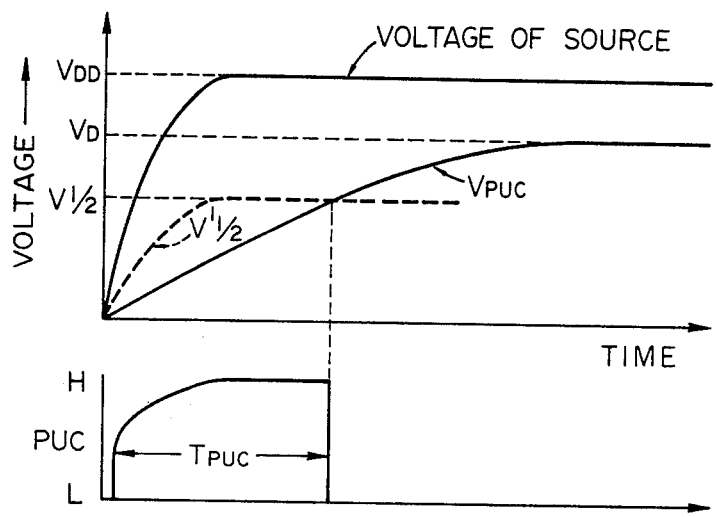
FIG. 27 shows the relative position FIGS. 27A and 27T.

Lastly, the resistor $R_{PUC1}$ and the inverter IV25, with a parallel circuit of the capacitor $C_{PUC}$ and resistor $R_{PUC2}$ connected to the connecting terminal PU, constitute a power up clear circuit and here is obtained a high level output for a predetermined time after the closing of the main switch by the time constant determined by the resistor $R_{PUC1}$ and the capacitor $C_{PUC}$ and the inverting level of the inverter IV25. The resistor $R_{PUC2}$ is for discharging the capacitor $C_{PUC}$ and here, it provides an aid in prolonging the power up clear time by rendering the charging voltage of the capacitor $C_{PUC}$ into a voltage divided by the resistor $R_{PUC1}$. The operation of such power up clear circuit is as shown in FIG. 26, wherein $V_{DD}$ represents the source voltage, $V_D$ represents the divided voltage by the resistors $R_{PUC1}$ and $R_{PUC2}$ for the source voltage $V_{DD}$, namely, the charging voltage for the capacitor $C_{PUC}$, $V_1$ represents the operation input level of the inverter IV25 for the source voltage $V_{DD}$, $V'_1$ represents the operation input level of the inverter IV25 during the closing of the main switch, $V_{PUC}$ represents the voltage across the capacitor $C_{PUC}$, namely, the input level of the inverter IV25, and $T_{PUC}$ represents the output time of the power up clear signal PUC obtained from the inverter IV25. As seen from FIG. 26, after the closing of the main switch, the voltage $V_{PUC}$ across the capacitor $C_{PUC}$ gradually rises toward the charging voltage $V_D$ in accordance with the time constant of the resistor $R_{PUC1}$ and during this time, a high level output corresponding to the source voltage $V_{DD}$ is put out from the inverter IV25 and, when the voltage $V_{PUC}$ across the capacitor $C_{PUC}$ reaches the operation input level $V_i$ of the inverter IV25 for the source voltage $V_{DD}$, the output of the inverter IV25 becomes low at this point of time and thus, the power up clear signal PUC of time $T_{PUC}$ is obtained.

Figure 27A:
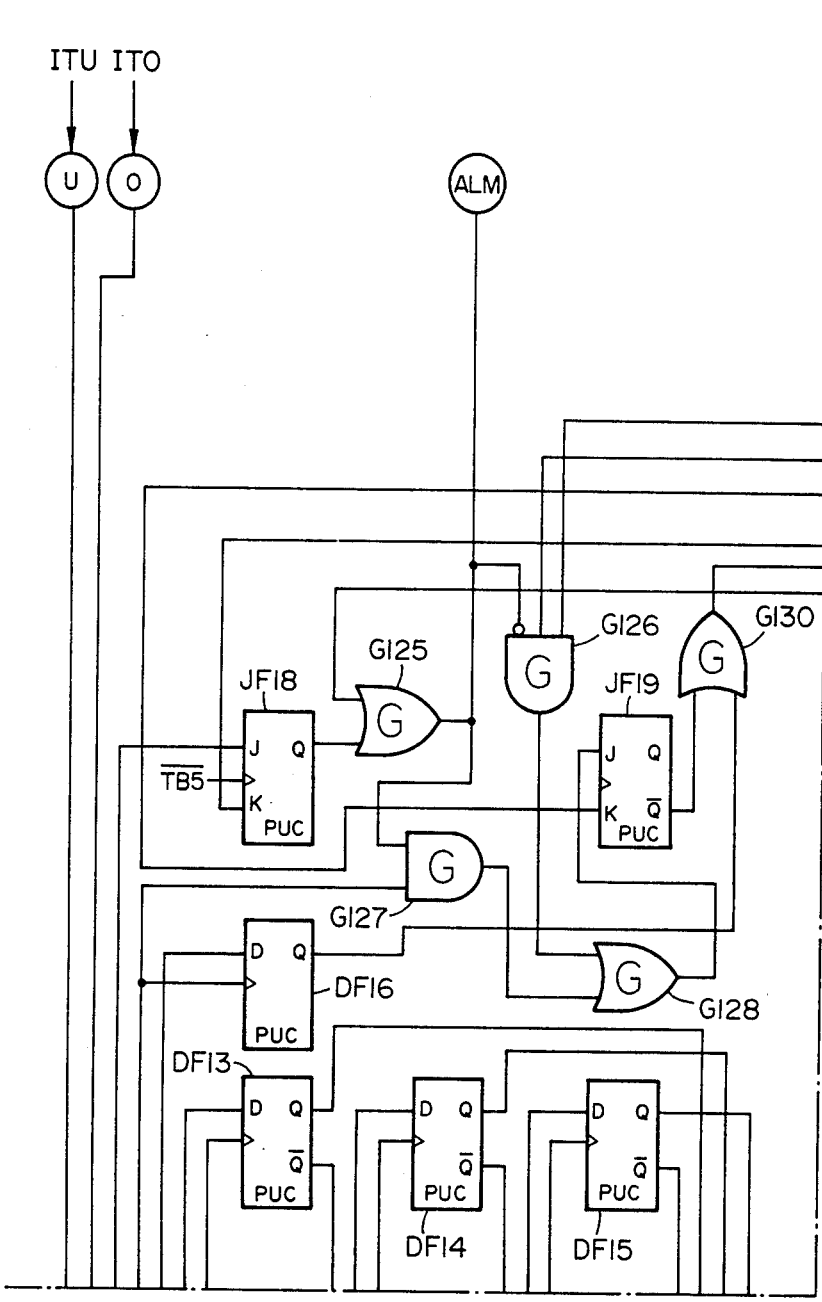
FIGS. 27A, 27B, 27C, 27D, 27E, 27F, 27G, 27H, 27J, 27K, 27L, 27M, 27N, 27P, 27Q, 27R, 27S and 27T are circuit diagrams showing the details of the digital circuit system of FIG. 9.
Figure 27B:
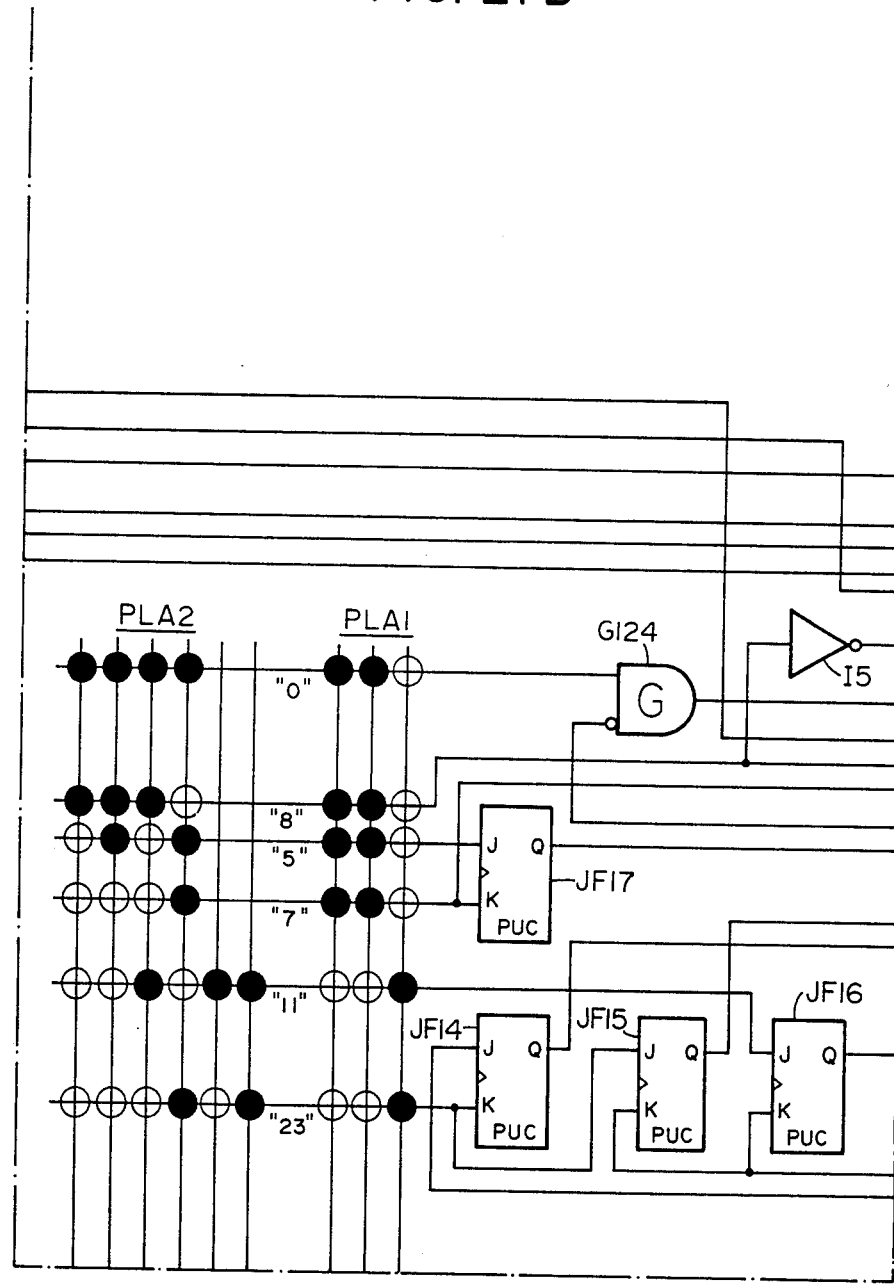
Figure 27C:
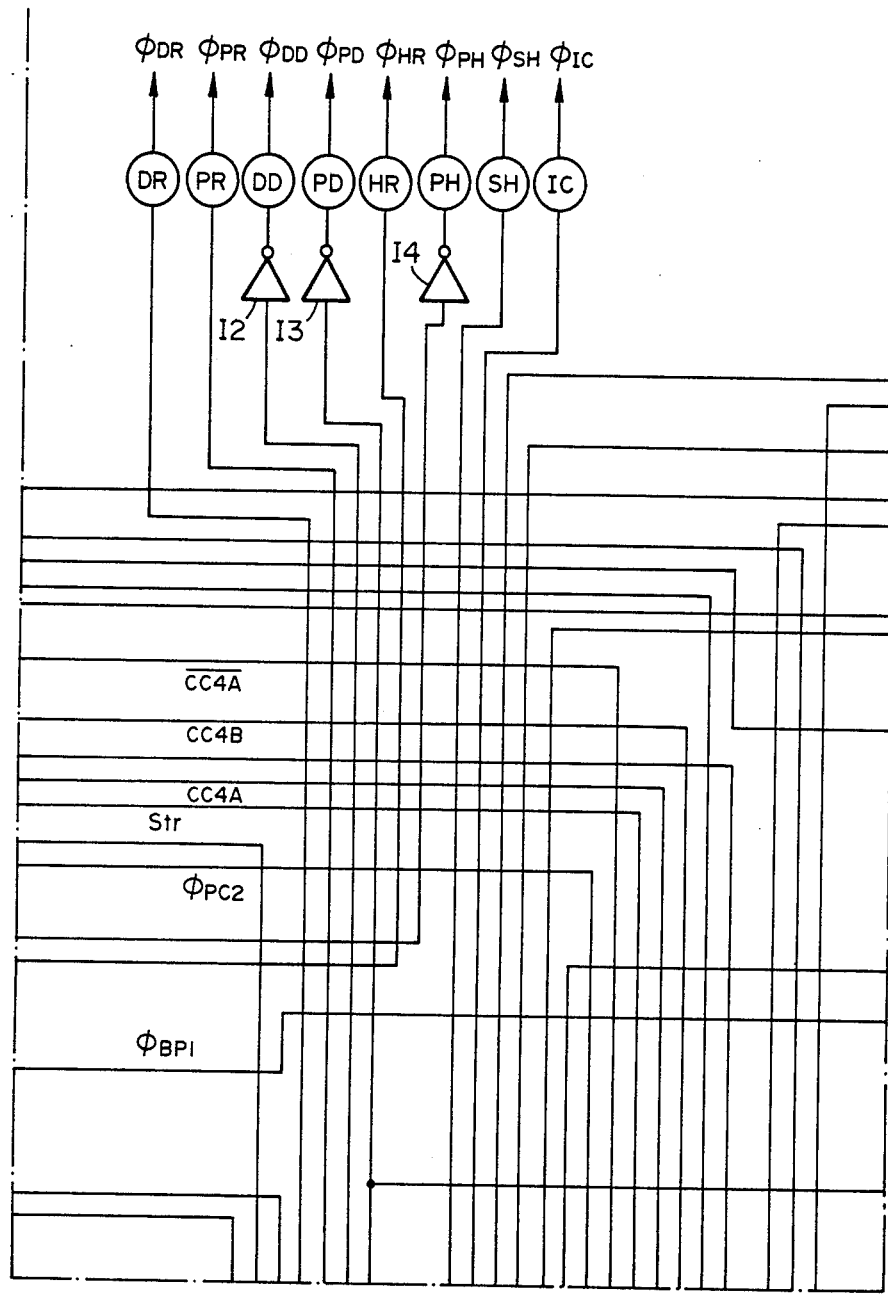
Figure 27D:
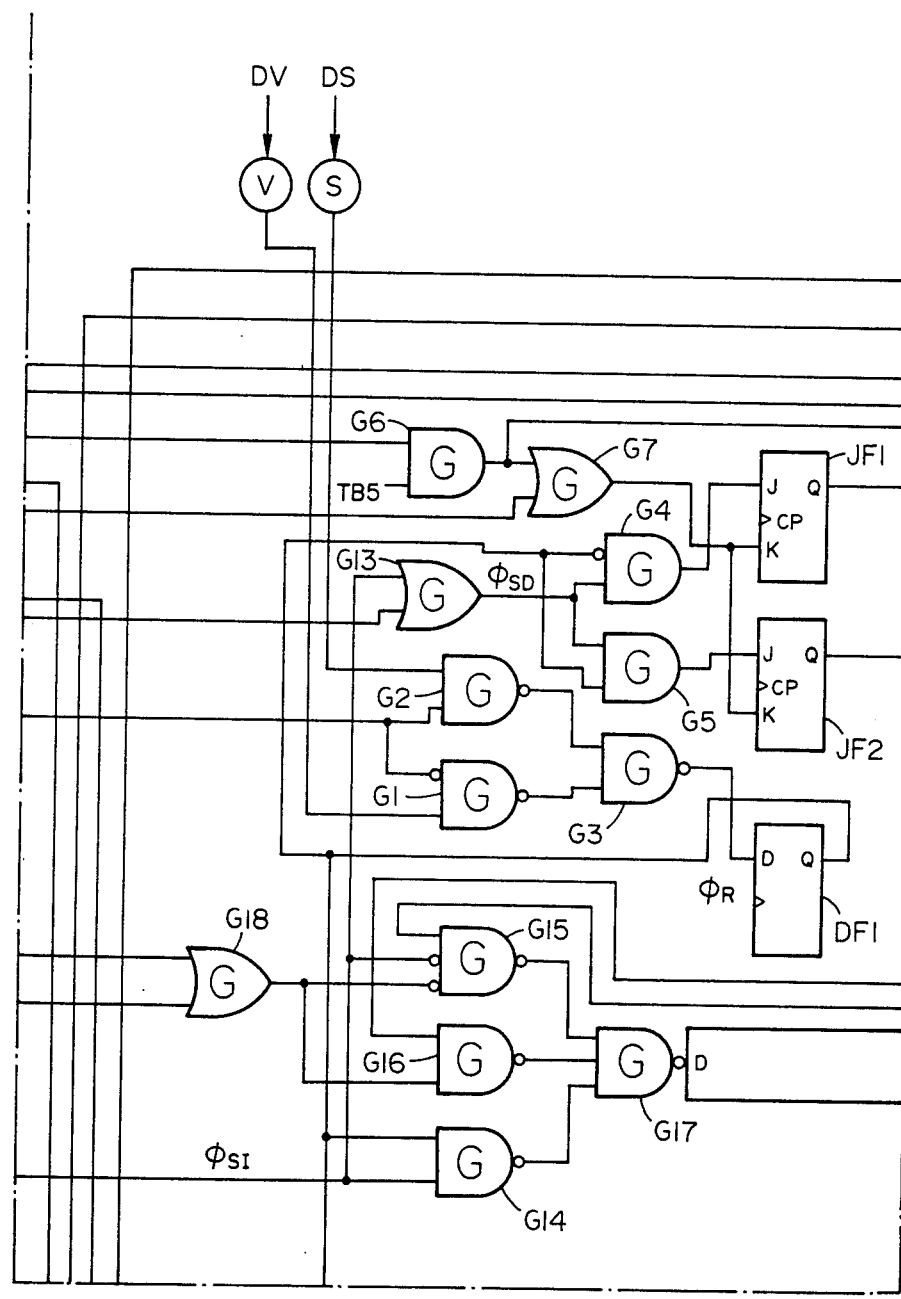
Figure 27E:
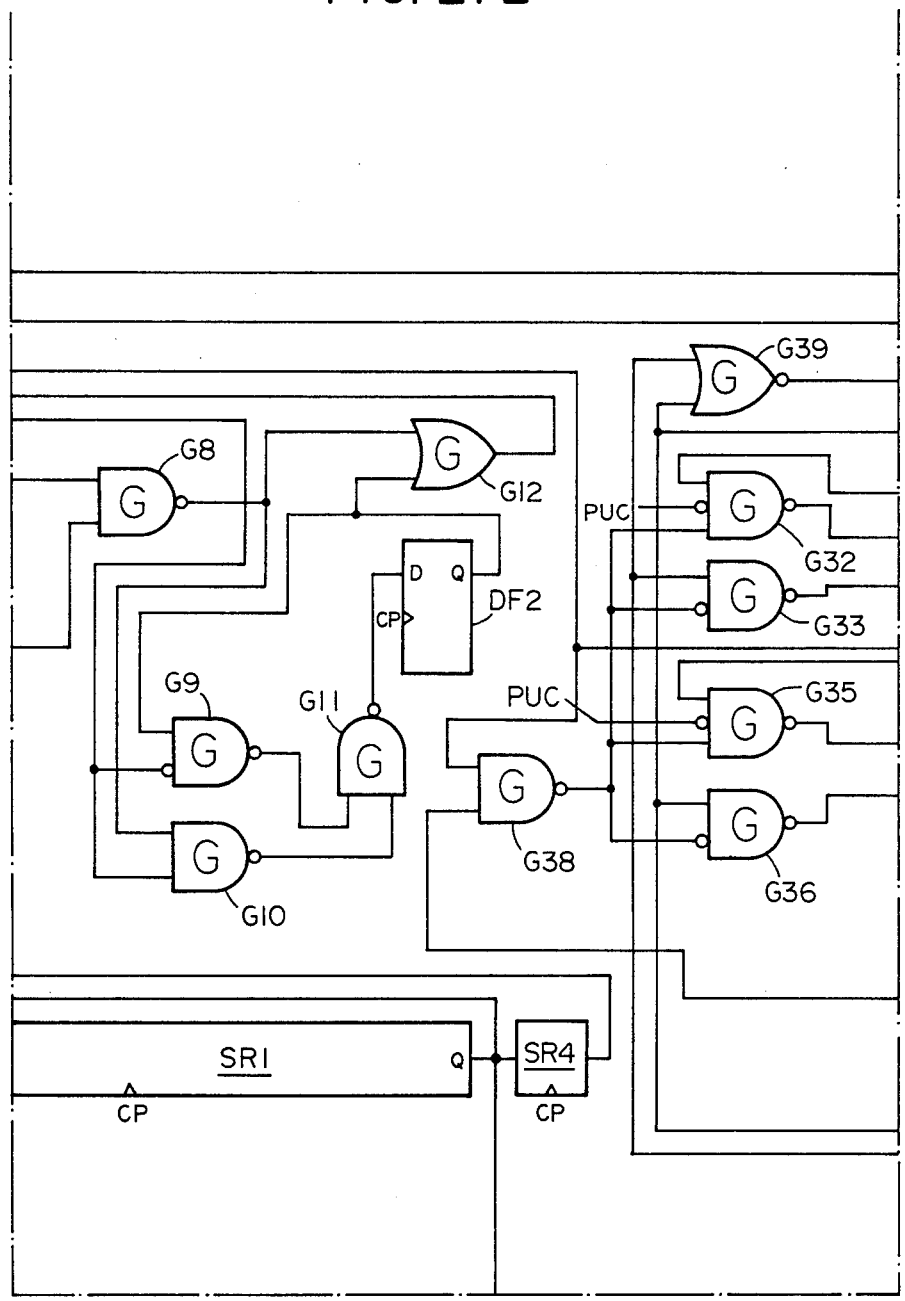
Figure 27F:
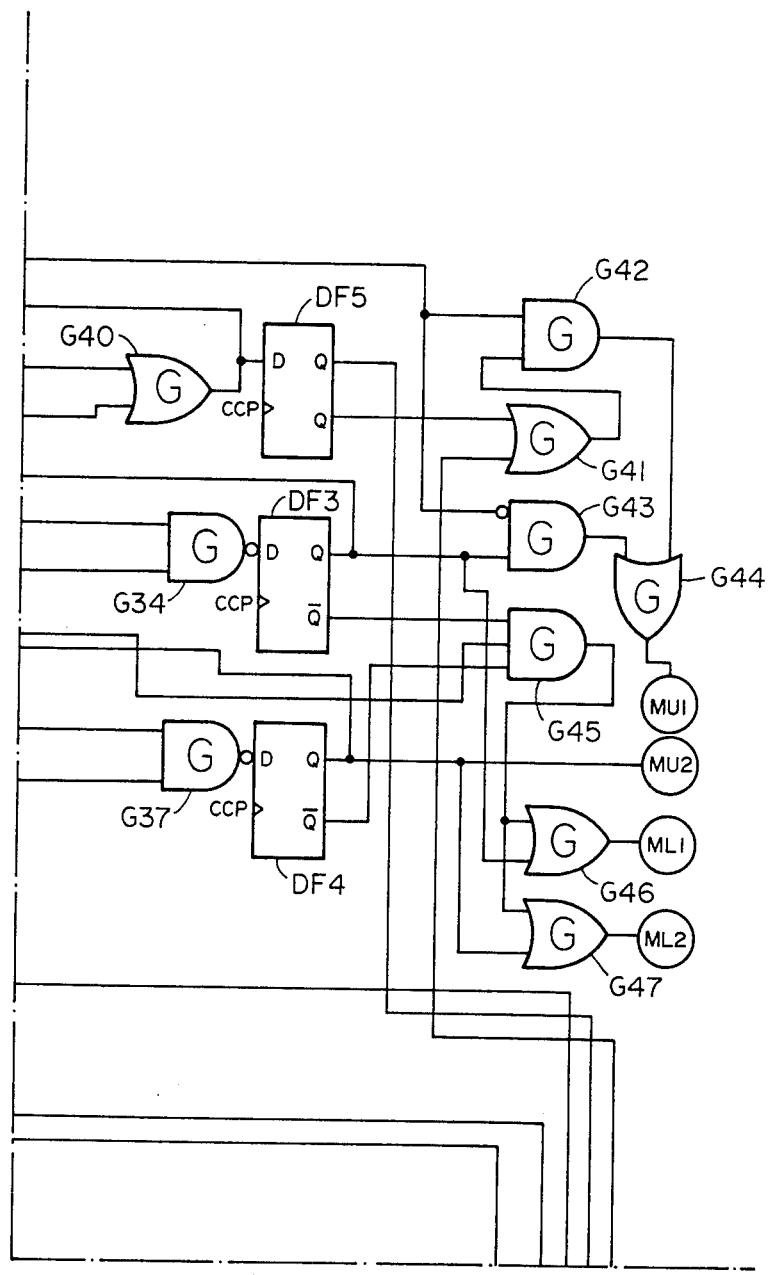
Figure 27G:
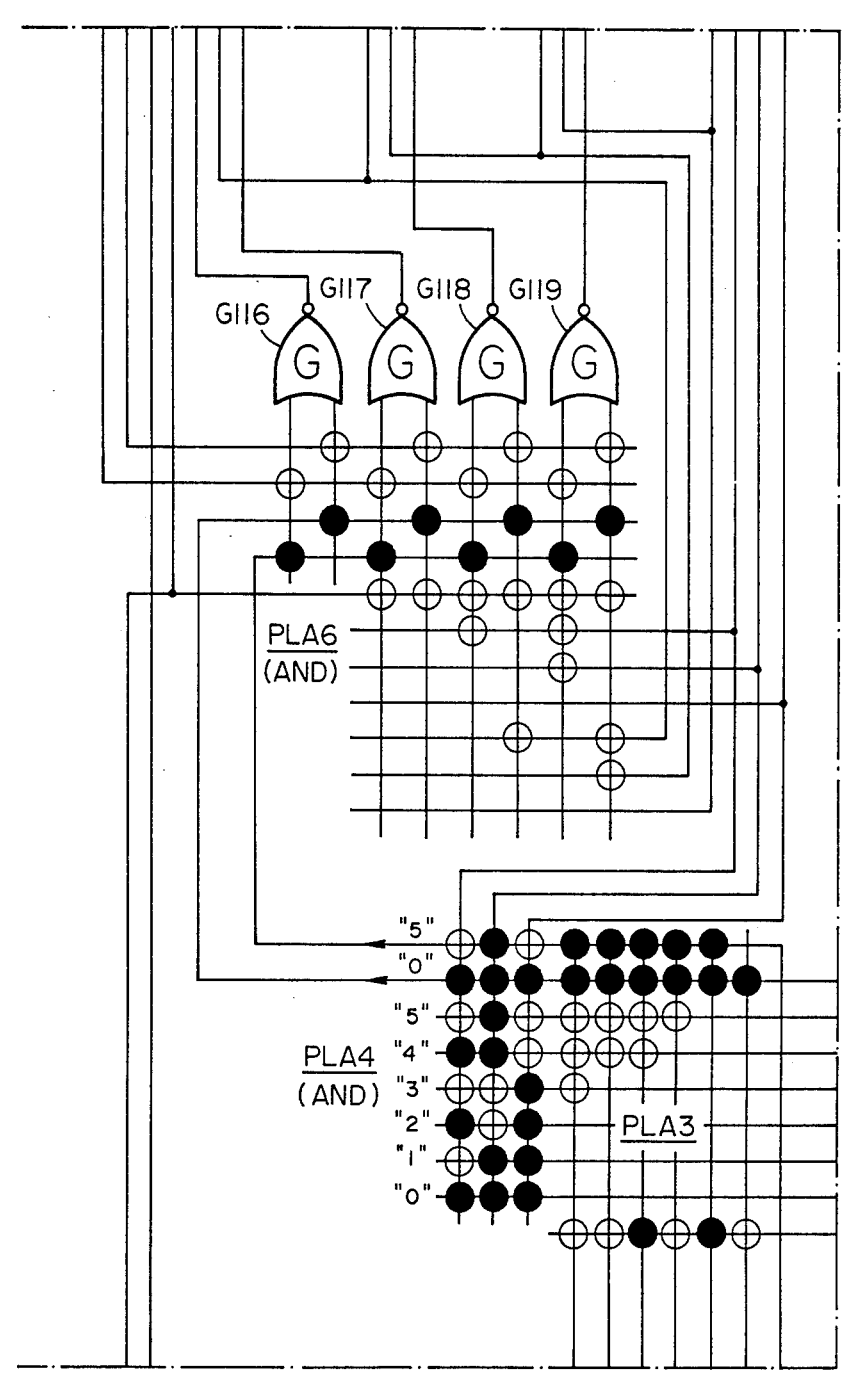
Figure 27H:
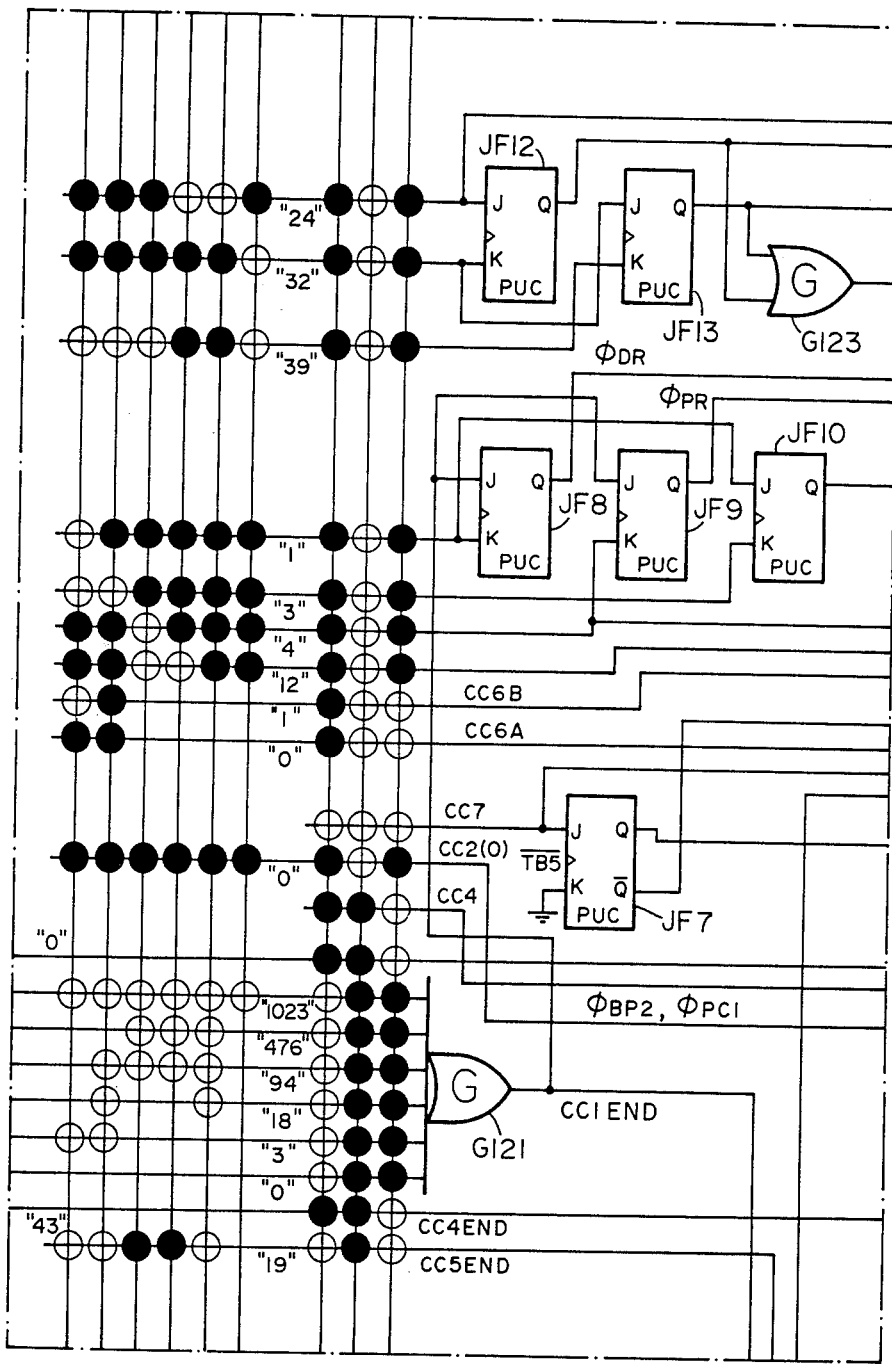
Figure 27J:
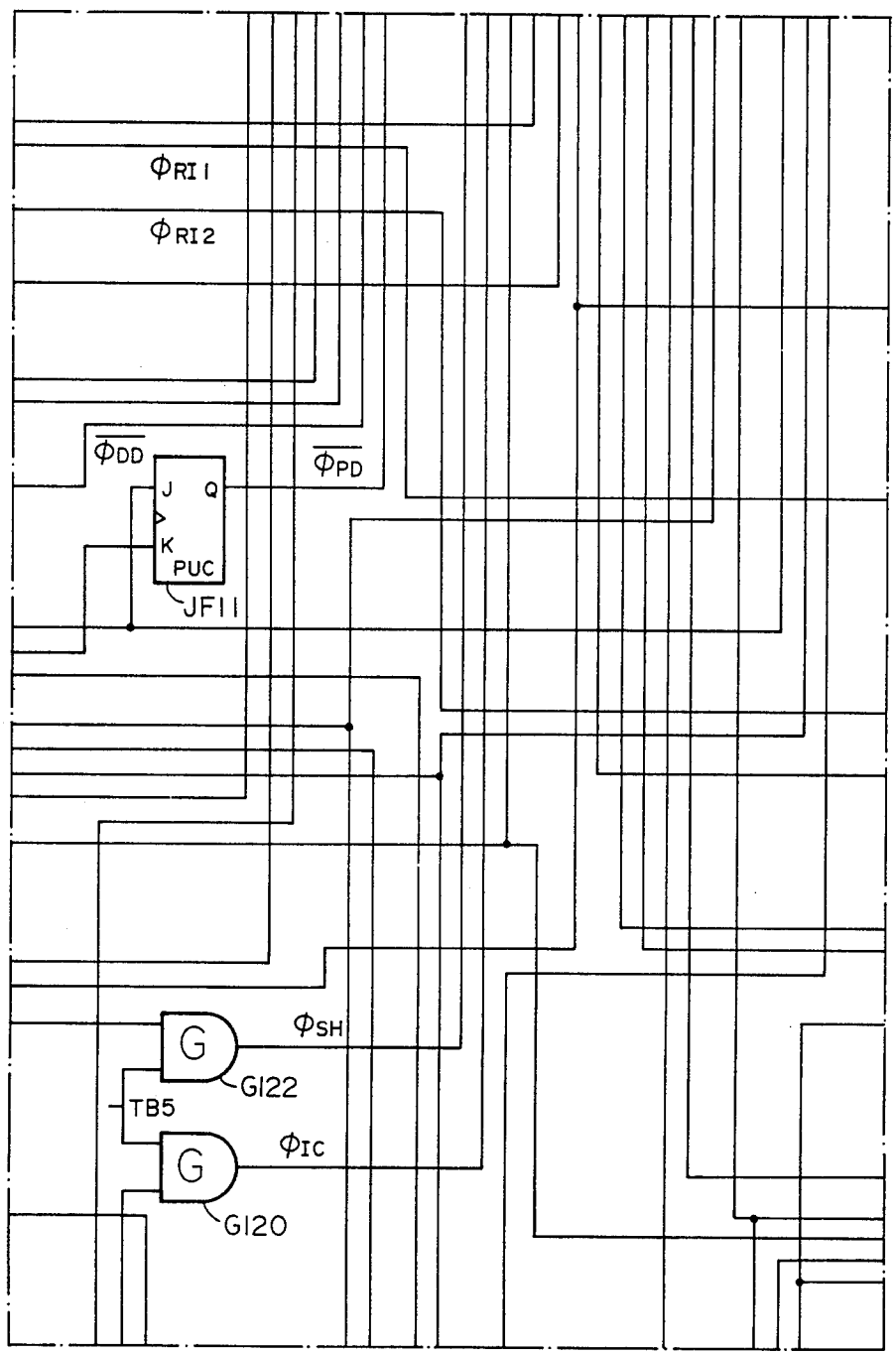
Figure 27K:
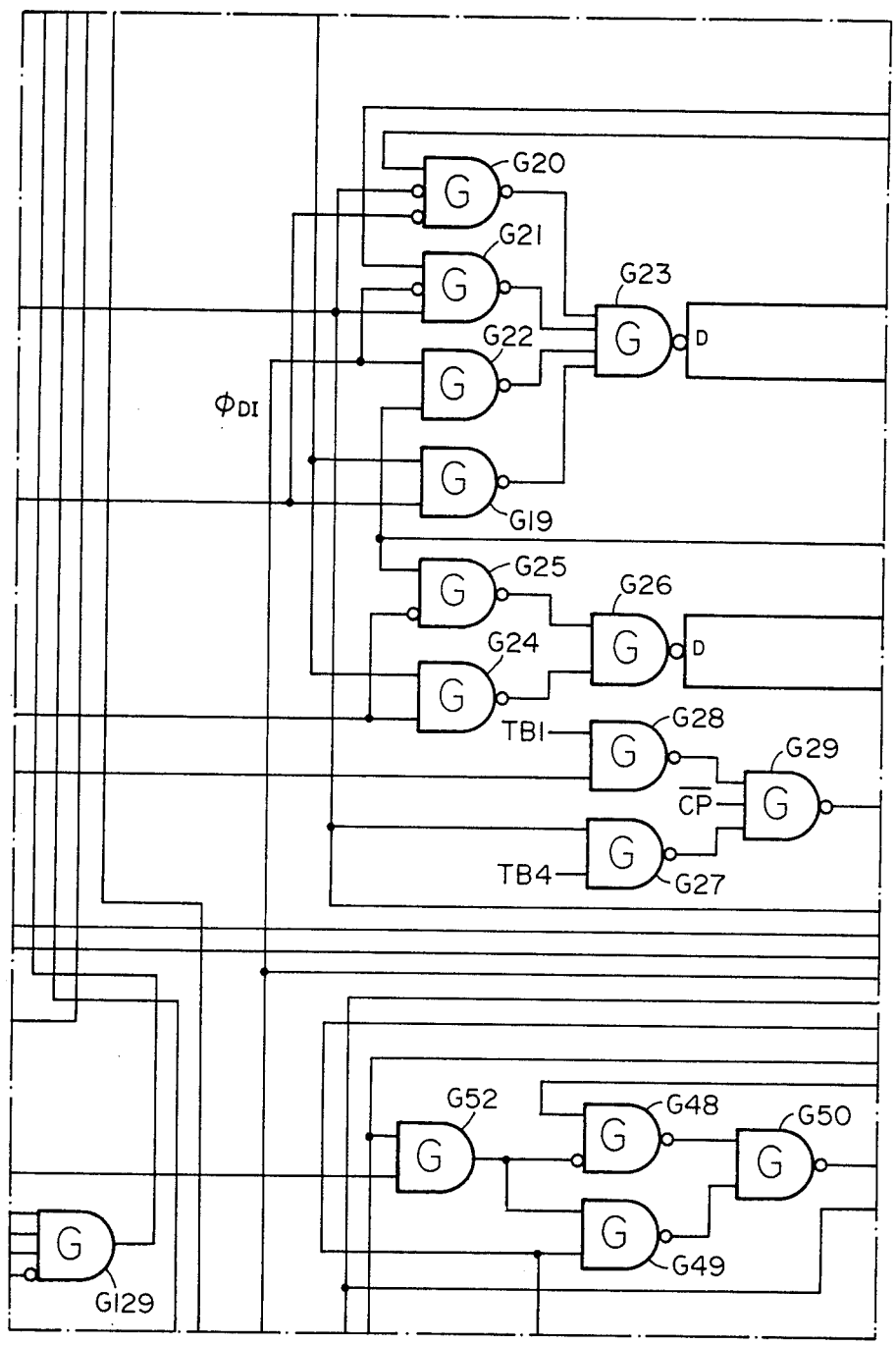
Figure 27L:
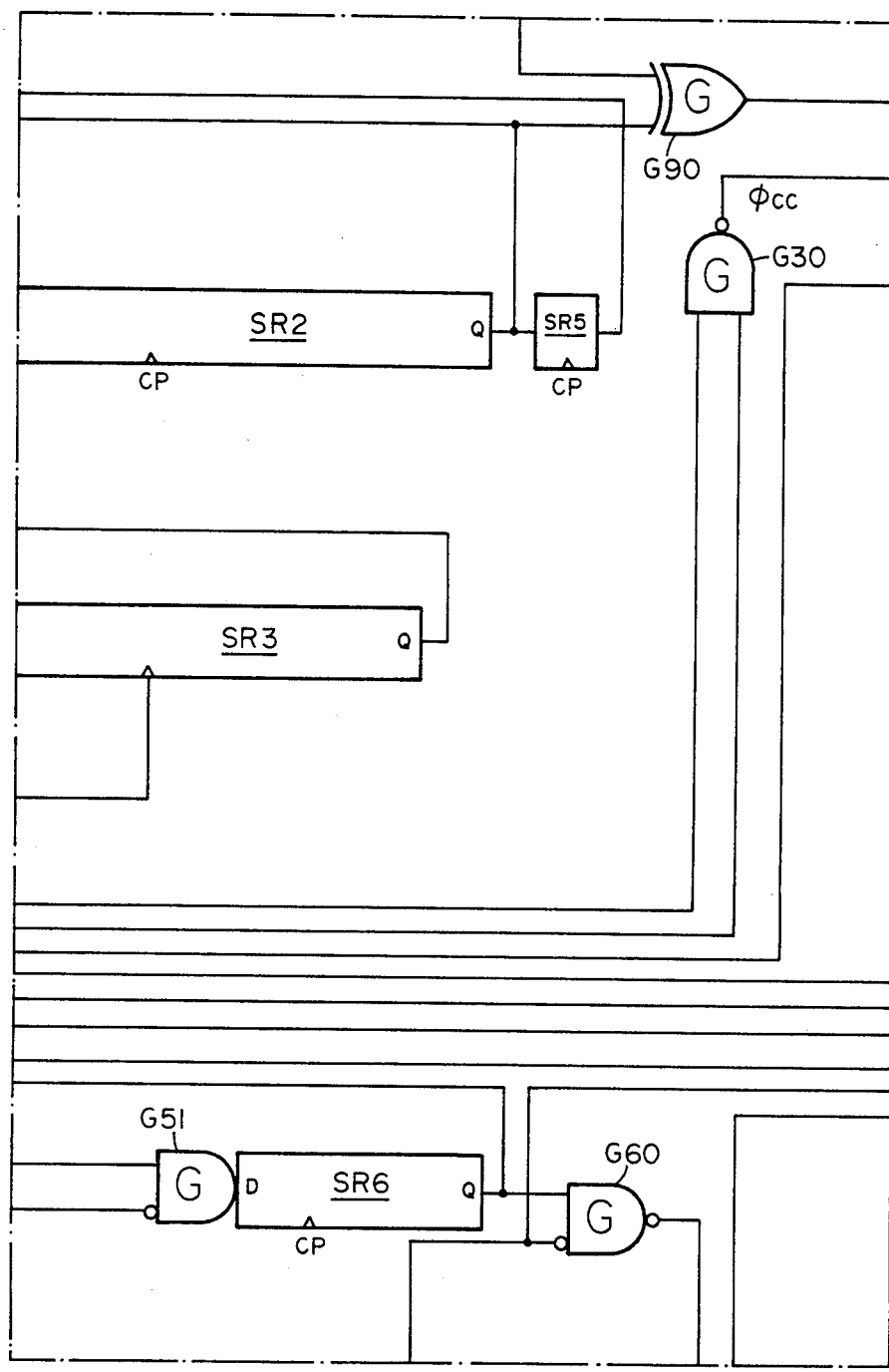
Figure 27M:
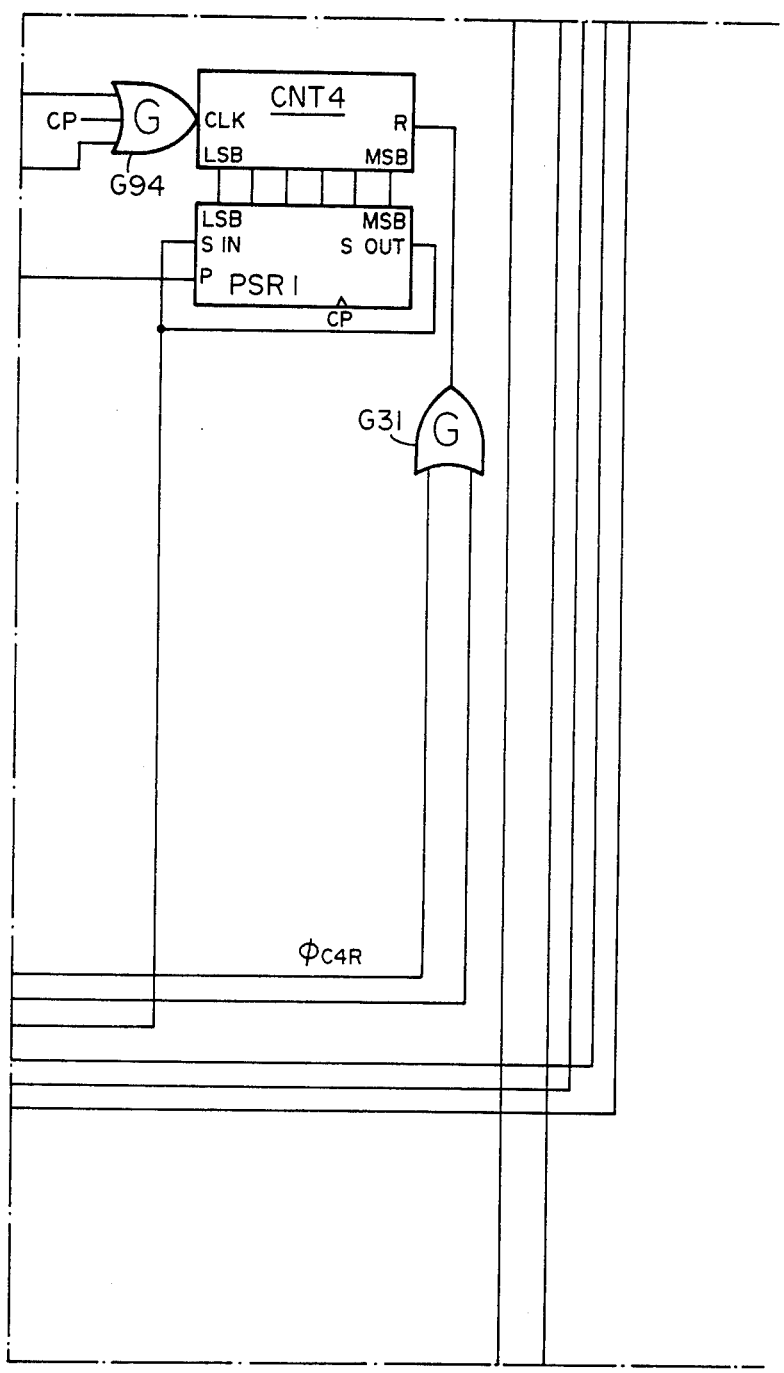
Figure 27N:
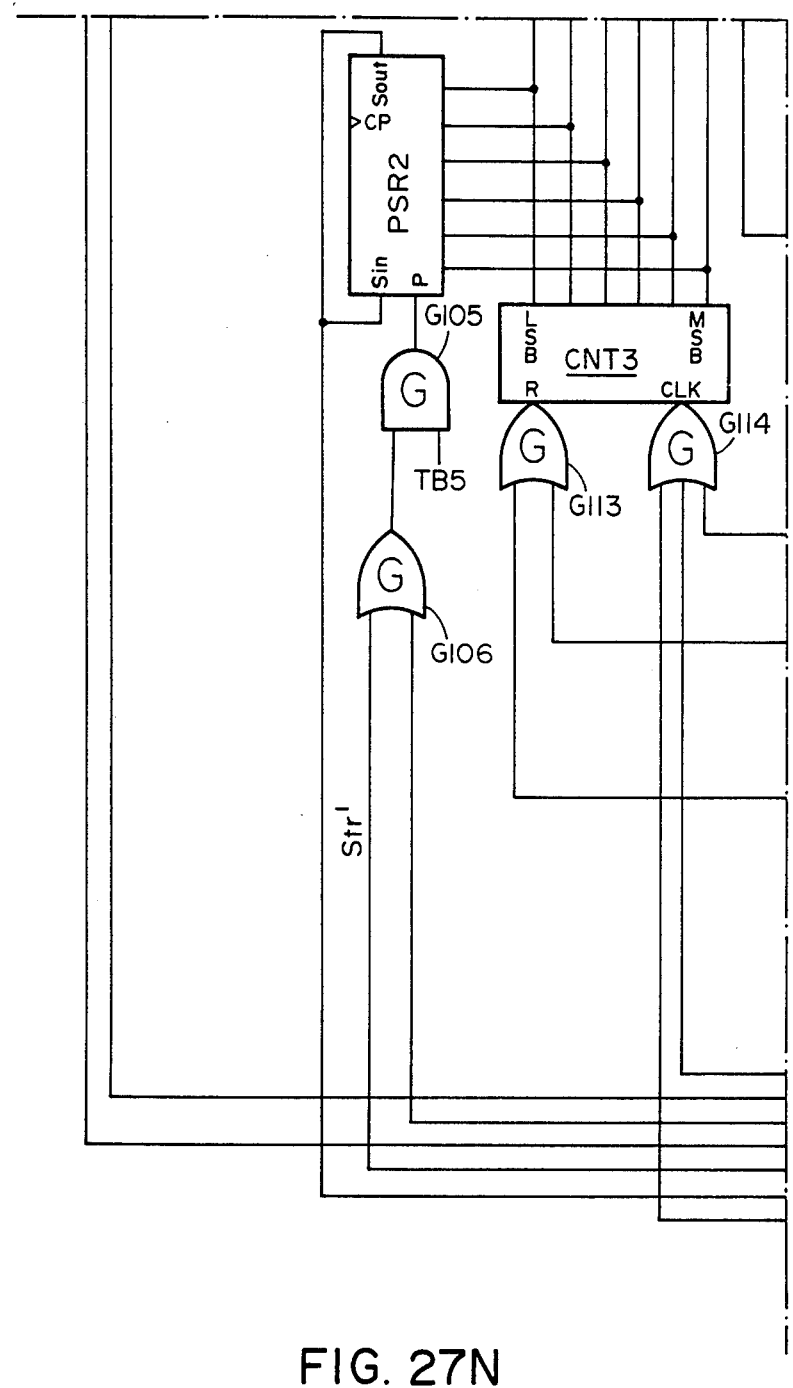
Figure 27P:
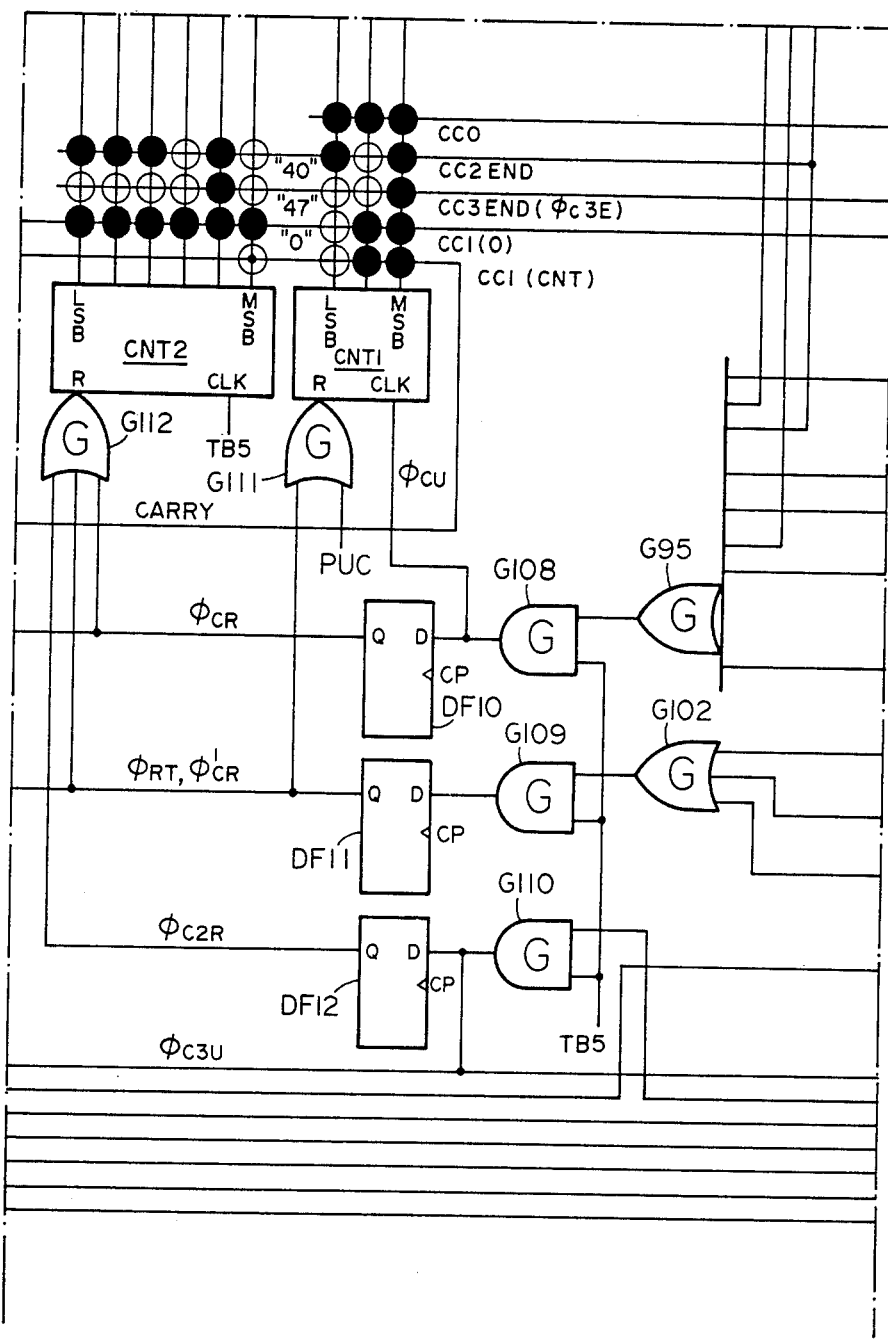
Figure 27Q:
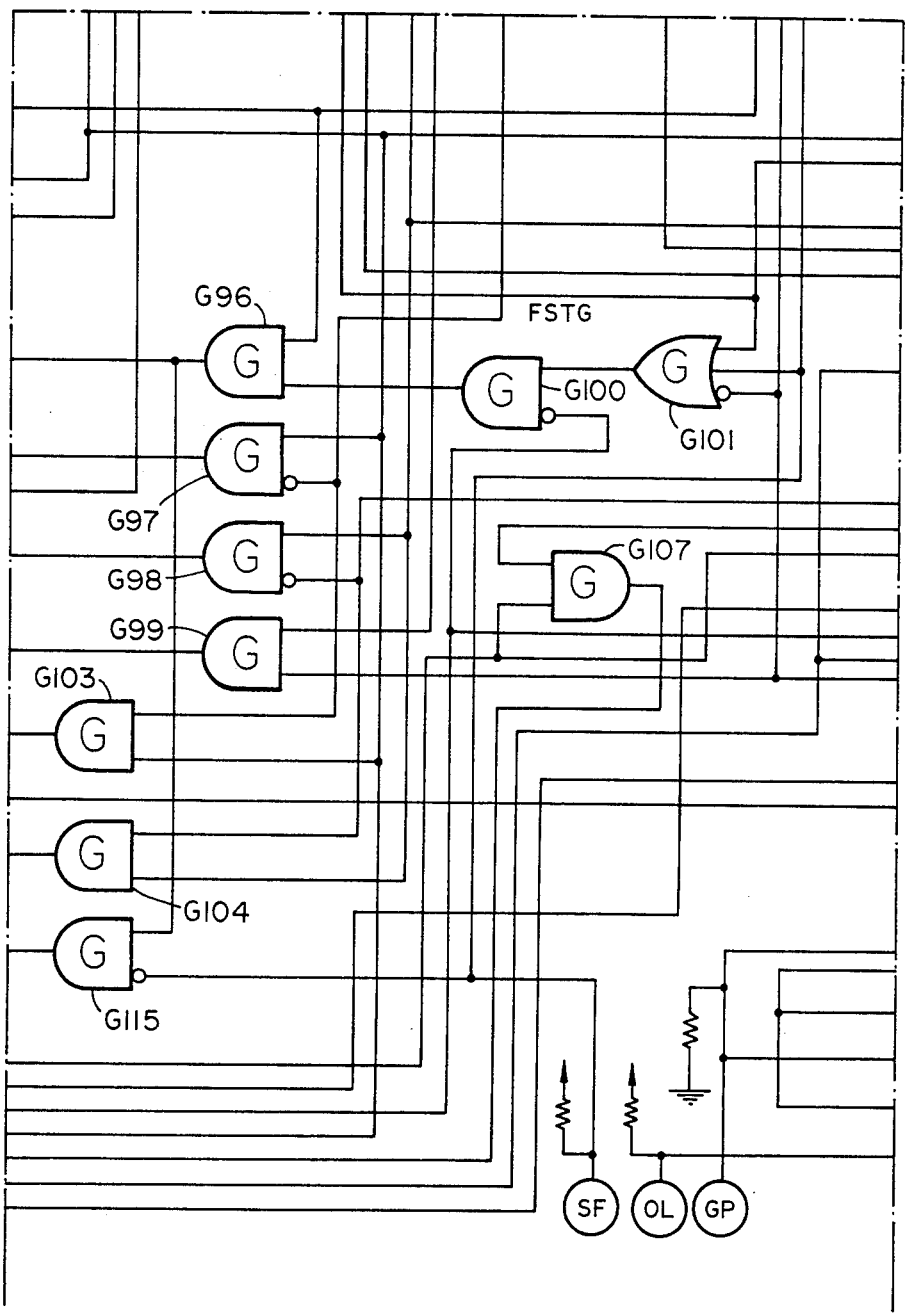
Figure 27R:
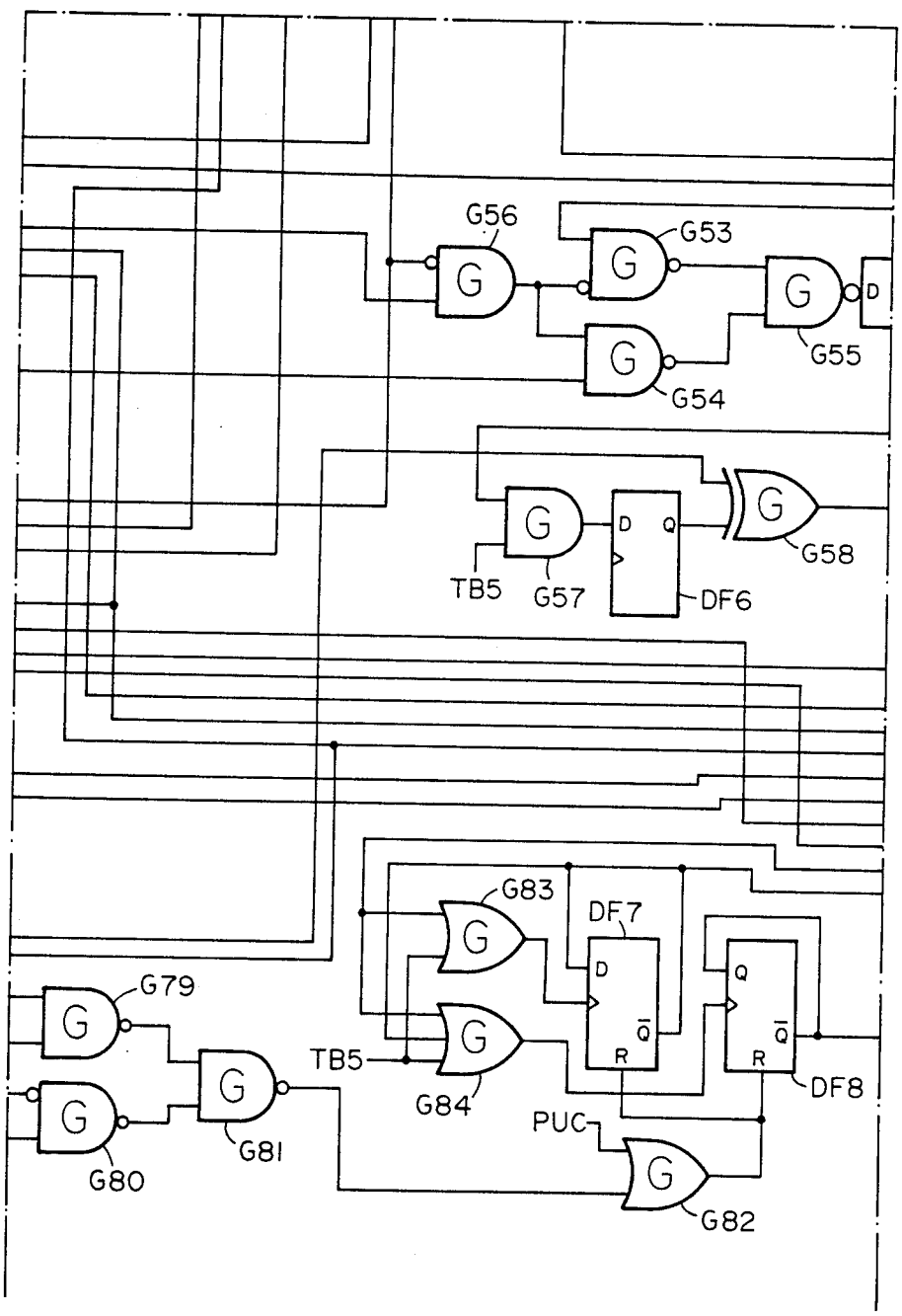
Figure 27S:
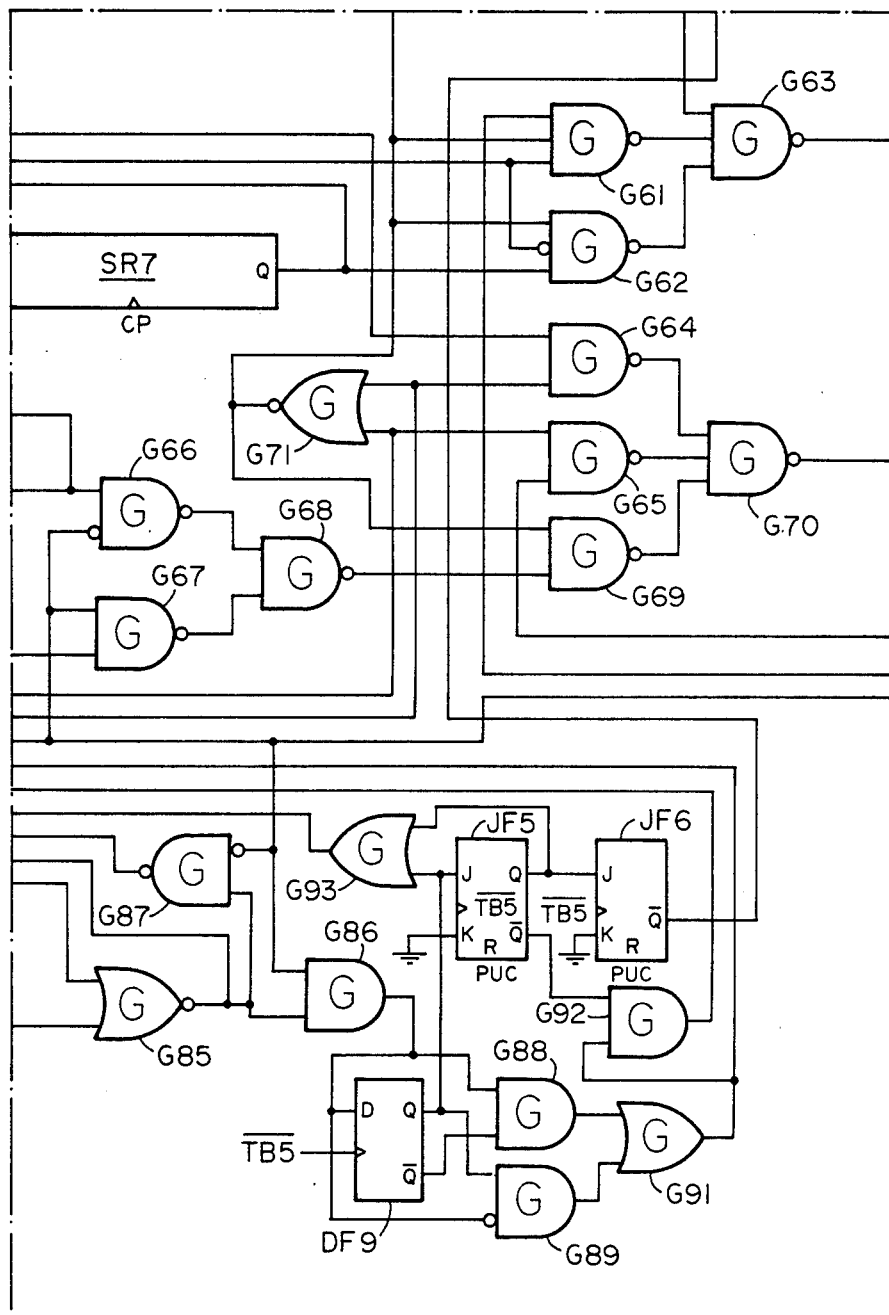
Figure 27T:
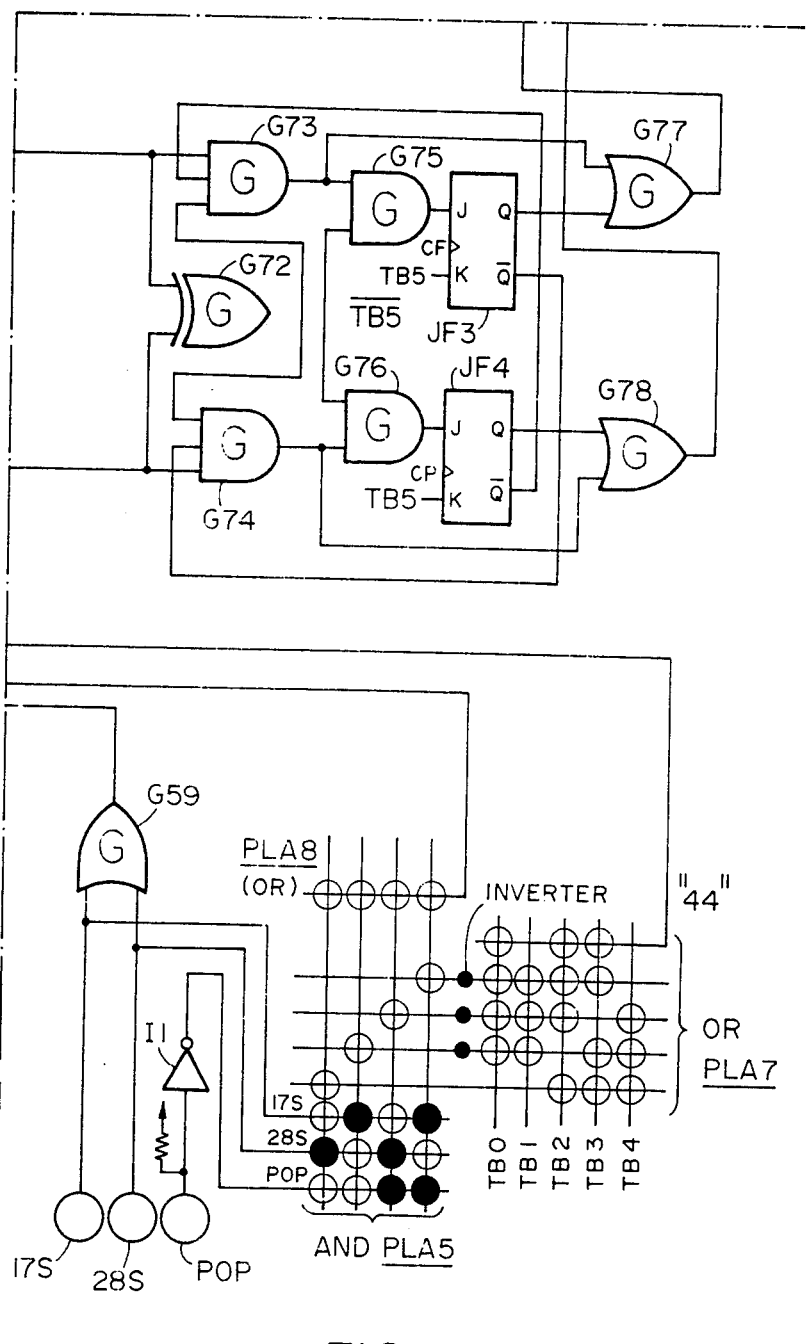

Next, FIGS. 27A-27T show details of all the other circuit blocks of the FIG. 9 digital circuit system than the timing control circuit 110, and these partial diagrams constitute the FIG. 9 digital circuit system (except for the timing control circuit 110) by being combined in the manner as shown in FIGS. 27A-T. Attention is drawn to the fact that FIG. 9 collectively shows the construction of the circuit system by each functional block and the construction of FIG. 9 more or less differs from the construction which will hereinafter be described.

FIGS. 27D-F, K-M show details of portions of the select gate circuit 72, slice failure detecting circuit 74, select gate circuits 76, 78 and 80, pulse control circuit 82, output circuit 108 and sequence control circuit 70 which are shown in FIG. 9.

Figure 28:
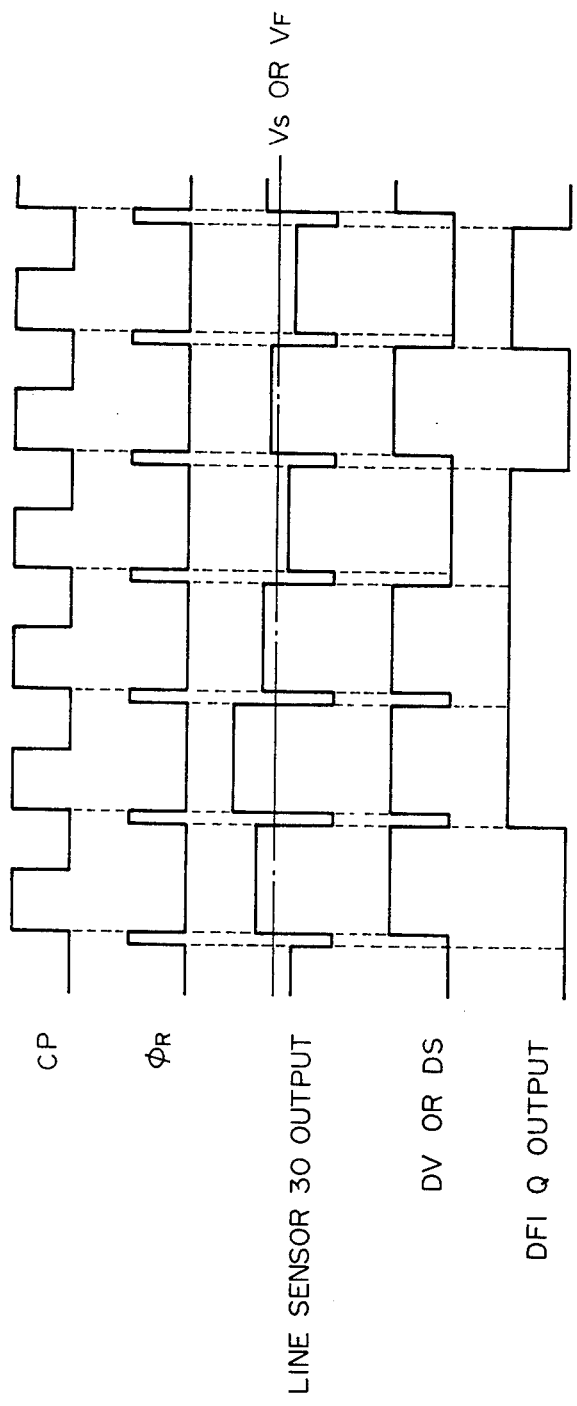
FIG. 28 is a waveform diagram for illustrating the operation of the binary data select gate circuit shown in FIOG. 27A.

In FIGS. 27D-F, K-M, NAND gates G1, G2 and G3 together constitute a select gate circuit for selecting the binary data DV and DS from the binary circuit 66 of FIG. 7B applied through input terminals V and B and here, one of the binary data DV and DS is selected in accordance with the control signal imparted from the sequence control circuit 70 to the NAND gates G1 and G2 and is put out through the NAND gate G3. DF1 designates a D-type flip-flop adapted to receive the output of the NAND gate G3 at the D input thereof and to operate in synchronism with the rising of the reset pulse $\phi_R$ to the line sensor 30 and although not described in connection with the construction of FIG. 9, the binary data DV and DS from the binary circuit 66 lack portions corresponding to the reset pulse $\phi_R$ to the line sensor 30 and therefore, the D-type flip-flop DF1 is provided to make up for such lacking portions. That is, as shown in FIG. 28, the output signal of the line sensor 30 for the clock pulses CP lacks the period of the reset pulse $\phi_R$ and accordingly, the binary data DV and DS from the binary circuit 66 always become "0" during the period of this reset pulse $\phi_R$ and, if these binary data in such state are introduced into the shift registers SR1-SR3 upon rising of the clock pulses CP, it means introduction of all "0" data, but if these binary data DV and DS are introduced through the D-type flip-flop DF1 which is operated upon rising of the reset pulse $\phi_R$, the levels of the data DV and DS can be faithfully maintained as shown and thus, the aforementioned inconvenience can be avoided. What has been described above constitutes the select gate circuit 72 shown in FIG. 9.

JF1 and JF2 designate JK-type flipflops for detecting all "0" or all "1" of the standard field data DA and reference field data DB, of the binary data put out from the above-described flip-flop DF1, namely, a slice failure, DF2 denotes a D-type flip-flop for storing the slice failure of the standard field data DA, G4 designates an AND gate for imparting to the flip-flop JF1 the standard field data DA of the output data from the flip-flop DF1, G5 designates an AND gate for imparting the reference field data DB to the flip-flop JF2, G6 and G7 respectively designates an AND gate and an OR gate for imparting a control signal to these flip-flops JF1 and JF2, G8 denotes a NAND gate for taking out the slice failure condition on the basis of the outputs of these flip-flops JF1 and JF2, G9 G10 and G11 designate NAND gates for controlling the input to the flip-flop DF2, and G12 designates an OR gate for putting out the result of the detection of the presence or absence of the slice failure in accordance with the output of the NAND gate G8 and the output of the flip-flop DF2. All these constitute the slice failure detecting circuit 74 shown in FIG. 9. In such construction, the data introduction instruction signal $\phi_{SD}$ (shown in FIG. 15) put out from the sequence control circuit 70 in the sequence mode CC2 is imparted to the AND gates G4 and G5 through an OR gate 13 (which is included in the sequence control circuit 70).

G14, G15, G16 and G17 designate NAND gates for selecting the input data to the shift register SR1. The NAND gate G14 is for selecting the output data from the flip-flop DF1, the NAND gate G15 is for selecting the output data of the shift register SR1, and the NAND gate G16 is for selecting the output data of the circulation delaying shift register SR4, and these constitute the select gate circuit 76 shown in FIG. 9. In such construction, the standard field data input signal $\phi_{SI}$ (shown in FIG. 15) put out from the sequence control circuit 70 in the sequence mode CC2 is imparted to the NAND gate G14 (the inverted signal thereof is imparted to the NAND gate G15). Also, the bypass circulation instruction signals $\phi_{BP1}$ and $\phi_{BP2}$ (shown in FIGS. 16 and 17) put out from the sequence control circuit 70 in the sequence modes CC3 and CC4 are imparted to the NAND gate G16 through an OR gate G18 (which is included in the sequence control circuit 70 and at this time, the inverted signal thereof is imparted to the NAND gate G15).

G19, G20, G21, G22 and G23 denote NAND gates for selecting the input data to the shift register SR2. The NAND gate G19 is for selecting the output data from the flip-flop DF1, the NAND gate G20 is for selecting the output data of the shift register SR2, the NAND gate G21 is for selecting the output data of the circulation delaying shift register SR5, and the NAND gate G22 is for selecting the output data of the shift register SR3, and these constitute the select gate circuit 78 shown in FIG. 9. In such construction, the reference field data input signal $\phi_{RI1}$ (shown in FIG. 15) put out from the sequence control circuit 70 in the sequence mode CC2 is imparted to the NAND gate G19 (the inverted signal thereof is imparted to the NAND gate G20), the bypass circulation instruction signal $\phi_{BP2}$ (shown in FIG. 17) put out from the sequence control circuit 70 in the sequence mode CC4 is imparted to the NAND gate G21 (the inverted signal thereof is imparted to the NAND gate G20), and the data introduction instruction signal $\phi_{DI}$ (shown in FIGS. 17 and 18) put out from the sequence control circuit 70 in the sequence mode CC4 is imparted to the NAND gate G22 (the inverted signal thereof is imparted to the NAND gate G21).

G24, G25 and G26 designate NAND gates for selecting the input data to the shift register SR3. The NAND gate G24 is for selecting the output data from the flip-flop DF1, and the NAND gate G25 is for selecting the output data of the shift register SR3, and these constitute the select gate circuit 80 shown in FIG. 9. In such construction, the reference field data input signal $\phi_{RI2}$ (shown in FIG. 15) put out from the sequence control circuit 70 in the sequence mode CC2 is imparted to the NAND gate G24 (the inverted signal thereof is imparted to the NAND gate G25).

G27, G28 and G29 designate NAND gates for controlling the imparting of the driving clock pulses CP to the shift register SR3. The NAND gate G27 takes the NAND of the control signal $\phi_{PC1}$ (shown in FIG. 17—this is the same signal as the bypass circulation instruction signal $\phi_{BP2}$ imparted to the NAND gates G16 and G21) put out from the sequence control circuit 70 in the sequence mode CC4 and the timing pulse TB4, the NAND gate G28 takes the NAND of the control signal $\phi_{PC2}$ (shown in FIG. 17) put out from the sequence control circuit 70 in the sequence mode CC4 and the timing pulse TB1, and the NAND gate G29 takes the NAND of the outputs of these NAND gates G27 and G28 and the clock pulses $\overline{CP}$ to thereby put out driving clock pulses CP' (shown in FIG. 18) to the shift register SR3. These constitute the pulse control circuit 82 shown in FIG. 9.

G30 denotes an OR gate for imparting a control signal $\phi_{CC}$ (shown in FIG. 17) to an OR gate G94 in the sequence mode CC4 and this is included in the sequence control circuit 70. This OR gate G30 renders high the inverted signal of the control signal $\phi_{PC1}$ (=the bypass circulation instruction signal $\phi_{BP2}$ imparted to the NAND gates G16 and G21) imparted to the NAND gate G27 in the sequence mode CC4, only during the period of CC4A shown in FIG. 17, to thereby put out the aforementioned control signal $\phi_{CC}$.

G31 designates an OR gate for imparting a reset pulse to the match counter CNT4 at the termination of the sequence mode CC3 and in the sequence mode CC4. The OR gate G31 puts out a control signal $\phi_{C3E}$ (shown in FIG. 16) as reset pulse at the termination of the sequence mode CC3, and puts out a reset pulse $\phi_{C4R}$ (shown in FIGS. 17 and 18—this is the same signal as the data introduction instruction signal $\phi_{DI}$ to the NAND gate G22) in the sequence mode CC4. The OR gate G31 is included in the sequence control circuit 70.

DF3 and DF4 designate D-type flip-flops for storing and holding the two outputs from the magnitude comparing circuit 106, G32, G33 and G34 denote NAND gates for selecting the input data to the flip-flop DF3, G35, G36 and G37 denote NAND gates for selecting the input data to the flip-flop DF4, and G41, G42, G43, G44, G45, G46 and G47 designate OR gates and AND gates constituting a random logic for putting out from the output terminals MU1, MU2, ML1 and ML2 output signals corresponding to the focus modes such as the servo focus or the focusmatic mode and the preset focus mode on the basis of the output conditions of the flip-flops DF3, DF4 and a flip-flop DF to be described and the control signal from the sequence control circuit 70. These constitute the output circuit 108 shown in FIG. 9.

G38 designates a NAND gate for giving the NAND gates G32, G33, G35 and G36 the condition of whether to cause the flip-flops DF3 and DF4 to hold the data or the cause them to introduce and store a new data, G39 denotes a NOR gate for discriminating whether or not the two outputs of said comparing circuit 106 are both "0", G40 designates an OR gate for taking the OR of the output of the OR gate G39 and one output of said comparing circuit 106, and DF5 designates a D-type flip-flop for introducing and storing therein the output of the OR gate G40. These are included in the sequence control circuit 70.

The pulse CCP for driving said flip-flops DF3, DF4 and DF5 is obtained by taking the logic sum of the clock pulses CP and the inverted pulse $\overline{TB5}$ of the timing pulse TB5.

Next, FIG. 27B shows details of portions of the select gate circuits 86, 96, 98 and 104, constant setting circuit 94, gray-binary converting circuit 98, fixed distance output circuit 100 and sequence control circuit 70 in the construction shown in FIG. 9.

In FIG. 27B, G48, G49, G50 and G51 Designate NAND gates and AND gates for selecting the input data to the shift register SR6. The NAND gate G48 selects the output data of the shift register SR6, and the NAND gate G49 selects the output data of the shift register PSRI (shown in FIG. 27A), and these constitute the select gate circuit 86 shown in FIG. 9. In such construction, the control signal $\phi_{C3E}$ (shown in FIG. 16) put out from the sequence control circuit 70 to clear the content of the shift register SR6 at the point of time whereat the sequence mode CC3 is terminated is imparted to the final stage AND gate G51 at inverted logic as the inhibition signal, namely, gate off signal, and the control signal put out from the sequence control circuit 70 to cause the content of the shift register PSRI to be introduced into the shift register SR6 in the sequence mode CC4 is imparted to the NAND gate G49 (the inverted signal thereof is imparted to the NAND gate G48) through an AND gate G52 (which is included in the sequence control circuit 70).

G53, G54 and G55 denote NAND gates for selecting the input data to the shift register SR7. The NAND gate G53 selects the output data of the shift register SR7 and the NAND gate G54 selects the output data of the shift register PSR2, and these constitute the select gate circuit 96 shown in FIG. 9. In such construction, the control signal put out from the sequence control circuit 70 to cause the content of the shift register PSR2 to be introduced into the shift register SR7 during the period of CC6B (shown in FIG. 21) in the sequence mode CC6 is imparted to the NAND gate G54 (the inverted signal thereof is imparted to the NAND gate G53) through an AND gate G56 (which is included in the sequence control circuit 70).

G57, DF6 and G58 respectively designate an AND gate, a D-type flip-flop and an exclusive OR gate for converting into a binary code signal the gray code signal representing the lens position which is applied through an input terminal GP in the servo focus or the focusmatic mode, and these constitute the gray-binary converting circuit 98 shown in FIG. 9. The input signal from the input terminal GP is imparted to the exclusive OR gate G58.

PLA7 designates a programmable logic array in which the allowable minimum coincidence number data (as already described, "44" in the present embodiment) and the fixed distance data used in the preset focus mode are set, I1 denotes an inverter for inverting and introducing thereinto the input from the setting terminal POP, PLA5 designates a programmable logic array for putting out a signal corresponding to each control style of the preset focus mode in accordance with the input conditions from the setting terminals 17S, 28S and the inverter I1, and PLA8 denotes a programmable logic array constituting an OR logic for putting out the fixed distance data from the programmable logic array PLA7 in accordance with the output of the programmable logic array PLA5. A portion of the programmable logic array PLA7, namely, the uppermost one array thereof, constitutes the constant setting circuit 94 shown in FIG. 9, and the remaining four arrays of the programmable logic array PLA7, the inverter I1 and the programmable logic arrays PLA5 and PLA8 together constitute the fixed distance data output circuit 100 shown in FIG. 9.

G59 designates an OR gate for putting out a signal representing the preset focus mode when one of the inputs from the setting terminals 17S and 28S is "1", and this is included in the sequence control circuit 70.

In the construction of the output circuit 108 described in connection with FIGS. 27D-F, K-M, the output signal of the OR gate G59 is imparted to the AND gate G42 and the inverted signal thereof is imparted to the AND gate G43.

G60, G61, G62 and G63 designate NAND gates for selecting the output data of the shift register SR6, the output data of the programmable logic array PLA8 (namely, the fixed distance data) and the output data of the shift register SR7 (namely, the effective distance data). The NAND gate G60 is for selecting the output data of the shift register SR6, the NAND gate G61 is for selecting the output data of the programmable logic array PLA8, and the NAND gate G62 is for selecting the output data of the shift register SR7, and these constitute the select gate circuit 102 shown in FIG. 9. In such construction, a gate control signal is imparted to the NAND gate G60 to cause the output data of the shift register SR6 to be selected only during the period of CC4A in the sequence mode CC4 and the period of CC6A in the sequence mode CC6 while, on the other hand, a gate control signal is imparted to the NAND gate G61 to cause the output data of the programmable logic array PLA8 to be selected within the period until the operation sequence of the system reaches the sequence mode CC7 in the preset focus mode, except the period of CC4A in the sequence mode CC4 and the period of CC6A in the sequence mode CC6, and a gate control signal is imparted to the NAND gate G62 to cause the output data of the shift register SR7 to be selected except the periods of the sequence modes CC0-CC6 in the first operation sequence in the servo focus or the focusmatic mode and the period of CC4A in the sequence mode CC4 and the period of CC6A in the sequence mode CC6 in and after the second operation sequence.

G64, G65, G66, G67, G68, G69 and G70 designate NAND gates for selecting the output data of the shift register PSR1 (shown in FIGS. 27D-F, K-M), the output data of the first array of the programmable logic array PLA7 (namely, the allowable minimum coincidence number data), the output data of the exclusive OR gate G58 (namely, the binary code signal representing the position of the phototaking lens during the servo focus or the focusmatic mode) and the output data of the shift register PSR2 (shown in FIGS. 27N-Q) (namely, the data representing the position of the phototaking lens during the preset focus mode). The NAND gate G64 is for selecting the output data of the shift register PSR1, the NAND gate G65 is for selecting the output data of the first array of the programmable logic array PLA7, the NAND gate G66 is for selecting the output data of the exclusive OR gate G58, the NAND gate 67 is for selecting the output data of the shift register PSR2, the NAND gate G68 is for selecting the output data of one of the NAND gates G66 and G67, and the NAND gate G69 is for selecting the output data of the NAND gate G68, and these constitute the select gate circuit 104 shown in FIG. 9. In such construction, the signal representing the preset focus mode which is put out from the OR gate G59 is imparted to the NAND gate G67 to cause the output data of the shift register PSR2 to be selected (the inverted signal thereof is imparted to the NAND gate G66). On the other hand, a gate control signal is imparted to the NAND gate G64 to cause the output data of the shift register PSR1 to be selected only during the period of CC4A in the sequence mode CC4, and a gate control signal is imparted to the NAND gate G65 to cause the output data of the first array of the programmable logic array PLA7 to be selected only during the period of CC6A (shown in FIG. 21) in the sequence mode CC6. Also, a gate control signal is imparted to the NAND gate G69 to cause the output of the NAND gate G68 (namely, the output data of the exclusive OR gate G58 or the output data of the shift register PSR2) to be selected except the period of CC4A in the sequence mode CC4 and the period of CC6A in the sequence mode CC6, and this is imparted through a NOR gate G71 which takes the NOR of the gate signals to the NAND gates G64 and G65 (the NOR gate 71 is included in the sequence control circuit 70). The gate control signal from the NOR gate 71 is also imparted to the NAND gates G61 and G62, and the inverted signal thereof is imparted to the NAND gate G60.

G72, G73, G74, G75, G76, JF3, JF4, G77 and G78 designates exclusive OR gates, AND gates, JK-type flip-flops and OR gate constituting a series digital comparator for comparing the magnitudes of the output data from said NAND gates G63 and G70, and these constitute the magnitude comparing circuit 106 shown in FIG. 9.

In the construction of the output circuit 108 described in connection with FIGS. 27D-F, K-M, the flip-flop DF3 is used to store and hold the output data from an OR gate G77 for putting out the comparison result, and the flip-flop DF4 is used to store and hold the output data from an OR gate G78 for putting out the comparison result, and an OR gate G39 is used to discriminate whether or not both of the output data from these OR gates G77 and G78 are "0".

G79, G80 and G81 designate NAND gates constituting a select gate circuit for selecting the input signal from the input terminal GP and the input signal from the setting teminal OL. The NAND gate G79 selects the input signal from the terminal GP and the NAND gate G80 selects the input signal from the terminal OL, and the output signal from the OR gate G59 is imparted to the NAND gate G79 and the inverted signal thereof is imparted to the NAND gate G80 and accordingly, in the preset focus mode, the input signal from the terminal GP, namely, the pulse signal representing the amount of movement of the phototaking lens, is selected while, on the other hand, in the servo focus or the focusmatic mode, the input signal from the terminal OL, namely, the continuous focus lock change-over signal in the full auto mode and the stoppage one more focus change-over signal in the semi auto mode, are selected. G82, G83, G84, DF7, DF8 and G85 designate OR gates, D-type flip-flop and NOR gate constituting a chuttering absorbing circuit for absorbing the chuttering of the input signal from the input terminal GP in the preset focus mode or the input signal from the setting terminal OL in the servo focus or the focusmatic mode, and the output signal from the NAND gate G81 is imparted to the OR gate G82. G86 and G87 denote an AND gate and a NOR gate for distributing the output signal from the NOR gate G85, and the output signal from the OR gate G59 is imparted to the AND gate G86 and the inverted signal thereof is imparted to the NAND gate G87 and accordingly, in the preset focus mode, the output signal from the NOR gate G85 (in this case, the pulse signal from the terminal GP) is put out through the AND gate G86, while in the servo focus or the focusmatic mode, the output signal from the NOR gate G85 (in this case, the set signal from the terminal OL) is put out through the NAND gate G87. OF9, G88, G89 and G91 designate a D-type flip-flop, AND gates and OR gate constituting a pulse converting circuit for putting out a pulse once at each rising and falling of the pulse signal representing the amount of movement of the phototaking lens in the preset focus mode which is put out from the AND gate G86. Accordingly, in the preset embodiment, the pulse representing the amount of movement of the phototaking lens in the preset focus mode has the number thereof converted into double and counted. The output pulse from the OR gate G91 is imparted to the clock input terminal of the counter CNT3 (shown in FIGS. 27N-Q) through the counter control circuit 90. JF5, JF6, G92 denote JK-type flip-flops, AND gate and OR gate constituting a circuit for detecting the start of the phototaking lens in the preset focus mode on the basis of the Q output of the flip-flop DF9 and the output of the OR gate G91. The $\overline{Q}$ output of the flip-flop JF6 is imparted to the OR gate G41 in the output circuit 108 described in connection with FIGS. 27D–F, K–M, and the output of the AND gate G92 is imparted to the counter control circuit 90 to reset the counters CNT1-CNT3 while, on the other hand, the output of the OR gate G93 is utilized to control the introduction of the count of the counter CNT3 into the shift register PSR2. The above-described circuit groups are included in the sequence control circuit 70.

FIGS. 27N-Q show details of portions of the counter control circuit 90 and the sequence control circuit 70 in the construction shown in FIG. 9.

IN FIGS. 27N-Q, G95, G96, G97, G98, G99, G100 and G101 designate OR gates and AND gates constituting a logic for creating the conditions for the count-up of the sequence counter CNT1 and the resetting of the counters CNT2 and CNT3, G102, G103 and G104 designate an OR gate and AND gates constituting a logic for creating the conditions for the resetting of the counters CNT1-CNT3, and G105, G106 and G107 designate AND gates and OR gate constituting a logic for controlling the introduction of data into the shift register PSR2. These are included in the sequence control circuit 70. In such construction, the output from the OR gate G12 for putting out the detection result in the slice failure detecting circuit 74 described in connection with FIGS. 27D–F, K–M is imparted to the AND gate G103 and the inverted signal thereof is imparted to the AND gates G97 and G98. Also, the output from the NAND gate G87 in FIGS. 27R-T for putting out the set signal to the setting terminal OL is imparted to the AND gate G99 and the inverted signal thereof is imparted to the OR gate G101. The output from the AND gate G92 in the detecting circuit for detecting the lens start in the preset focus mode described in connection with FIGS. 27R-T is imparted to the OR gate G103 and the output from the OR gate G93 is imparted to the OR gate G106 while, on the other hand, the inverted signal thereof is imparted to the AND gate G100. The input signal from the setting terminal SF is further imparted to the OR gate G101.

G108 designates an AND gate for putting out the count-up pulse $\phi_{CU}$ to the sequence counter CNT1 on the basis of the output from the OR gate G95 and the timing pulse TB5, DF10 denotes a D-type flip-flop for putting out the reset pulse $\phi_{CR}$ synchronized with the timing pulse TB0 to the counters CNT2 and CNT3 in response to the output from the AND gate G108, G109 and DF11 designate an AND gate and a D-type flip-flop for putting out the return pulse $\phi_{RT}$ (shown in FIGS. 16 and 21) synchronized with the timing pulse TB0 to the counters CNT1-CNT3 and the reset pulse $\phi'_{CR}$ (shown in FIG. 22—as already described, this is put out during the lens start in the preset focus mode) on the basis of the output signal from the OR gate G102 and the timing pulse TB5, G110 denotes an AND gate for putting out the count-up pulse $\phi_{C3U}$ (shown in FIGS. 17 and 18) synchronized with the timing pulse TB5 to the counter CNT3 in the sequence mode CC4, DF12 designates a D-type flip-flop for putting out the reset pulse $\phi_{C2R}$ (shown in FIG. 17) synchronized with the timing pulse TB0 to the counter CNT2 in response to the output from the AND gate G110, G111 denotes an OR gate from receiving as inputs the power up clear signal PUC put out from the timing control circuit 110, the return pulse $\phi_{RT}$ put out from the flip-flop DF11 and the reset pulse $\phi'_{CR}$ and imparting the same to the reset terminal of the sequence counter CNT1 on the OR condition, G112 designates an OR gate for putting out, on the OR condition, the reset pulse $\phi_{CR}$ put out from the flip-flop DF10, the return pulse $\phi_{RT}$ put out from the flip-flop DF11, the reset pulse $\phi'_{CR}$ and the reset pulse $\phi_{C2R}$ put out from the flip-flop DF12, G113 denotes an OR gate for imparting, on the OR condition, to the reset terminal of the counter CNT3 the reset pulse $\phi_{CR}$ put out from the flip-flop DF10, the return pulse $\phi_{RT}$ put out from the flip-flop DF12 and the reset pulse $\phi'_{CR}$, and G114 designates an OR gate for imparting, on the OR condition, to the clock input terminal of the counter CNT3 the carry signal of the counter CNT2 put out from the sequence control circuit 70 during the control of the accumulation time of the line sensor 30 in the sequence mode CC1, the count-up pulse $\phi_{C3U}$ put out from the AND gate G110, and the pulse signal representing the amount of movement of the lens which is put out from the OR gate G91 in the pulse converting circuit, described in connection with FIGS. 27R-T during the movement of the phototaking lens in the preset focus mode. These constitute the counter control circuit 90 shown in FIG. 9.

The output from the AND gate G110 (namely, the countup pulse $\phi_{C3U}$ to the counter CNT3) is utilized as the data introduction instruction signal $\phi_{DI}$ (shown in FIGS. 17 and 18) to the NAND gate G22 constituting the select gate circuit 78 on the input side of the shift register SR2 described in connection with FIGS. 27D–F, K–M (the inverted signal thereof is imparted to the NAND gate G21) and also is imparted to the OR gate G31 as the reset pulse $\phi_{C4R}$ (shown in FIGS. 17 and 18) to the match counter CNT4 (accordingly, the count-up $\phi_{C3U}$, the data introduction instruction signal $\phi_{DI}$ and the reset pulse $\phi_{C4R}$ are the same pulse signal). The output from the AND gate G110 is imparted to the AND gate G107 with the output from the OR gate G40 in the output circuit 108 described in connection with FIGS. 27D-F. K-M, whereby from the AND gate G107, a strobe signal STr' (shown in FIGS. 17 and 18) for causing the count of the counter CNT3, namely, the data regarding the amount of relative shift of the reference field data DB to the standard field data DA, to be introduced into the shift register PSR2 only under the condition of "content of PST1≧content of SR6" is put out in the sequence mode CC4.

G115 designates an AND gate for creating an alarm condition during the semi auto mode in the servofocus mode and during the preset focus mode on the basis of the output from the AND gate G96 and the inverted signal of the set signal to the setting terminal SF, and this is included in the sequence control circuit 70.

Lastly, FIGS. 27A-C, G-J shows details of the essential portions of the up-down counter U/D CNT, counter control circuit 88, decoder circuit 92 and sequence control circuit 70 in the construction shown in FIG. 9.

In FIGS. 27A-C, G-J, DF13, DF14 and DF15 designate D-type flip-flops which constitute the up-down counter U/D CNT shown in FIG. 9.

PLA1 designates a programmable logic array for decoding the count output of the sequence counter CNT1, PLA2 designates a programmable logic array for decoding the count output of the counter CNT2, PLA3 denotes a programmable logic array for decoding the count output of the counter CNT3, PLA4 denotes a programmable logic array for decoding the Q output of the flip-flops DF13-DF15 (namely, the up-down counter U/D CNT). These constitute the decoder circuit 92 shown in FIG. 9.

PLA6, G116, G117, G118 and G119 denote a programmable logic array and NOR gates for controlling the flip-flops DF13-DF15 on the basis of the discrimination outputs ITO and ITU from the discrimination circuit 68 of FIG. 7B imparted through input terminals O and U, the outputs of the first and second arrays of the programmable logic array PLA4, the Q and $\overline{Q}$ outputs of the flip-flops DF13-DF15 and the control signal from the sequence control circuit 70, and these constitute the counter control circuit 88 shown in FIG. 9.

G120 designates an AND gate for putting out the integration clear pulse $\phi_{IC}$ (shown in FIG. 13) synchronized with the timing pulse TB5 to the line sensor 30 immediately after the start of the sequence mode CC1, on the basis of the outputs of the programmable logic arrays PLA1-PLA3, and the output pulse from the AND gate G120 is put out through an output terminal IC as the integration clear pulse $\phi_{IC}$. G121 designates an OR gate for putting out, on the basis of the outputs of the programmable logic arrays PLA1-PLA4, a signal representing the termination of the count of the set accumulation time for the line sensor 30 in the sequence mode CC1, namely, a signal representing the termination of the sequence mode CC1, and the output of this OR gate G121 is imparted to the OR gate G95 shown in FIGS. 27N-Q. G122 designates an AND gate for putting out, on the basis of the outputs of the programmable logic arrays PLA1 and PLA2, the shift gate pulse $\phi_{SH}$ (shown in FIGS. 13 and 15) synchronized with the timing pulse TB5 to the line sensor 30 immediately after the start of the sequence mode CC2, and the output pulse from this AND gate G122 is put out through the output terminal SH as the shift gate pulse $\phi_{SH}$. JF7 designates a JK-type flip-flop adapted to be maintained in reset condition during the time until the sequence mode CC7 is reached for the first time after the closing of the main switch and to be reset at the point of time whereat the sequence mode CC7 has been reached for the first time, and JF8 designates a Jk-type flip-flop for putting out, on the basis of the output of the OR gate G121 and the outputs of the programmable logic arrays PLA1 and PLA2, the dark reset signal $\phi_{DR}$ (shown in FIG. 15) to the dark current signal detecting and holding circuit 52 of FIG. 7A in the sequence mode CC2, and the Q output of the flip-flop JF8 is put out through an output terminal DR as the dark reset signal $\phi_{DR}$. JF9 designates a JK-type flip-flop for putting out, on the basis of the output of the OR gate G121 and the outputs of the programmable logic arrays PLA1 and PLA2, the peak reset signal $\phi_{PR}$ (shown in FIG. 15) to the peak value detecting circuit 58 in the sequence mode CC2, and the Q output of the flip-flop JF9 is put out through an output terminal PR as the peak reset signal $\phi_{PR}$. JF10 denotes a JK-type flip-flop for putting out, on the basis of the output of the OR gate G121 and the outputs of the programmable logic arrays PLA1 and PLA2, the dark detect signal $\phi_{DD}$ (shown in FIG. 15) to the dark current signal detecting and holding circuit 52 in inverted logic in the sequence mode CC2, and the Q output of this flip-flop JF10 is inverted by an inverter I2 and put out through an output terminal DD as the dark detect signal $\phi_{DD}$. JF11 designates a JK-type flip-flop for putting out, on the basis of the output of the OR gate 121 and the outputs of the programmable logic arrays PLA1 and PLA2, the peak detect signal $\phi_{PD}$ (shown in FIG. 15) to the peak value detecting circuit 58 in inverted logic in the sequence mode CC2, and the Q output of the flip-flop JF11 is inverted by an inverter I3 and put out through an output terminal PD as the peak detect signal $\phi_{PD}$. The Q output of the flip-flop JF11 is imparted as the standard field data input signal $\phi_{SI}$ (shown in FIG. 15) to the NAND gate G14 constituting the select gate circuit 76 on the input side of the shift register SR1 described in connection with FIGS. 27D-F, K-M (the inverted signal thereof is imparted to the NAND gate G15) and is also imparted to the OR gate G13. JF12 designates a JK-type flip-flop for putting out, on the basis of the outputs of the programmable logic arrays PLA1 and PLA2, the reference field data input signal $\phi_{RI1}$ (shown in FIG. 15) to the select gate circuit 78 on the input side of the shift register SR2, and the Q output of the flip-flop JK12 is imparted as the reference field data input signal $\phi_{RI1}$ to the NAND gate G19 constituting the select gate circuit 78 described in connection with FIGS. 27D-F, K-M (the inverted signal thereof is imparted to the NAND gate G20). JF13 designates a JK-type flip-flop for putting out, also on the basis of the outputs of the programmable logic arrays PLA1 and PLA2, the reference field data input signal $\phi_{RI2}$ (shown in FIG. 15) to the select gate circuit 80 on the input side of the shift register SR3 in the sequence mode CC2, and the Q output of the flip-flop JF13 is imparted as the reference field data input signal $\phi_{RI2}$ to the NAND gate G24 constituting the select gate circuit 80 described in connection with FIGS. 27D-F, K-M (the inverted signal thereof is imparted to the NAND gate G25). The Q outputs of these flip-flops JF12 and JF13 are imparted to the OR gate G13 in FIGS. 27D-F, K-M through the OR gate G123 and thus, the OR gate G13 imparts said data introduction instruction signal $\phi_{SD}$ (shown in FIG. 15) to the AND gates G4 and G5 constituting the slice failure detecting circuit 74, upon the OR condition of said data input signals $\phi_{SI}$, $\phi_{RI1}$ and $\phi_{RI2}$. Jf14 denotes a JK-type flip-flop for putting out, on the basis of the outputs of the programmable logic arrays PLA1 and PLA2, the hold reset signal $\phi_{HR}$ (shown in FIG. 16) to the peak value holding circuit 60 of FIG. 7B in the sequence mode CC3, and the Q output of the flip-flop JF14 is put out through an output terminal HR as the hold reset signal $\phi_{HR}$. JF15 designates a JK-type flip-flop for putting out, on the basis of the outputs of the programmable logic arrays PLA1 and PLA2, the peak hold signal $\phi_{PH}$ (shown in FIG. 16) to the peak value holding circuit 60 in inverted logic in the sequence mode CC3, and the Q output of the flip-flop JF15 is inverted by an inverter 14 and put out through an output terminal PH as the peak hold signal $\phi_{PH}$. JF16 denotes a JK-type flip-flop for putting out, also on the basis of the outputs of the programmable logic arrays PLA1 and PLA2, the bypass circulation instruction signal $\phi_{BP1}$ (shown in FIG. 16) to the select gate circuit 76 on the input side of the shift register SR1 in the sequence mode CC3, and the Q output of the flip-flop JF16 is imparted as the bypass circulation instruction signal $\phi_{PB1}$ to the NAND gate G16 constituting the select gate circuit 76, through the OR gate G18 shown in FIGS. 27D-F, K-M (the inverted signal thereof is imparted to the NAND gate G15). Incidentally, the bypass circulation instruction signal $\phi_{BP2}$ (shown in FIG. 17) imparted to the select gate circuits 76 and 78 in the sequence mode CC4 and the control signal $\phi_{PC1}$ (shown in FIG. 17) to the pulse control circuit 82 are directly put out as the same signal from the programmable logic array PLA1, and the bypass circulation instruction signal $\phi_{BP2}$ is imparted to the NAND gate G21 constituting the select gate circuit 78 described in connection with the FIGS. 27D-F, K-M, (the inverted signal thereof is imparted to the NAND gate G20) and is also imparted to the NAND gate G16 through the OR gate G18 (the inverted signal thereof is imparted to the NAND gate G15) while, on the other hand, the control signal $\phi_{PC1}$ is imparted to the NAND gate G27 constituting the pulse control circuit 82 described in connection with FIGS. 27D-F, K-M and is also imparted to the NAND gate G30. JF17 designates a JK-type flip-flop for putting out, on the basis of the outputs of the programmable logic arrays PLA1 and PLA2, the control signal $\phi_{PC2}$ (shown in FIG. 17) to the pulse control circuit 82 in the sequence mode CC4, and the Q output of the flip-flop JF17 is imparted as the control signal $\phi_{PC2}$ to the NAND gate G28 constituting the pulse control circuit 82 described in connection with FIGS. 27D-F, K-M. G124 designates an AND gate for putting out, on the basis of the outputs of the programmable logic arrays PLA1 and PLA2, a signal for setting the period of CC4B (shown in FIG. 17) in the sequence mode CC4, and the output of the AND gate G124 is imparted to the AND gate G52 shown in FIGS. 27R-T. Incidentally, the Q output of the flip-flop DF5 in the output circuit 108 described in connection with FIGS. 27D-F, K-M is being imparted to the AND gate G52, whereby this AND gate G52 opens the NAND gate G49 constituting the select gate circuit 86 on the input side of the shift register SR6, during the period of CC4B, only under the condition of "content of PSR1≧content of SR6", thereby causing the output data of the shift register PSR1 to be introduced into the shift register SR6. The period of CC4A (shown in FIG. 17) preceding the period of CC4B is directly set by the outputs of the programmable logic arrays PLA1 and PLA2, and the output signal for setting this period of CC4A is imparted to the AND gate G64 and NOR gate G71 constituting the select gate circuit 104 in FIGS. 27R-T and is also imparted to the AND gate G110 constituting the counter control circuit 90 in FIGS. 27N-Q. 15 designates an inverter for inverting the output signals of the programmable logic arrays PLA1 and PLA2 for setting the period of CC4A, and the output of this inverter 15 is imparted to the NAND gate G30 in FIGS. 27D-F, K-M and thus, the NAND gate G30 puts out the control signal $\phi_{CC}$ (shown in FIG. 17) to the OR gate G94 on the basis of the output signal of the inverter 15 and the control signal $\phi_{PC1}$ imparted to the pulse control circuit 82. The strobe signal Str for causing the count of the counter CNT4 to be introduced into the shift register PSR1 in the sequence mode CC4 is directly put out from the programmable logic arrays PLA1 and PLA2. Also, the control signal $\phi_{C3E}$ (shown in FIG. 16) put out to reset the counter CNT4 and clear the shift register SR6 at the point of time whereat the sequence mode CC3 has been terminated is directly put out from the programmable logic arrays PLA1 and PLA2, and this is imparted to the OR gate G31 shown in FIGS. 27D-F, K-M while, on the other hand, it is imparted in inverted logic to the AND gate G51 constituting the select gate circuit 86 on the input side of the shift register SR6 shown in FIGS. 27R-T. This control signal $\phi_{C3E}$ is also imparted to the flip-flops JF15, JF16 and AND gates G97, G103 in FIGS. 27N-Q and the programmable logic array PLA6. The periods of CC6A and CC6B (shown in FIG. 21) in the sequence mode CC6 are directly set by the outputs of the programmable logic arrays PLA1 and PLA2, and the output signal for setting the period of CC6A is imparted to the NAND gate G65 constituting the select gate circuit 104 described in connection with FIGS. 27R-T and is also imparted to the NOR gate G71, and the output of the NOR gate G71 is imparted to the other NAND gate G69 constituting the select gate circuit 104 and to the NAND gates G61 and G62 constituting the select gate circuit 102 and is also imparted in inverted logic to the NAND gate G60 and thus, during the period of CC6A, the output data of the shift register SR6 (namely, the maximum coincidence number data obtained in the sequence mode CC4) is selected in the select gate circuit 102 while the output data of the first array of the programmable logic array PLA7 (namely, the allowable minimum coincidence number data) is selected in the select gate circuit 104. On the other hand, the output signal for setting the period of CC6B is imparted to the AND G56 in FIGS. 27R-T with the inverted signal of the Q output of the flip-flop DF5 constituting the output circuit 108 described in connection with FIGS. 27D-F, K-M, whereby under the condition of "content of SR6≧allowable minimum coincidence number", during this period of CC6B, the content of the shift register PSR2 is introduced into and stored in the shift register SR7 through the select gate circuit 96. The output signal for setting this period of CC6B is also imparted to the AND gates G98 and G104 shown in FIGS. 27N-Q JF18 and G125 respectively designates a JK-type flip-flop and an OR gate for putting out an alarm signal on the basis of the output of the AND gate G115 in FIGS. 27N-Q, the output of the programmable logic array PLA1 and the $\overline{Q}$ output of the flip-flop JF7, and the alarm signal is put out from the OR gate G125 through an output terminal ALM. G126, G127, G128, G129, DF16, JF19 and G130 designate AND gates, OR gates, D-type flip-flop and JK-type flip-flop for giving an instruction for causing the select gate circuit 72 to select the binary data DS based on the fixed slice level $V_F$, of the binary data DV and DS applied through input terminals V and S, and on the basis of the output of the programmable logic array PLA1, the input signal from the setting terminal SF, the output of the OR gate 116 and the output of the OR gate G125, namely, the alarm signal, a high level signal is put out from the OR gate G130 during the first data introduction immediately after the closing of the main switch, during the first data introduction after the one more focus requirement in the case of the semi auto mode in the servo focus mode and during the first data introduction immediately after the accumulation time for the line sensor 30 has been altered, and this is imparted to the NAND gate G2 constituting the select gate circuit 72 described in connection with FIGS. 27D-F, K-M and is also imparted in inverted logic to the NAND gate G1 to effect the introduction of the binary data DS. The above-described circuit groups constitute the major portion of the sequence control circuit 70.

In FIGS. 27A-C, G-J, P, CC1 (CNT) means the count of the carry signal of the counter CNT2 by the counter CNT3 in the sequence mode CC1, CC1 (O) means the period of "0" count of the counter CNT2 in the sequence mode CC1, CC3END means the end of the sequence mode CC3, CC2END means the end of the sequence mode CC2, CC0 means the sequence mode CC0, CC5END means the end of the sequence mode CC5, CC4END means the end of the sequence mode CC4, CC1END means the end of the sequence mode CC1, CC4 means the sequence mode CC4, CC2 (0) means the period of "0" count of the counter CNT2 in the sequence mode CC2, and CC7 means the sequence mode CC7, and signals representing these are all put out from the programmable logic arrays PLA1-PLA4 on the basis of the count outputs of the counters CNT1-CNT3 and U/D CNT.

The details of the construction of the digital circuit system shown in FIG. 9 are as described above. The digital circuit system shown in FIGS. 27A-27T performs an operation entirely similar to what has been described in connection with FIG. 9 and therefore, the operation thereof need not be described here.

As already described, FIG. 29 shows the setting conditions of various focus control modes for this digital circuit system.

In the construction of the digital circuit system described above, the servo focus control of the phototaking lens by the servo focus mode, the display of the focus adjusted condition of the phototaking lens by the focusmatic mode and the automatic focus control of the phototaking lens by the preset focus mode are possible, and description will now be made of an example of connection and construction of the output portion for these focus controls.

Figure 30:
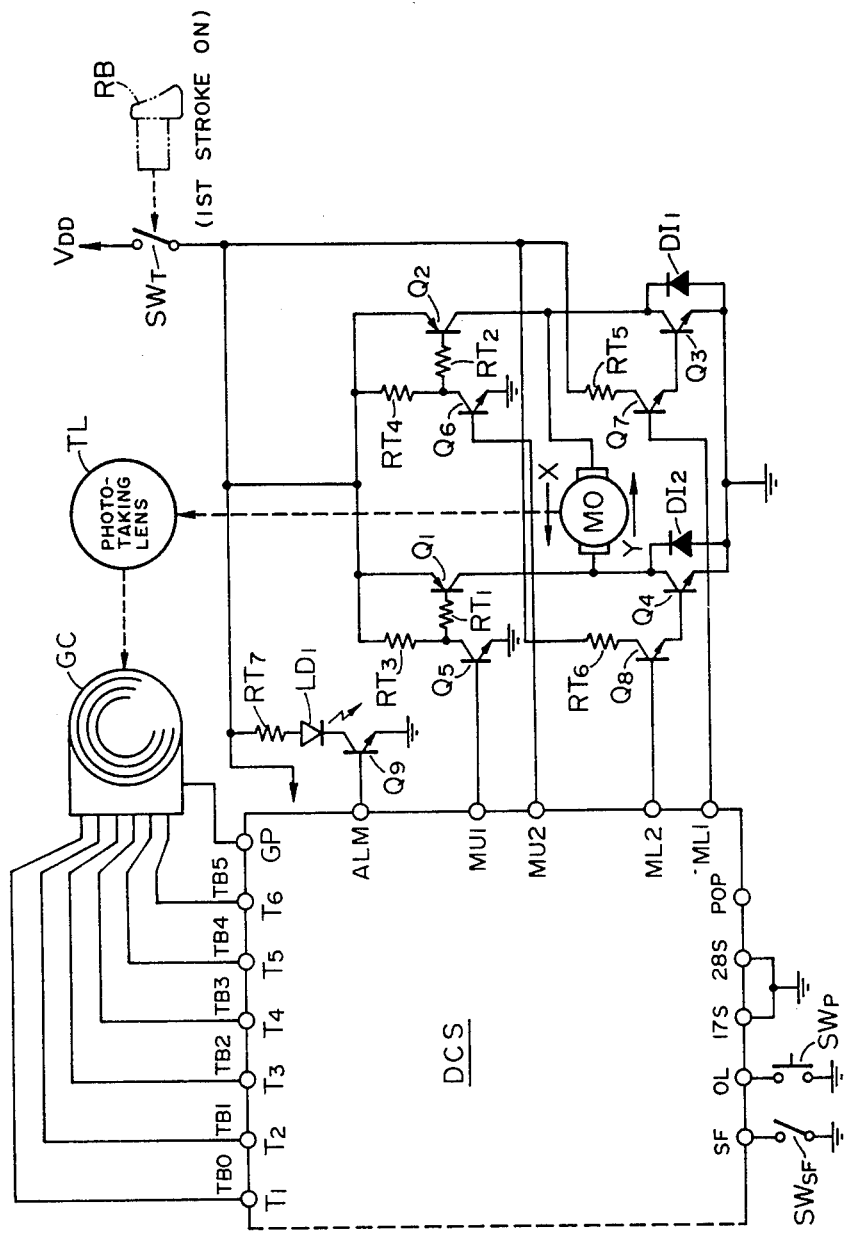
FIG. 30 is a circuit diagram showing an example of the construction for the servo focus control of the phototaking lens by the servo focus mode.
Figure 33:
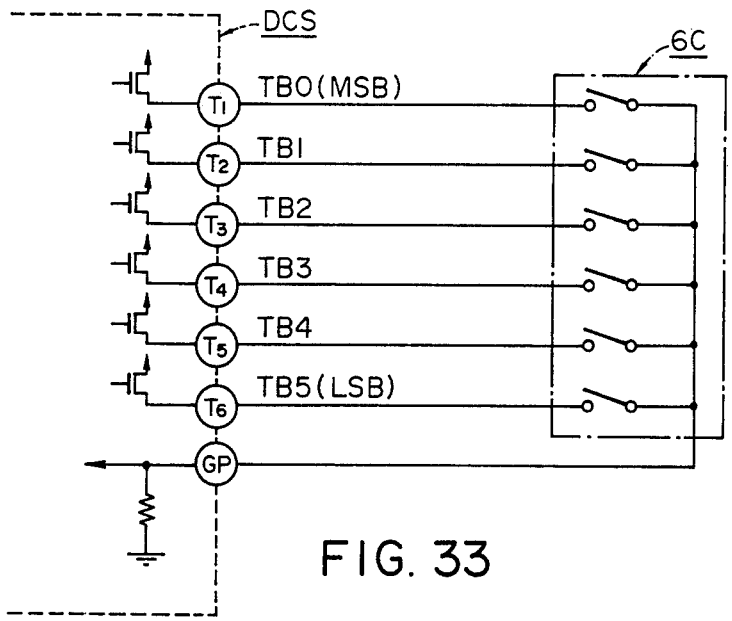
FIG. 33 is an equivalent circuit diagram showing the connection relation of the gray code plate in the servo focus or the focusmatic mode.
Figures 34, 35:
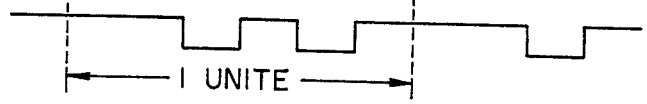
FIG. 34 is a timing chart showing a model of the gray code signal.
FIG. 35 shows the contrast during the conversion from the gray code signals into binary code signals.

FIG. 30 shows an example of the construction for the servo focus control of the phototaking lens by the servo focus mode. TL designates the phototaking lens and GC designates the gray code plate for putting out, in 6 bits gross, the gray code signal representing the position of the phototaking lens TL. The gray code plate GC has a printed plate having a conductor pattern and rotatable in response to the phototaking lens TL, for example, and six pairs of fixed brushes in sliding contact with the printed plate, and is constructed as a 6-bit gray code switch as equivalently shown in FIG. 33 and, as shown in the circumference thereof, one of each of the six pairs of brushes is connected to the input terminal GP of the digital circuit system DCS and the other brushes are connected to the timing pulse output terminals $T_1$-$T_6$ of the timing control circuit 110, whereby in accordance with the combination of the opening-closing of these six gray code switches, a gray code signal of 6 bits gross is imparted in bit series to the input terminal GP with the period of the timing pulses TB0-TB5 as one unit. FIG. 34 shows a model of the gray code signal imparted to the input terminal GP. The gray code signal introduced through an input terminal GP is converted into a binary code signal by the gray-binary converting circuit 98 and in the present embodiment, the conversion from the gray code into a binary code is effected in accordance with the gray-binary conversion code shown, for example, in FIG. 35. A binary code "0" represents the infinity adjusted position and a binary code "42" represents the adjustable shortest distance position of the phototaking lens TL and accordingly, in the present embodiment, the controlled position of the phototaking lens TL is set to 43. Of the gray code signal of 6 bits gross in this case, the signal introduced by the timing pulse TB0 is treated as MBS, namely, the most significant bit signal, and the signal introduced by the timing pulse TB5 is treated as LSB, namely, the least significant bit signal. Incidentally, the gray code signal shown in FIG. 34 is "110101" and therefore, if this is converted into a binary code, it will become "38".

MO designates a servo motor for driving the phototaking lens TL, and it is connected between the junction between the collector of pnp transistor $Q_1$ and the collector of npn transistor $Q_4$ and the junction between the collector of pnp transistor $Q_2$ and the collector of npn transistor $Q_3$. $Q_5$, $Q_6$, $Q_7$ and $Q_8$ denote npn transistors having their bases connected to the output terminals MU1, MU2, ML1 and ML2, respectively, of the output circuit 108, and the bases of the transistors $Q_1$ and $Q_2$ are connected to the collectors of the transistors $Q_5$ and $Q_6$ through transistors $RT_1$ and $RT_2$, respectively, and the bases of the transistors $Q_3$ and $Q_4$ are connected to the emitters of the transistors $Q_7$ and $Q_8$, respectively, and the collectors of the transistors $Q_5$-$Q_8$ are connected to a main switch $SW_T$ through resitors $RT_3$, $RT_4$, $RT_5$ and $RT_6$, and the emitters of the transistors $Q_5$ and $Q_6$ are grounded. Also, the emitters of the transistors $Q_1$ and $Q_2$ are connected to the positive pole of the power source and the emitters of the transistors $Q_3$ and $Q_4$ are grounded. $DI_1$ and $DI_2$ designate reversely connected in parallel to the transistors $Q_3$ and $Q_4$ and these are for quickly stopping the motor MO. In the construction of the digital circuit DCS (FIGS. 27A-27D) according to the present embodiment, the output signals from the output terminals MU1, MU2, ML1 and ML2 of the output circuit 108 in the servo focus or the focusmatic mode are as shown in FIG. 36.

$LD_1$ designates an alarm desplaying light-emitting diode connected to the collector of npn transistor $Q_9$, with a protective resistor $RT_7$ connected to the main switch $SW_T$, and this transistor $Q_9$ has its base connected to the alarm signal output terminal ALM of the digital circuit system DCS and has its emitter grounded.

$SW_{SF}$ designates a full auto-semi auto mode changeover switch connected to the setting terminal SF. $SW_P$ designates a normally open push switch for effecting the focus lock in the full auto mode and the one more focus in the semi auto mode, and this is connected to the setting terminal OL. As will be seen from FIG. 29, in this case, the setting terminals 17C and 28S are both GNC-short-circuited and the setting terminal POP is opened. The digital circuit system DCS is adpated to be supplied with power upon closing of the main switch $SW_T$.

In such connection and construction, as already described, the output from the output terminal ALM is high during the time until the operation sequence of the system reaches the sequence mode CC7 for the first time after the closing of the main switch $SW_T$, in the case of the full auto mode (namely, the change-over switch $SW_{SF}$ off), and during the time from after closing of the main switch $SW_T$ until the operation sequence of the system reaches the sequence mode CC7 for the first time and during the time from after the one more focus requirement by the closing of the push switch $SW_P$ has occurred until the operation sequence reaches the sequence mode CC7, in the case of the semi auto mode (namely, the change-over switch $SW_{SF}$ on), and accordingly, in the meantime, transistor $Q_9$ remains conductive, so that the light-emitting diode $LD_1$ is turned on to effect the alarm display, but when the operation sequence of the system reaches the sequence mode CC7, the output from the output terminal ALM becomes low and accordingly, the transistor $Q_9$ becomes non-conductive, so that the light-emitting diode $LD_1$ is turned off to release the alarming condition. On the other hand, when the operation sequence reaches the sequence mode CC7, the comparison of the obtained effective distance data with the binary converted data, by the gray-binary converting circuit 98, of the gray code signal from the gray code plate GC representing the position of the phototaking lens and introduced through the input terminal GP is effected by the comparing circuit 106 and as the result, a signal representing the adjusted condition of the phototaking lens TL with respect to the object is put out in the form as shown in FIG. 36, by the output circuit 108 through the output terminals MU1, MU2, ML1 and ML2. Now, assuming that the phototaking lens TL is in forward focus condition, the outputs from the output terminals MU1, MU2, ML1 and ML2 at this time are low, high, low and high, respectively, as shown in FIG. 36, and accordingly, the transistors $Q_5$ and $Q_7$ are turned off while the transistors $Q_6$ and $Q_8$ are turned on, so that the transistors $Q_1$ and $Q_3$ are turned off while the transistors $Q_2$ and $Q_4$ are turned on and a current flows to the motor MO in the direction indicated by arrow X and thus, the motor MO begins to effect normal rotation, for example. Accordingly, if design is made such that by the normal rotation of the motor MO, the phototaking lens TL is adjusted toward the backward focus, namely, toward the long distance in-focus position and that by the reverse rotation of the motor MO, the phototaking lens TL is adjusted toward the forward focus, namely, toward the short distance in-focus position, then the phototaking lens TL is adjusted toward the ling distance side in this case. In the course of such adjustment, when the phototaking lens TL reaches its in-focus position with respect to the object, the effective distance data obtained at this time and the binary converted data from the gray-binary converting circuit 98 become coincident with each other and the outputs from the output terminals MU1, MU2, ML1 and ML2 become low, low, high and high, respectively, as shown in FIG. 36, whereby the transistor $Q_5$ remains turned off and the transistor $Q_8$ remains turned on while the transistor $Q_6$ is turned off and the transistor $Q_7$ is turned on, so that the transistor $Q_1$ remains turned off and the transistor $Q_4$ remains turned on while the transistor $Q_2$ is turned off and the transistor $Q_3$ is turned on and accordingly, the power supply to the motor MO is cut off while, at the same time, the counter electromotive force induced by the rotation of the motor MO flows to the motor MO in the direction of arrow Y through the closed circuit of diode $DI_2$ and transistor $Q_3$, so that the motor MO is quickly stopped and thus, the phototaking lens TL is stopped at in-focus position. On the other hand, in the case where the phototaking lens TL is in backward focus condition, the outputs from the output terminals MU1, MU2, Ml1 and ML2 become high, low, high and low, respectively, as shown in FIG. 36, conversely to the case of the forward focus condition, and accordingly, the transistors $Q_5$ and $Q_7$ are turned on while the transistors $Q_6$ and $Q_8$ are turned off, so that the transistors $Q_1$ and $Q_3$ are turned on while the transistors $Q_2$ and $Q_4$ are turned off and a current flows to the motor MO in the direction of arrow Y to reversely rotate the motor MO, whereby the phototaking lens TL is adjusted toward the short distance side. When the phototaking lens TL reaches the in-focus position, the transistor $Q_5$ is turned off and the transistor $Q_8$ is turned on, whereby the transistor $Q_1$ is turned off and the transistor $Q_4$ is turned on to cut off the power supply to the motor MO and at this time, the counter electromotive force induced by the rotation of the motor MO flows to the motor MO in the direction of arrow X through the closed circuit of diode $DI_1$ and transistor $Q_4$, so that the motor MO is quickly stopped and thus, the phototaking lens TL is stopped at the in-focus position.

In this connection and construction shown in FIG. 30, the servo focus control of the phototaking lens TL by the servo focus mode is carried out in the manner described above. Of course, in the full auto mode (switch $SW_{SF}$ off), when the object distance is varied, the phototaking lens is adjusted in accordance therewith. On the other hand, when the focus lock requirement by the closing of the switch $SW_P$ has occurred in the full auto mode, the phototaking lens TL is fixed to the once adjusted position until the switch $SW_P$ is opened, irrespective of the variation in the object distance. Of course, when the switch $SW_P$ is opened, the phototaking lens TL is re-adjusted to the in-focus position. Also, in the semi auto mode (switch $SW_{SF}$ on), the phototaking lens TL, once focused with respect to the object, is not caused to follow any variation in the object distance which my occur thereafter. Of course, in the case of this semi auto mode, the focusing of the phototaking lens can be effected any number of times in accordance with the one more focus requirement by the closing of the switch $SW_P$.

The embodiment shown in FIG. 30 is very suitable for motion picture cameras, TV camaras, etc., but when it is applied to these cameras, it will be convenient if the main switch $SW_T$ is designed to be closed, for example, in the first stroke of a two-stage push type camera trigger button RB, as conceptionally shown by dots-and-dash line in the Figure.

Figure 31:
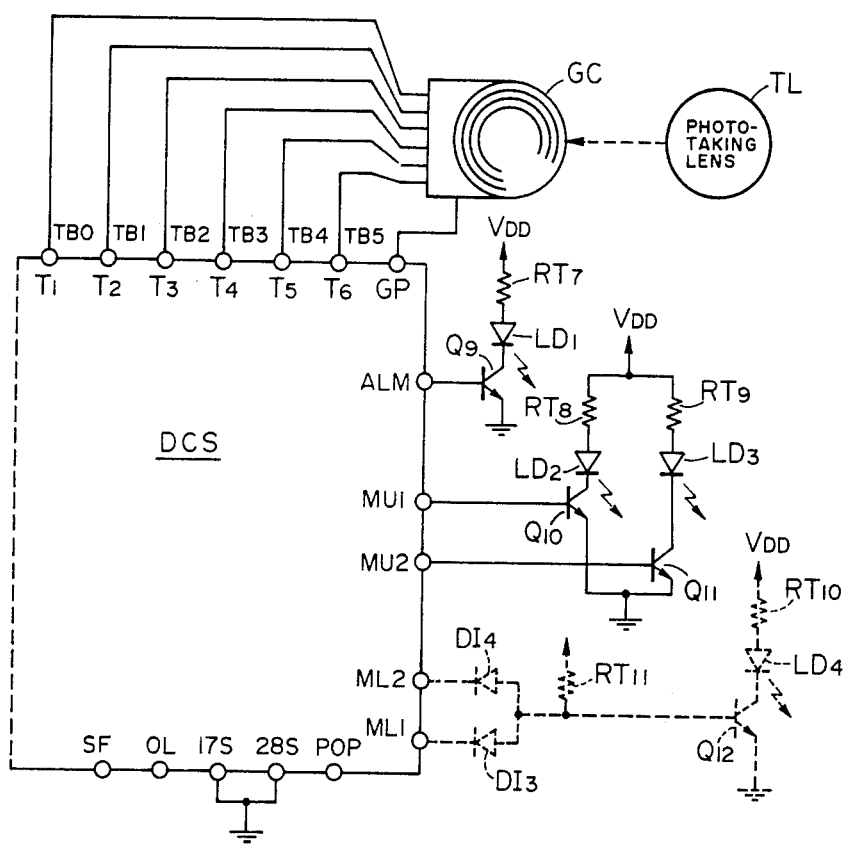
FIGS. 31 and 32 are circuit diagrams showing two examples of the construction for displaying the focus adjusted condition of the phototaking lens by the focusmatic mode.

FIG. 31 shows a first example of the construction for displaying the focus adjusted condition of the phototaking lens by the focusmatic mode. In FIG. 31, $LD_2$ and $LD_3$ designate displaying light-emitting dioes which, with resistors $RT_8$ and $RT_9$, are connected to the collectors of npn transistors $Q_{10}$ and $Q_{11}$, respectively, and the transistors $Q_{10}$ and $Q_{11}$ have their bases connected to the output terminals MU1 and MU2 and have their emitters grounded.

In such connection and construction, when the phototaking lens TL is in the forward focus condition, the outputs of the output terminals MU1 and MU2 become low and high, respectively, so that the transistor $Q_{10}$ is turned off and the transistor $Q_{11}$ is turned on and only the light-emitting diode $LD_3$ is turned on. On the other hand, when the phototaking lens is in the backward focus condition, the outputs of the output terminals MU1 and MU2 become high and low, respectively, so that the transistor $Q_{10}$ is turned on and the transistor $Q_{11}$ is turned off and only the light-emitting diode $LD_2$ is turned on. When the phototaking lens is in the in-focus condition, the outputs of the output terminals MU1 and MU2 both become low, so that the transistors $Q_{10}$ and $Q_{11}$ are both turned off and the light-emitting didoes $LD_2$ and $LD_3$ are neither turned on. Thus, the backward focus condition is displayed by the turn-on of the light-emitting diode $LD_2$, the forward focus condition is displayed by the turn-on of the light-emitting diode $LD_3$, and the in-focus condition is displayed by the turn-off of both light-emitting diodes $LD_2$ and $LD_3$.

In this case, the form in which the in-focus is displayed by the turn-off of both light-emitting diodes $LD_2$ and $LD_3$ gives the sense of uncertainty to the user of the camera and it is passive as the form of display and accordingly, in such case, if, as indicated by broken line in FIG. 31, a further light-emitting diode $LD_4$ is connected to the collector side of npn transistor $Q_{12}$ whose base, with a protective resistor $RT_{10}$, is connected to the positive pole of the power source through a resistor $RT_{11}$ and also connected to the output terminals ML1 and ML2 through reverse current preventing diodes $DI_3$ and $DI_4$, the base of the transistor $Q_{12}$ becomes low as long as the output of one of the output terminals ML1 and ML2 is low and therefore, the transistor $Q_{12}$ is turned off and, only when the outputs of the output terminals ML1 and ML2 are both high, the base of the transistor $Q_{12}$ is high and therefore, this transistor is turned on and thus, the in-focus display is effected by the turn-on of the light-emitting diode $LD_4$, instead of the turn-off of both light-emitting diodes $LD_2$ and $LD_3$. Incidentally, where only the light-emitting diode $LD_4$ is employed, the display of the directionality of the out-of-focus of the forward focus or the backward focus cannot be accomplished but at least the display of in-focus and non-in-focus can be accomplished.

Although the description has been delayed, the switches $SW_{SF}$ and $SW_P$ for the setting terminals SF and OL shown in FIG. 30 are usually omitted in the case of this focusmatic mode.

Figure 32:
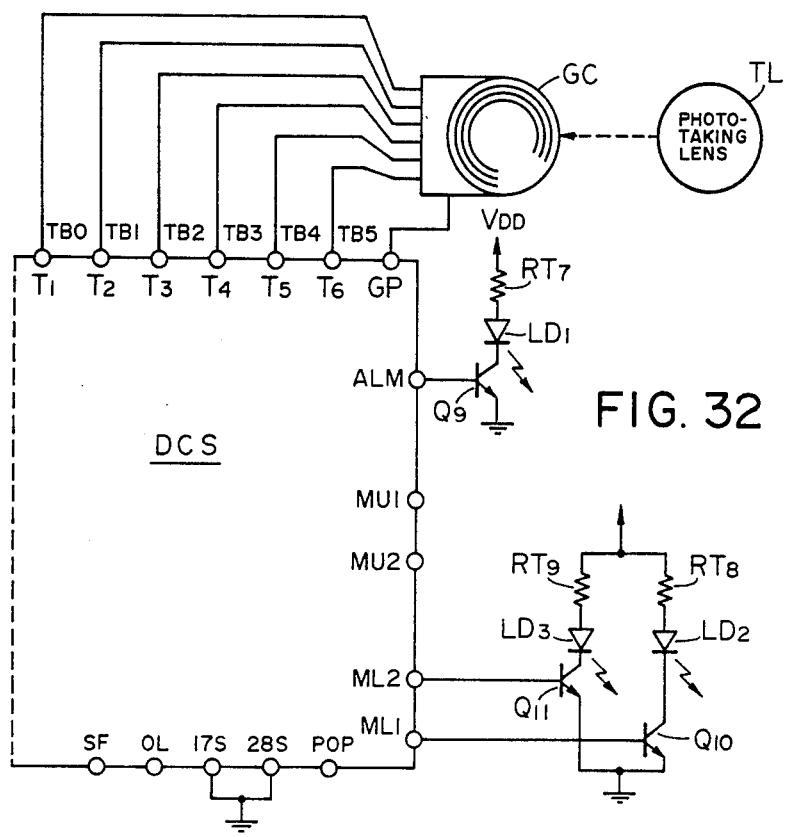

FIG. 32 shows a second example of the construction. In this construction, in constrast with the construstion shown in FIG. 31, the bases of transistors $Q_{10}$ and $Q_{11}$ are connected to the output terminals ML1 and ML2, respectively. That is, in such connection and construction, when the phototaking lens TL is in the forward focus condition, the outputs of the output terminals ML1 and ML2 become low and high, respectively, and therefore, the transistor $Q_{10}$ is turned off while the transistor $Q_{11}$ is turned on and, when the phototaking lens TL is in the backward focus condition, the outputs of the output terminals ML1 and ML2 become high and low, respectively, and therefore, the transistor $Q_{10}$ is turned on while the transistor $Q_{11}$ is turned off and, when the phototaking lens TL is in the in-focus condition, the outputs of the output terminals ML1 and ML2 become both high and therefore, the transistors $Q_{10}$ and $Q_{11}$ are both turned on and thus, the backward focus condition is displayed by the turn-on of the light-emitting diode $LD_2$, the forward focus condition is displayed by the turn-on of the light-emitting diode $LD_3$, and the in-focus condition is displayed by the turn-on of both of these light-emitting diodes $LD_2$ and $LD_3$.

FIG. 37 shows an example of the construction for the automatic focus control of the phototaking lens by the preset focus mode. In FIG. 37, PG designates a pulse generating plate fixedly disposed with respect to the phototaking lens TL and, as shown in FIG. 38, it has a combtooth-like conductor pattern and is connected to the input terminal GP of the digital circuit system DCS. BR designates a brush adapted to slide on the conductive pattern of the pulse generating plate PG in response to movement of the phototaking lens TL, and the brush BR is connected to the positive pole of the power source. $SP_1$ designates a spring for moving the phototaking lens TL, GN designates a governor mechanism connected to the phototaking lens TL, and $ST_1$ denotes a first stop adapted to be released by depression of a release button RB. The first stop $ST_1$ is rotatably supported by a shaft $AX_1$ and is biased counter-clockwisely by a spring $SP_2$, and is adapted to engage the governor mechanism GN under the action of the spring $SP_2$ to stop and hold the phototaking lens TL against the force of the spring $SP_1$. $ST_2$ denotes a second stop which is rotatably supported by a shaft AX and is biased counter-clockwisely by a spring $SP_3$ and is adapted to engage the governor mechanism GN under the action of the spring $SP_3$ to retain the phototaking lens TL against the force of the spring $SP_1$. MG designates an electromagnet for controlling the second stop $ST_2$. The electromagnet MG is connected to the collector side of npn transistor $Q_{13}$, whose base is connected to the junction between the emitter of npn transistor $Q_{14}$ having its base connected to the output terminal MU1 of the digital circuit system DCS and a grounded resistor $RT_{13}$. The collector side of the transistor $Q_{14}$ is connected to the positive pole of the power source through a resistor $RT_{12}$. $DI_5$ is for extinguishing the counter electromotive force generated during the deenergization of the electromagnet MG. Here, the phototaking lens TL is moved to the infinity in-focus position during the film advance and shutter charge, for example, by a mechanism operatively associated with a film advance and shutter charge mechanism (at this time, the spring $SP_1$ for moving the phototaking lens is charged) and is locked at this position by the first stop $ST_1$ (incidentally, the construction of such mechanism may be, for example, the construction as disclosed in our German Patent Publication No. 2,800,448) and in this condition, the brush BR is in in contact with the conductor pattern of the pulse generating plate PG, as shown in 38, and accordingly, the input from the input terminal GP at this time is high. When the movement of the phototaking lens toward the short distance in-focus position is started, the brush BR slides on the pulse generating plate PG in the direction indicated by arrow Z in FIG. 38 and at this time, from the pulse output circuit described in connection with FIG. 27B (namely, the circuit comprising flip-flop DF9, AND gates G88, G89 and OR gate G91), each one pulse is put out at the position a and the position b of the pulse generating plate PG.

$SW_S$ designates a normally open switch adapted to be closed manually, or by mounting of a strobe device to the camera, or in the case of a strobe-containing camera, by the setting of the camera to the stroboscopic photography mode, and this switch is connected to the setting terminal POP. In the shown example, the setting terminal 17S is pulled up by the source voltage $V_{DD}$ and the setting terminal 28S is GND-short-circuited and accordingly, the system is in the focus control mode with respect to the f1.7 lens, but in the case of the focus control with respect to the f2.8 lens, the setting terminal 28S is pulled up by the source voltage $V_{DD}$ and the setting terminal 17S is GND-short-circuited. In this case, as will be seen from FIG. 29, the setting terminal SF is GND-short-circuited and the setting terminal OL is opened.

Now, in such construction, when the main switch is closed with the phototaking lens TL set to the infinity in-focus position and locked at such position by the first stop $ST_1$, the circuit system is operated to start the detection of the distance to the object and in this mode, the output from the output terminal MU1 becomes high simultaneously with the closing of the main switch, whereby transistor $Q_{14}$ is turned on, so that transistor $Q_{13}$ is turned on to energize the magnet MG and accordingly, the second stop $ST_2$ is attracted by the magnet MG and held at its released position. In this condition, the brush BR is at the position V on the pulse generating plate PG as shown in FIG. 38, namely, in contact with the conductor pattern and accordingly, the input from the input terminal GP has become high by this time. On the other hand, as already described, in the operation of the circuit system, the output from the output terminal ALM has become high by the time when the operation sequence of the circuit system reaches the sequence mode CC7 and accordingly, in the meantime, the light-emitting diode $LD_1$ is turned on to provide an alarming condition. When the operation sequence mode CC7 is reached, the output from the output terminal ALM changes to low, whereby the light-emitting diode $LD_1$ is turned off to release the alarming condition while, at the same time, the operation sequence of the circuit system is stopped at this sequence mode CC7 and, at this point of time, the effective distance data stored in the shift register SR7 is imparted to one input of the comparing circuit 106 through the select gate circuit 102. In this condition, when the release button RB is depressed to release the first stop $ST_1$, the phototaking lens TL begins to be moved toward the short distance in-focus position by the action of the moving spring $SP_1$ and at this time, as will be seen from FIG. 38, the brush BR initially shifts to a position W on the pulse generating plate PG, whereby the input from the input terminal GP becomes low. When the input from the input terminal GP becomes low, the sequence control circuit 70 causes the reset pulse $\phi_{CR}$ (shown in FIG. 22) synchronized with the timing pulse TB0 to be imparted to the counters CNT1-CNT3 by the counter control circuit 90 to reset these counters CNT1-CNT3, thereby returning the operation sequence of the circuit system to the sequence mode CC0. When the input from the input terminal GP is changed in such a manner as low→high→low→high . . . by the sliding movement of the brush BR resulting from the movement of the phototaking lens TL, the sequence control circuit 70 puts out each one pulse at the position a and the position b of the pulse generating plate PG shown in FIG. 38, in response to the change of the input from the terminal GP from low to high and from high to low and causes the same pulse to be counted by the counter CNT3 through the counter control circuit 90 while, on the other hand, it causes the count of the counter CNT3 at this time to be sampled by the shift register PSR2 for each timing pulse TB5 and also causes the output of the shift register PSR2 at this time to be imparted to the other input of the comparing circuit 106 through the select gate circuit 104. Thus, the effective distance data from the shift register SR7 and the data from the shift register PSR2 representing the position of the phototaking lens TL are imparted to the comparing circuit 106, which thus compares these two input data and puts out a coincidence signal when the output data of the shift register PSR2 becomes coincident with the output data of the shift register SR7 in the course of movement of the phototaking lens TL. When the coincidence signal is put out from the comparing circuit 106, the output circuit 108 immediately renders low the output from the output terminal MU1 in response thereto, whereby transistor $Q_{14}$ is turned off and therefore, transistor $Q_{13}$ is turned off and accordingly, the magnet MG is deenergized. By this, the second stop $ST_2$ is released from the attraction of the magnet MG, so that under the action of the spring $SP_3$, the second stop engages the governor GN to stop the phototaking lens TL, thus locking the phototaking lens TL at the in-focus position.

Incidentally, where the movement of the phototaking lens TL is started before the operation sequence of the circuit system reaches the sequence mode CC7, that is, before the light-emitting diode $LD_1$ is turned off, since, as previously described, the fixed distance data from the fixed distance data output circuit 100 is selected by the select gate circuit 102 before the sequence mode CC7 is reached, the comparing circuit 106 puts out a coincidence signal at the point of time whereat the output data of the shift register PSR2 has become coincident with the output data of the fixed distance data output circuit 100 (in this case, the system is set to the focus control mode for the f1.7 lens and therefore, when the switch $SW_S$ is open, namely, during normal photography, the distance data indicating about 6 m is put out from the fixed distance data output circuit 100 and when the switch $SW_S$ is closed, namely, during stroboscopic photography, the distance data indicating about 2.5 m is put out from the fixed distance data output circuit 100) and accordingly, in this case, the phototaking lens TL is locked at a position indicated by the output data from the fixed distance data output circuit 100.

In the connection and construction shown in FIG. 37, the automatic focus control of the phototaking lens TL by the preset focus mode is carried out in the manner described above.

The above-described stroboscopic photography mode setting switch $SW_S$ may be provided, for example, on the accessory shoe of the camera in order that it may be closed by the mounting of the strobe device onto the camera, or in the case of the strobe strobo-containing camera of the well-known pop-up type (namely, the camera of such a construction in which the strobe unit contained therein is popped up when the camera is set to the stroboscopic photography mode), the switch $SW_S$ may be designed so as to be closed by the pop-up of the strobe strobo unit contained in the camera. Also, this need not always be a mechanical contact switch but may be replaced, for example, by a semiconductor switching element adapted to conduct by the charge completion signal of the main capacitor in the strobo device.

The distance detecting device according to the present invention and an embodiment of the focus control system utilizing the same have been described above and now, some examples of partial improvements over the above-described embodiment will be described.

As described in connection with FIG. 4, the line sensor 30 has a portion DM (dark current detecting area) of the light-receiving portion 32 thereof shielded from light by a method such as Al vaporization or the like and, during the read-out of the line sensor output, a signal corresponding to the output from the dark current detecting area DM is detected and held as the dark current signal by the dark current signal detecting and holding circuit 52 shown in FIG. 7A, whereby the output subsequently read out is subjected to the treatment of removing the dark current component in the differential amplifier circuit 54, and here, for example, in the servo focus or the focusmatic mode, when the intensity of light incident on the light-receiving portion 32 has been sharply and extremely increased in the condition in which accumulation of image signal is being effected under a relatively long accumulation time, the intensity of leakage light incident from the end face of the light-shielding layer for the dark current detecting area DM, particularly, the end face which is adjacent to the dummy bit $D_2$, onto the sensor elements in the dark current detecting area DM is increased to extremely increase the amount of accumulated charges in these sensor elements and accordingly, the level of the dark current signal component detected and held by the dark current signal detecting and holding circuit 52 during the read-out of the line sensor output is extremely increased, so that the level of the signal of the subsequently read-out output after the dark current component thereof has been removed by the differential amplifier circuit 54 becomes very low, whereby the peak level of the signal component corresponding to the output from the standard field area A detected by the peak detecting circuit 58 is reduced and therefore, the output ITU from the comparator $CP_7$ in the discrimination circuit 68 shown in FIG. 7B becomes high and the accumulation time for the line sensor 30 is changed over to the long time side although it should originally be altered to the short time side, and this may lead to occurrence of further undesirable situations.

Figure 39A:
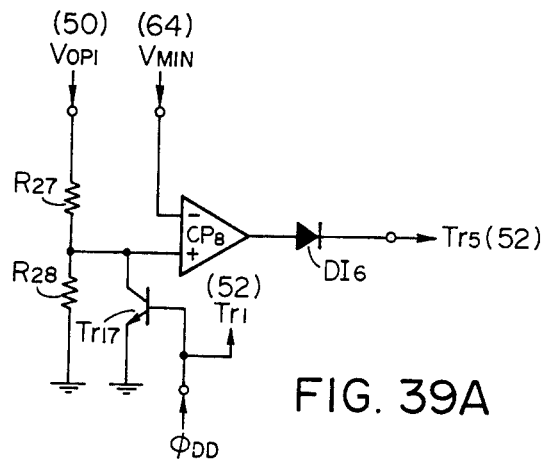
FIG. 39(a), (b) and (c) are partial circuit diagrams showing three examples of the improvement for meeting the inconvenience which may arise when the dark current component of the image sensor output is extremely increased.

To prevent such situations, as shown in FIG. 39(a), for example, a circuit comprising a comparator $CP_8$ adapted to receive at its non-inverting input the divided voltage value of the output $V_{OP1}$ of the differential amplifier circuit 50 of FIG. 7A by resistors $R_{27}$ and $R_{28}$ and to receive at its inverting input the lower limit voltage $V_{MIN}$ set by the standard voltage setting circuit 64 of FIG. 7B, and npn transistor $T_{r17}$, similar to the transistor $T_{r1}$ in the dark current signal detecting and holding circuit 52, to the base of which the dark detect signal $\phi_{DD}$ (shown in FIGS. 8 and 15) is imparted to thereby limit the input to the comparator $CP_8$ to the signal corresponding to the output from the dark current detecting area DM, may be attached to the dark current signal detecting and holding circuit 52 so that the output of the comparator $CP_8$ may be imparted through a diode $DI_6$ to the base of the stored value clearing transistor $T_{r5}$ in the dark current signal detecting and holding circuit 52. According to such connection and construction, when the level of the signal component corresponding to the output from the dark current detecting area DM, namely, the dark current signal component, is extremely increased during the read-out of the line sensor output and the level of the divided voltage by the resistors $R_{27}$ and $R_{28}$ exceeds the lower limit voltage $V_{MIN}$, the output of the comparator $CP_8$ changes from low to high and therefore, the stored value clearing transistor $T_{r5}$ in the dark current signal detecting and holding circuit 52 is turned on so that the stored value of the dark current signal storing capacitor $C_1$ is cleared and accordingly, the treatment of removing the dark current component from the subsequently read-out output by the differential amplifier circuit 54 is hardly carried out and so, the level of said output is increased, whereby the peak level of the signal component corresponding to the output from the standard field area A detected by the peak value detecting circuit 58 exceeds the upper limit voltage $V_{MAX}$ set by the standard voltage setting circuit 64 and therefore, the accumulation time for the line sensor 30 is changed over to the short time, thus preventing the above-described situations.

Figure 39B:
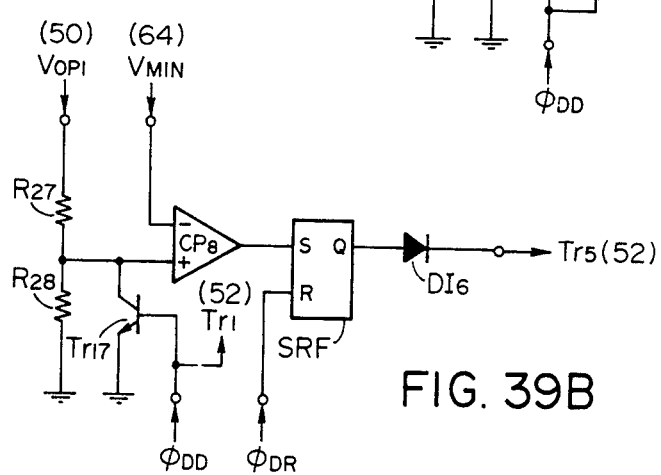

Incidentally, in the construction shown in FIG. 39(a), as long as the divided voltage level, by the resistors $R_{27}$ and $R_{28}$, of the dark current signal component corresponding to the output from the dark current detecting area DM exceeds the lower limit voltage $V_{MIN}$ during the read-out of the line sensor output, the transistor $T_{r5}$ is turned on by the output of the comparator $CP_8$ and therefore, the stored value of the capacitor $C_1$ continues to be cleared and, when the level of the dark current signal component is decreased and the divided voltage level thereof by the resistors $R_{27}$ and $R_{28}$ becomes lower than the lower limit voltage $V_{MIN}$, the output of the comparator $CP_8$ becomes low and therefore, the transistor $T_{r5}$ is turned on to effect the charging of the capacitor $C_1$ and accordingly, in some cases, the subsequently read-out output is slightly subjected to the treatment of removing the dark current component while, on the other hand, if the output of the comparator $CP_8$ becomes high even once during the read-out of the line sensor output, the clearing of the capacitor $C_1$ may be continued thereafter so that the treatment of removing the dark current component from the subsequently read-out output may not be carried out at all. For that purpose, as shown in FIG. 39(b), for example, the output of the comparator $CP_8$ may be imparted to the set terminal S of a rising synchronous SR-type flip-flop SRF whose reset terminal R is adapted to receive the dark reset signal $\phi_{DR}$ (shown in FIGS. 8 and 15) and the Q output of this flip-flop SRF may be imparted to the base of the transistor $T_{r5}$ through a diode $DI_6$.

Figure 39C:
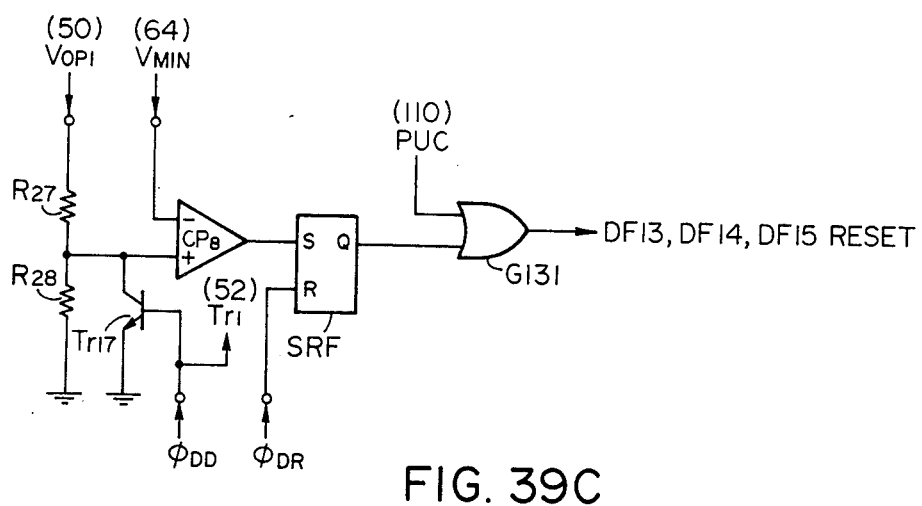

Both of the foregoing two examples aim at the effect of substantially nullifying the treatment of removing the dark current component for the line sensor output and increasing the level of the image signal to thereby change over the accumulation time to the short time side, but instead of adopting such a method of increasing the image signal level, it may also be adopted to utilize the high output of the comparator $CP_8$ to forcibly set the accumulation time to the shortest time (96 $\mu$sec.). For that purpose, as shown in FIG. 39(c), for example, an OR gate G131 for taking the logic sum of the Q output of the flip-flop SRF and the power up clear signal PUC from the timing control circuit 110 may be provided so that the output of this OR gate G131 may be imparted to the reset terminals of the D-type flip-flops DF13, DF14 and DF15 shown in FIG. 27D (as already described, these flip-flops DF13-DF15 constitute the up-down counter U/D CNT shown in FIG. 9). According to such construction, when the output of the comparator $CP_8$ changes from low to high, the flip-flop SRF is set thereby and the Q output thereof changes from low to high and therefore, the output of the OR gate G131 becomes high and accordingly, the flip-flops DF13-DF15 are reset and their Q outputs all become low, so that a signal "0" indicating the shortest accumulation time is put out from the programmable logic array PLA4 (which forms a part of the decoder circuit 92 shown in FIG. 9 and thus, the accumulation time is forcibly set to the shortest time 96 μsec.

Figure 40:
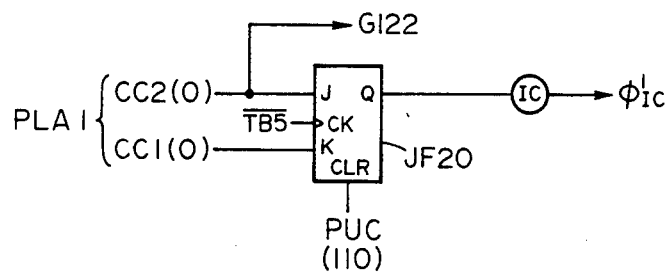
FIG. 40 is a partial circuit diagram showing a construction applied when the unnecessary charge clear signal to be imparted to the image sensor has been altered.
Figure 41:
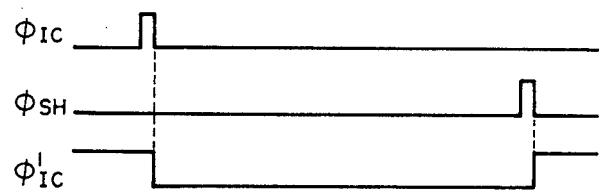
FIG. 41 is a timing chart showing the unnecessary charge clear signal obtained by the construction of FIG. 40.

The integration clear signal for clearing the unnecessary charges to be imparted to the antiblooming gates 44 and 46 (shown in FIG. 3) of the line sensor 30 is not limited to such a single pulse $\phi_{IC}$ (shown in FIGS. 5 and 13) as in the above-described embodiment, but may be, for example, a signal which becomes low only during the accumulation time designated by the output of the up-down counter U/D CNT and becomes high during the other time and in that case, the unnecessary charges of the line sensor 30 can be cleared more completely. For this purpose, as shown in FIG. 40, for example, a falling synchronous JK-type flip-flop JF20 adapted to receive at its K input a signal CC1(0) representing the first word of the sequence mode CC1 (namely, the period of "0" count of the counter CNT2) from the programmable logic array of FIG. 27D (which constitutes the sequence control circuit 70 of FIG. 9, as already described) and to receive at its J input a signal CC2(0) representing the first word of the sequence mode CC2 and also to receive at its clock input CK the inverted pulse $\overline{TB5}$ of the timing pulse TB5 may be provided instead of the AND gate G120 for putting out the integration clear pulse so that the Q output of the flip-flop JF20 may be imparted as the integration clear signal $\phi'_{IC}$ to the antiblooming gates 44 and 46 of the line sensor 30 through the output terminal IC. According to such construction, for the integration clear pulse $\phi_{IC}$ put out from the AND gate G120 for putting out the integration clear pulse and the shift gate pulse $\phi_{SH}$ put out from the AND gate G122 for putting out the shift gate pulse, the Q output of the flip-flop JF20 becomes such as shown in FIG. 41 and thus, the above-described intention is achieved.

Figure 42:
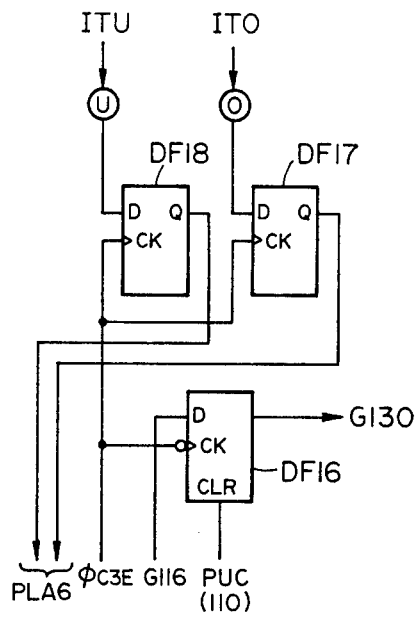
FIG. 42 is a partial circuit diagram showing an example of the improvement of the introducing portion for the discrimination result output from the discrimination circuit of FIG. 7B in the digital circuit of FIG. 27D.

Also, the discrimination outputs ITO and ITU from the discrimination circuit 68 of FIG. 7B introduced through the input terminals O and U are based on the premise that they have no hunting component, but when the level of the peak value $V_{PK}$ compared is at the very limit with respect to the level $V_{MAX}$ or $V_{MIN}$, hunting may occur and in such a case, the up-down counter U/D CNT for setting the accumulation time may cause malfunctioning due to the hunting. To meet such a situation, there may be provided, in the portion for introducing the discrimination outputs ITO and ITU, a latch circuit adapted to operate in synchronism with the rising of the inverted pulse $\overline{TB5}$ of the timing pulse TB5 or the signal $\phi_{C3E}$ (representing the end of the sequence mode CC3—shown in FIG. 16) put out from the programmable logic array PLA1 at the end of the sequence mode CC1. Incidentally, FIG. 42 shows an example in which D-type flip-flops DF17 and DF18 for latching the discrimination outputs ITO and ITU in synchronism with the rising of said signal $\phi_{C3E}$ are provided so that the Q outputs of the flip-flops DF17 and DF18 are imparted as the discrimination outputs ITO and ITU to the programmable logic array PLA6 of FIG. 27D (which constitutes the counter control circuit 88 shown in FIG. 9).

Figure 43:
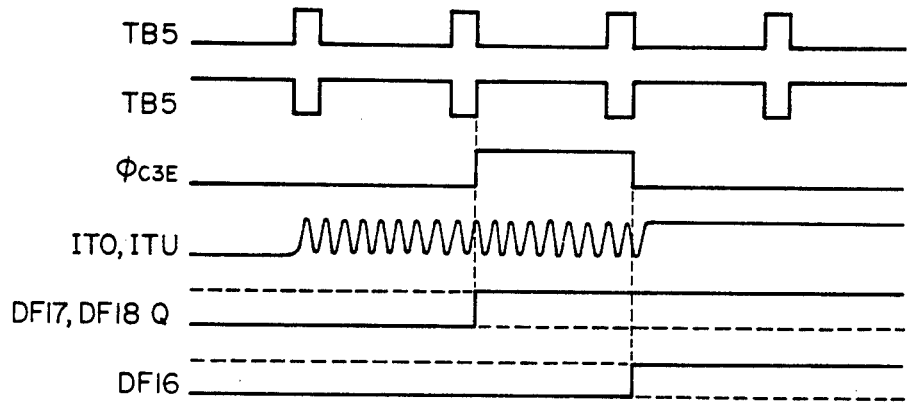
FIG. 43 is a timing chart showing the operation of the circuit shown in FIG. 42.

Along therewith, the clock input to the D-type flip-flop DF16 for storing the alteration of the accumulation time is imparted in inverted logic as shown. FIG. 43 shows the operation of such circuit construction.

The most important factor in effecting the distance detection is the contrast of the image of the object and it is usually more difficult to catch the contrast of an object at a long distance than the contrast of an object at a short distance. Under the conditions which make it difficult to effect the distance detection, it is preferable to carry out error detection at a point as near as possible to infinity.

From such a point of view, as the condition for introducing the content of the shift register PSR1 into the shift register SR6 when comparing the magnitude of the content of the shift register PSR1 with the magnitude of the content of the shift register SR6 during the circulation comparison of the binary image element data in the sequence mode CC4, the condition of "content of shift register PSR1>content of shift register SR6", namely, the condition lacking the sign of equality, is more preferable than the condition of "content of shift register PSR1≧content of shift register SR6", namely, the condition lacking the sign of equality, is more preferable than the condition of "content of shift register PSR1≧content of shift register SR6", because the former condition provides the long distance side first. That is, in the above-described embodiment, as will be appreciated from the foregoing description, comparison is successively effected from the 48 image element data of the infinity side of the reference field area B toward the 48 image element data of the short distance side area with the infinity as the standard and, according to the above-described setting, regarding the amount of shift of the reference field data with respect to the output data of the counter CNT3, namely, the standard field data DA, the introduction of that data into the shift register PSR does not take place under the condition of "content of shift register PSR1=content of shift register SR6" and therefore, after the introduction of the output data of the counter CNT3 into the shift register PSR2 has been once effected at the long distance side during the comparison of the image element data under the condition of "content of shift register PSR1>content of shift register SR6", the condition of "content of shift register PSR1=content of shift register SR6" is neglected even if such condition is created several times and after all, the long distance side first is provided. For this purpose, a signal which usually becomes high may be imparted as an additional input to the NOR gate G39 of FIG. 27A (which constitutes the sequence control circuit 70 shown in FIG. 9) receiving the outputs of the OR gates G77 and G78 of FIG. 27B (which constitute the comparing circuit 106 shown in FIG. 9), but this condition must be released during the control of the phototaking lens in the preset focus mode, namely, during the comparison between the amount of movement of the phototaking lens and the distance data and accordingly, as indicated by line 1 in FIG. 44, the $\overline{Q}$ output (which is imparted to the OR gate G41 constituting the output circuit 108 shown in FIG. 9) of the JK-type flip-flop JF6 of FIG. 27B (which, as already described, constitutes the circuit for detecting the start of the phototaking lens in the preset focus mode) may further be imparted as an additional input to said NOR gate G39.

Figure 44:
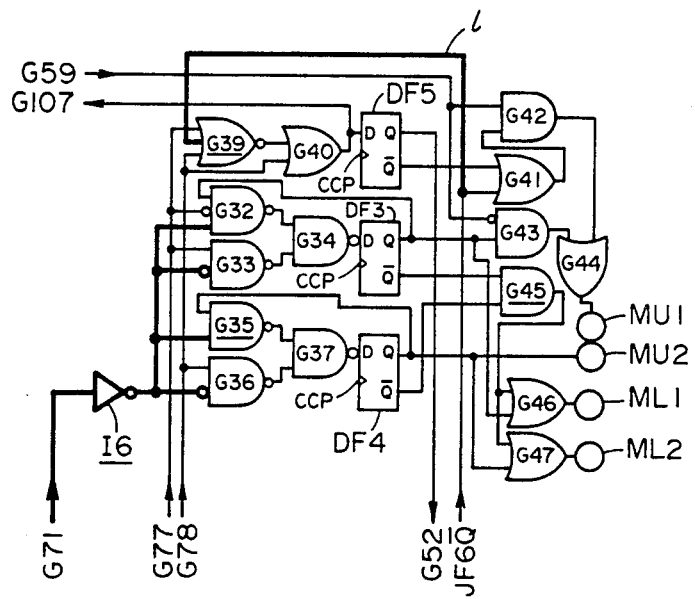
FIG. 44 is a partial circuit diagram showing an example of the case where the distance data obtained during the comparison between the binary image element data in the sequence mode CC4 is given preference at the long distance side and an example of the case where the adjustment and control of the phototaking lens can be effected even during the time until effective distance data is obtained for the first time in the servo focus mode.
Figure 45:
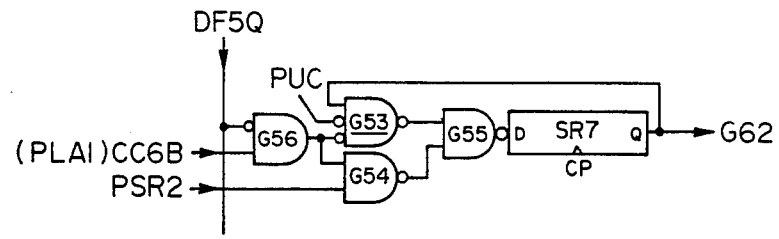
FIG. 45 is a partial circuit diagram showing an example of the case where the phototaking lens can be adjusted to the infinity in-focus position during the time until effective distance data is obtained for the first time in the servo focus mode.

Also, in the above-described embodiment, when the output from the alarm signal output terminal ALM is high to provide the alarming condition in the servo focus mode, namely, during the time until the effective distance data is obtained for the first time after the closing of the main switch, the outputs from the output terminals MU1, MU2, ML1 and ML2 of the output circuit 108 are all rendered low by the output of the output controlling NAND gate G38 of FIG. 27A receiving the Q output of the JK-type flip-flop JF7 of FIG. 27D (these constitute the sequence control circuit 70 shown in FIG. 9), so that the adjustment and control of the phototaking lens are not effected at all, but this is apparently disadvantageous in a case where the contrast of the image of the object is so low that a long time is required until the effective distance data is obtained for the first time after the closing of the main switch. Accordingly, for example, in view of the fact that it is usually at the infinity side that the contrast of the image of the object is so low that the effective distance data is difficult to obtain, the phototaking lens may be adjusted to the infinity in-focus position during the alarming. For that purpose, upon closing of the main switch, the data representing the infinity distance, namely, the "0" data, may be written into the distance data storing shift register SR7 in advance and thereafter, during the time until the effective distance data is obtained for the first time, the phototaking lens may be controlled on the basis of this "0" data. In order that the "0" data may be written into the shift register SR7 upon closing of the main switch, as shown in FIG. 45, the power up clear signal PUC put out from the timing control circuit 110 upon closing of the main switch may be imparted in inverted logic as an additional input to the NAND gate G53 (which constitutes the select gate circuit 96 on the input side of the shift register SR7), whereby the output of the NAND gate G53 may be controlled by the power up clear signal PUC. With this, it is necessary to make such a design that adjustment and control of the phototaking lens can be effected even during the alarming condition and, as shown in FIG. 44, this may be accomplished by discontinuing the imparting of the power up clear signal PUC to the NAND gate G35 and the imparting of the Q output of the JK-type flip-flop JF7 of FIG. 27D to the AND gate G45 and cancelling the output controlling NAND gate G38 so that the output of the OR gate G71 of FIG. 27B may be imparted through the inverter 16 to the NAND gates G32, G33, G35 and G36.

Also, in the servo focus mode, when the distance data put out from the shift register SR7 is repeatedly varied at a very slight width of the order of one bit with the phototaking lens adjusted to the in-focus position, the phototaking lens is finely moved thereby repetitively and becomes very unstable to adversely affect the photographed image particularly in a motion picture camera or a TV camera.

Figure 46:
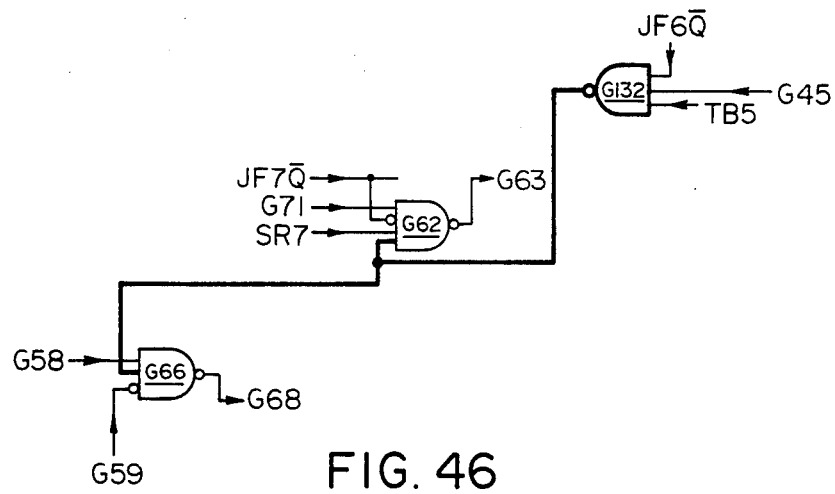
FIG. 46 is a partial circuit diagram showing an example of the case where the stability of the phototaking lens at the in-focus position can be improved during the focus control of the phototaking lens by the servo focus mode.

As a method for preventing such situation, there is a method of neglecting the output data of the shift register SR7 and each LSB data (least significant bit data) of the output data of the gray-binary converting circuit 98, namely, the data of the timing pulse TB5 period, for example, at the point of time whereat the phototaking lens has been adjusted to the in-focus position, namely, at the point of time whereat the outputs from the output terminals MU1 and MU2 have both become high and the outputs from the output terminals ML1 and ML2 have both become low. For this purpose, as shown in FIG. 46, a NAND gate G132 adapted to receive as inputs the Q output of the JK-type flip-flop JF6 of FIG. 27B, the output of the AND gate G45 of FIG. 27A (which constitutes the output circuit 108) and the timing pulse TB5 may be provided so that the output of the NAND gate G132 may be imparted as an additional input to the NAND gate G62 which receives the output data of the shift register SR7, of the NAND gate group constituting the select gate circuit 102 on one input side of the comparing circuit 106 and to the NAND gate G66 which receives the output data from the exclusive OR gate G58 constituting the gray-binary converting circuit 98, of the NAND gate group constituting the select gate circuit 104 on the other input side of the comparing circuit 106. As the result, during the control of the phototaking lens in the servo focus mode, at the point of time whereat the output data of the shift register SR7 has become coincident with the output data of the gray-binary converting circuit 98, the data of the timing pulse TB5 period (namely, the LSB data) of these output data are forcibly rendered into "0" and thus, resolution for the control of the phototaking lens is substantially reduced to one-half to thereby prevent the above-noted undesirable situation. To further increase the stability of the phototaking lens in the in-focus position, even the data of the timing pulse TB4 period, of the output data of the shift register SR7 and the gray-binary converting circuit 98, may be neglected and this may be accomplished by imparting to the NAND gate G132 a signal obtained by taking the logic sum of the timing pulses TB4 and TB5, instead of the timing pulse TB5. By this, the phototaking lens is caused not to follow any fluctuation of the distance data which will take place at the width of the order of 3 bits.

Figure 47:
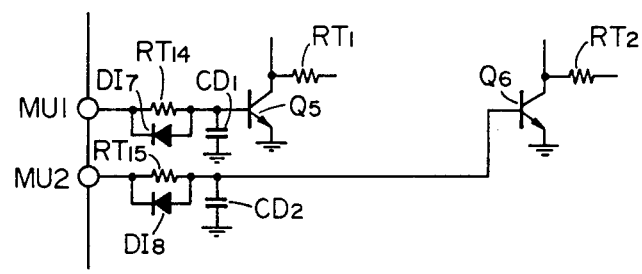
FIG. 47 is a partial circuit diagram showing another example of the case where the stability of the phototaking lens at the in-focus position can be improved during the focus control of the phototaking lens by the servo focus mode.

As another method, there is, for example, a method of delaying the outputs from the output terminals MU1 and MU2, of the outputs from the output terminals MU1, MU2, ML1 and ML2. The delay time in this case must be at least one period of the operation sequence provided by the repetition of the sequence modes CC0–CC7, but to increase the stability of the phototaking lens in the in-focus position, the delay time can be set to a longer time although this more or less aggravates the responsivity. A specific construction for this purpose, as shown in FIG. 47, may be provided by connecting, in the connection and construction for the focus control of the phototaking lens by the servo focus mode shown in FIG. 30, the bases of the motor controlling transistors $Q_5$ and $Q_6$ to the output terminals MU1 and MU2 through an ON delay circuit comprising resistors $RT_{14}$, $RT_{15}$, diodes $DI_7$, $DI_8$ and capacitors $CD_1$, $CD_2$. According to such construction, the base potentials of the transistors $Q_5$ and $Q_6$ are gradually increased for the change of the outputs from the output terminals MU1 and MU2 from low to high and therefore, even if the distance data put out from the shift register SR7 is abruptly varied with the phototaking lens being in the in-focus position, the phototaking lens driving motor MO is not immediately started but if the varied distance data returns to the original data in the next operation sequence, the motor remains stopped and accordingly, the phototaking lens remains held at the in-focus position. On the other hand, if the varied distance data remains varied even in the next operation sequence, the transistors $Q_5$ and $Q_6$ will soon be turned on to start the motor MO and thus, the phototaking lens will be adjusted to the in-focus position with respect to the object distance indicated by this new distance data. Thus, the stability of the phototaking lens in the in-focus position is increased to prevent the above-noted undesirable situation.

As has hitherto been described in detail, according to the present invention, there is provided a distance detecting device in which, with respect to an object whose distance is to be detected, the images of a first and a second field following different lines of sight and containing said object and different in range are scanned while, at the same time, continuous M quantized image element data regarding the first field image and continuous N (N>M) quantized image element data regarding the second field image are obtained and the M image element data regarding the first field image are stored in a first circulation type shift register while the first M image element data of the N image element data regarding the second field image are stored in a second circulation type shift register and the remaining N-M image element data are stored in a third shift register, and the comparison between the stored data of the first and second shift registers during one circulation of said stored data and the relative shift of n bits each of the stored data of the second and third shift registers with respect to the stored data of the first shift register are repeatedly effected to thereby detect the distance to said object, characterized in that in the circulation circuit of the first shift register, bypass means is provided for delaying one circulation of the stored data of the first shift register by n bits relative to one circulation of the stored data of the second shift register and the stored data of the first shift register are circulated through said bypass means, whereby for each one circulation of the stored data of the first shift register, the stored data of the second shift register are shifted by n bits each relative to the stored data of the first shift register. According to this, the inconveniences encountered in the prior art as mentioned at the beginning are all eliminated and particularly, as the construction of the digital sytem adopted, the image element data comparison treatment is made much more efficient and the time required for such comparison treatment is much shortened and moreover, the style of drive and control for the image element data storing shift registers is much simplified and thus, there is obtained a more rational form of system particularly suited to be constructed as the dynamic type system. In these points, the distance detecting device of the present invention is highly effective and useful.

In the embodiment, the digital system is constructed as a dynamic type one, and the one-word time for the data treatment is of 6 bits and the amount of relative shift of the image element data for the comparison of the reference field data DB with the standard field data DA is determined to one bit each and therefore, a shift register of 6-bit construction is used as the circulation delaying shift register as the bypass means for the first shift register SR1 for storing the standard field data, and a shift register of 5-bit construction is used as the circulation delaying shift register SR5 as the bypass means for the second shift register SR2 for storing the reference field data, whereas the present invention is of course not restricted to such construction of the embodiment. That is, where the digital system is formed as a static type construction instead of the dynamic type construction, or even where the digital system is formed as the dynamic type construction, depending on the standard field area A and the reference field area B on the light-receiving portion 32 of the line sensor, the set number of image elements for the separating space IV (shown in FIG. 4) therebetween, and the construction and processing operation of the data processing system subsequent to the match counter CNT4, it is possible to eliminate, for example, the circulation delaying shift register for the shift register SR2 and provide a circulation delaying shift register of 1-bit construction only for the shift register SR1, to thereby adopt a construction in which, during one circulation of each of the stored data of these shift registers SR1 and SR2, the effect of relative 1-bit shift of the stored data of the shift register SR2 with respect to the stored data of the shift register SR1 is provided by said circulation delaying shift register, and accordingly, summing up, a construction may be adopted in which, during one circulation of each of the stored data of the shift registers SR1 and SR2, the circulation return of the stored data of the shift register SR1 is delayed by a desired number of bits relative to the circulation return of the stored data of the shift register SR2.

Incidentally, according to the embodiment, there are proposed, as the form of the focus control system for optical instrument such as camera or the like which utilizes the output from the distance detecting device for detecting the distance to an object, various forms of the system which have taken into account the versatility of the system (for example, the applicability of the system to various instruments such as motion picture camera, TV camera, photographic camera, etc. by the selection of the servo focus or the focusmatic mode and the preset focus mode), the enlarged function of the system (for example, the multifunction by the semi auto—full auto mode change-over in the servo focus or the focusmatic mode), the counter-measure for the control in the case where the effective distance data for the control of the optical system is not obtained (the fixed distance data output circuit shown in FIG. 9 and the embodiment shown in FIGS. 44 and 45), the counter-measure for the control of the optical system during stroboscopic photography, or the counter-measure for the stability of the optical system in the in-focus position in the servo focus mode (the embodiment shown in FIGS. 46 and 47), and as described at the beginning, these provide highly useful advantages as the focus control system of this type.

The analog circuit system shown in FIGS. 7A and 7B and the digital circuit system shown in FIGS. 27A–27D may of course be made into integrated circuits except for the capacitors of great capacity, and particularly, the logic construction of the digital circuit system shown in FIGS. 27A–27D, when made into an integrated circuit, can be modified into various forms as required and accordingly, in this sense, the construction of the system according to the embodiment shown in FIGS. 27A–27D is not absolute.

What we claim is:

1. A distance detecting system for detecting the distance of an object comprising:

image element data producing means (e.g. 30, 66) disposed to receive first and second detected images of said object in accordance with different paths and produce image element data regarding a plurality of continuous image elements in each of said first and second detected images;

first storage means (e.g. SR1) for storing the image element data regarding M continuous image elements in said first detected image, said first storage means having a data circulation path for circulating the stored data thereof;

second storage means (e.g. SR2) for storing the image element data regarding M continuous image elements in said second detected image, said second storage means having a data circulation path for circulating the stored data thereof;

third storage means (e.g. SR3) for storing the image element data regarding M' continuous image elements succeeding said M continuous image elements in said second detected image;

circulation delaying means (e.g. SR4) provided in the data circulation path of said first storage means for delaying the circulation of the stored data of said first storage means by n data relative to the circulation of the stored data of said second storage means during each circulation;

drive means (e.g. 110) for driving said first and second storage means in synchronism with each other to circulate the stored data of said first and second storage means in synchronism with each other;

data transfer means (e.g. 70, 78) for transferring n of the stored data of said third storage means to said second storage means during each circulation of the stored data of said first storage means through said circulation delaying means;

similarity detecting means (e.g. G90, G94, CNT4, PSR1) for detecting the similarity between the stored data of said first and second storage means during each circulation of said data; and location detecting means (e.g. 70, SR6, 106, CNT3, PSR2) for detecting the location, in said M+M' continuous image elements in said second detected image, of a set of M continuous image elements in said second detected image which are most similar to said M continuous image elements in said first detected image, on the basis of the data similarity detected by said similarity detecting means, said location representing the distance of said object.

2. A distance detecting system according to claim 1, wherein said circulation delaying means is a first circulation delaying circuit adapted to delay the circulation of the stored data of said first storage means by $\alpha$ greater than said n during each circulation, and said system further comprises:

a second circulation delaying circuit (e.g. SR5) provided in the data circulation path of said second storage means to delay the circulation of the stored data of said second storage means by $\alpha - n$ during each circulation.

3. A distance detecting system according to claim 2, wherein said first circulation delaying circuit is a shift register of $\alpha$-bit construction, said second circulation delaying circuit is a shift register of $\alpha$-n-bit construction, and these two circulation delaying shift registers are disposed so as to be driven in synchronism with each other by said drive means.

4. A distance detecting system according to any one of claims 1 to 3, wherein said n is 1.

5. A distance detecting system according to any one of claims 1 to 3, wherein said first and second storage means are shift registers of M-bit construction, said third storage means is a shift register of M'-bit construction, and these three data storing shift registers are disposed so as to be driven in synchronism with each other by said drive means.

6. A distance detecting system according to any one of claims 1 to 3, wherein said image element data producing means includes:

image scanning means (e.g. 30) for scanning said first and second detected images to produce analog image element data regarding the plurality of continuous image elements in each of said first and second detected images; and quantizing means (e.g. 66) for quantizing said analog image element data produced by said image scanning means to produce quantized image element data regarding the plurality of continuous image elements in each of said first and second detected images;

said first storage means being disposed to store the quantized image element data regarding the M continuous image elements in said first detected image, and said second and third storage means being disposed to store the quantized image element data regarding the succeeding M and M' continuous image elements in said second detected image.

7. A distance detecting system according to claim 6, wherein said first and second storage means are shift registers of M-bit construction, said third storage means is a shift register of M'-bit construction, and these three data storing shift registers are disposed so as to be driven in synchronism with each other by said drive means.

8. A distance detecting system according to claim 5, wherein said n is 1.

9. A distance detecting system according to claim 7, wherein said n is 1.

10. An image correlation system for correlating first and second image having associated image portions, comprising:

image element data producing means (e.g. 30, 66) for producing image element data regarding a plurality of image elements in each of said first and second images;

first storage means (e.g. SR1) for storing the image element data regarding M continuous image elements in a predetermined image portion of said first image, said first storage means having a data circulation path for circulating the stored data thereof;

second storage means (e.g. SR2) for storing the image element data regarding M continuous image elements in said second image, said second storage means having a data circulation path for circulating the stored data thereof;

third storage means (e.g. SR3) for storing the image element data regarding M' continuous image elements succeeding said M continuous image elements in said second image;

circulation delaying means (e.g. SR4) provided in the data circulation path of said first storage means for delaying the circulation of the stored data of said first storage means by n data relative to the circulation of the stored data of said second storage means during each circulation;

drive means (e.g. 110) for driving said first and second storage means in synchronism with each other to circulate the stored data of said first and second storage means in synchronism with each other;

data transfer means (e.g. 70, 78) for transferring n of the stored data of said third storage means to said second storage means during each circulation of the stored data of said first storage means through said circulation delaying means;

similarlity detecting means (e.g. G90, G94, CNT4, PSR1) for detecting the similarity between the stored data of said first and second storage means during each circulation of said data; and detecting means (e.g. 70, SR6, 106, CNT3, PSR2) for detecting an image portion related to said predetermined image portion of said first image, out of said second image, on the basis of the data similarity detected by said similarity detecting means.

11. An image correlation system according to claim 10, wherein said circulation delaying means is a first circulation delaying circuit adapted to delay the circulation of the stored data of said first storage means by $\alpha$ greater than said n during each circulation, and said system further comprises:

a second circulation delaying circuit (e.g. SR5) provided in the data circulation path of said second storage means to delay the circulation of the stored data of said second storage means by $\alpha$-n during each circulation.

12. An image correlation system according to claim 11, wherein said first circulation delaying circuit is a shift register of $\alpha$-bit construction, said second circulation delaying circuit is a shift register of $\alpha$-n-bit construction, and these two circulation delaying shift registers are disposed so as to be driven in synchronism with each other by said drive means.

13. An image correlation system according to any one of claims 10 to 12, wherein said n is 1.

14. An image correlation system according to any one of claims 10 to 12, wherein said first and second storage means are shift registers of M-bit construction, said third storage means is a shift register of M'-bit construction, and these three data storing shift registers are disposed so as to be driven in synchronism with each other by said drive means.

15. An image correlation system according to claim 14, wherein said n is 1.

16. An image correlation system according to any one of claims 10 to 12, wherein said image element data producing means includes:

image scanning means (e.g. 30) for scanning said first and second images to produce analog image element data regarding the plurality of continuous image elements in each of said first and second images; and quantizing means (e.g. 66) for quantizing said analog image element data produced by said image scanning means to produce quantized image element data regarding the plurality of continuous image elements in each of said first and second images;

said first storage means being disposed to store the quantized image element data regarding the M continuous image elements in said first image, and said second and third storage means being disposed to store the quantized image element data regarding the succeeding M and M' continuous image elements in said second image.

17. An image correlation system according to claim 16, wherein said first and second storage means are shift registers of M-bit construction, said third storage means is a shift register of M'-bit construction, and these three data storing shift registers are disposed so as to be driven in synchronism with each other by said drive means.

18. An image correlation system according to claim 17, wherein said n is 1.

19. A data correlation system for correlating first quantized data of M bits and second quantized data of N bits greater than M, comprising:

first storage means (e.g. SR1) for storing said first quantized data, said first storage means having a data circulation path for circulating the stored data thereof;

second storage means (e.g. SR2) for storing the first M data of said second quantized data, said second storage means having a data circulation path for circulating the stored data thereof;

third storage means (e.g. SR3) for storing the remaining N−M data of said second quantized data;

circulation delaying means (e.g. SR4) provided in the data circulation path of said first storage means for delaying the circulation of the stored data of said first storage means by n data relative to the circulation of the stored data of said second storage means during each circulation;

drive means (e.g. 110) for driving said first and second storage means in synchronism with each other to circulate the stored data of said first and second storage means in synchronism with each other;

data transfer means (e.g. 70, 78) for transferring n of the stored data of said third storage means to said second storage means during each circulation of the stored data of said first storage means through said circulation delaying means;

similarity detecting means (e.g. G90, G94, CNT4, PSR1) for detecting the similarity between the stored data of said first and second storage means during each circulation of said data; and detecting means (e.g. 70, SR6, 106, CNT3, PSR2) for detecting a set of M continuous data most similar to said first quantized data, out of said second quantized data, on the basis of the data similarity detected by said similarity means.

20. A data correlation system according to claim 19, wherein said circulation delaying means is a first circulation delaying circuit adapted to delay the circulation of the stored data of said first storage means by $\alpha$ greater than said n during each circulation, and said system further comprises:

a second circulation delaying circuit (e.g. SR5) provided in the data circulation path of said second storage means to delay the circulation of the stored data of said second storage means by $\alpha$-n during each circulation.

21. A data correlation system according to claim 20, wherein said first circulation delaying circuit is a shift register of $\alpha$-bit construction, said second circulation delaying circuit is a shift register of $\alpha$-n-bit construction, and these two circulation delaying shift registers are disposed so as to be driven in synchronism with each other by said drive means.

22. A data correlation system according to any one of claims 19 to 21, wherein said n is 1.

23. A data correlation system according to any one of claims 19 to 21, wherein said first and second storage means are shift registers of M-bit construction, said third storage means is a shift register of N-M-bit construction, and these three data storing shift registers are disposed so as to be driven in synchronism with each other by said drive means.

24. A data correlation system according to claim 23, wherein said n is 1.

25. A focus detecting system for detecting the focus adjusted condition of objective lens means with respect to an object, comprising:

distance detecting means for detecting the distance of said object, said distance detecting means putting out object distance data in the form of digital data of m bits following a predetermined code;

converter means (e.g. 98) for converting an electrical signal representing the position of said lens means along the optic axis thereof into digital data of m bits following said predetermined code;

counter means (e.g. CNT3) applied to count pulse signals obtained in association with the movement of said lens means along the optic axis thereof from a predetermined position, said counter means putting out its count output in the form of digital data of m bits following said predetermined code;

means (e.g. G82–G85, DF7, DF8) for absorbing the chattering of said pulse signals, said counter means being electrically connected to said chattering absorbing means to count the pulse signals imparted through said chattering absorbing means to count the pulse signals imparted through said chattering absorbing means;

selector means (e.g. 104) capable of selectively putting out the output data of said converter means and the output data of said counter means;

means (e.g. terminal 17S or 28S) applied to designate the data to be selected by said selector means; and comparing means (e.g. 106) for comparing the data selected by said selector means with the output data of said distance detecting means, said comparing means producing a characteristic output representing the properly focused condition of said lens means with respect to said object when said two data are coincident with each other.

26. A focus detecting system according to claim 25, wherein said code is a binary code.

27. A focus detecting system according to claim 26, wherein said converter means is a gray-binary converting circuit for converting a gray code signal of m bits representing the position of said lens means along the optic axis thereof into binary digital data of m bits.

28. A focus detecting system according to claim 26 or 27, wherein said counter means is a binary counter of m-bit construction.

29. A camera comprising:
objective lens means (e.g. TL) capable of being focused with respect to an object;
an automatic focusing device (e.g. DCS, MO) for automatically focusing said lens means with respect to said object, said automatic focusing device being selectively operable in a first operation mode in which it is repeatedly and continuously operated to cause the focusing of said lens means to follow a variation in the distance of said object and in a second operation mode in which it is only once operated to cause the focusing of said lens means not to follow the variation in the distance of said object after said lens means has once been focused with respect to said object;
actuator means (e.g. $SW_T$) for operating said automatic focusing device; and
selector means (e.g. $SW_{SF}$) for selecting the operation mode of said automatic focusing device between said first and second operation modes.

30. A camera according to claim 29, further comprising:
operating means (e.g. $SW_P$) commonly applied to stop the operation of said automatic focusing device when in said first operation mode and to operate said automatic focusing device only once again when in said second operation mode.

31. A camera according to claim 29 or 30, wherein said actuator means is switch means operated by camera trigger means.

32. An automatic focusing system for automatically focusing objective lens means with respect to an object, comprising:
distance detecting means for detecting the distance of said object, said distance detecting means putting out distance data representing the object distance at the end of each distance detecting operation and holding said distance data until the next distance detecting operation is terminated;
position detecting means (e.g. GC, 98) for detecting the position of said lens means (e.g. TL) along the optic axis thereof, said position detecting means putting out position data representing the position of said lens means along the optic axis thereof;
comparing means (e.g. 106) for comparing the distance data put out from said distance detecting means with the position data put out from said position detecting means and putting out an output representing the focused condition of said lens means with respect to said object;
regulating means (e.g. MO) for regulating said lens means along the optic axis thereof to focus said lens means with respect to said object on the basis of the output of said comparing means; and
means (e.g. the construction of PUC and G53 in FIG. 45) for imparting to said comparing means specific distance data representing a predetermined distance as the output data of said distance detecting means during the time from after the operation of said distance detecting means has been started until the first distance detecting operation thereof is terminated.

33. An automatic focusing system according to claim 32, wherein said predetermined distance is infinity.

34. An automatic focusing system according to claim 32 or 33, further comprising:
operation detecting means (e.g. JF7 in FIG. 27D) for detecting whether or not said distance detecting means has completed its first distance detecting operation after the operation thereof has been started, said operation detecting means producing a characteristic output during the time from after the operation of said distance detecting means has been started until the first distance detecting operation thereof is terminated; and
alarm means (e.g. $LD_1$ in FIG. 30) capable of responding to the characteristic output of said operation detecting means to produce an alarm display during the time from after the operation of said distance detecting means has been started until the first distance detecting operation thereof is terminated.

35. A focus detecting system for detecting the focused condition of objective lens means with respect to an object, comprising:
(A) distance detecting means for detecting the distance of said object, said distance detecting means putting out distance data representing the object distance in the form of digital data of m bits;
(B) position detecting means (e.g. GC, 98) for detecting the position of said lens means (e.g. TL) along the optic axis thereof, said position detecting means putting out position data representing the position of said lens means along the optic axis thereof in the form of digital data of m bits;

(C) comparing means (e.g. 106) for comparing the distance data put out from said distance detecting means with the position data put out from said position detecting means and producing an output representing the focused condition of said lens means with respect to said object;

(D) discrimination means (e.g. G45 in FIG. 27A) for discriminating, on the basis of the output of said comparing means, whether or not said lens means has been properly focused with respect to said object, said discrimination means producing a characteristic output when it has detected that said lens means has been properly focused with respect to said object; and (E) data nullifying means (e.g. G132 in FIG. 46) capable of responding to the characteristic output of said discrimination means to nullify the data of at least the least significant bit of said two data during the comparison by said comparing means between said distance data and said position data.

36. An automatic focusing system for automatically focusing objective lens means with respect to an object, comprising:

(A) distance detecting means for detecting the distance of said object, said distance detecting means putting out distance data representing the object distance in the form of digital data of m bits;

(B) position detecting means (e.g. GC, 98) for detecting the position of said lens means (e.g. TL) along the optic axis thereof, said position detecting means putting out position data representing the position of said lens means along the optic axis thereof in the form of digital data of m bits;

(C) comparing means (e.g. 106) for comparing the distance data put out from said distance detecting means with the position data put out from said position detecting means and producing an output representing the focused condition of said lens means with respect to said object;

(D) regulating means (e.g. MO) for regulating said lens means along the optic axis thereof to focus said lens means with respect to said object on the basis of the output of said comparing means;

(E) discrimination means (e.g. G45 in FIG. 27A) for discriminating, on the basis of the output of said comparing means, whether or not said lens means has been properly focused with respect to said object, said discrimination means producing a characteristic output when it has detected that said lens means has been properly focused with respect to said object; and (F) data nullifying means (e.g. G132 in FIG. 46) capable of responding to the characteristic output of said discrimination means to nullify the data of at least the least significant bit of said two data during the comparision by said comparing means between said distance data and said position data.

37. An automatic focusing system for automatically focusing objective lens means with respect to an object, comprising:

(A) distance detecting means for detecting the distance of said object, said distance detecting means putting out distance data representing the distance of said object simultaneously with the termination of the distance detecting operation;

(B) drive means (e.g. SP$_1$ in FIG. 47) for moving said lens means (TL) along the optic axis thereof from a predetermined position;

(C) starting means (e.g. RB in FIG. 47) for starting the movement of said lens means;

(D) position detecting means (e.g. PG in FIG. 37 and CNT3 in FIG. 9) for detecting the moved position of said lens means on the optic axis thereof in association with the movement of said lens means from said predetermined position, said position detecting means putting out position data representing the moved position of said lens means on the optic axis thereof;

(E) comparing means (e.g. 106 in FIG. 9) for comparing the distance data put out from said distance detecting means with the position data put out from said position detecting means and putting out a stop signal for stopping said lens means at the properly focused position with respect to said object;

(F) stop means (e.g. MG, ST$_2$ in FIG. 37) capable of responding to the output of said comparing means to stop the movement of said lens means; and (G) data supply means (e.g. 100, 102, 70 in FIG. 9) for imparting, instead of the output data of said distance detecting means, specific distance data representing predetermined distance to said comparing means when said lens means starts to move before the distance detecting means produces the distance data.

38. An automatic focusing system according to claim 37, wherein said data supply means includes:

data producing means (e.g. 100) for producing said specific distance data;

operation detecting means (e.g. JF7 in FIG. 27D) for detecting whether or not said distance detecting means has terminated its distance detecting operation after the operation thereof has been started, said operation detecting means producing a characteristic output during the time from after the operation of said distance detecting means has been started until the distance detecting operation thereof is terminated; and selector means (e.g. 106) for selecting the distance data to be imparted to said comparing means between output data of said distance detecting means and the output data of said data producing means, said selector means being capable of responding to the characteristic output of said operation detecting means and selecting the output data of said data producing means instead of the output data of said distance detecting means when said lens means starts to move before the distance detecting operation of said distance detecting means is terminated.

39. An automatic focusing system according to claim 38, further comprising:

alarm means (e.g. LD$_1$ in FIG. 37) capable of responding to the output of said operation detecting means to produce an alarm display during the time from after the operation of said distance detecting means has been started until the distance detecting operation thereof is terminated.

40. A camera capable of using a flash unit, comprising:

(A) objective lens means movable along the optic axis thereof to be focused with respect to an object;

(B) distance detecting means for detecting the distance of said object, said distance detecting means putting out distance data representing the distance of said object simultaneously with the termination of the distance operation;

(C) drive means (e.g. SP₁ in FIG. 47) for moving said lens means (e.g. TL) along the optic axis thereof from a predetermined position;

(D) starting means (e.g. RB in FIG. 47) for starting the movement of said lens means;

(E) position detecting means (e.g. PG in FIG. 37 and CNT3 in FIG. 9) for detecting the moved position of said lens means along the optic axis thereof in association with the movement of said lens means from said predetermined position, said position detecting means putting out position data representing the moved position of said lens means along the optic axis thereof;

(F) comparing means (e.g. 106 in FIG. 9) for comparing the distance data put out from said distance detecting means with the position data put out from said position detecting means and putting out a stop signal for stopping said lens means at the properly focused position with respect to said object;

(G) stop means (e.g. MG, ST₂ in FIG. 37) capable of responding to the output of said comparing means to stop the movement of said lens means; and (H) data supply means (e.g. 100, 106, 70 in FIG. 9 and SWs in FIG. 37) for imparting to said comparing means specific distance data representing a predetermined distance suited for flash photography, instead of the output data of said distance detecting means, when said lens means starts to move before the distance detecting means produces the distance data in photography using said flash unit.

41. A camera according to claim 40, wherein said data supply means includes:

data producing means (e.g. 100) for producing said specific distance data;

flash photography detecting means (e.g. SW$_S$) for detecting the use of said flash unit, said flash photography detecting means producing a characteristic output when it has detected the use of said flash unit;

operation detecting means (e.g. JF7 in FIG. 27D) for detecting whether or not said distance detecting means has terminated its distance detecting operation after the operation thereof has been started, said operation detecting means producing a characteristic output during the time from after the operation of said distance detecting means has been started until the distance detecting operation thereof is terminated; and selector means (e.g. 106) for selecting the distance data to be imparted to said comparing means between the output data of said distance detecting means and the output data of said data producing means, said selector means being capable of responding to the characteristic outputs of said flash photography detecting means and said operation detecting means and selecting the output data of said data producing means when said lens means starts to move before the distance detecting operation of said distance detecting means is terminated in photography using the flash unit.

42. A distance detecting system for detecting the distance of an object, comprising:

image element data producing means (e.g. 30 in FIGS. 2 and 3) disposed to receive a first and a second detected image of said object in accordance with different paths and produce analog image element data regarding a plurality of image elements in each of said first and second detected images;

quantizing means (e.g. 66 in FIG. 7B) for quantizing the analog image element data produced by said image element data producing means to produce quantized image element data regarding the plurality of image elements in each of said first and second detected images;

storage means (e.g. SR1, SR2, SR3 in FIG. 9) for storing quantized image element data regarding M continuous image elements in said first detected image and quantized image element data regarding N (N>M) continuous image elements in said second detected image;

image position detecting means (e.g. G90, G94, CNT4, PSR1, 70, SR6, 106, CNT3, PSR2 in FIG. 9) for detecting the location, in said N continuous image elements in said second detected image, of a set of M continuous image elements in said second detected image which are most similar to said M continuous image elements in said first detected image, on the basis of the quantized image element data stored in said storage means, the output of said image position detecting means representing the distance of said object;

quantized condition detecting means (e.g. the construction of 74 in FIG. 9 - G4 - GR, JF1, JF2, DF2 in FIG. 27A) for detecting whether or not the quantized image element data regarding said M continuous image elements in said first detected image have all become identical data and whether or not the quantized image element data regarding said N continuous image elements in said second detected image have all become identical data, said quantized condition detecting means producing a characteristic output when it has detected that at least one of the quantized image element data regarding said M continuous image elements in said first detected image and the quantized image element data regarding said N continuous image elements in said second detected image are all identical data; and control means (e.g. 70 in FIG. 9) responsive to said characteristic output of said quantized condition detecting means to control the operation of the system.

43. A distance detecting system according to claim 42, wherein said quantizing means compares the analog image element data produced by said image element data producing means with the threshold level to thereby produce quantized image element data in the form of logic value "1" or logic value "0" on the basis of the result of the comparison, and said quantized condition detecting means detects whether or not the data regarding said M continuous image elements in said first detected image are all "1" or all "0" and whether or not the data regarding said N continuous image elements in said second detected image are all "1" or all "0" and produces said characteristic output when it has detected that at least one of the data regarding said M continuous image elements in said first detected image and the data regarding said N continuous image elements in said second detected image are all "1" or all "0".

44. A distance detecting system according to claim 42 or 43, wherein said control means inhibits the image position detection operation of said image position detecting means in response to said characteristic output of said quantized condition detecting means.

45. A data correlation system for correlating a first quantized data of M bits and a second quantized data of N bits greater than M, comprising:
- first storage means (e.g. SR1) for storing said first quantized data, said first storage means having a data circulation path for circulating the stored data thereof;
- second storage means (e.g. SR2) for storing the first M data of said second qauntized data, said second storage means having a data circulation path for circulating the stored data thereof;
- third storage means (e.g. SR3) for storing the remaining N-M data of said second quantized data;
- circulation delaying means (e.g. SR4) provided in the data circulation path of said first storage means for delaying the circulation of the stored data of said first storage means by n data relative to the circulation of the stored data of said second storage means during each circulation;
- drive means (e.g. 110) for driving said first and second storage means in synchronism with each other to circulate the stored data of said first and second storage means in synchronism with each other;
- data transfer means (e.g. 70, 78) for transferring n of the stored data of said third storage means to second storage means during each circulation of the stored data of said first storage means through said circulation delaying means; and
- detecting means (e.g. G90, G94, CNT4, PSR1) for detecting correlation between the stored data of said first and second storage means during each circulation of said data.

46. A data correlation system according to claim 45, wherein said circulation delaying means is a first circulation delaying circuit adapted to delay the circulation of the stored data of said first storage means by $\alpha$ greater than said n during each circulation, and said system further comprises:
- a second circulation delaying circuit (e.g. SR5) provided in the data circulation path of said second storage means to delay the circulation of the stored data of said second storage means by $\alpha$-n during each circulation.

47. A data correlation system according to claim 46, wherein said first circulation delaying circuit is a shift register of $\alpha$-bit construction, said second circulation delaying circuit is a shift register of $\alpha$-n-bit construction, and these two circulation delaying shift registers are disposed so as to be driven in synchronism with each other by said drive means.

48. A data correlation system according to any one of claims 45 to 47, wherein said n is 1.

49. A data correlation system according to any one of claims 45 to 47, wherein said first and second storage means are shift registers of M-bit construction, said third storage means is a shift register of N-M-bit construction, and these three data storing shift registers are disposed as to be driven in synchronism with each other by said drive means.

50. A data correlation system according to claim 49, wherein said n is 1.

51. A system for detecting the focusing condition of an objective lens means with respect to an object, said lens means having an optical axis and being movable along the axis, said system comprising:
- distance detecting means for detecting the distance of said object and for producing distance data regarding the object distance;
- first receiving means (e.g. 98) for receiving a first type of electrical signal correlated with said lens means and for providing position data regarding the adjusted position of the lens means along the optical axis on the basis of said first type of electrical signal;
- second receiving means (e.g. CNT3, PSR2) for receiving a second type of electrical signal correlated with said lens means which is different from said first type of electrical signal and for providing position data regarding the adjusted position of the lens means along the optical axis on the basis of said second type of electrical signal;
- selecting means (e.g. 104) for selecting said position data provided by said first receiving means and said position data provided by said second receiving means; and
- means (e.g. 106) for receiving the selected position data selected by said selecting means and said distance data produced from said distance detecting means and for discriminating the focusing condition of said lens means with respect to the object.

52. A system according to claim 51, wherein said first type of electrical signal has a predetermined first code; and said first receiving means includes a code conversion circuit for converting said first code into a predetermined second code different from the first code and fitted to a code of said distance data.

53. A system according to claim 52, wherein said first code is a gray code and said second code is a binary code.

54. A system according to one of claims 51 to 53, wherein said second type of electrical signal includes electrical pulses generated in relation to the movement of said lens means; and said second receiving means includes a pulse counting circuit for counting said electrical pulses to provide said position data.

55. A system according to claim 54, wherein said pulse counting circuit includes a binary counter to provide said position data in a binary code.

56. A system according to claim 55, wherein said distance detecting means produces said distance data in a binary code.

57. A system according to claim 53, wherein said distance detecting means produces said distance data in a binary code.

* * * * *

UNITED STATES PATENT AND TRADEMARK OFFICE
CERTIFICATE OF CORRECTION

PATENT NO. : 4,329,033

DATED : May 11, 1982

INVENTOR(S) : MAKOTO MASUNAGA, ET AL.

It is certified that error appears in the above-identified patent and that said Letters Patent is hereby corrected as shown below:

Column 7, line 25, after "output" insert --data--.

Column 10, line 44, insert "between" after --position--.

Column 13, line 4, "ara" should read --area--;
  line 27, "eferencing" should read --referencing--;
  line 58, "$\phi_1-100_4$" should read --$\phi_1-\phi_4$--.

Column 15, line 9, "are a" should read --area A--;
  line 41, "rinsing" should read --rising--.

Column 18, line 59, "and" should read --are--.

Column 23, line 51, after "charging of the" insert --capacitor $C_1$ is cut off and after all, in this dark current--.

Column 24, line 51, "554" should read --54--.

Column 26, line 9, "VMIN" should read --$V_{MIN}$--.

Column 39, line 35, "strobo" should read --strobe--.

Column 40, line 3, "chattring" should read --chattering--;
  line 26, "sequnce" should read --sequence--;
  line 43, "fall" should read --full--.

Column 43, line 38, "sequence" sould read --sequences--;
  line 45, "like" should read --line--;
  line 64, "of" should read --for--.

Column 49, line 14, "25∞" should read --"25"--.

UNITED STATES PATENT AND TRADEMARK OFFICE
CERTIFICATE OF CORRECTION

PATENT NO. : 4,329,033
DATED : May 11, 1982
INVENTOR(S) : MAKOTO MASUNAGA, ET AL.

It is certified that error appears in the above-identified patent and that said Letters Patent is hereby corrected as shown below:

Column 50, line 35, "24bit" should read --24-bit--.

Column 56, line 53, "$\phi_{CU}$synchronized" should read --$\phi_{CU}$ synchronized--.

Column 57, line 10, after "during" insert --which--.

Column 63, line 53, "½$_R$" should read --$\phi_R$--.

Column 66, line 13, "Designate" should read --designate--.

Column 69, line 27, after "G92" insert --and G93--.

Column 72, line 5, "Jk" should read --JK--.

Column 73, line 1, "$\phi R_{I1}$" should read --$\phi_{RI1}$--;
line 35, delete "the" before --FIGS.--.

Column 74, line 5, "15" should read --I5--;
line 8, "15" should read --I5--;
line 12, "15" should read --I5--;
line 50, after "AND" insert --gate--.

Column 76, line 39, "transistors" should read --resistors--.

Column 77, line 1, "GNC" should read --GND--;
line 2, "adpated" should read --adapted--;
line 11, after "after" insert --the--;
line 56, "leng" should read --long--.

UNITED STATES PATENT AND TRADEMARK OFFICE
CERTIFICATE OF CORRECTION

PATENT NO. : 4,329,033           Page 3 of 3

DATED : May 11, 1982

INVENTOR(S) : MAKOTO MASUNAGA, ET AL.

It is certified that error appears in the above-identified patent and that said Letters Patent is hereby corrected as shown below:

Column 78, line 11, "M11" should read --ML1--;
           line 48, "my" should read --may--.

Column 79, line 53, "constrast" should read --contrast--;
           "construstion (second occurrence) should read --construction--.

Column 82, line 55, delete --strobo--;
           line 61, delete --strobo--.

Column 95, line 24, Claim 25, "forcomparing" should read --for comparing--.

Column 102, line 1, Claim 49, after "disposed" insert --so--.

Signed and Sealed this

First Day of November 1983

[SEAL]

Attest:

GERALD J. MOSSINGHOFF

Attesting Officer      Commissioner of Patents and Trademarks